Jan. 19, 1965  R. W. WAYMAN  3,165,946
CONTROLS FOR POWER TRANSMISSION
Filed June 5, 1950  43 Sheets-Sheet 7

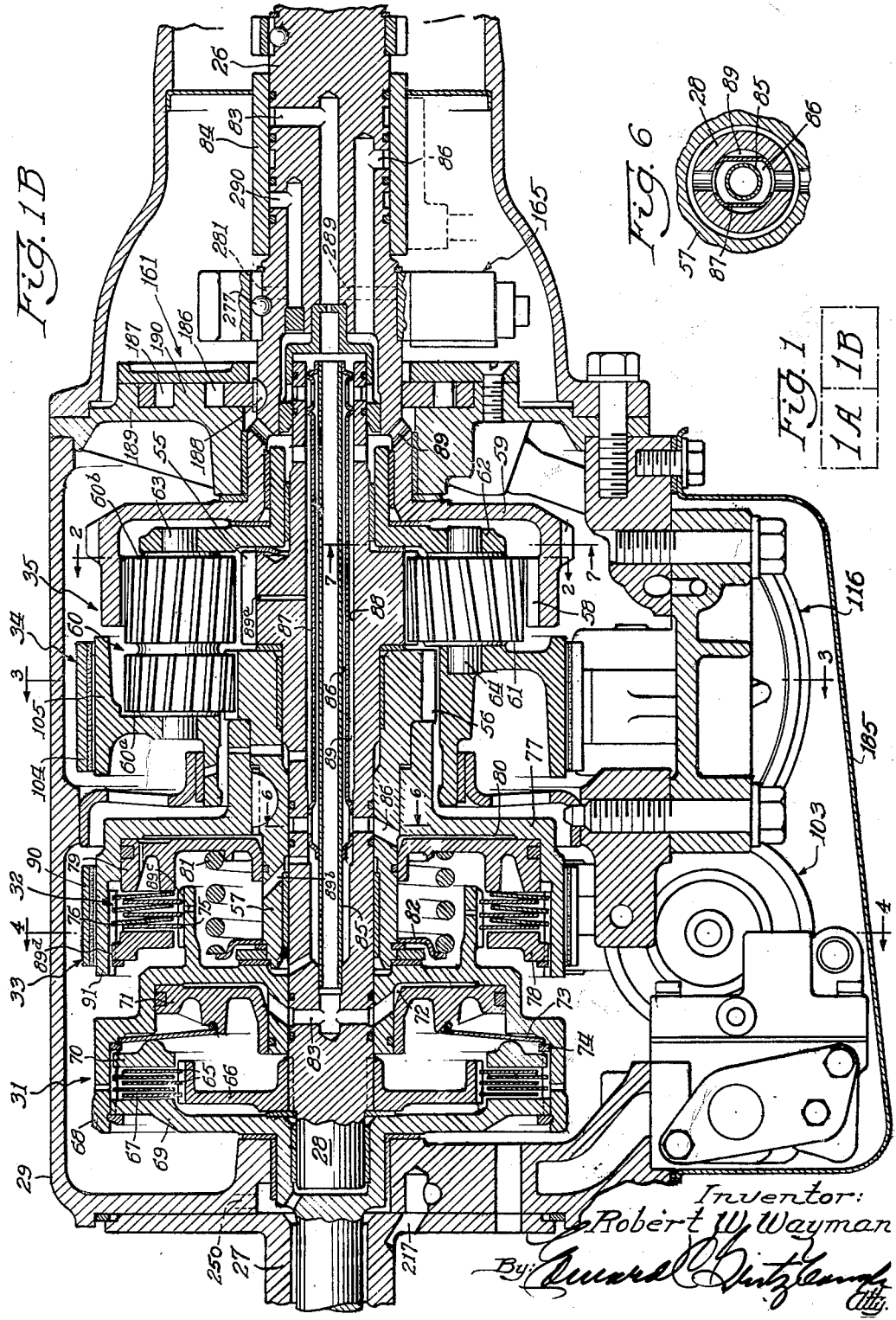

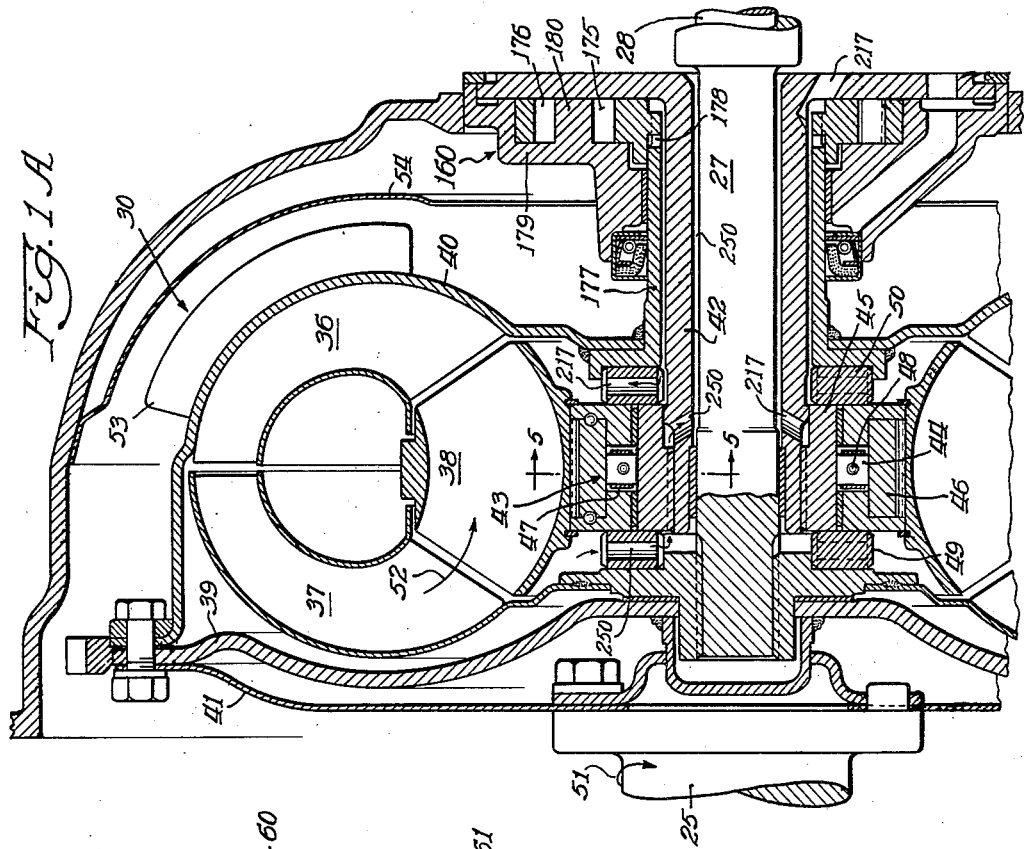
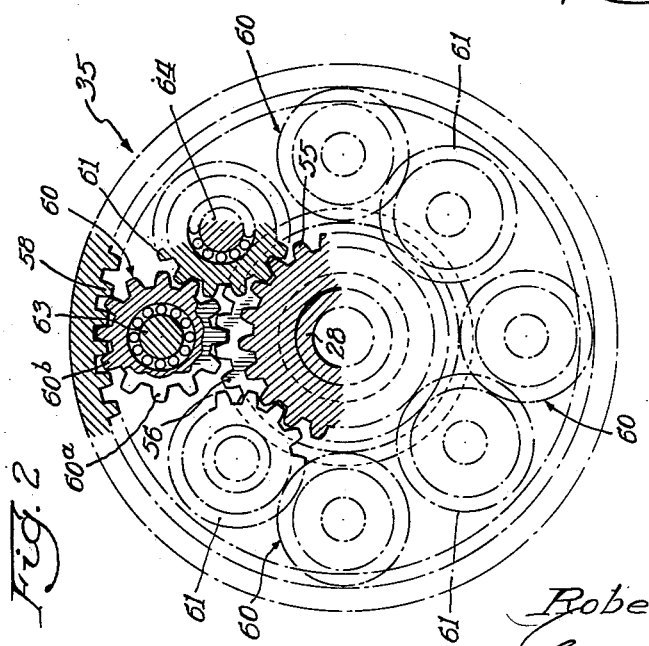
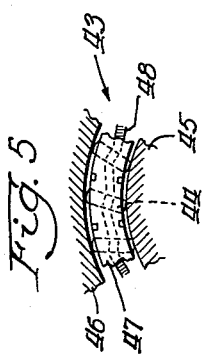

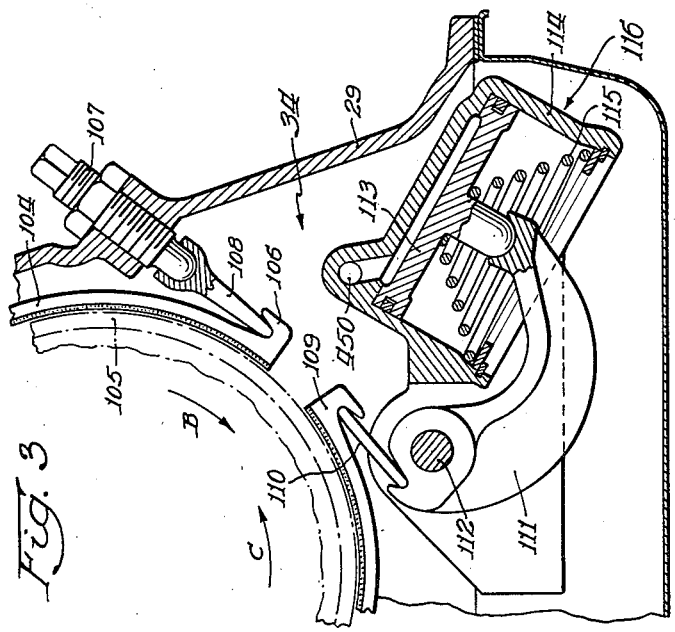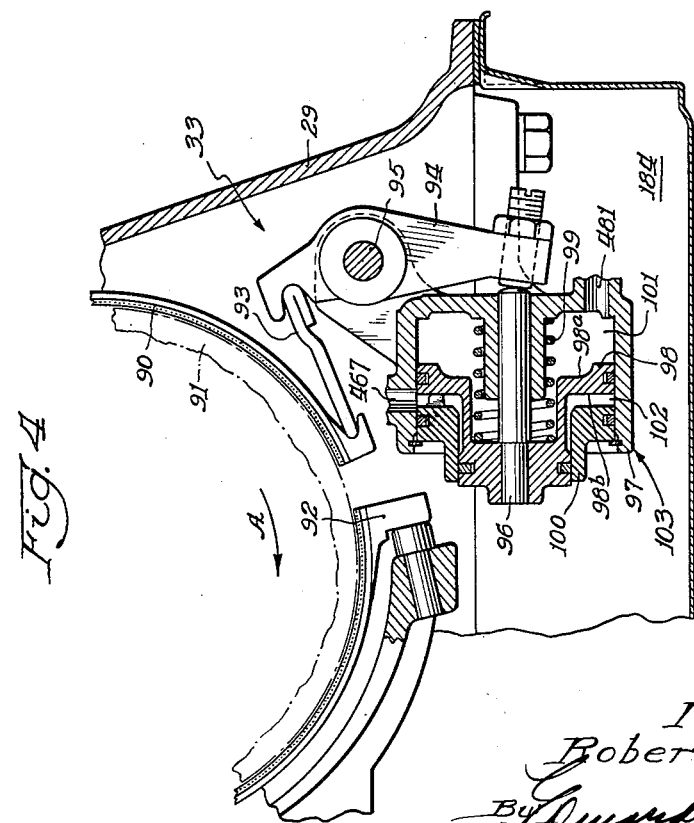

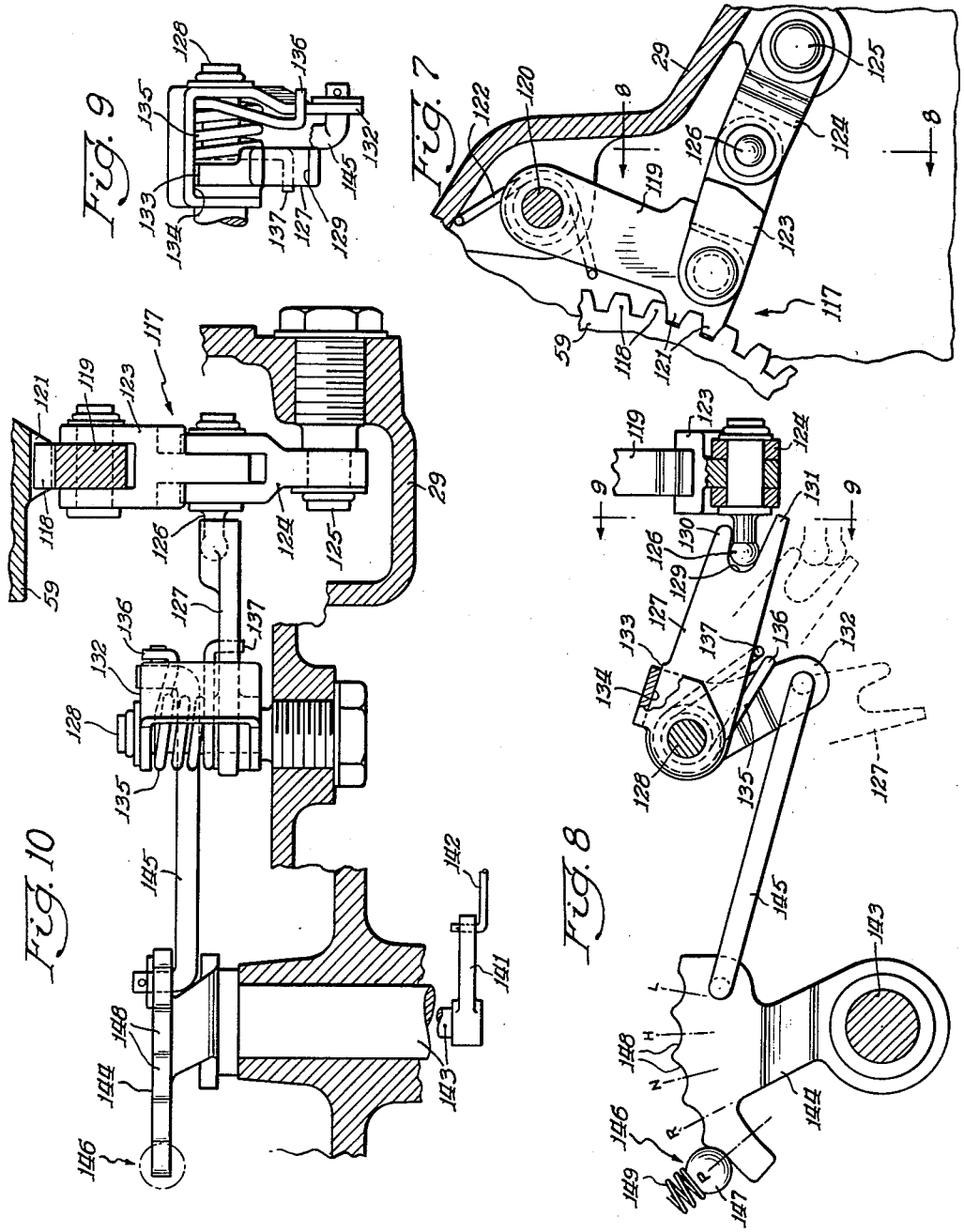

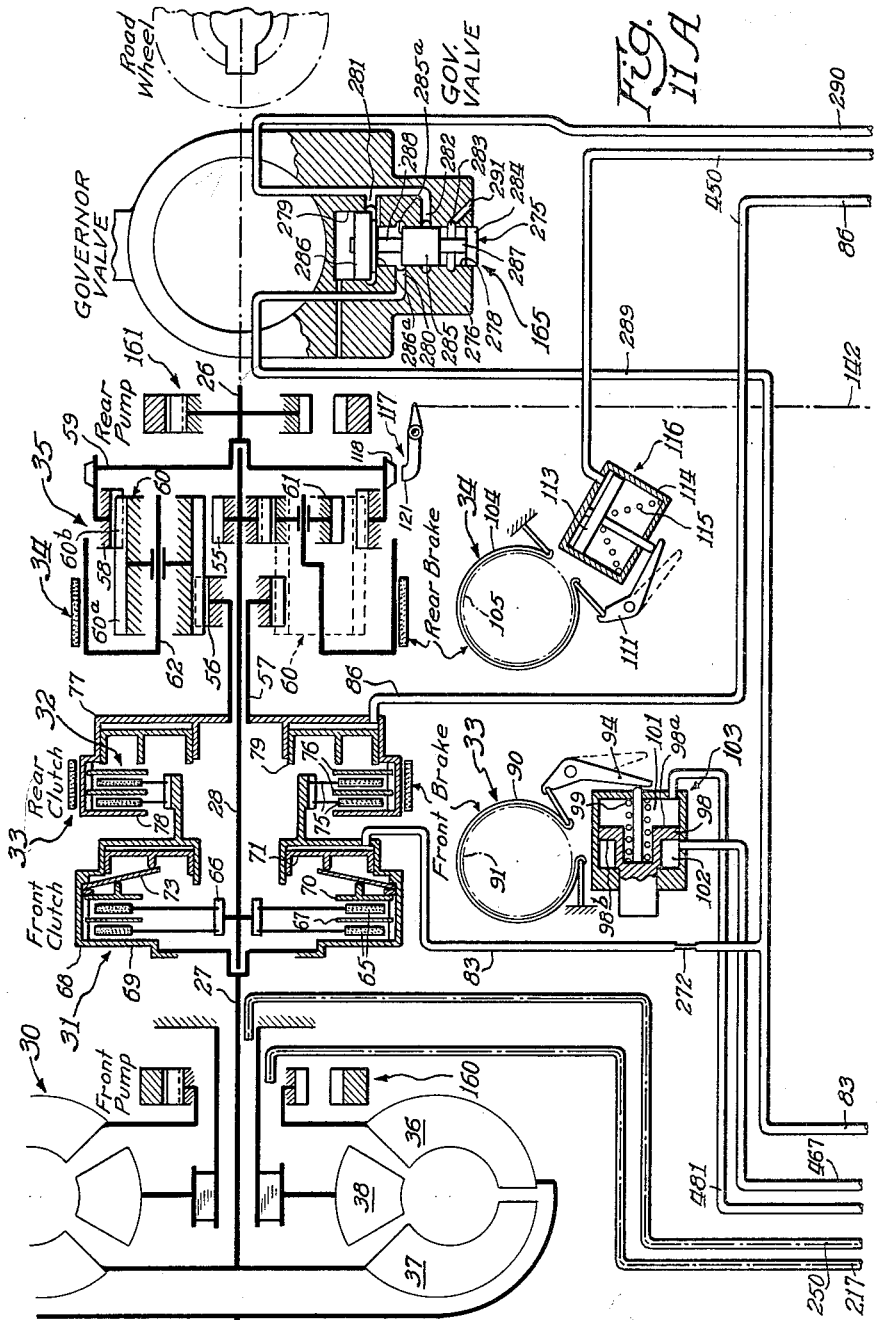

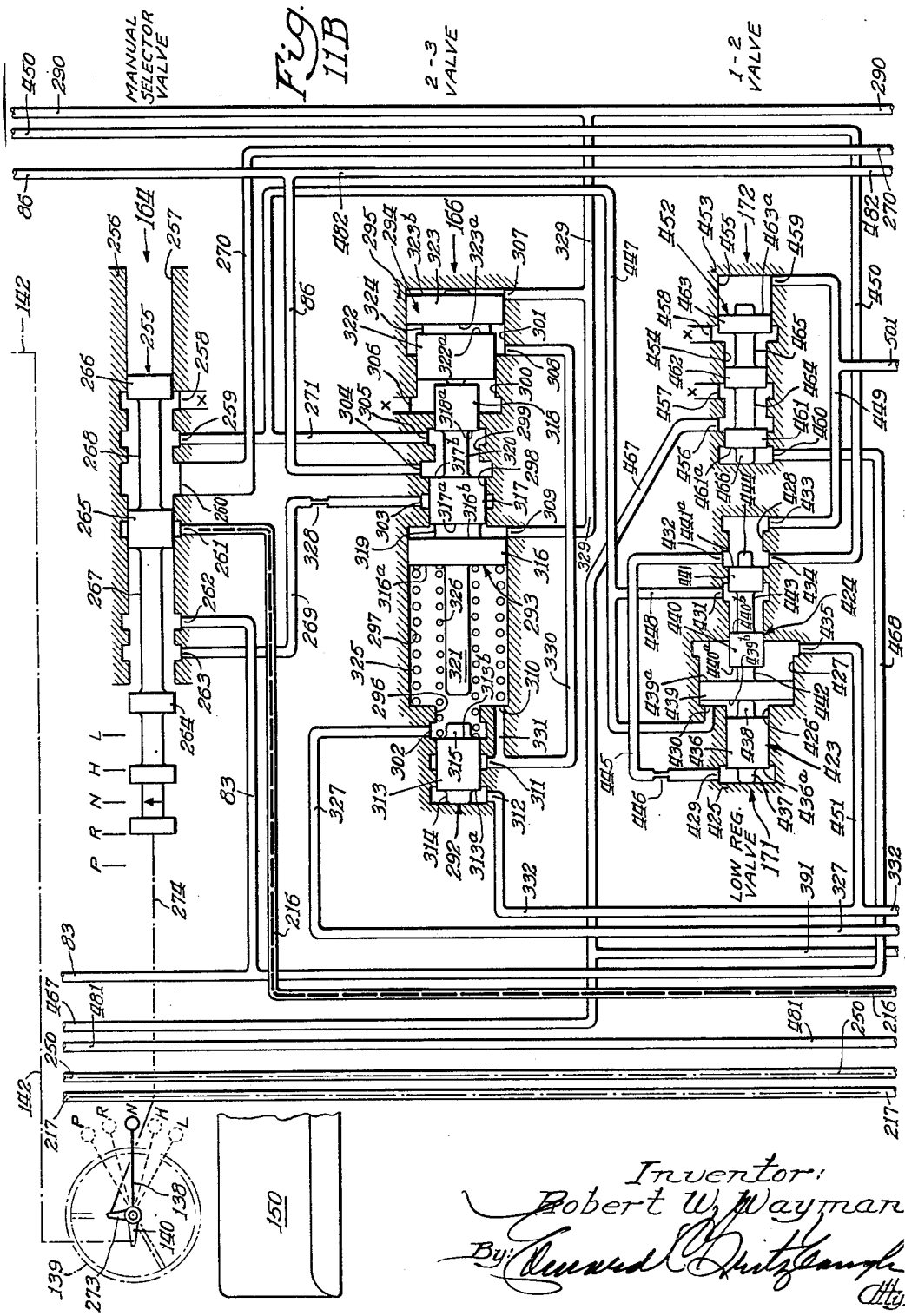

Inventor:
Robert W. Wayman
By Edward C. Dietzgen
Atty.

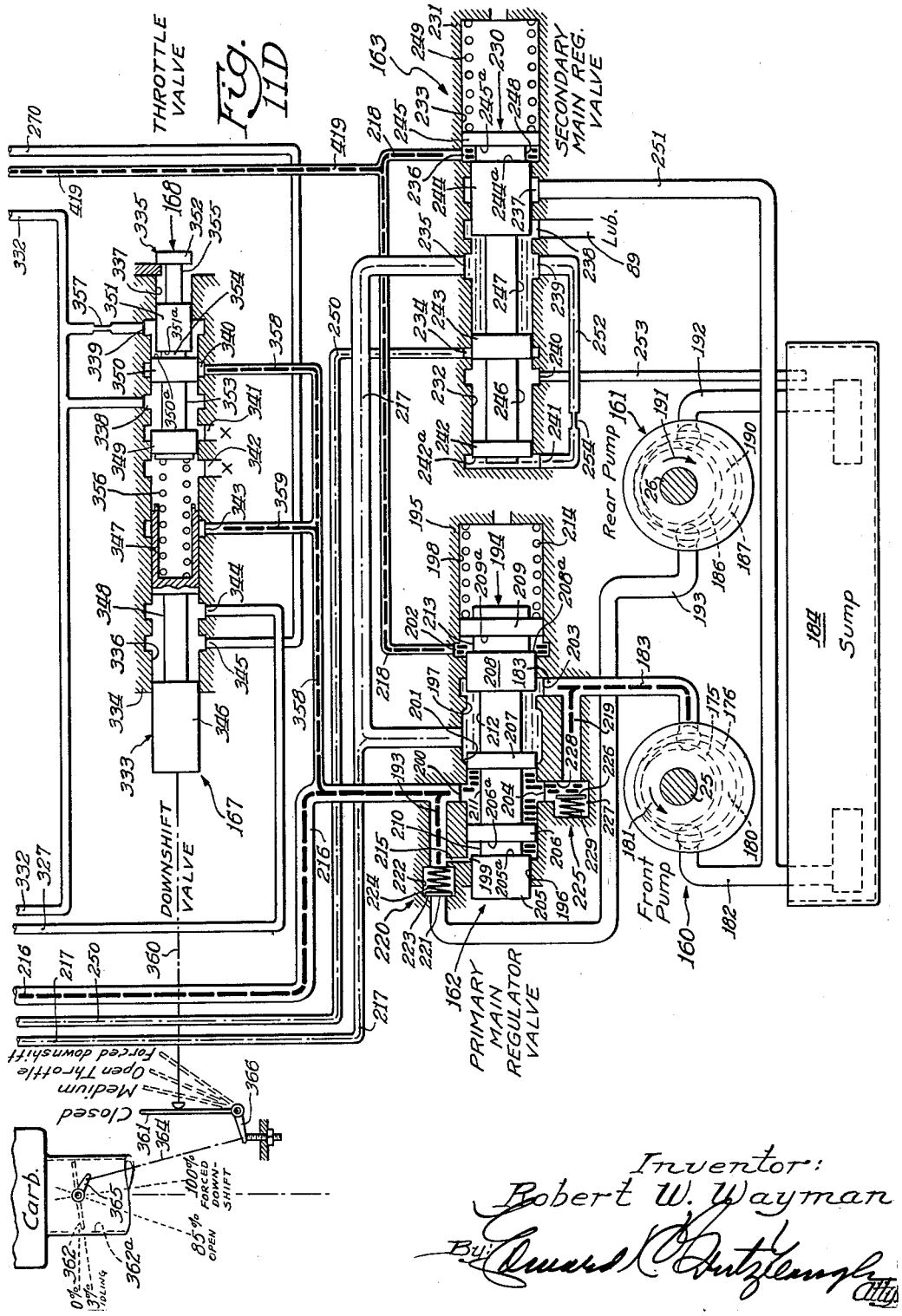

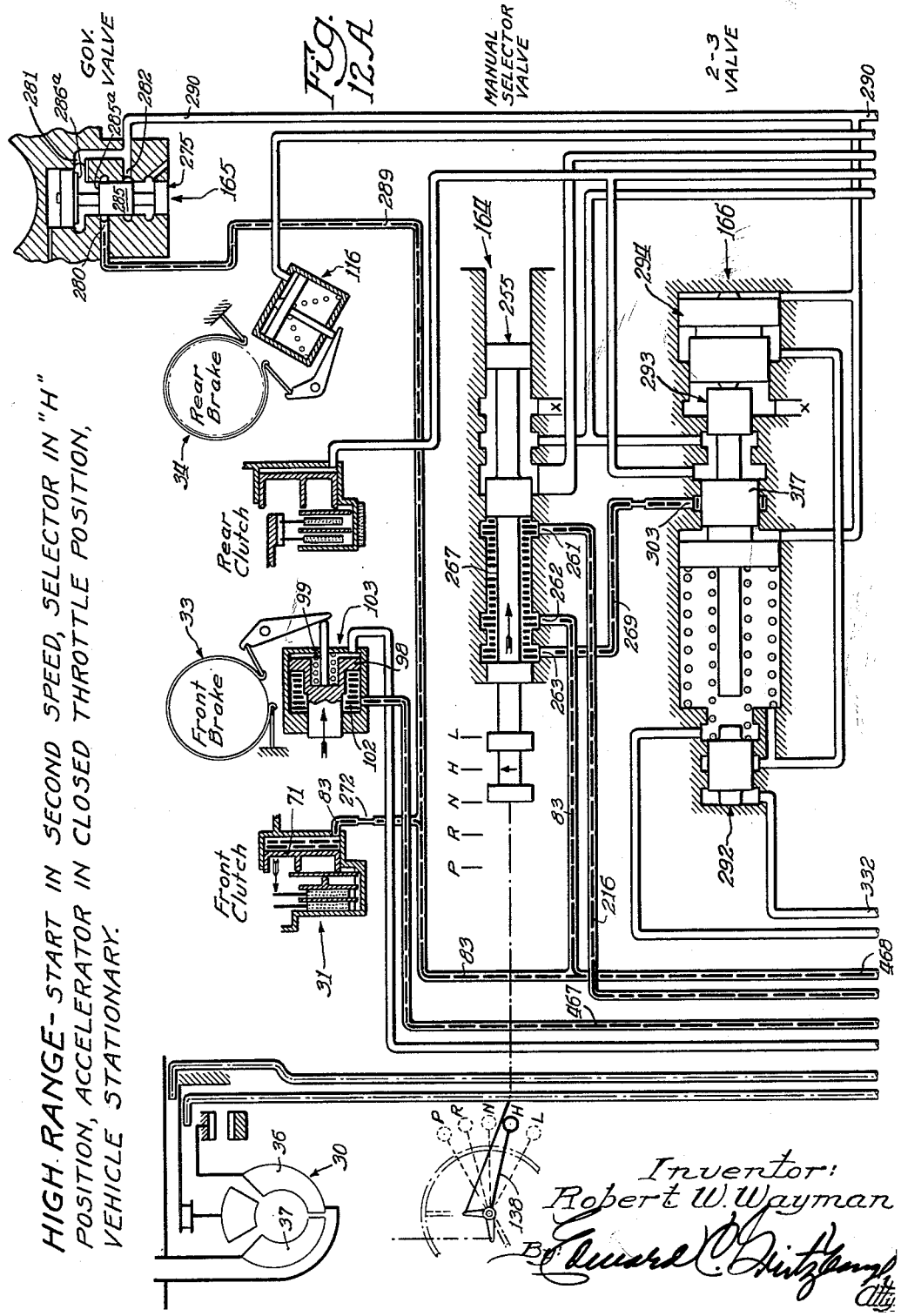

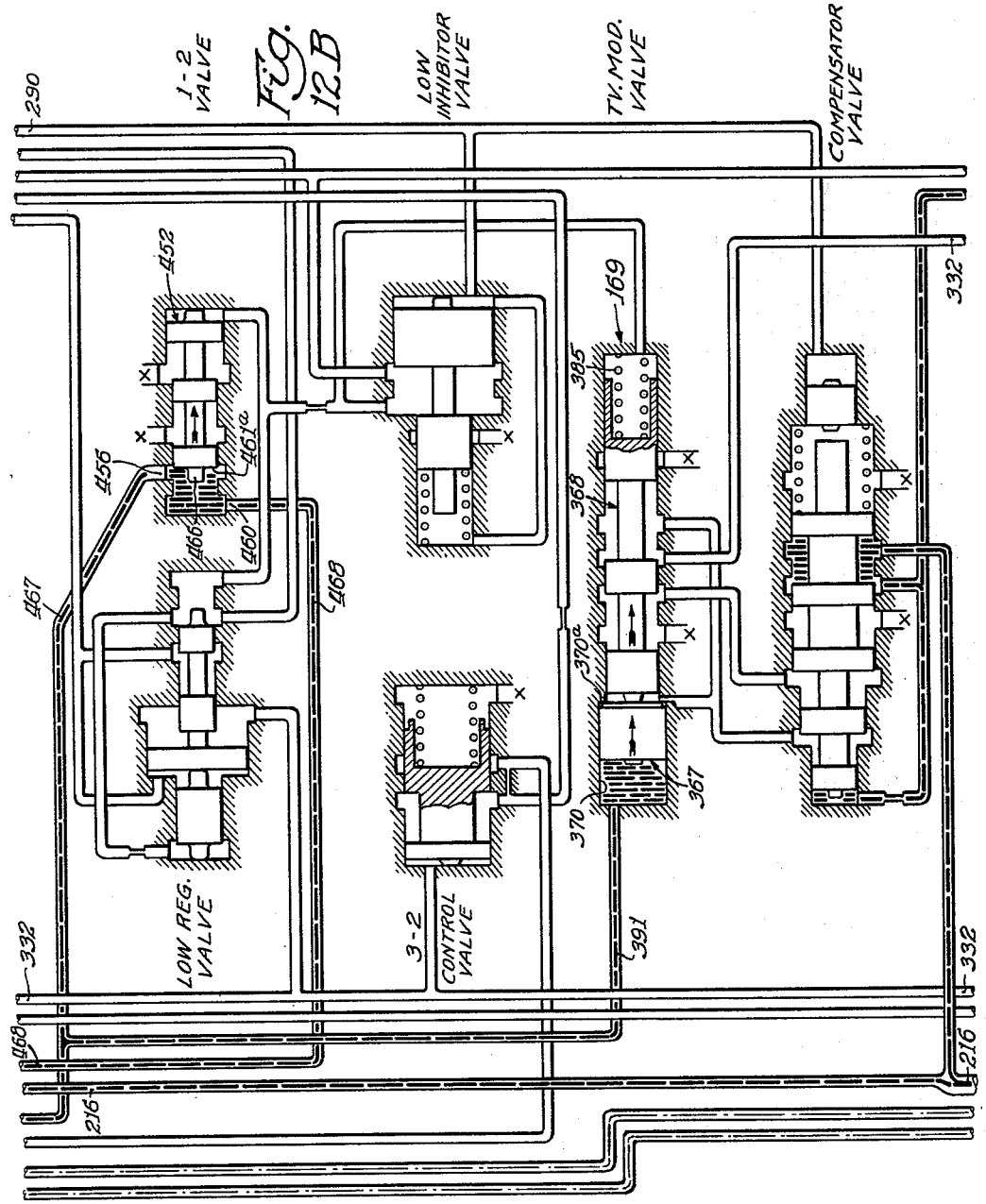

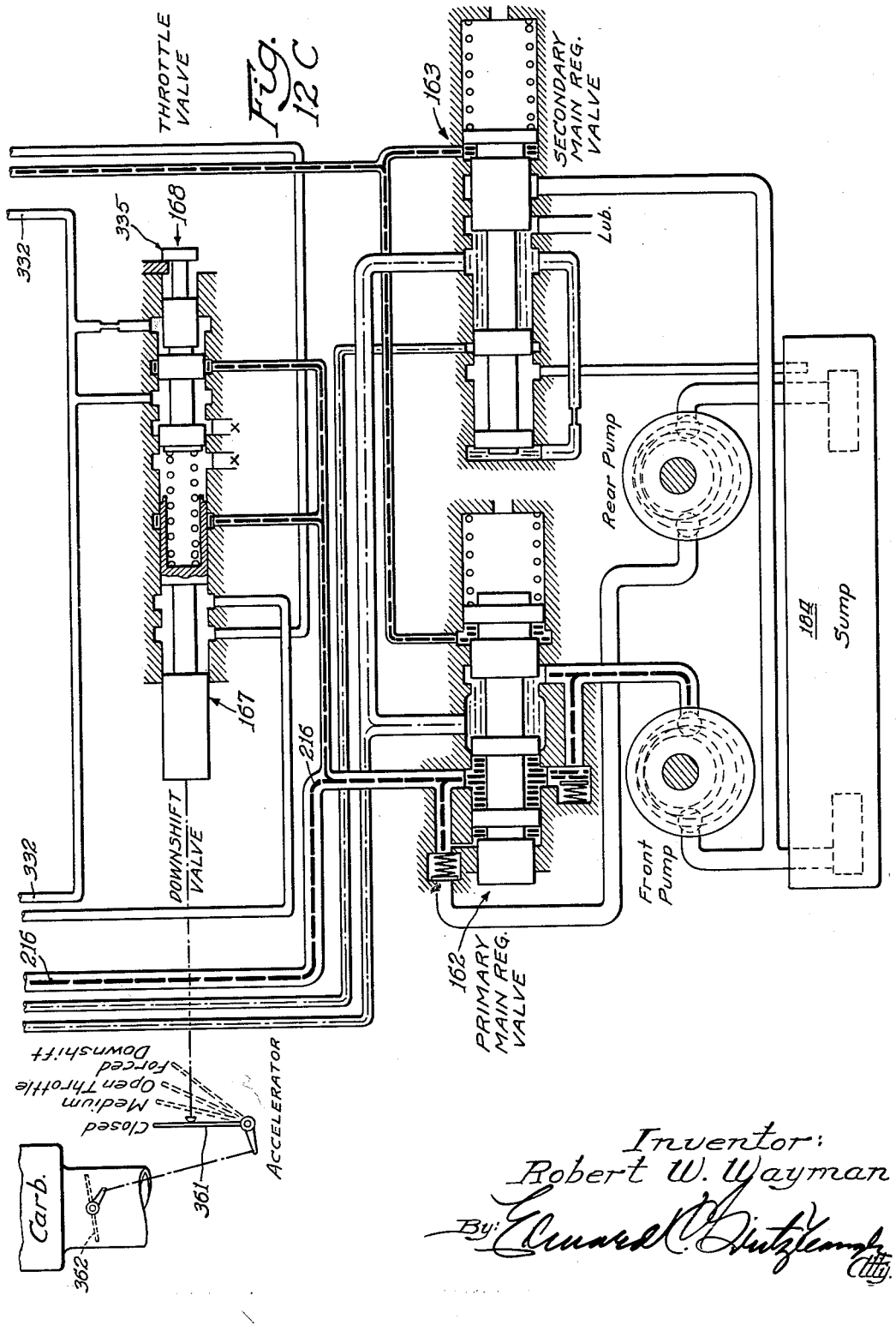

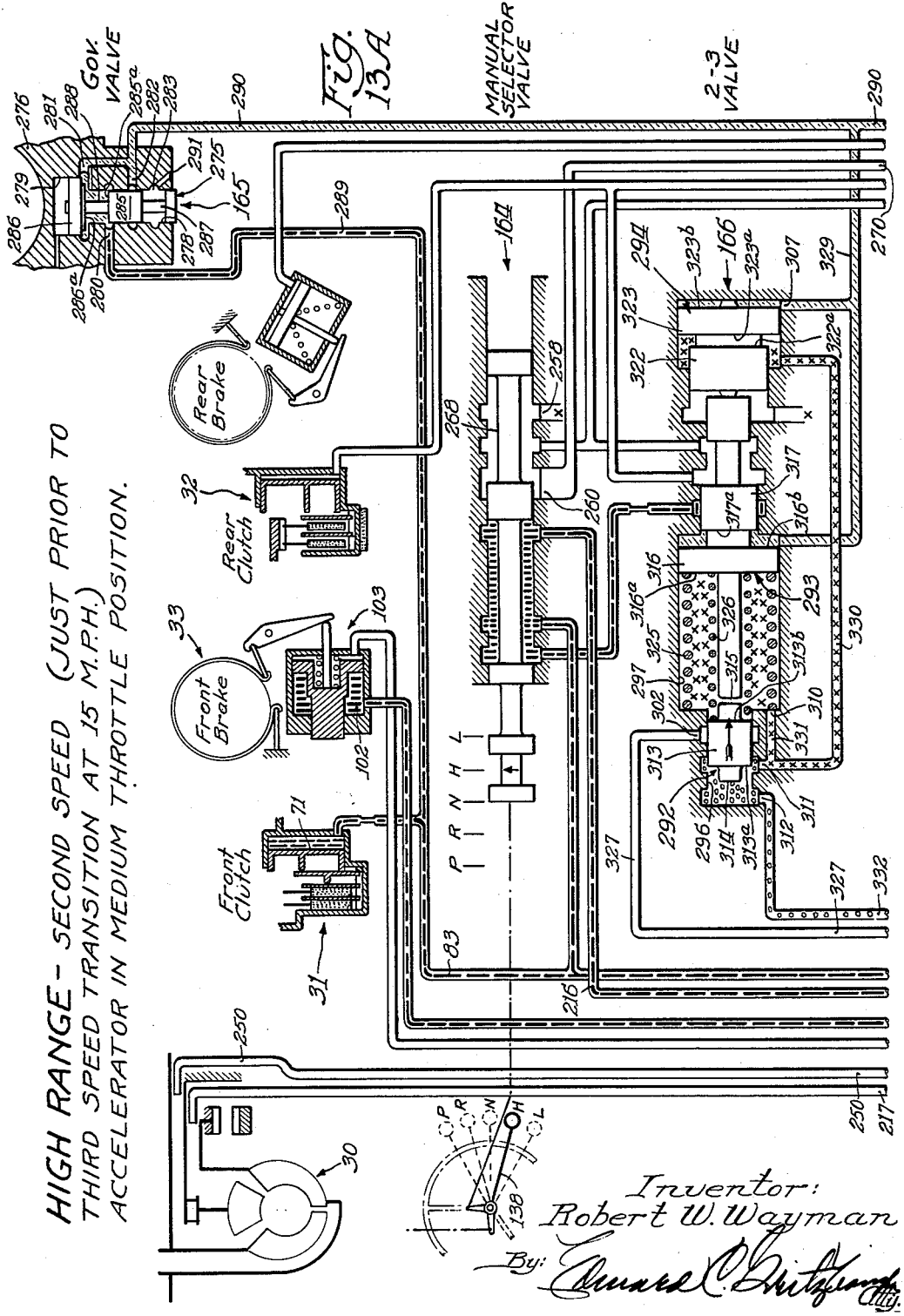

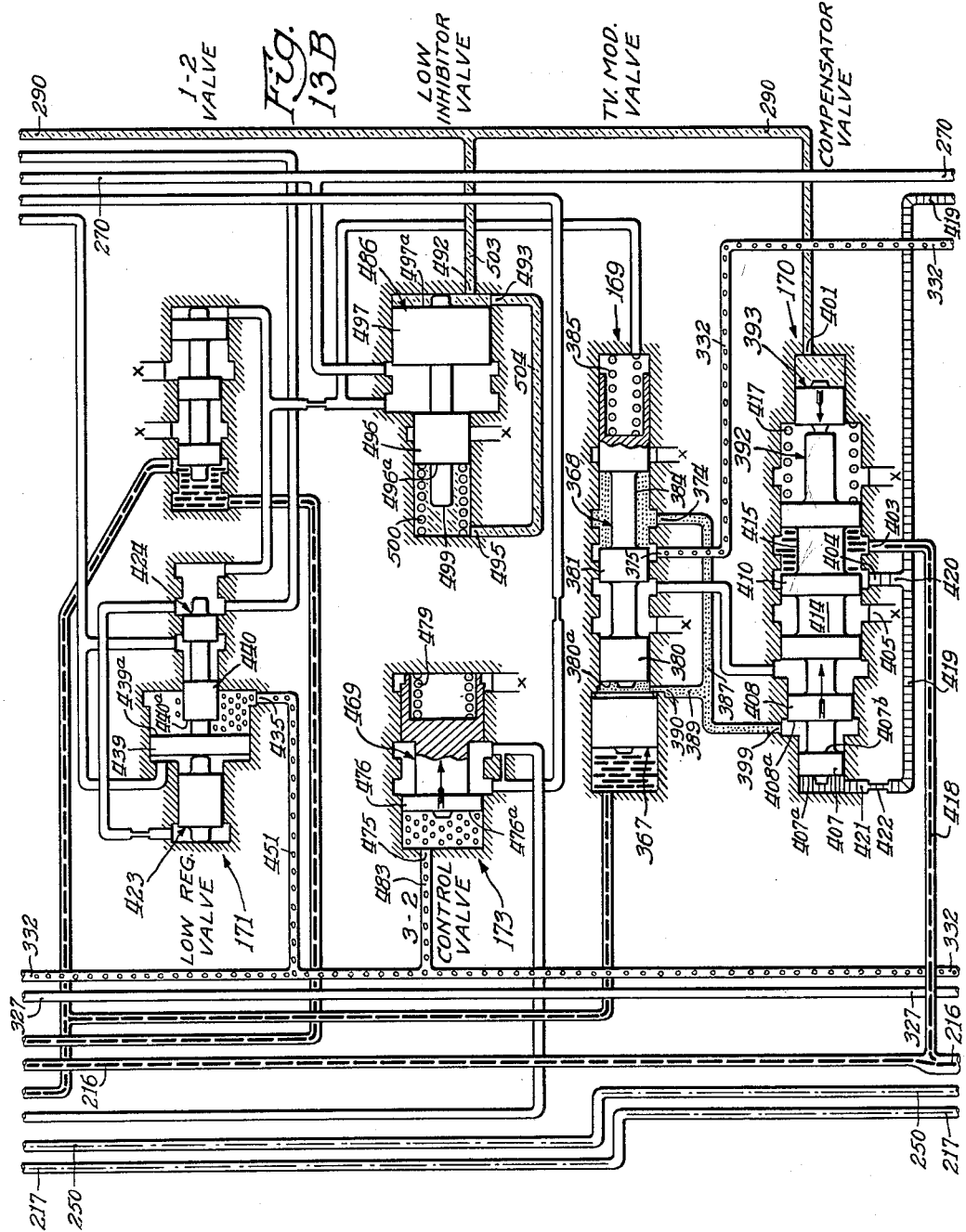

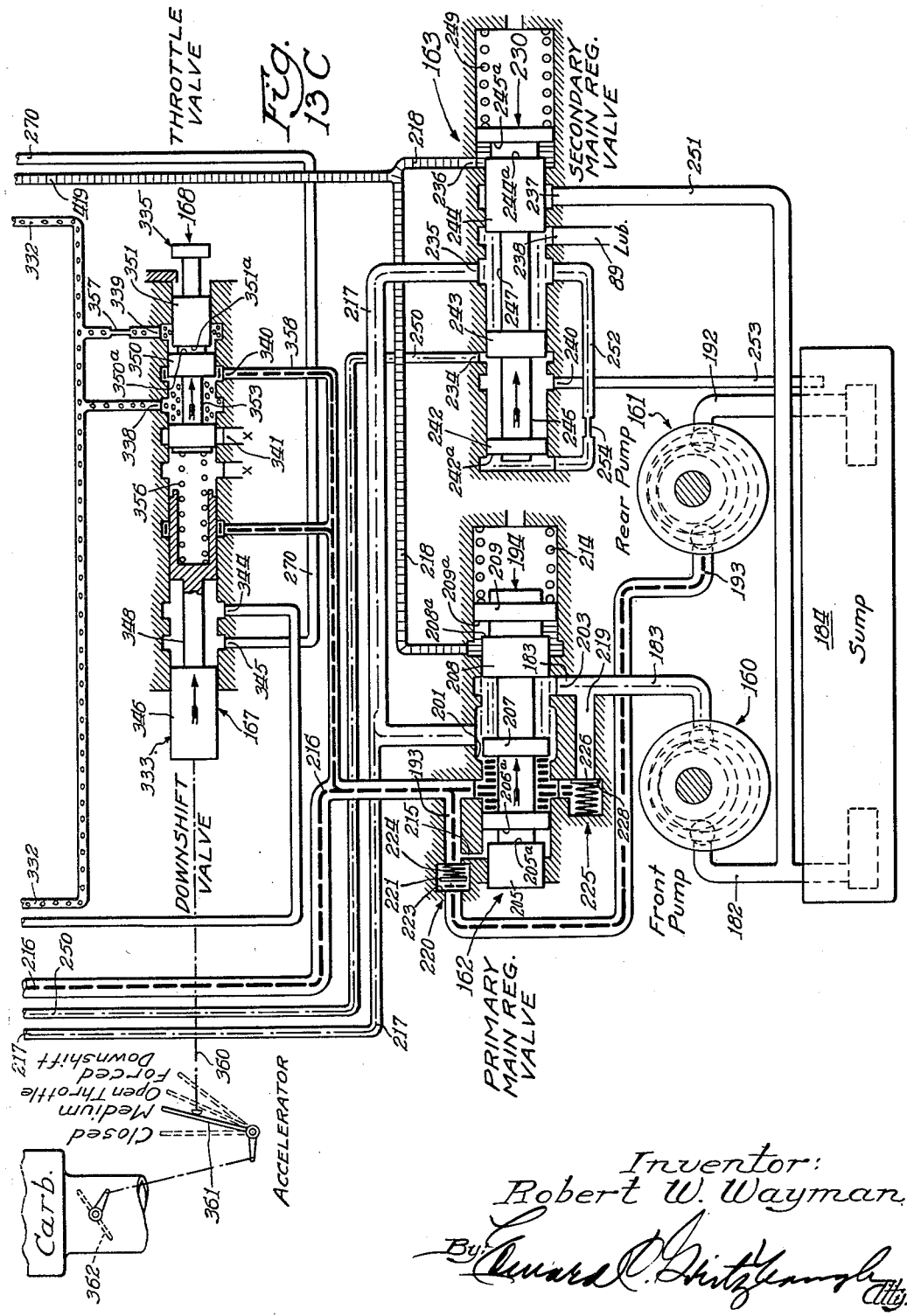

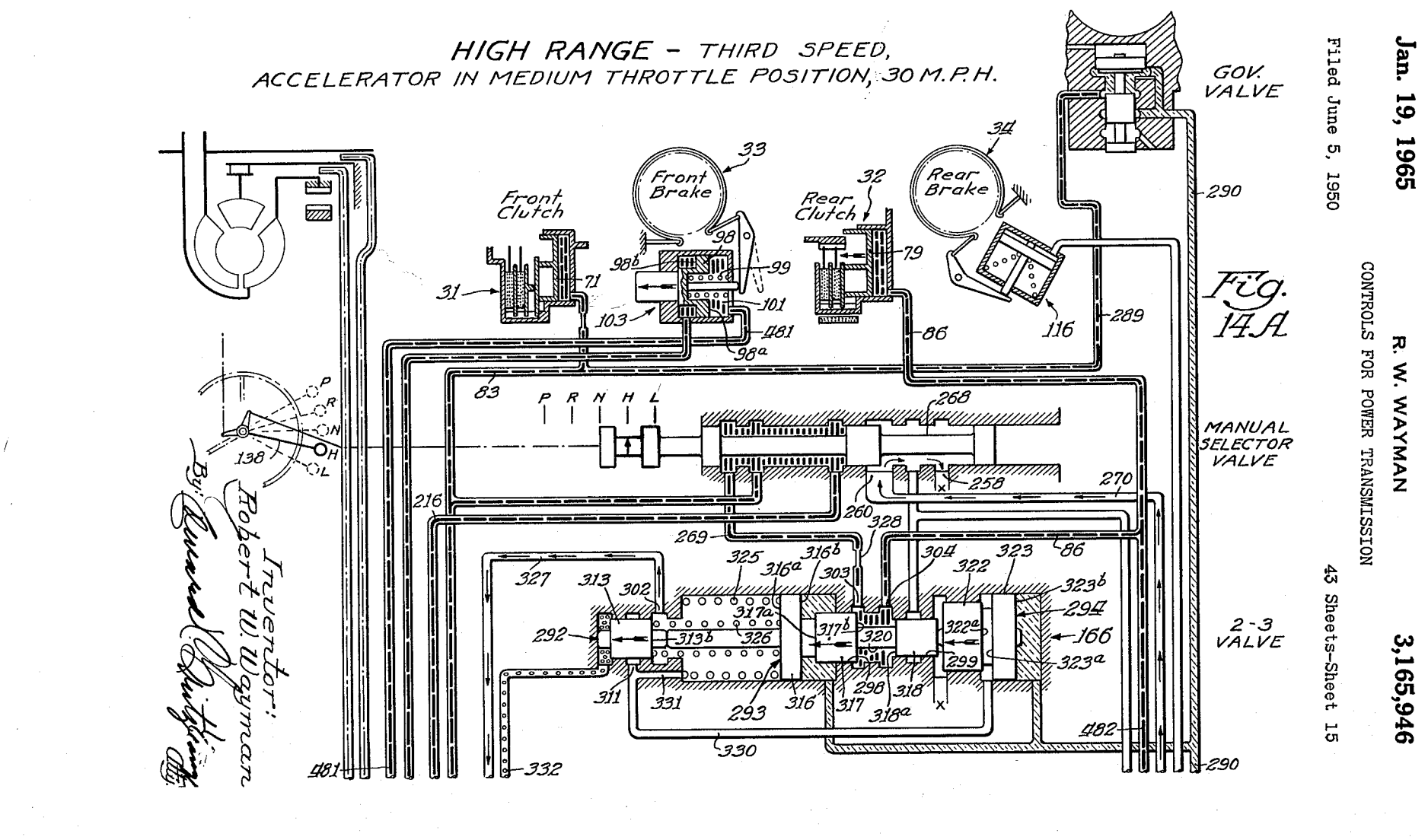

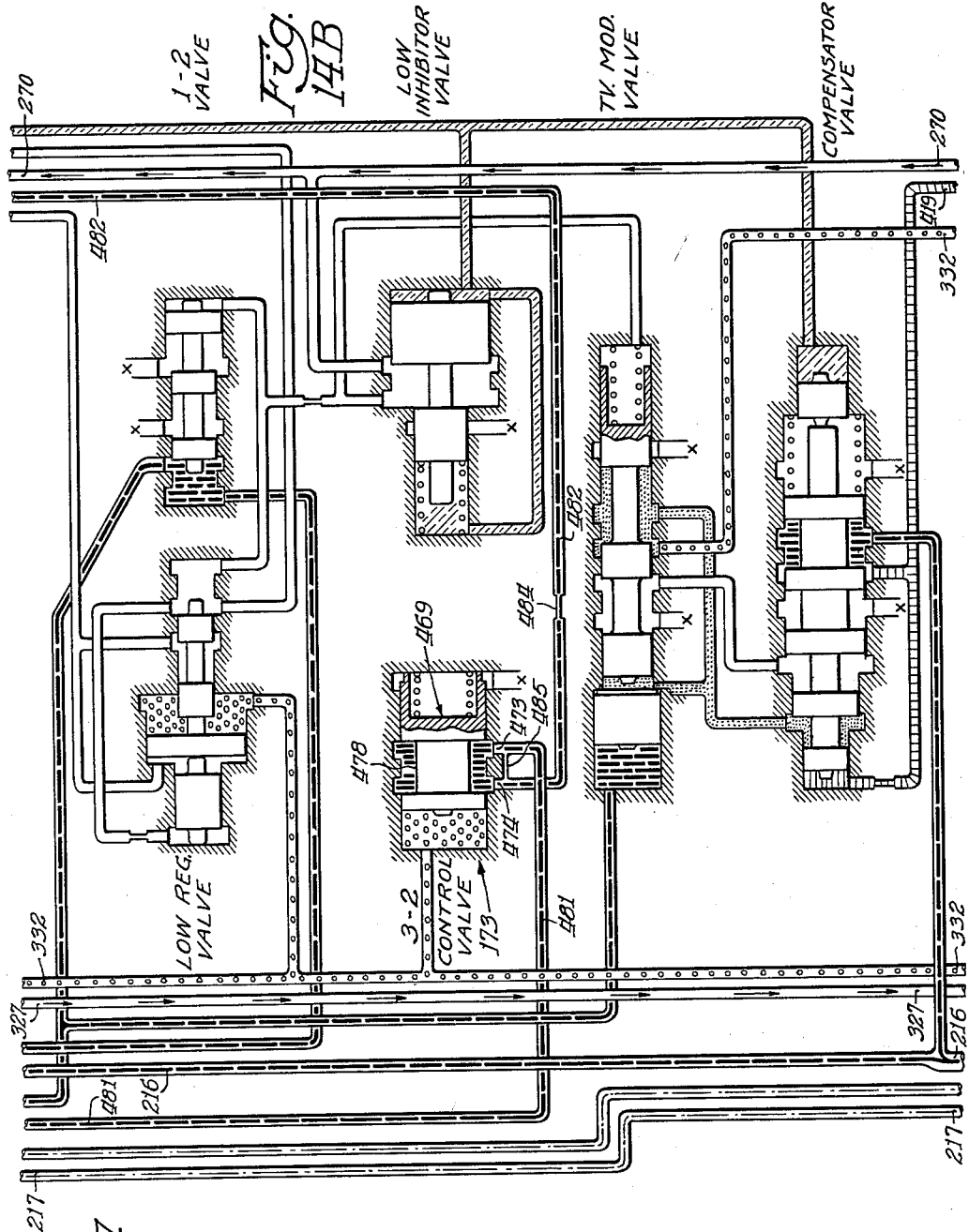

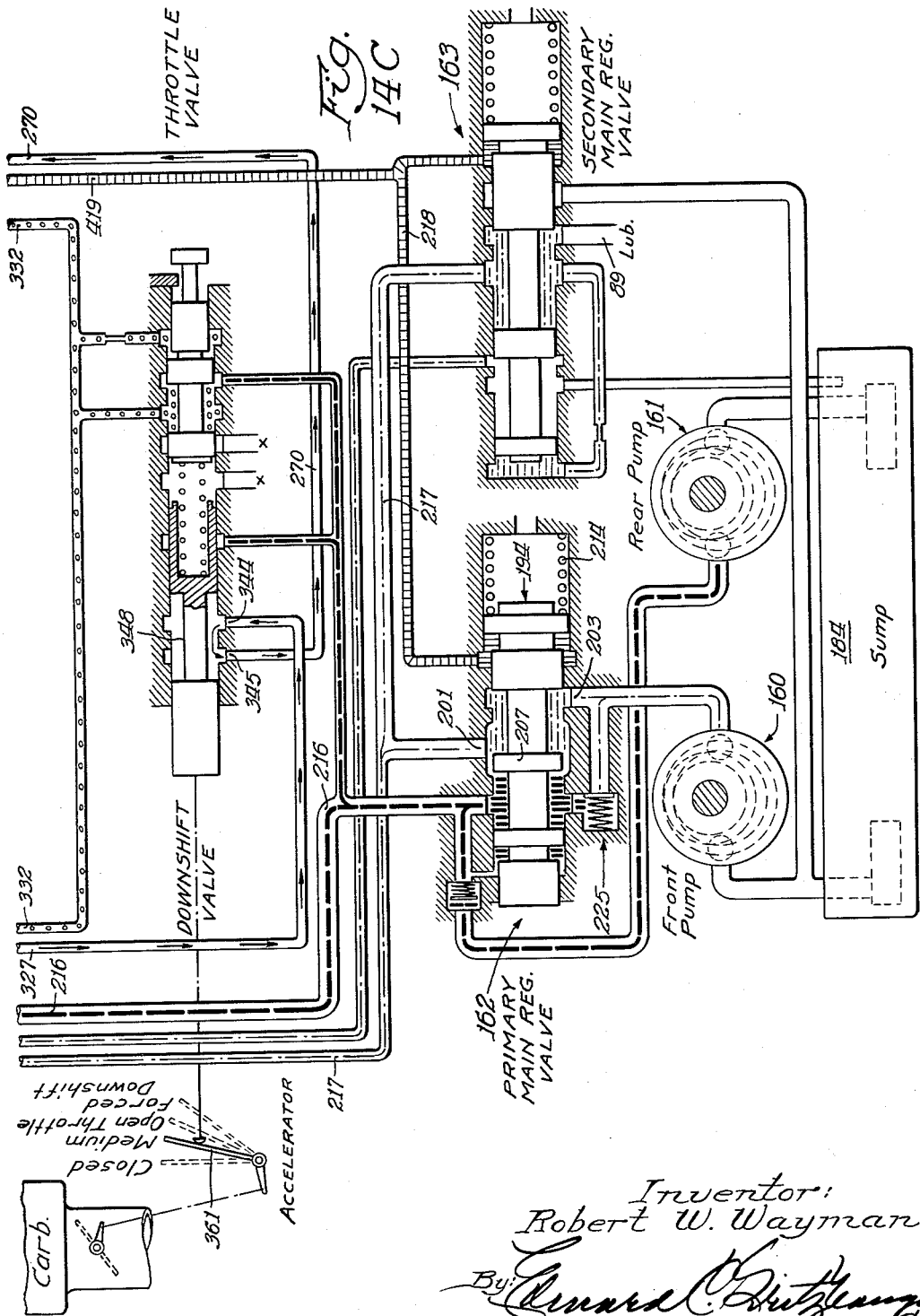

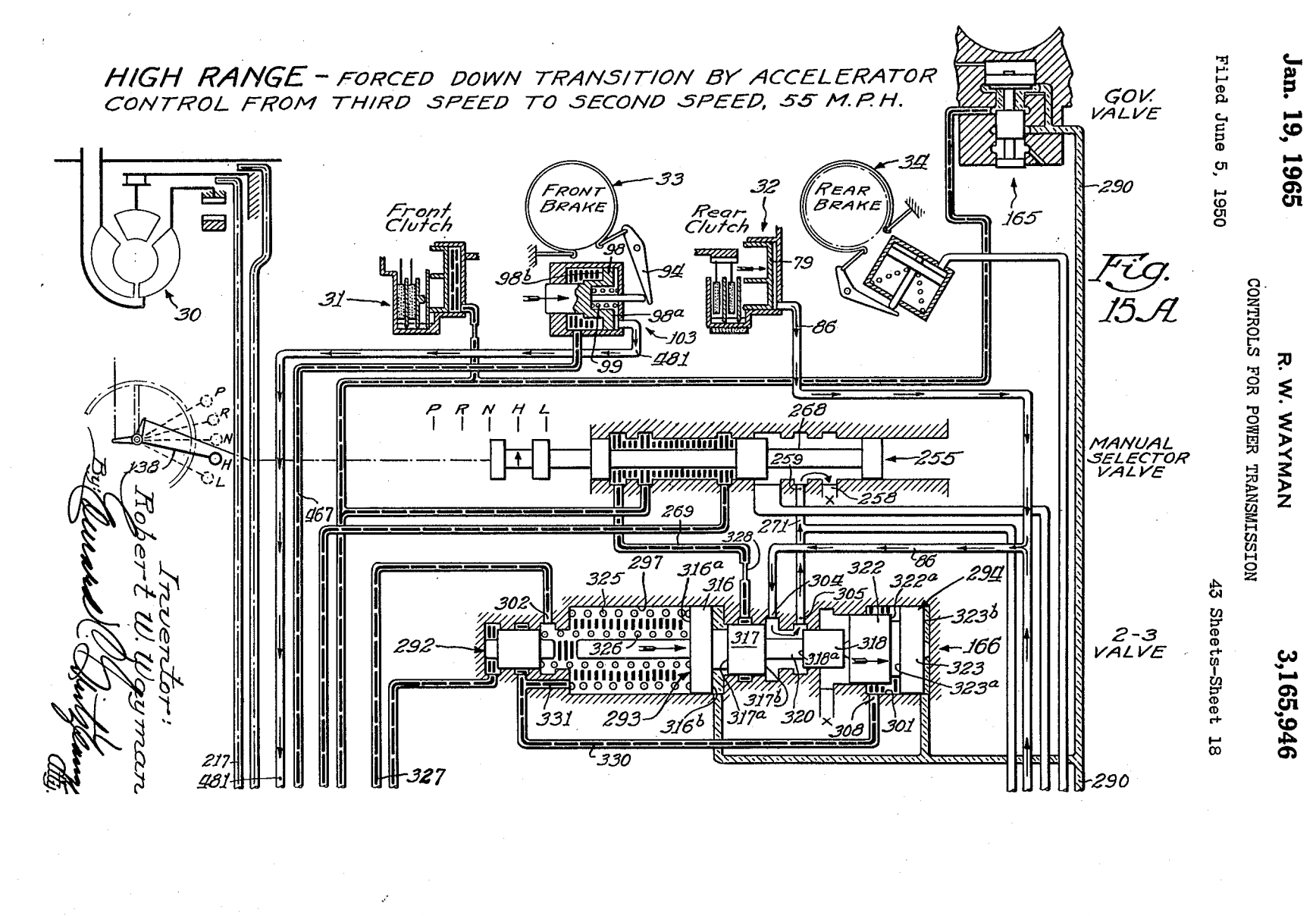

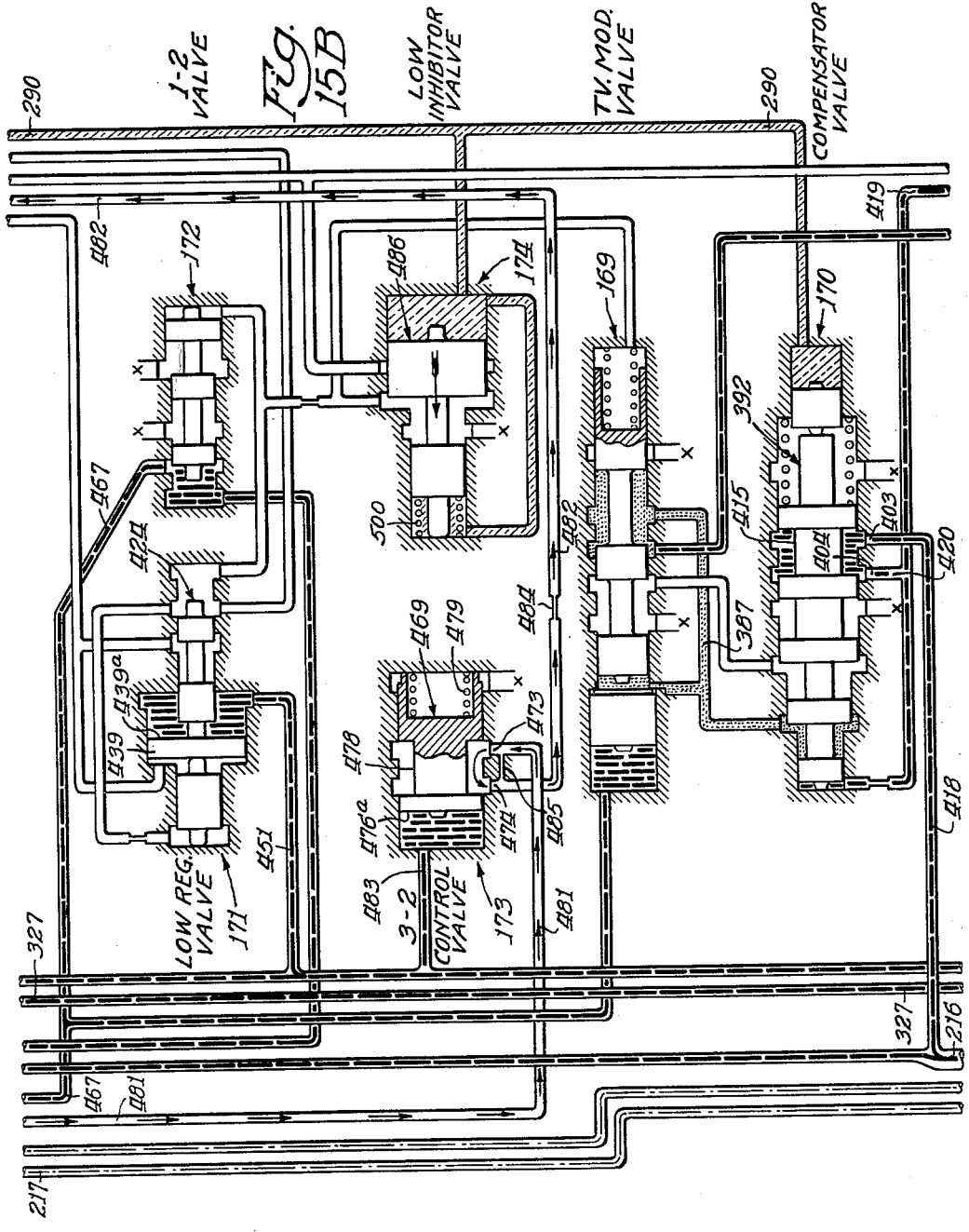

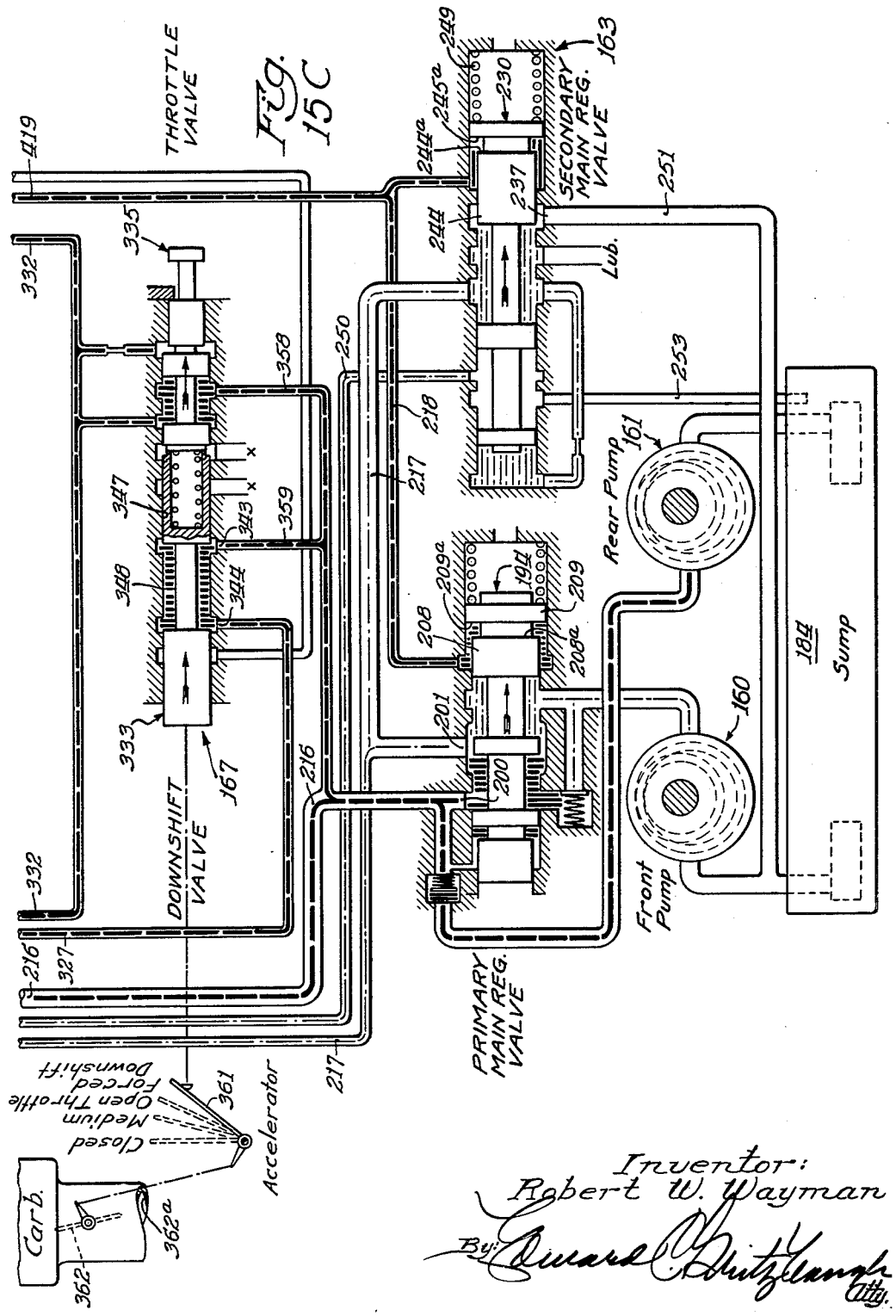

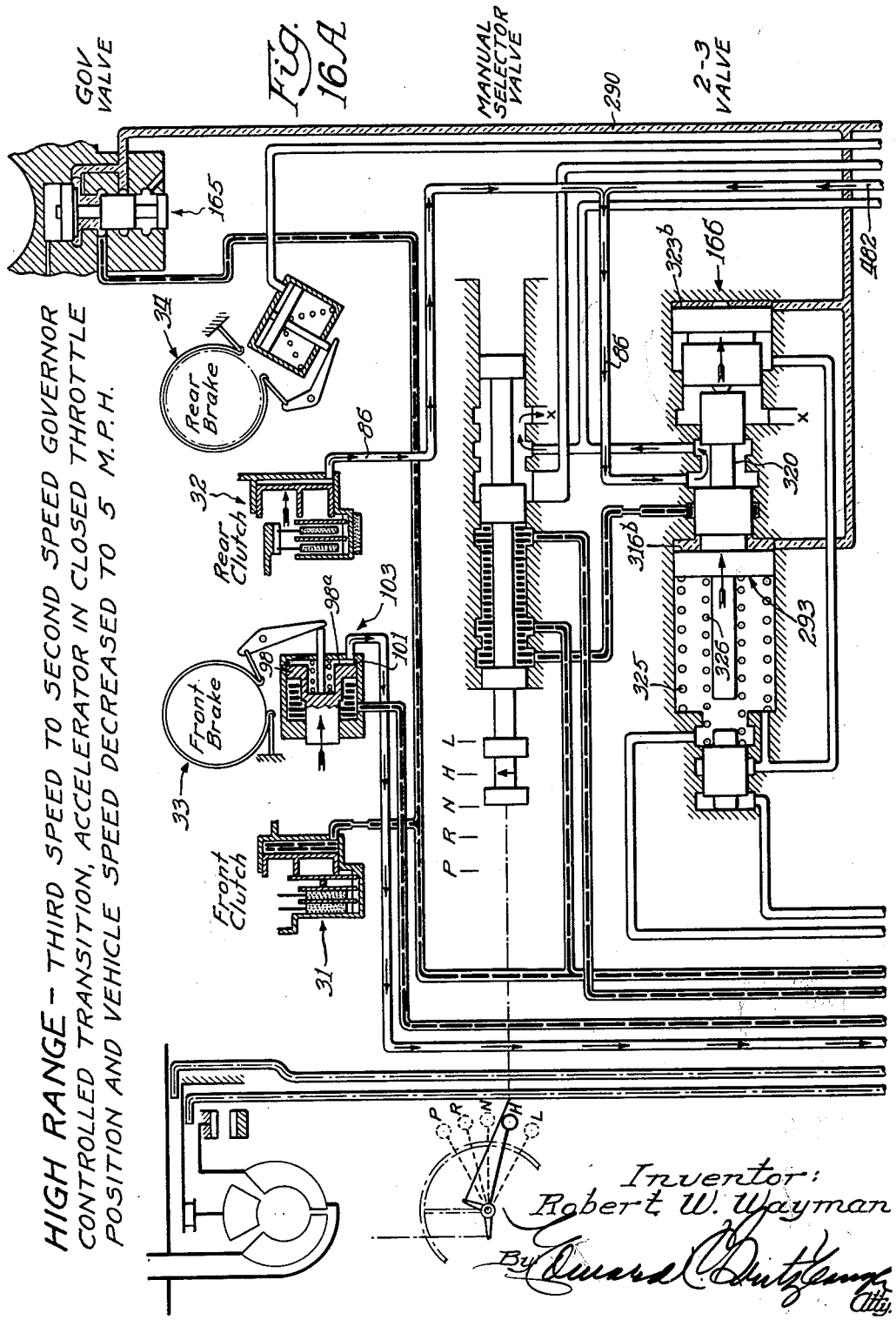

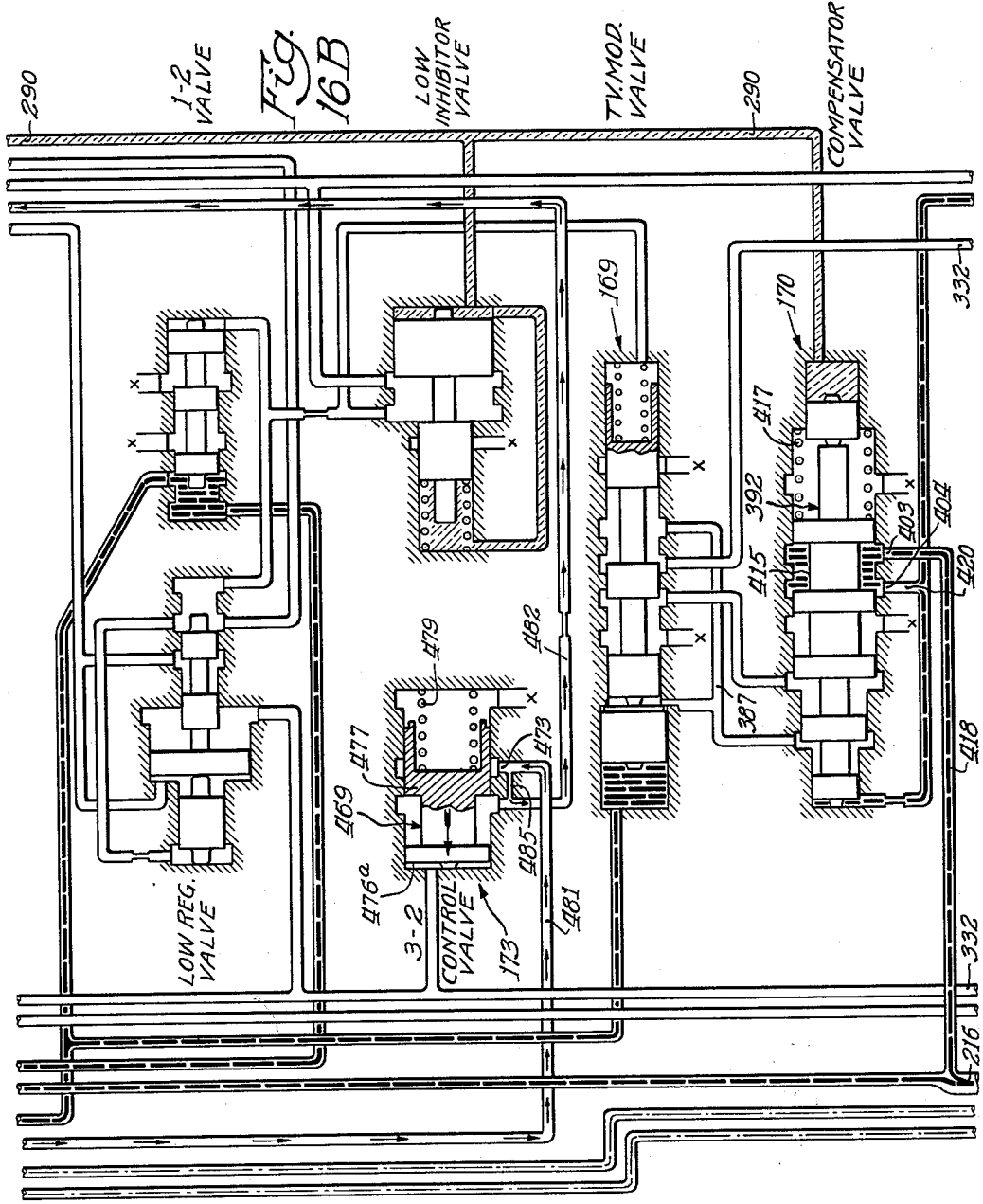

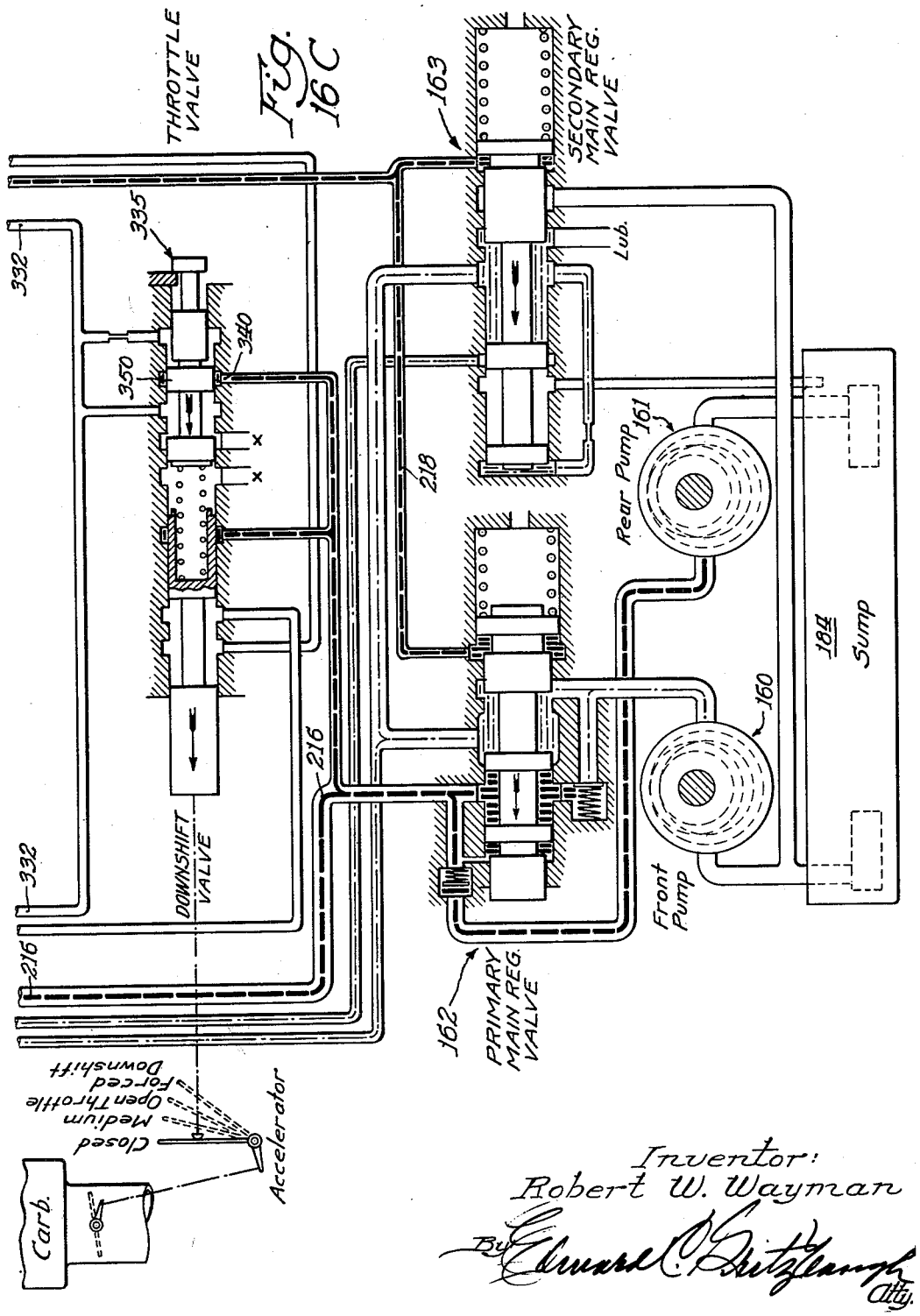

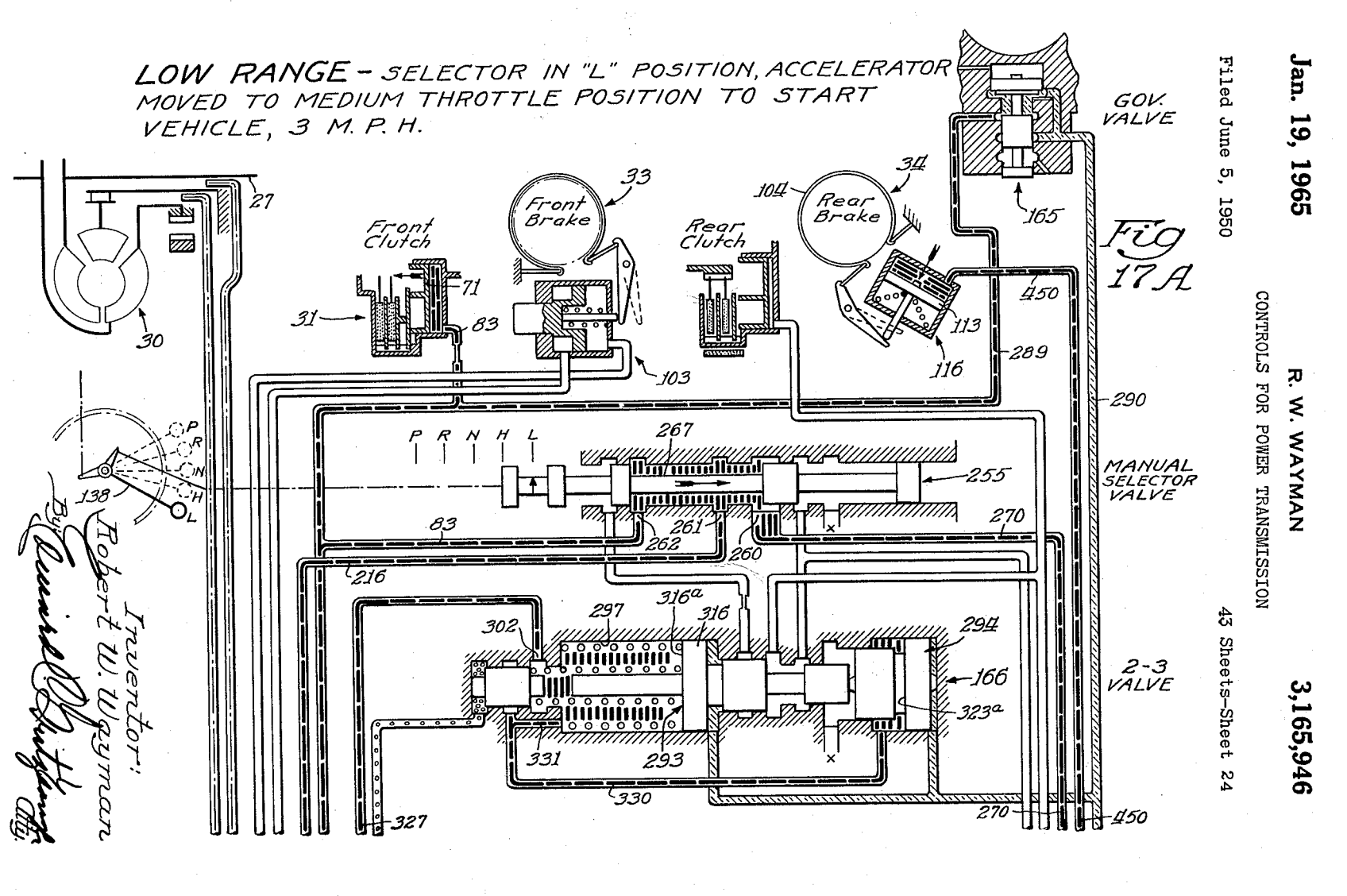

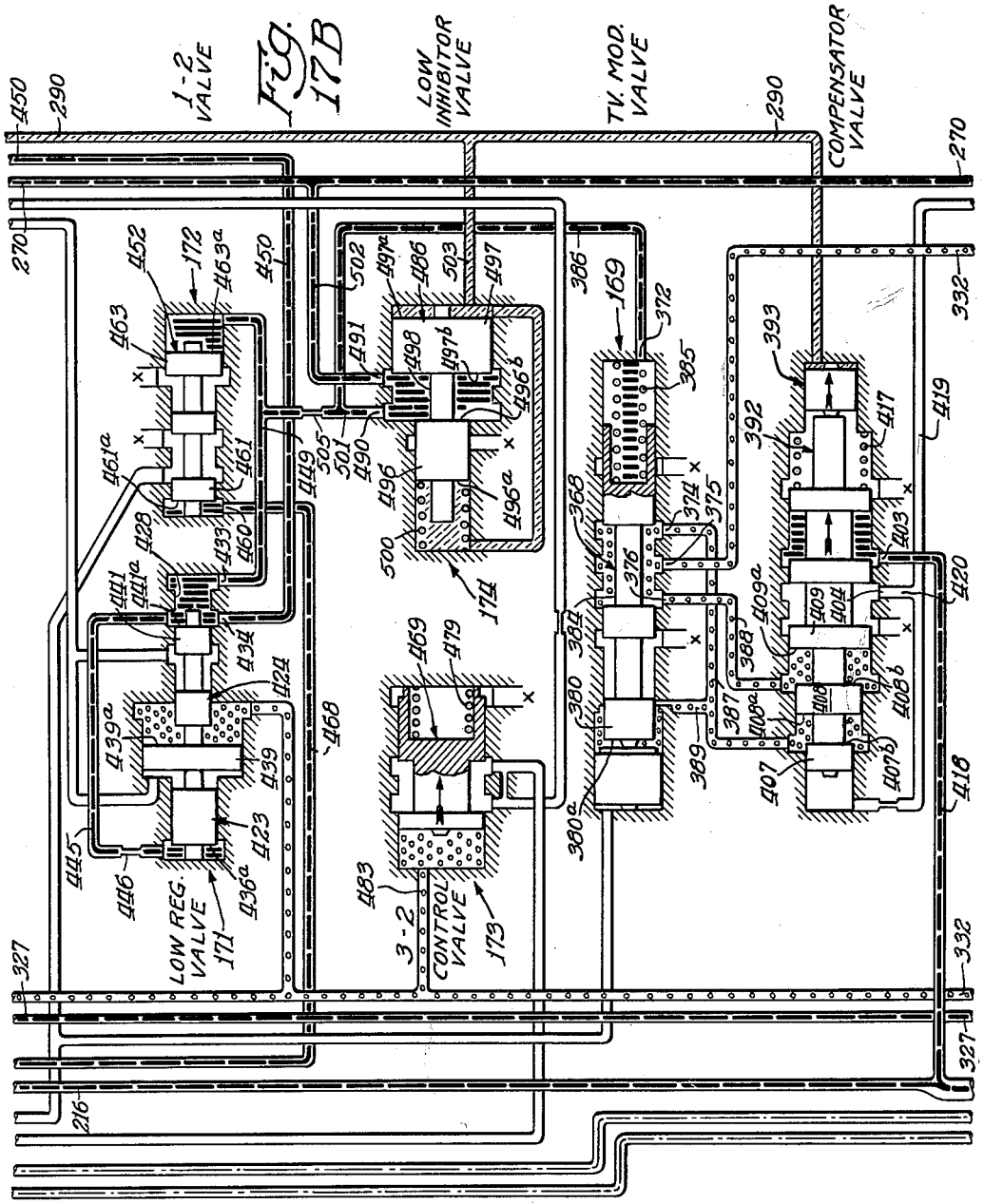

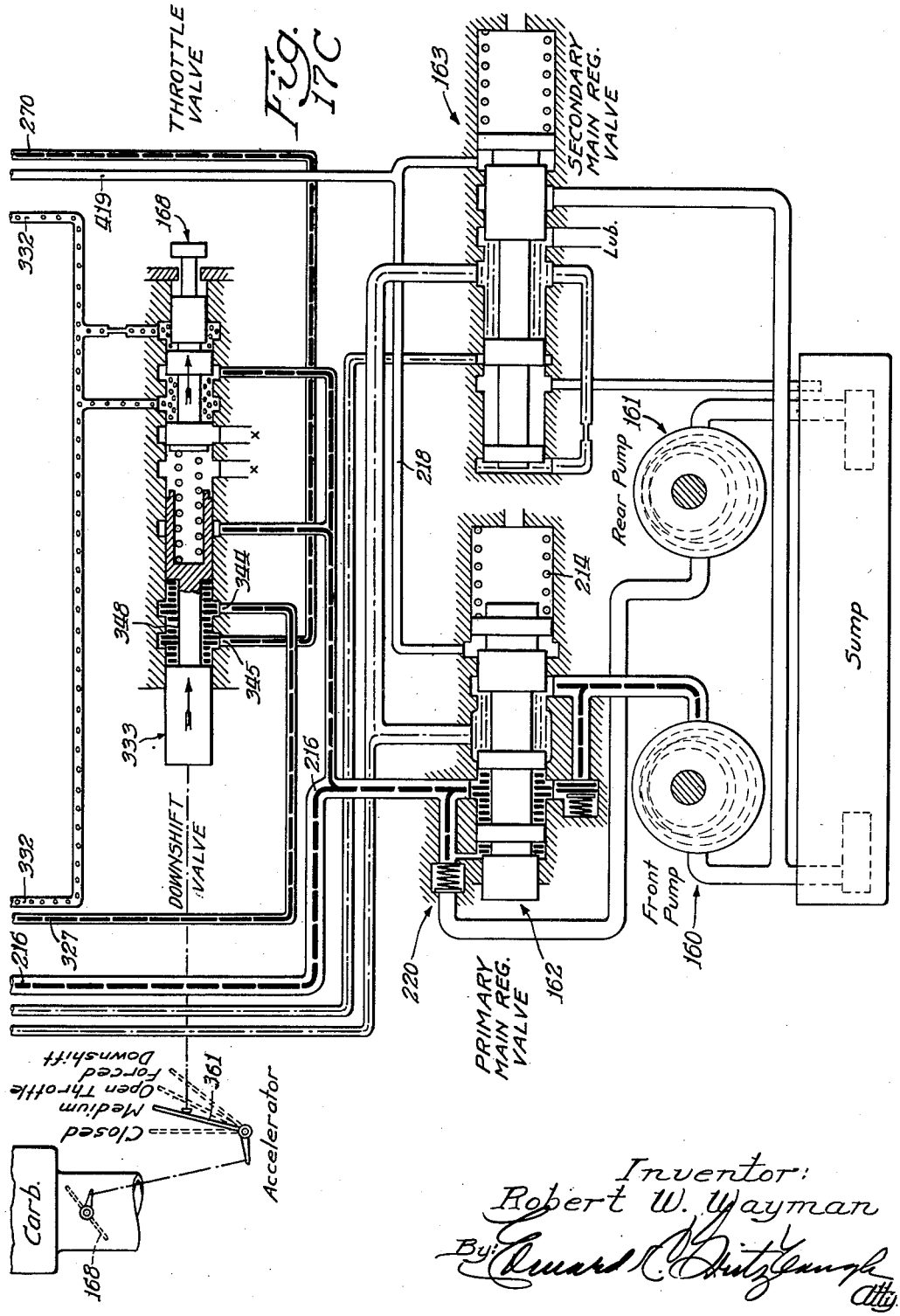

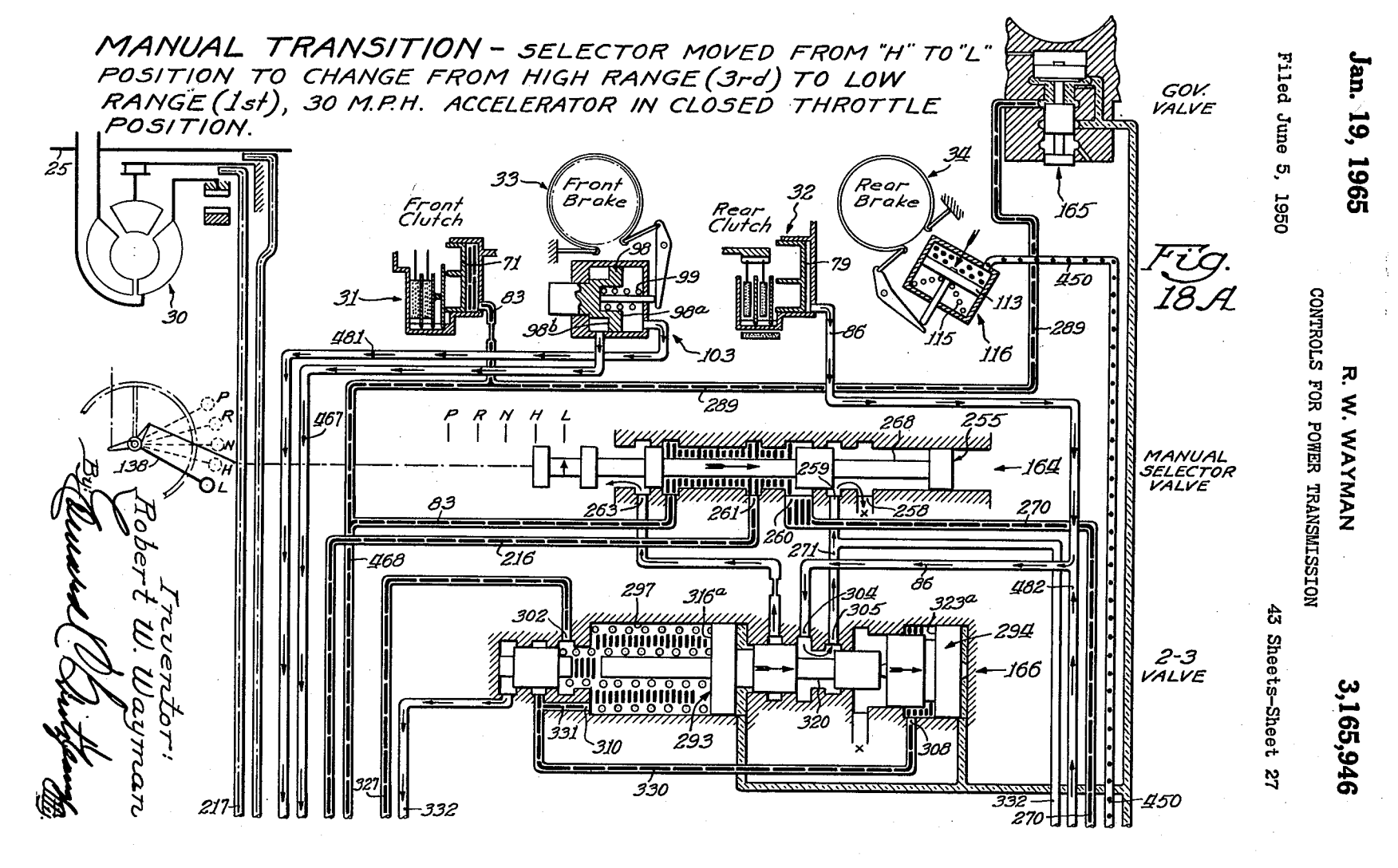

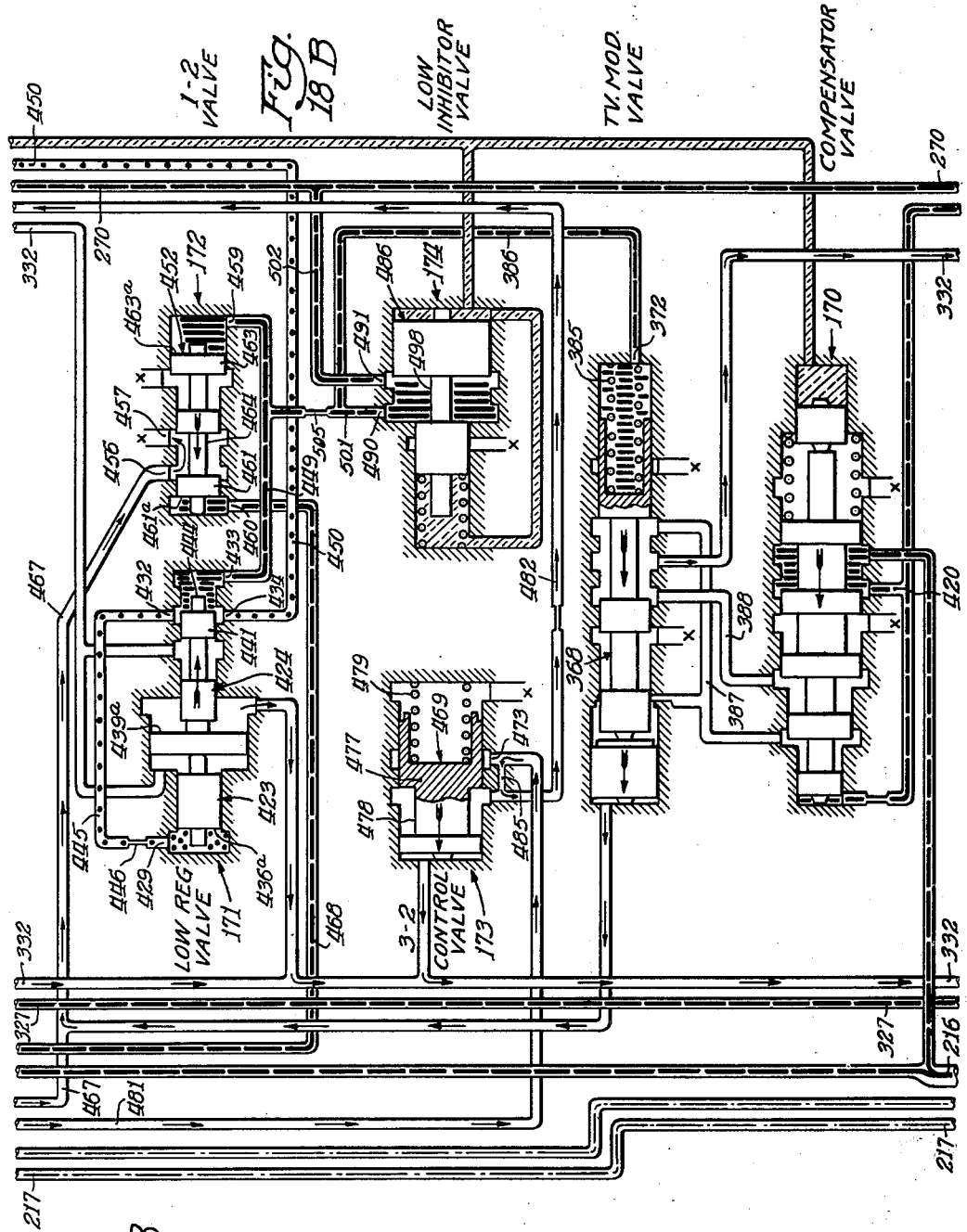

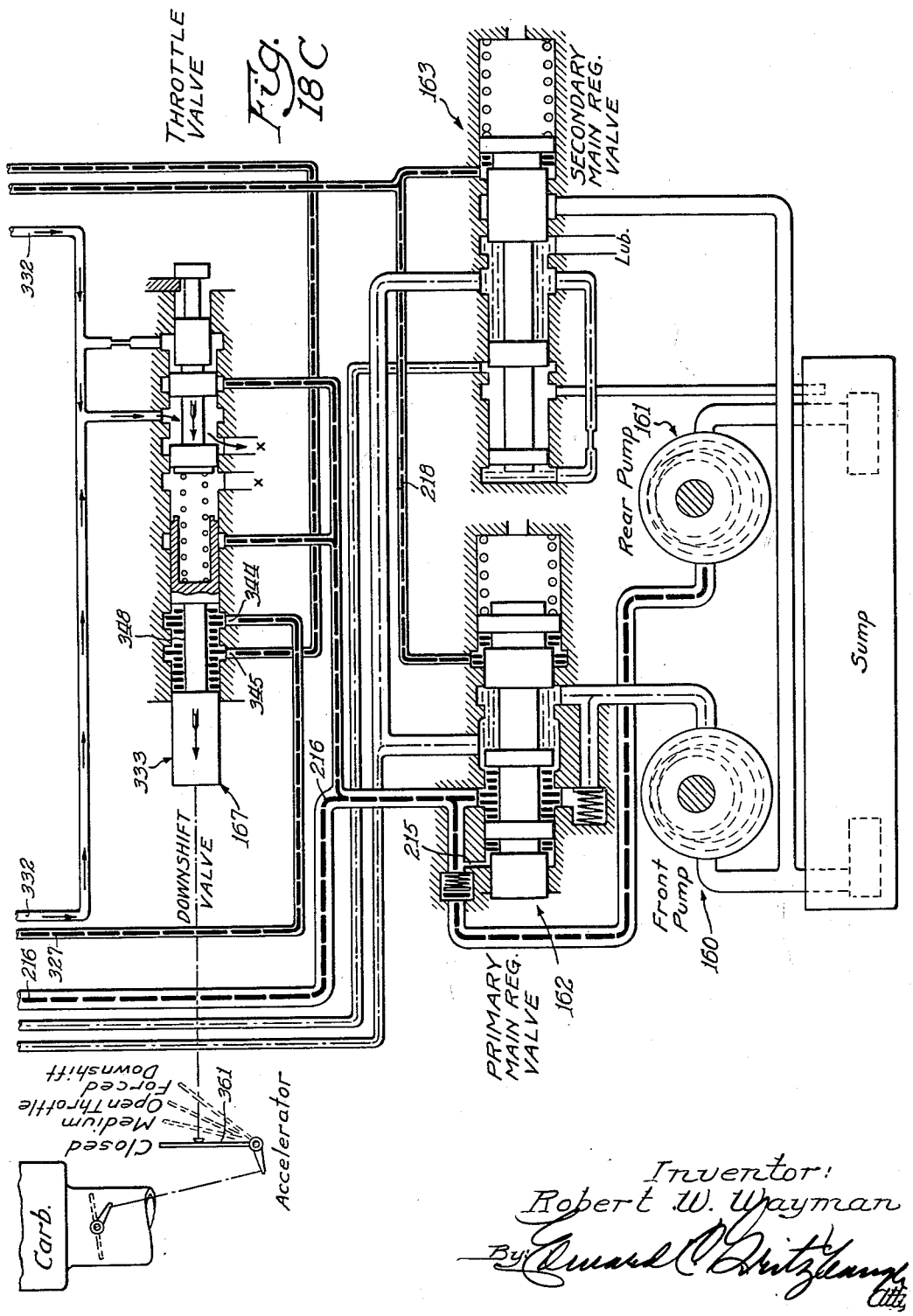

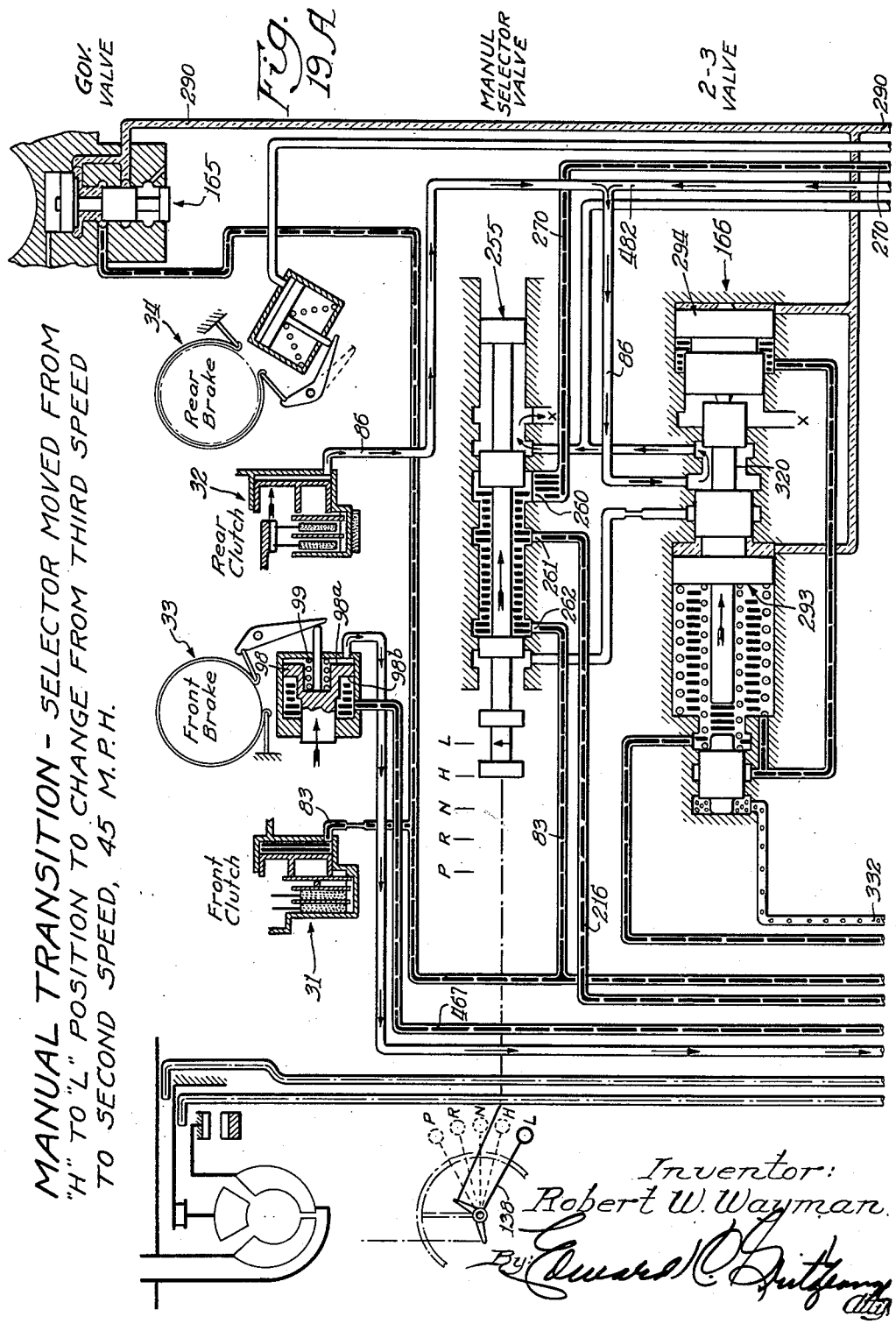

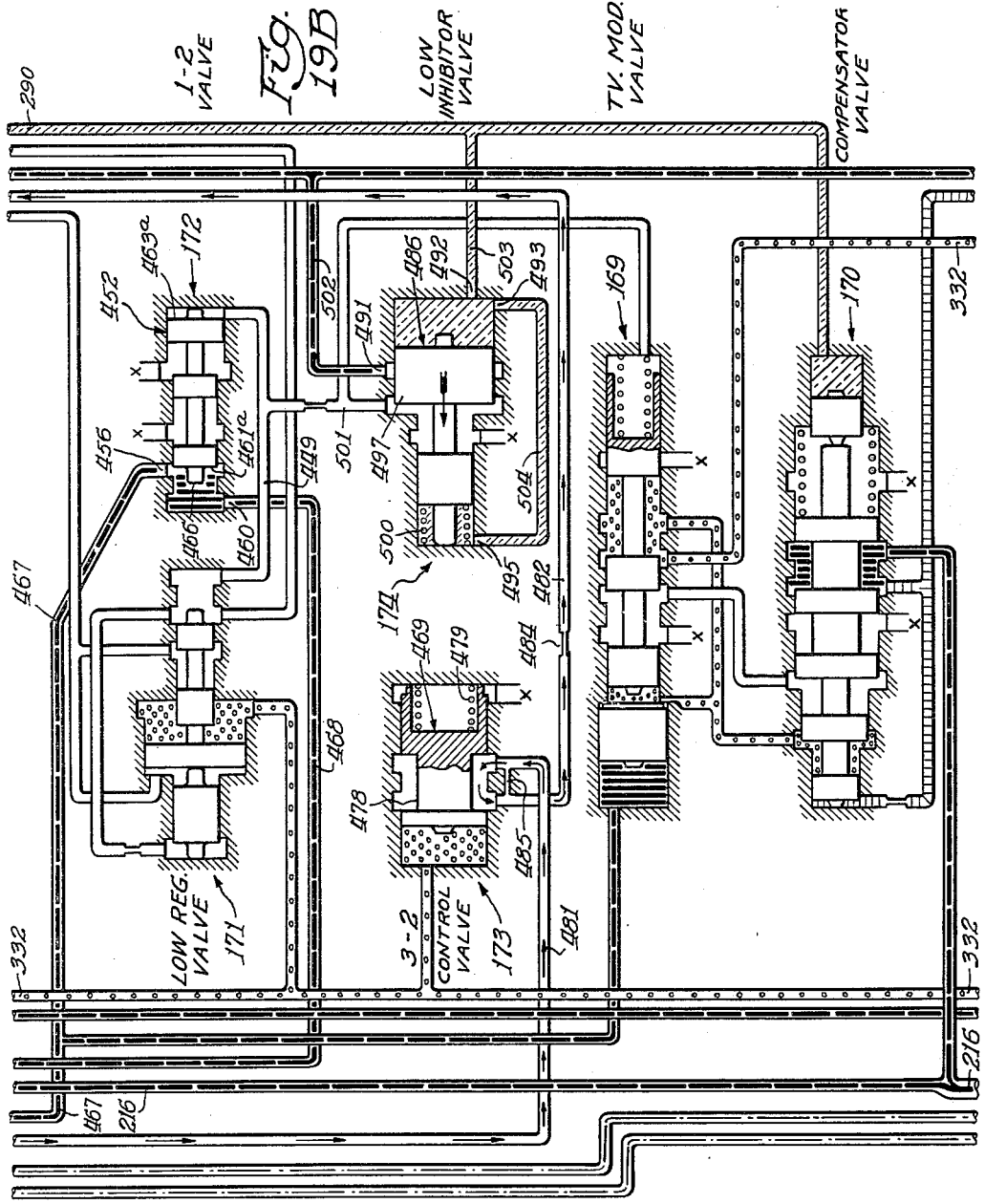

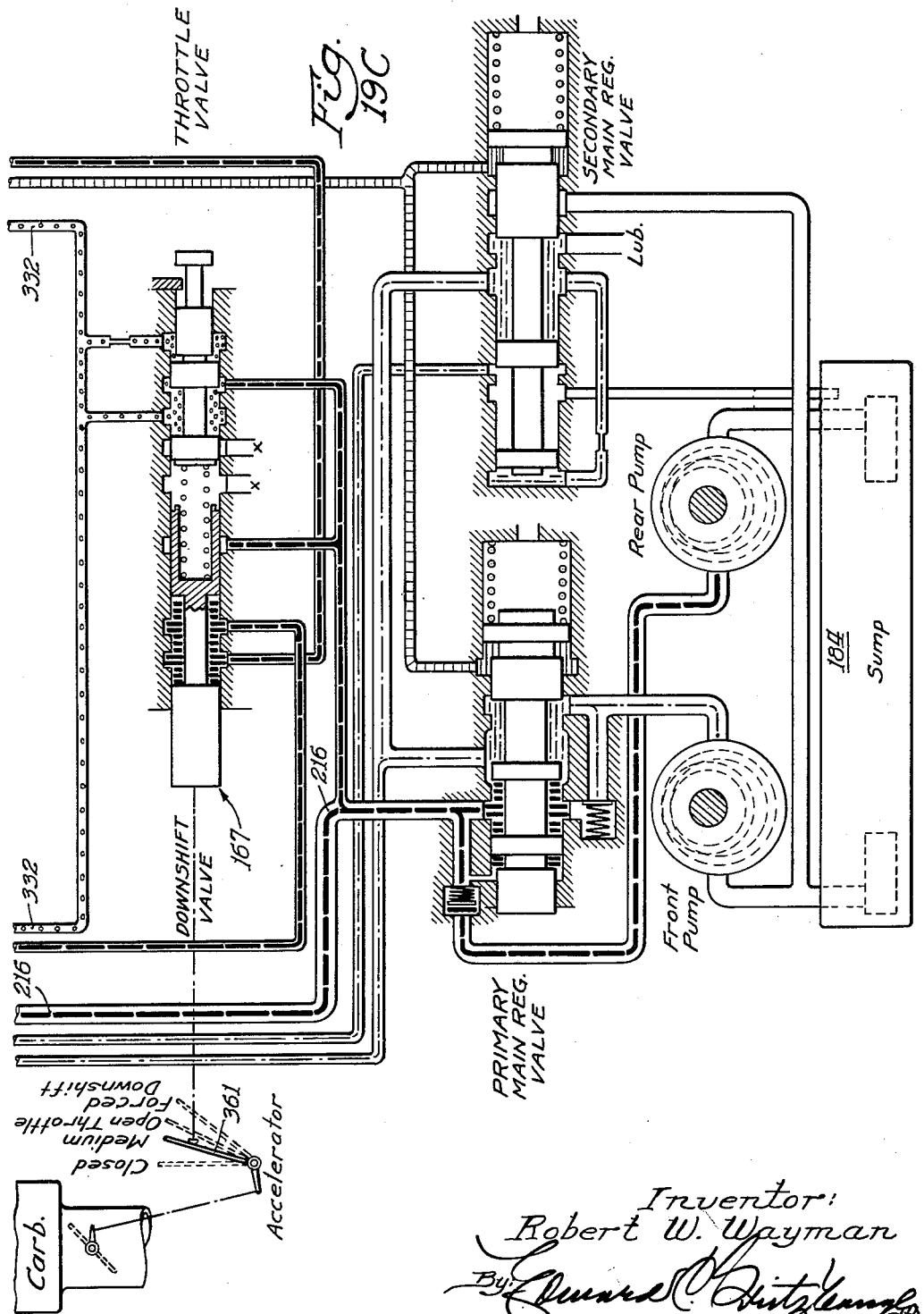

Jan. 19, 1965          R. W. WAYMAN          3,165,946
              CONTROLS FOR POWER TRANSMISSION
Filed June 5, 1950                    43 Sheets-Sheet 33

Inventor:
Robert W. Wayman

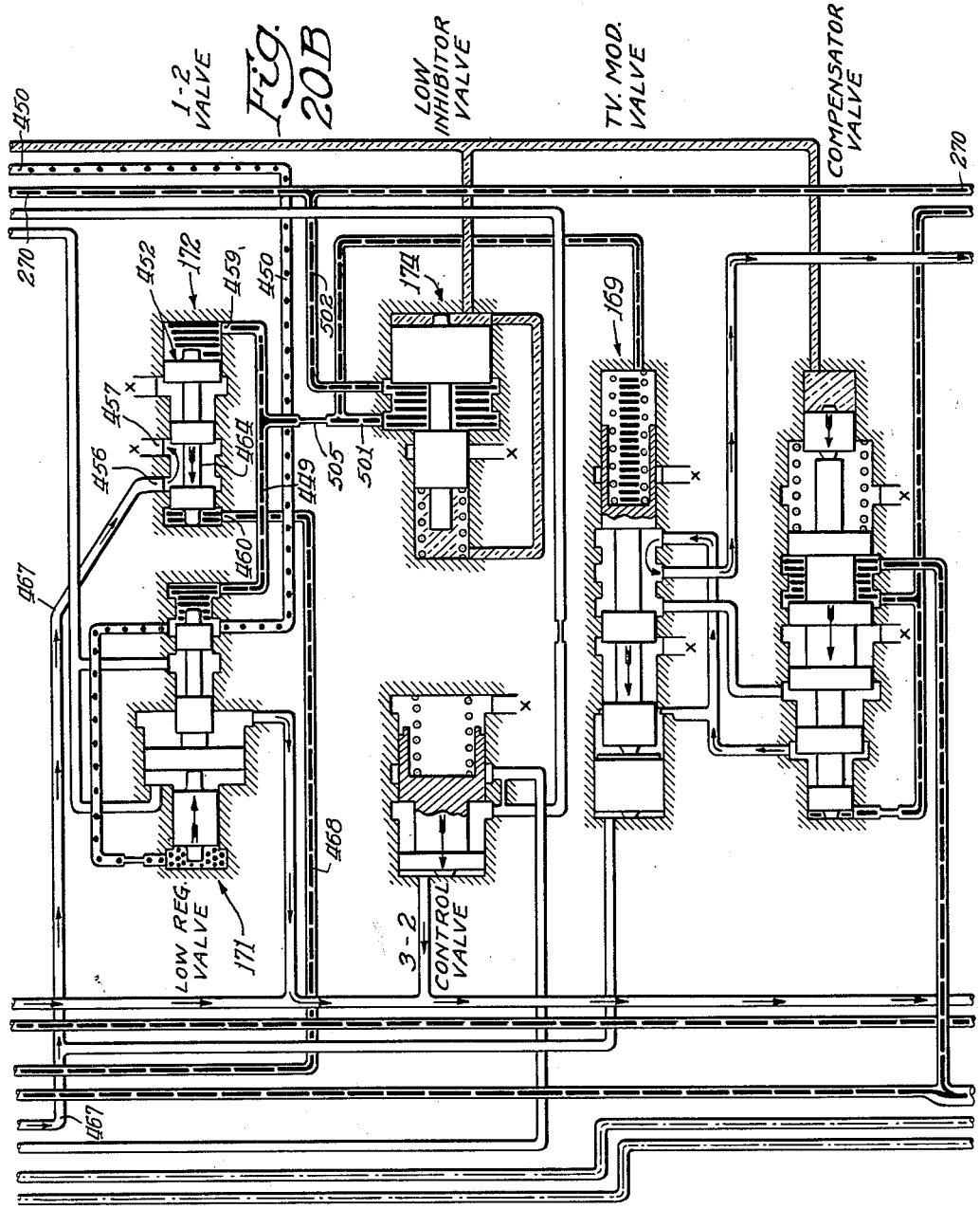

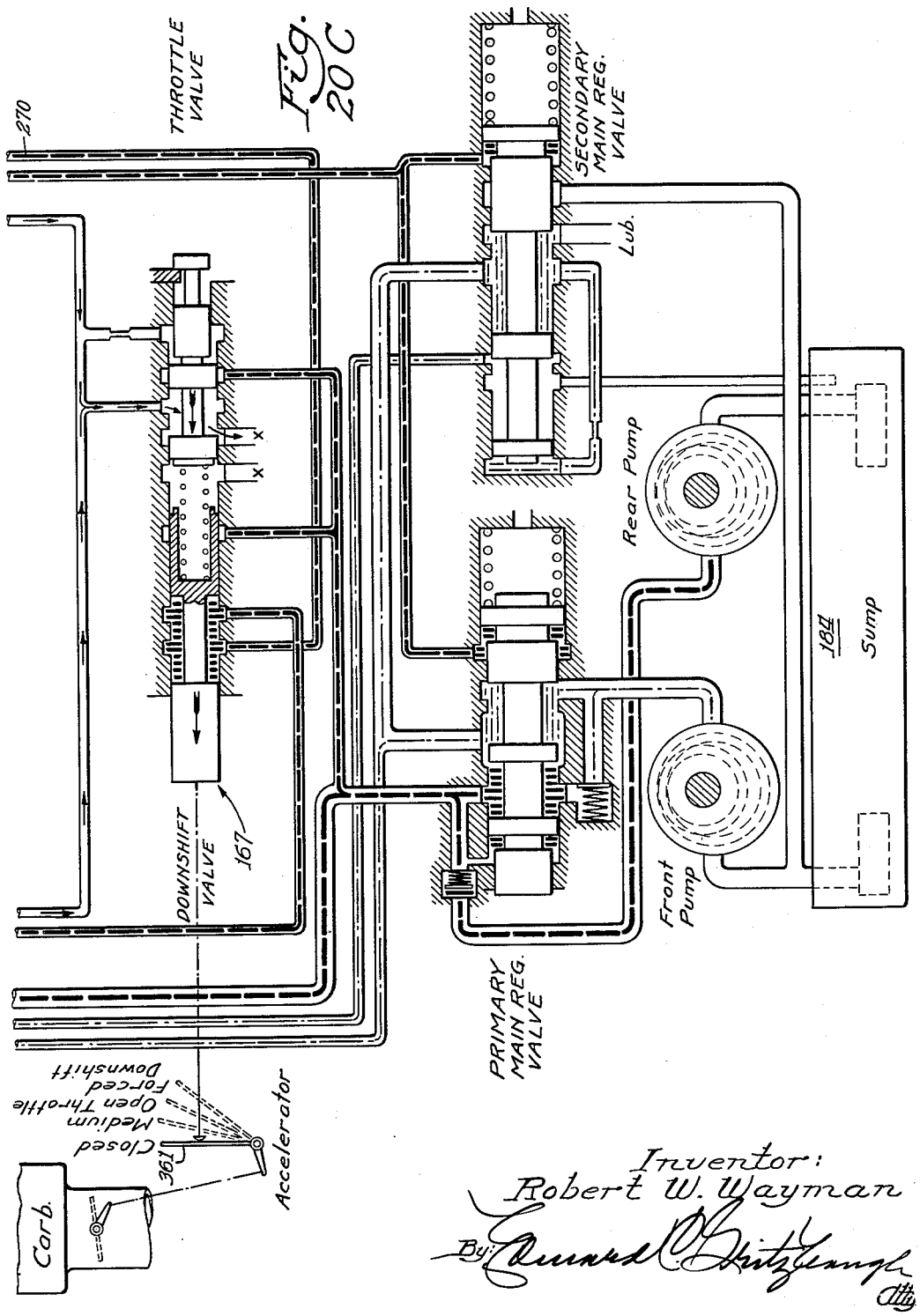

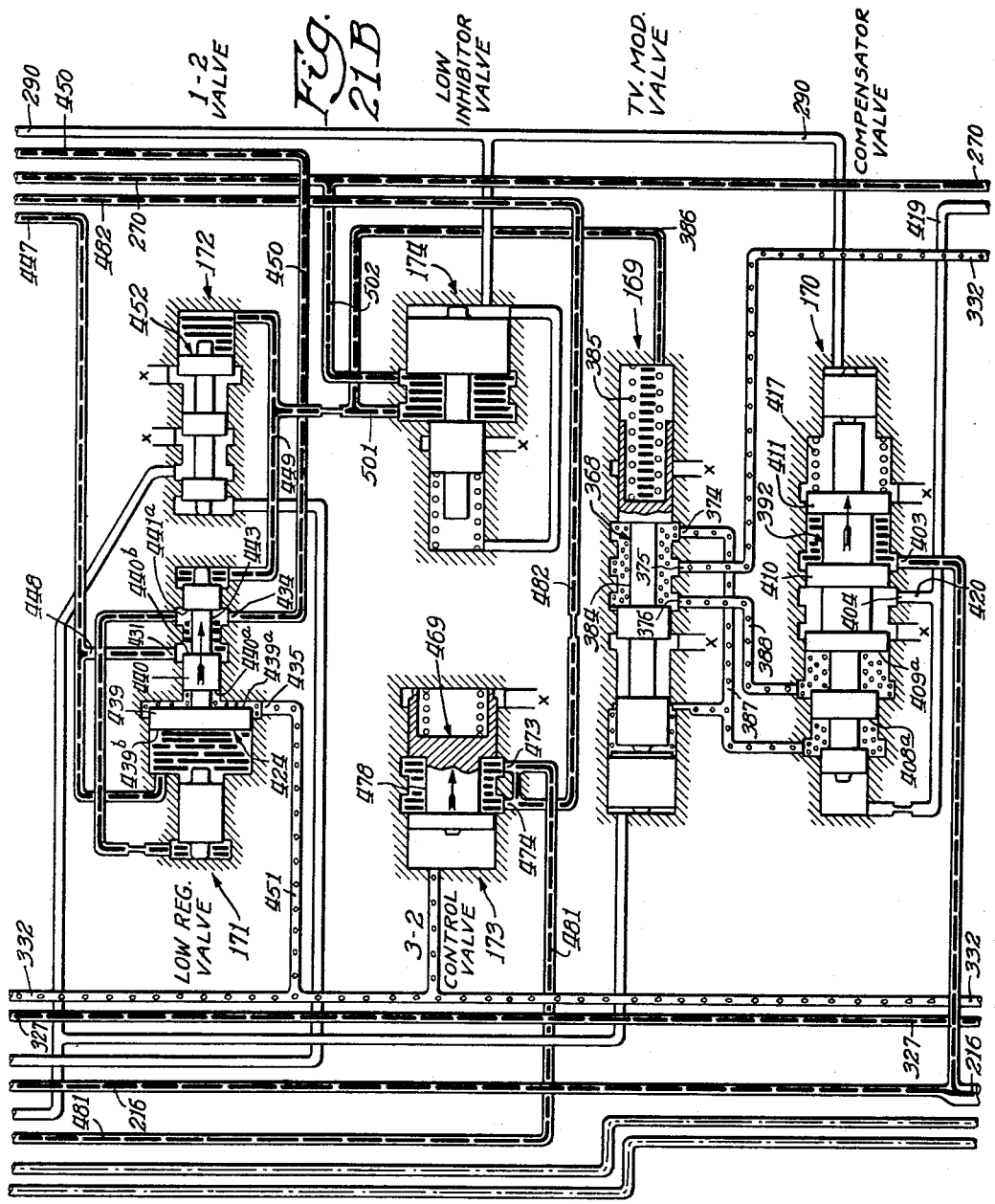

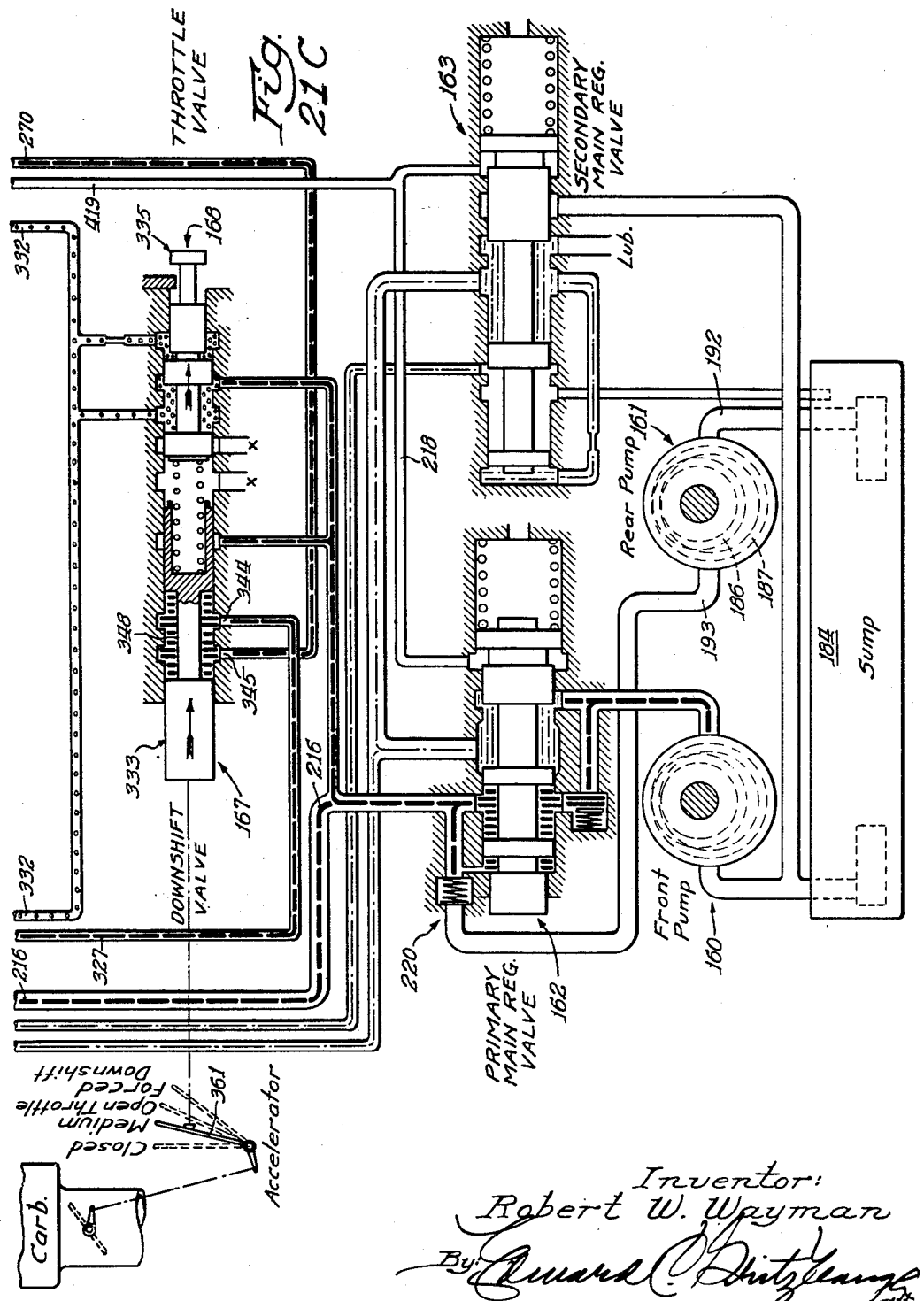

Jan. 19, 1965 R. W. WAYMAN 3,165,946
CONTROLS FOR POWER TRANSMISSION
Filed June 5, 1950 43 Sheets-Sheet 39

LINE PRESSURE CHARACTERISTIC IN HIGH RANGE.

LINE PRESSURE CHARACTERISTIC IN LOW RANGE.

Inventor:
Robert W. Wayman

Fig. 25
LINE PRESSURE CHARACTERISTIC IN REVERSE DRIVE.
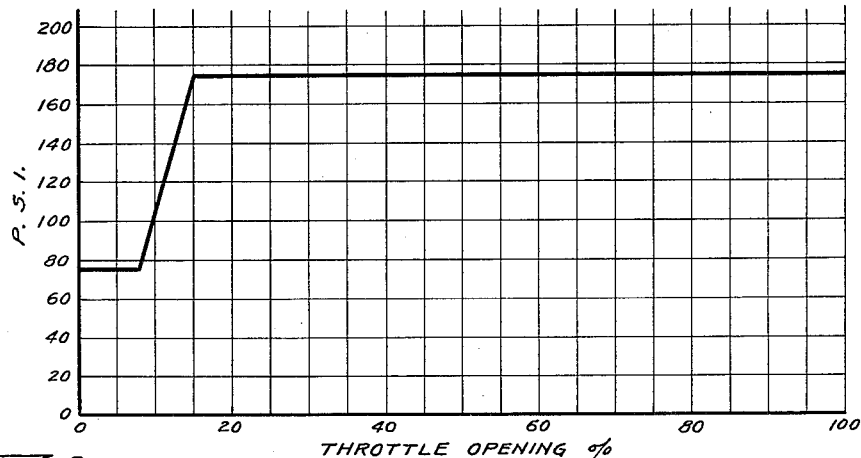
Fig. 26 THROTTLE CONSCIOUS PRESSURES.
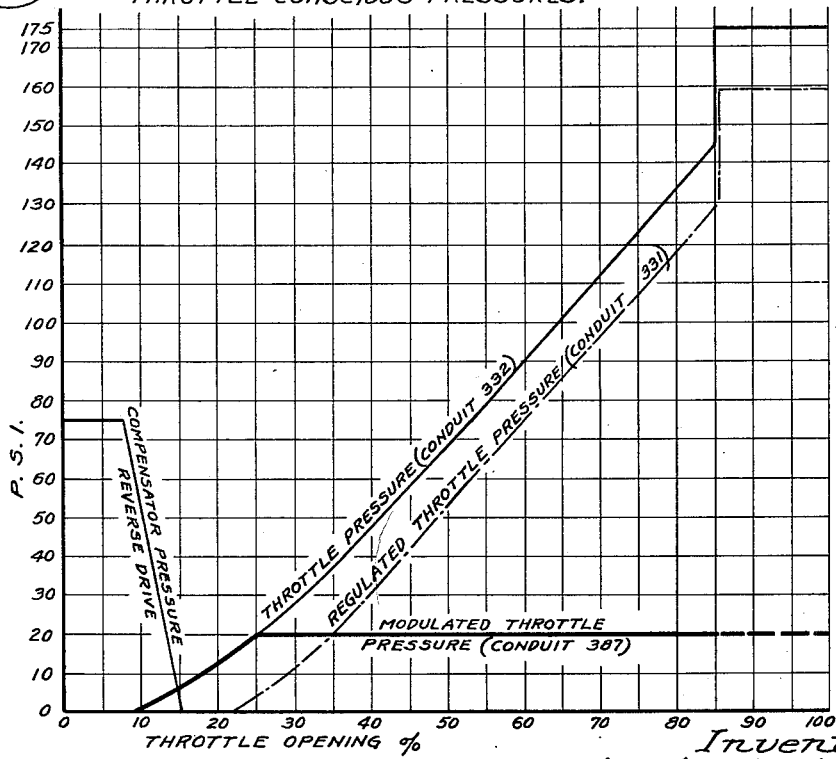

Jan. 19, 1965   R. W. WAYMAN   3,165,946
CONTROLS FOR POWER TRANSMISSION
Filed June 5, 1950   43 Sheets-Sheet 41

CONVERTER CHARGE PRESSURE CHARACTERISTIC IN HIGH RANGE.

CONVERTER CHARGE PRESSURE CHARACTERISTIC IN LOW RANGE.

Inventor:
Robert W. Wayman

CONVERTER PRESSURE CHARACTERISTIC IN REVERSE DRIVE.

GOVERNOR PRESSURE.

PRESSURE VARIATIONS ON PISTONS 98ª AND 79 FOR CHANGE FROM SECOND SPEED TO THIRD SPEED.

Inventor:
Robert W. Wayman

COMPENSATOR PRESSURE CHARACTERISTIC IN HIGH RANGE.

COMPENSATOR PRESSURE CHARACTERISTIC IN LOW RANGE.

Inventor:
Robert W. Wayman 3,165,946
CONTROLS FOR POWER TRANSMISSION
Robert W. Wayman, North Riverside, Ill., assignor to Borg-Warner Corporation, Chicago, Ill., a corporation of Illinois
Filed June 5, 1950, Ser. No. 166,136
106 Claims. (Cl. 74—645)

My invention relates to transmissions for automotive vehicles and more particularly to hydraulic controls for such transmissions.

It is an object of the invention to provide improved transmission controls which include friction engaging devices, such as friction clutches and brakes, for completing a reverse power train and low, intermediate and high forward drive power trains through the transmission and mechanism for so actuating the friction engaging devices that the drive through the transmission may be automatically changed between the intermediate and high speed forward drives, and the low speed forward drive and the reverse drive may be obtainable selectively at the will of the operator. It is contemplated that the transmission shall preferably include a planetary gear set on which these friction engaging devices are effective in order to have its drive changed as aforesaid between three forward drives and reverse drive and a hydraulic torque converter in series with the gear set, so that the torque between the drive and driven shafts of the transmission is the product of the torque multiplications by the torque converter and the planetary gear set.

It is another object of the invention to provide an improved control mechanism for engaging a power train completing friction engaging device, and particularly a friction clutch, with a pressure that increases with the opening of the vehicle engine throttle, so that this friction device may have the capacity for transmitting the increased torque attendant on increased engine throttle openings. It is a more particular object to provide this improvement in connection with a gear set disposed in tandem with and behind a hydraulic torque converter in which the friction engaging device must have increased holding power due to the torque converting function of the torque converter.

It is another object of my invention to provide means responsive to the speed of an element of the transmission, preferably its driven shaft, for decreasing the pressure of engagement on the friction device with increases in speed. As the speed of the parts of the torque converter increase, its torque multiplication generally decreases, and hence the augmented holding power of the friction engaging device is not needed with this increased speed.

It is another object of the invention to vary the charging pressure of the hydraulic torque converter in the transmission with operating conditions of the transmission and more particularly with the torque being transmitted through the torque converter and the speed of parts of the torque converter. It has been found that the required charging pressure of a torque converter varies with the latter two conditions, and in order that unnecessary pumping losses may be avoided, the pressure in the torque converter is lowered in accordance with the teachings of my invention with decreases in the torque transmitted through the converter and also with increases in the speed of the parts of the converter. More particularly it is an object of the invention to provide regulating valve means for decreasing the fluid pressure in the torque converter when the engine throttle of the vehicle is opened and decreasing the pressure in the converter when the throttle is closed. It is also an object to provide regulating valve means for decreasing the fluid pressure in the torque converter on increases in speed of the driven shaft of the transmission, for example, which varies generally with speeds of the parts of the torque converter.

It is another object of the invention to provide improved hydraulic control mechanism for providing the variable fluid pressures for the power train completing friction engaging devices and for the torque converter that increase with greater engine throttle openings and decrease with increases in speed of the transmission driven shaft and which hydraulic mechanism preferably includes valve mechanism under the control of the vehicle engine throttle control providing a throttle pressure that increases with throttle opening, governor valve mechanism that provides a governor pressure that increases with speed of the driven shaft, which pressures act on a first regulating valve tending to move the regulating valve in opposite directions. It is contemplated that the friction engaging devices shall be subject to a pressure produced by a second regulating valve and the torque converter shall be subject to a pressure produced by a third regulating valve, with the first regulating valve producing a fluid pressure that is impressed on both the second and third regulating valves and increases with the speed of the driven shaft and decreases with increased throttle openings, this pressure imposed on the second and third valves thus varying just oppositely with respect to the pressures on the torque converter and on the friction engaging devices.

It is a further object of the invention to provide hydraulic controls for varying the pressures applied to the friction engaging devices with different drives through the transmission. The planetary gear set in a transmission of this kind may include a friction device completing two different drives and which carries a greater torque for one drive than for the other, a greater torque for a reverse drive as compared with a direct drive, for example, and hence the desirability for providing increased fluid pressures for the engaging device for the drive in which the device carries the greater torque. It is contemplated that the fluid pressure for applying the friction engaging devices shall vary as before with throttle opening and the speed of the driven shaft of the transmission, and in this connection it is an object of the invention to provide a limiter or modulator valve in connection with the throttle pressure which limits the throttle pressure to a predetermined maximum value for the high forward speed drives and which allows the full throttle pressure to be impressed on the first regulator valve mentioned above in the low speed forward drive and reverse drive, so that the fluid pressures on the friction engaging devices are increased for the latter drives.

It is another object of the invention to provide a manually operable selector for conditioning the transmission either in a drive or high range in which there is automatic changing between intermediate and high speed forward drive power trains, a low range in which the drive may be through the low speed forward drive power train or at times through the intermediate speed forward drive power train, or for a drive in reverse. It is an object to provide, in connection with such a manually operable selector, automatic means for causing a change in drive from the high speed forward drive power train to the intermediate speed forward drive power train when the selector is moved from its high range to its low range position with the speed of the vehicle being above a predetermined value in lieu of a change in drive to the low speed power train. By this arrangement, undue engine braking on the vehicle will not be obtained due to a change in drive from the high speed drive to the low speed drive at too high a vehicle speed. It is contemplated that preferably this result may be obtained by means of a valve responsive to the governor pressure above mentioned.

It is another object of the invention to provide hydraulic means for modifying the engaging fluid pressure applied to a friction engaging device completing the low speed drive and reverse drive and which is responsive to changes in position of the vehicle engine throttle control. A friction engaging device, for example a brake, may be self-energizing and if such a brake is used for a reaction element of the planetary gear set which is braked for both the low forward drive power train as well as for the reverse drive power train, an engagement of this brake will tend to be unduly severe for a smooth change in drive if the accelerator is in a closed throttle position when the selector is moved from its high range position to its low range position for a change to low ratio drive if the same engaging pressures are used. It has been found that this unduly harsh engagement is particularly present when the friction brake for this reaction element of the gear set is wrapping or self-energizing for the reverse drive through the transmission, which is preferable, since the reaction is greater for the reverse drive than for the low speed forward drive. It is accordingly an object to provide a regulator valve for decreasing the fluid pressure applied to the low and reverse friction brake when the engine throttle is in a closed throttle position for completing the low forward drive power train. It is contemplated that the increased pressures mentioned above will be maintained on the other friction engaging devices, as well as on this brake when the throttle is opened, for completing the low and reverse power trains.

It is another object of the invention to provide improved mechanism for gradually completing a power train through the transmission by slowing the rate of application of a friction engaging device which is engaged to render the power train operative, and it is an object to make this control mechanism responsive to changes in position of the vehicle engine throttle control so that the mechanism is particularly operative to slow the engagement of the friction engaging device when the throttle control is in a closed throttle position and there would otherwise be an unduly harsh engagement.

It is also an object to provide improved mechanism for providing a gradual completion of a power train when a change is made to the latter power train from a second power train, which mechanism includes a pressure responsive device operative on a predetermined change in pressure on a friction engaging device completing the second power train to initiate engagement of a friction engaging device for the first power train, and more particularly it is an object to modify the action of this control mechanism in accordance with the speed of the vehicle and the position of the vehicle throttle control, so that the initiation of engagement of the first friction engaging device takes place at engaging pressures on the other engaging device which vary with these two factors and a gradual completion of the first power train is obtained regardless of variations in vehicle speed and throttle control position.

It is another object of the invention to provide a pump driven by the drive shaft of the transmission and a pump driven by the driven shaft of the transmission which constitute a source of fluid pressure and to provide an improved fluid pressure regulating mechanism for use in connection with the pumps and fluid pressure actuated drive completing clutches and brakes and with the hydraulic torque converter, so that the drive shaft pump may be utilized for both the clutches and brakes and for the torque converter for low speeds of the vehicle and the driven shaft pump when in operation may be utilized for providing the pressure for the clutches and brakes while the drive shaft pump may be utilized under these conditions for providing only the pressure for the hydraulic torque converter. The torque converter pressure is preferably lower than the pressure for the clutches and brakes and when this change takes place, the power required for driving the drive shaft pump is thereby reduced.

It is a further object of the invention to provide improved hydraulic control means for the two friction engaging mechanisms, respectively completing high speed and intermediate speed drives, which disengages the high speed drive friction mechanism and engages the intermediate speed drive friction mechanism when the accelerator of the vehicle is moved to an open throttle forced down shift position, with the arrangement including means for delaying the engagement of the intermediate speed friction mechanism with respect to the disengagement of the high speed mechanism for the purpose of allowing the vehicle engine to momentarily increase in speed free of load so that its speed approximates its speed for intermediate ratio drive when the intermediate drive is finally completed. More particularly it is an object in this connection to provide a fluid pressure operated piston for engaging a high speed drive clutch and a servomotor for engaging an intermediate speed brake which is drained of fluid under pressure for engaging the brake and to provide in a conduit connected with the servomotor and draining the servomotor a restriction for impeding the drainage, and therefore, delaying engagement of the brake.

It is also an object of the invention to provide a selector lever adjacent the steering wheel of the vehicle for conditioning the transmission mechanism for its various drives, with the arrangement being such that the selector lever has an improved relative disposition of principal drive conditioning positions. It is contemplated in this connection that the lever shall be moved away from the vehicle operator to condition the transmission for reverse operation or for engaging a parking brake in the transmission and shall be moved toward the driver for conditioning the transmission mechanism for operation in either high or low forward drive ranges.

The invention consists of the novel constructions, arrangements and devices to be hereinafter described and claimed for carrying out the above-stated objects and such other objects as will appear from the following description of a preferred form of the invention, illustrated with reference to the accompanying drawings, wherein:

FIG. 1 is a diagram illustrating the relative positions in which the component FIGS. 1A and 1B shall be placed to form a complete view;

FIGS. 1A and 1B when placed together as illustrated in FIG. 1 are a longitudinal, sectional view of a transmission with which my improved hydraulic transmission controls may be used;

FIGS. 2, 3, and 4 are sectional views taken respectively on lines 2—2, 3—3 and 4—4 of FIG. 1B in the directions indicated;

FIGS. 5 and 6 are sectional views on enlarged scales taken respectively on lines 5—5 and 6—6 of FIGS. 1A and 1B in the directions indicated;

FIG. 7 is a sectional view taken on line 7—7 of FIG. 1B in the direction indicated and illustrating parking brake mechanism shown engaged in FIG. 7;

FIG. 8 is a sectional view taken on line 8—8 of FIG. 7 in the direction indicated;

FIG. 9 is a view taken on line 9—9 of FIG. 8 in the direction indicated;

FIG. 10 is a top plan view of the mechanism shown in FIG. 8;

FIG. 11 is a diagram illustrating the relative positions in which the component FIGS. 11A, 11B, 11C and 11D shall be placed to form a complete view;

Figure 23:
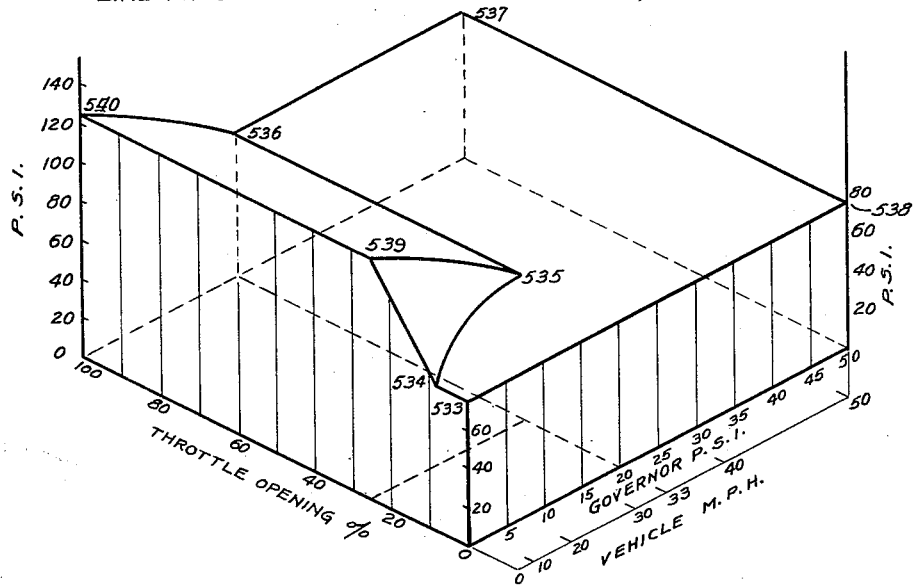
Figure 24:
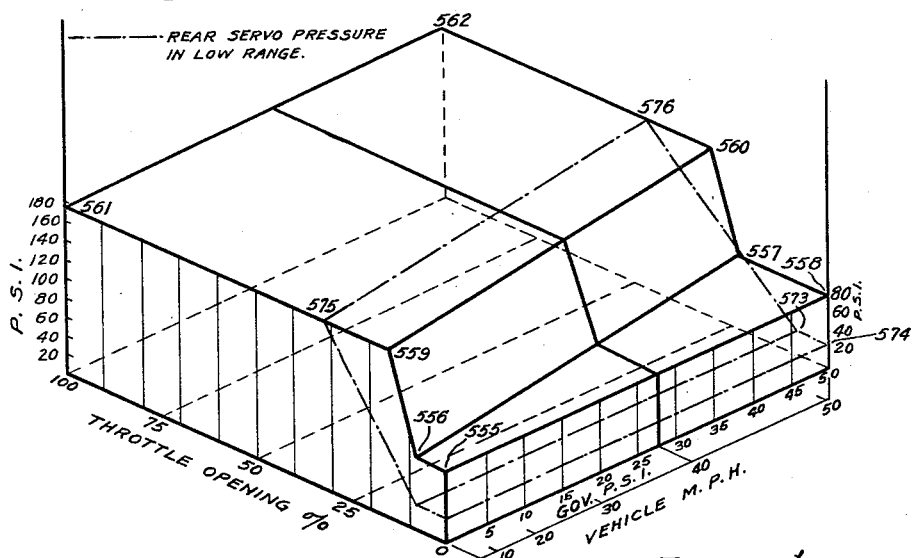
Figure 27:
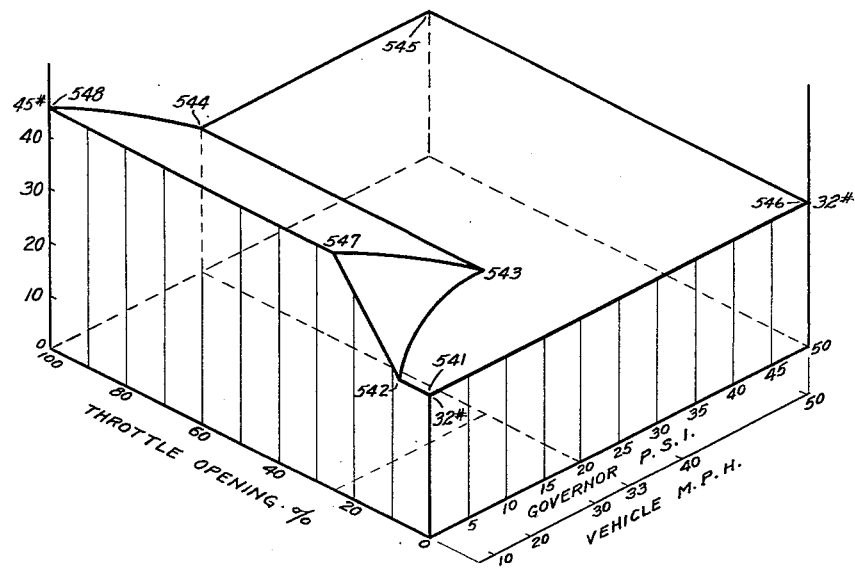
Figure 28:
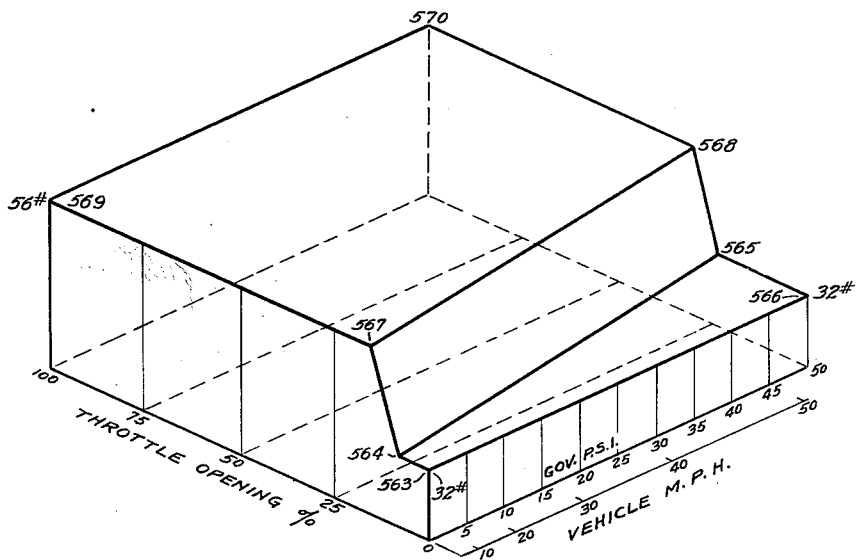
Figure 29:
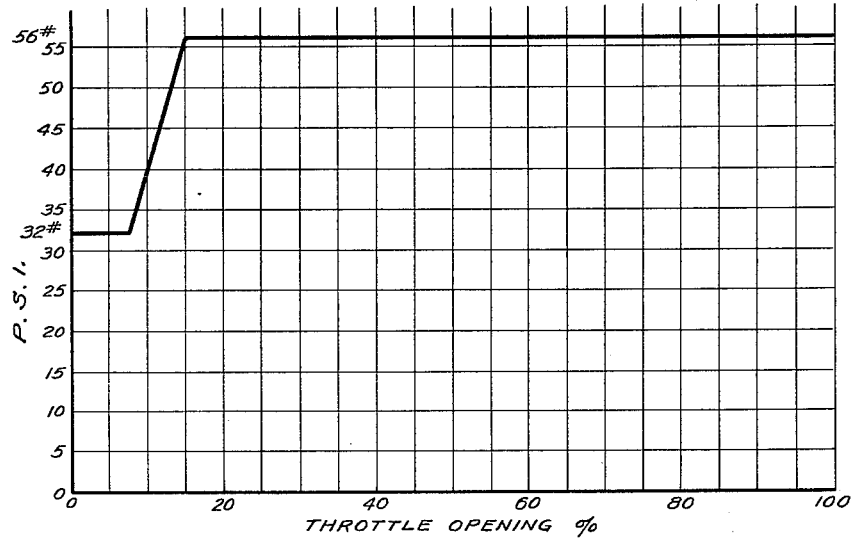
Figure 32:
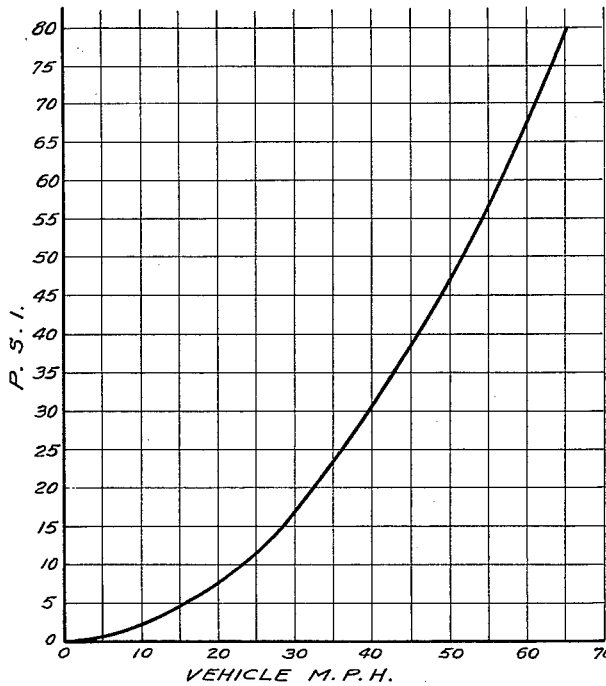
Figure 33:
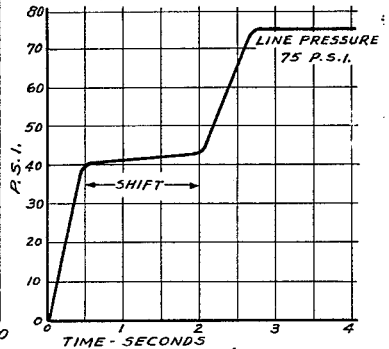
Figure 30:
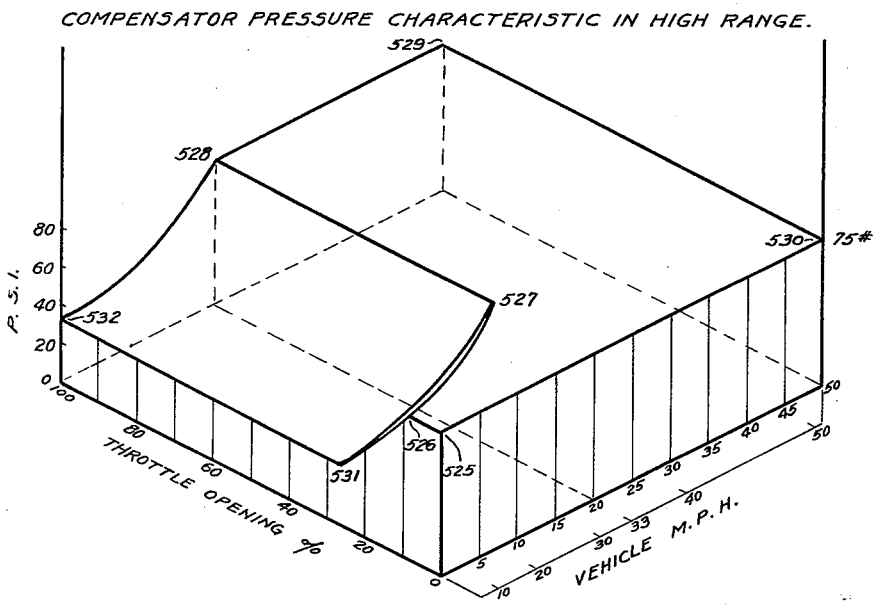
Figure 31:
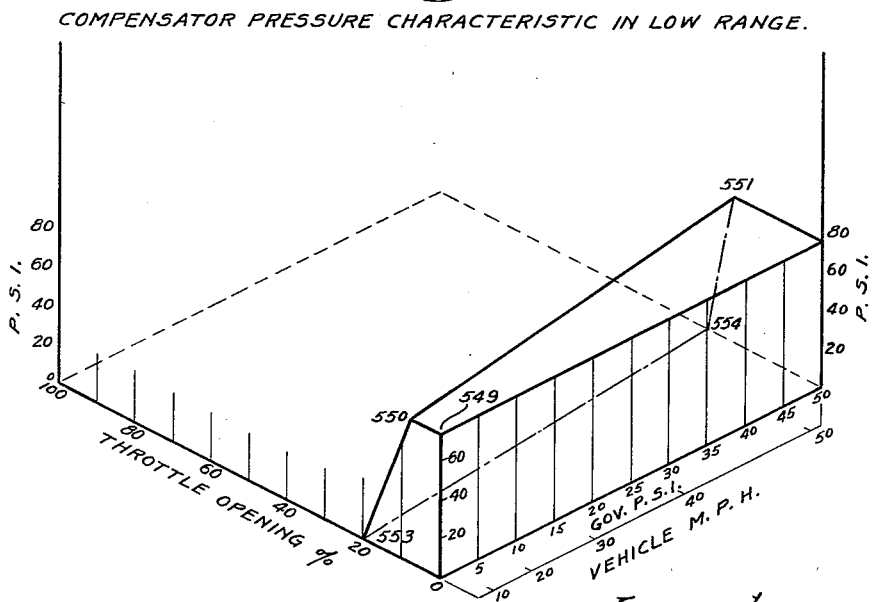

FIGS. 11A, 11B, 11C and 11D, when placed together as illustrated in FIG. 11 are a diagrammatic illustration of the transmission and the associated hydraulic control system embodying the principles of the invention, with the transmission and control system being in the following condition: Neutral, Engine in Operation, Accelerator in Closed Throttle Position and with a top view of the vehicle steering wheel being shown;

FIG. 12 is a diagram illustrating the relative positions in which the component FIGS. 12A, 12B and 12C shall be placed to form a complete view;

FIGS. 12A, 12B, and 12C, when placed together as illustrated in FIG. 12, are a diagrammatic illustration of the transmission control system, the transmission control system being in the following condition: High Range—Start in Second Speed, Selector in "H" Position, Accelerator in Closed Throttle Position, Vehicle Stationary;

FIG. 13 is a diagram illustrating the relative positions in which the component FIGS. 13A, 13B and 13C shall be placed to form a complete view;

FIGS. 13A, 13B and 13C, when placed together as illustrated in FIG. 13, are a diagrammatic illustration of the transmission control system, with the control system being in the following condition: High Range—Second Speed (Just Prior to Change to Third Speed at 15 m.p.h.), Accelerator in Medium Throttle Position;

FIG. 14 is a diagram illustrating the relative positions in which the component FIGS. 14A, 14B and 14C shall be placed to form a complete view;

FIGS. 14A, 14B and 14C, when placed together as illustrated in FIG. 14, are a diagrammatic illustration of the transmission control system, with the control system being in the following condition: High Range—Third Speed, Accelerator in Medium Throttle Position, 30 m.p.h.;

FIG. 15 is a diagram illustrating the relative positions in which the component FIGS. 15A, 15B and 15C shall be placed to form a complete view;

FIGS. 15A, 15B and 15C, when placed together as illustrated in FIG. 15, are a diagrammatic illustration of the transmission control system, with the transmission control system being in the following condition: High Range—Forced Down Transition by Accelerator Control from Third Speed to Second Speed, 55 m.p.h.;

FIG. 16 is a diagram illustrating the relative positions in which the component FIGS. 16A, 16B and 16C shall be placed to form a complete view;

FIGS. 16A, 16B and 16C, when placed together as illustrated in FIG. 16, are a diagrammatic illustration of the transmission control system, with the control system being in the following condition: High Range—Third Speed to Second Speed Governor Controlled Transition, Accelerator in Closed Throttle Position and Vehicle Speed Decreased to 5 m.p.h.;

FIG. 17 is a diagram illustrating the relative positions in which the component FIGS. 17A, 17B and 17C shall be placed to form a complete view;

FIGS. 17A, 17B and 17C, when placed together as illustrated in FIG. 17, are a diagrammatic illustration of the transmission control system, with the control system being in the following condition: Low Range—Selector in "L" Position, Accelerator Moved to Medium Throttle Position to Start Vehicle, 3 m.p.h.;

FIG. 18 is a diagram illustrating the relative positions in which the component FIGS. 18A, 18B and 18C shall be placed to form a complete view;

FIGS. 18A, 18B and 18C, when placed together as illustrated in FIG. 18, are a diagrammatic illustration of the transmission control system, with the transmission control system being in the following condition: Manual Transition Selector Moved from "H" to "L" Position to Change from High Range (3rd) Third to Low Range (1st), 30 m.p.h., Accelerator in Closed Throttle Position;

FIG. 19 is a diagram illustrating the relative positions in which the component FIGS. 19A, 19B and 19C shall be placed to form a complete view;

FIGS. 19A, 19B and 19C, when placed together as illustrated in FIG. 19, are a diagrammatic illustration of the transmission control system, with the control system being in the following condition: Manual Transition—Selector Moved from "H" to "L" Position to Change from Third Speed to Second Speed, 45 m.p.h.;

FIG. 20 is a diagram illustrating the relative positions in which the component FIGS. 20A, 20B and 20C, shall be placed to form a complete view;

FIGS. 20A, 20B and 20C, when placed together as illustrated in FIG. 20, are a diagrammatic illustration of the transmission control system, with the control system being in the following condition: Manual Transition—Selector Moved from "H" to "L" Position to Change from High Range (2nd) to Low Range (1st), 10 m.p.h., Accelerator in Closed Throttle Position;

FIG. 21 is a diagram illustrating the relative positions in which the component FIGS. 21A, 21B and 21C shall be placed to form a complete view;

FIGS. 21A, 21B and 21C, when placed together as illustrated in FIG. 21, are a diagrammatic illustration of the transmission control system, with the control system being in the following condition: Reverse—Selector in "R" Position, Accelerator in Medium Throttle Position, 15 m.p.h.;

FIG. 22 is a legend illustrating the various hydraulic pressures which are shown in various of the FIGS. 11 to 21C inclusive;

FIG. 23 is a graph showing the variations of line pressure identified in FIG. 22 with changes in vehicle speed and engine throttle opening for high range operation of a particular embodiment of the transmission controls;

FIG. 24 is a graph similar to FIG. 23 showing the variations of line pressure for low range operation of this particular embodiment of the controls and also showing regulated rear servo brake pressure identified in FIG. 22;

FIG. 25 is a graph showing the variations of line pressure with throttle opening for reverse drive for this embodiment of the controls;

FIG. 26 is a graph showing the variations of throttle pressure, regulated throttle pressure, modulated TV pressure and compensator pressure for reverse drive, all identified in FIG. 22, with variations in throttle opening for this particular embodiment;

FIG. 27 is a graph showing the variations of converter pressure in high range operation of the transmission with variations in throttle opening and vehicle speed for this particular embodiment;

FIG. 28 is a graph showing variations in converter pressure in low range operation of the transmission with changes in throttle opening and vehicle speed for this particular embodiment;

FIG. 29 is a graph showing the variations in converter pressure with variable throttle opening for reverse drive conditions in this particular embodiment;

FIG. 30 is a graph showing the variations in compensator pressure with variations in throttle opening and vehicle speed for high range operation for this particular embodiment;

FIG. 31 is a graph showing the variations in compensator pressure with variations in throttle opening and vehicle speed for low range operation for this particular embodiment;

FIG. 32 is a graph showing the variations of governor pressure with vehicle speed for this particular embodiment; and FIG. 33 is a graph showing the manner in which the hydraulic pressure builds up on certain pistons for completing the transition from second speed to third speed forward drive.

Like characters of reference designate like parts in the several views.

The present invention constitutes an improvement on the hydraulic transmission controls shown in a copending patent application by Herdis George English, Serial No. 68,342, filed December 30, 1948, now Patent No. 2,757,552, issued Aug. 27, 1956, and is applicable to transmissions of the type shown in the copending applications of Herdis George English, Sidney V. Hettinger, Jr., and Robert W. Wayman, Serial No. 72,902, filed January 26, 1949, now abandoned; Harold T. Youngren, Herdis George English and Sidney V. Hettinger, Jr., Serial No.

74,098, filed February 2, 1949, now Patent No. 2,715,343, issued Aug. 16, 1955; and Harold T. Youngren, Herdis George English and Sidney V. Hettinger, Jr., Serial No. 25,064, filed May 4, 1948, now Patent No. 2,699,076, issued January 11, 1955.

Referring now in particular to FIGS. 1A, 1B, 2 and 11A of the drawings, the transmission may be seen to comprise a drive shaft 25, a driven shaft 26 and intermediate shafts 27 and 28. The shaft 25 may be the usual crankshaft of the vehicle engine, and the shaft 26 may be connected by any suitable means (not shown) with the driving road wheels of the vehicle. All of the shafts 25, 26, 27 and 28 are rotatably disposed with respect to the transmission housing 29 and the shafts 27 and 28 are in effect piloted with respect to the shafts 25 and 26. The transmission comprises in general, a hydraulic torque converter 30, hydraulically operated friction clutches 31 and 32, hydraulically operated friction brakes 33 and 34 and a planetary gear set 35.

The hydraulic torque converter 30 comprises a vaned impeller element 36, a vaned rotor or driven element 37 and a vaned stator or reaction element 38. The vaned elements 36, 37 and 38 are disposed within a fluid tight casing 39, a part of which is formed by the casing 40 of the impeller 36. The impeller 36 is driven from the drive shaft 25 through a thin flexible annular metal ring 41 fixed to both the drive shaft 25 and casing 40. The rotor 37 is fixed to the intermediate shaft 27. The stator 38 is rotatably disposed on a stationary sleeve 42 which is fixed to the transmission casing 29, and a one-way brake 43 is disposed between the stator and the sleeve 42.

The one-way brake 43 may be of any suitable construction and in the illustrated embodiment comprises a plurality of tiltable sprags 44 disposed between an inner race 45 and an outer race 46. The inner race 45 is fixed with respect to the sleeve 42, and the outer race 46 is fixed with respect to the stator 38. The brake 43 comprises a sprag cage 47 and a sprag retainer spring 48 passing through the sprags. Two radially perforated thrust washers 49 and 50 are provided on opposite sides of the sprag brake 43 for holding the brake 43 in its proper place and for holding the stator spaced from the runner and impeller. The one-way brake 43 is so arranged as to allow a free rotation of the stator 38 in the forward direction, that is in the same direction in which the drive shaft 25 rotates and which is indicated by the arrow 51 and prevents a rotation of the stator in the reverse direction. In the latter case, the sprags 44 engage the inner and outer races 45 and 46, being tilted into engaging relation with the races by means of the spring 48, and in the former case, the outer race 46 rotates in a direction to slightly rotate the sprags 44 against the action of the spring 48 to disengage them with respect to the inner and outer races.

The torque converter 30 functions in a manner well known for such torque converters for driving the rotor or driven element 37 at an increased torque with respect to the torque impressed on the impeller 36 of the converter. The vanes of the stator 38 function to change the direction of flow of fluid between the rotor and impeller, the flow of fluid being indicated by the arrow 52, so as to provide this increased torque on the driven element 37. In this case the reaction on the stator 38 is in the direction reverse to the rotation of the drive shaft 25, so that the one-way brake 43 engages and prevents rotation of the stator in this direction. When the speed of the driven element or rotor 37 reaches a predetermined value, the reaction on the vanes of the stator 38 changes in direction, tending to rotate the stator in the forward direction, and the brake 43 releases and allows such rotation of the stator. In this case, the torque converter 30 functions as a simple fluid coupling to drive the rotor 37 at substantially the same speed and with no increase in torque with respect to the impeller 36.

As is well known, heat is developed in the fluid in a torque converter of this type, and cooling fins 53 are provided on the exterior of the impeller casing 40 for providing increased cooling for the casing 40 and the fluid within the converter. A shroud 54 is provided within the transmission casing 29 in the vicinity of the fins 53 for guiding a flow of air through the fins.

The planetary gear set 35 comprises a sun gear 55 which is formed on the shaft 28, a second sun gear 56 formed on a sleeve portion 57 which is rotatable on the shaft 28, a ring gear 58 formed on a bell shaped portion 59 of the driven shaft 26, a plurality of planet gears 60 each having a gear portion 60a and a gear portion 60b, a plurality of planet gears 61 and a planet gear carrier 62. Each planet gear 60 is rotatably disposed in the planet gear carrier 62 by means of a shaft 63, and each of the planet gears 61 is rotatably disposed in the carrier 62 by means of a shaft 64. The gear carrier 62 is rotatably disposed within the transmission casing 29 and with respect to the shaft 28 and shaft portion 57 by any suitable bearings. The planet gears 61 are each in mesh with the sun gear 55 and also with the gear portion 60b of a planet gear 60. The portions 60b of the gears 60 are also in mesh with the ring gear 58, and the gear portions 60a of the gears 60 are in mesh with the sun gear 56.

The clutch 31 is arranged to connect the shaft 27 driven by the rotor 37 with the shaft 28 and the sun gear 55 formed thereon. The clutch 31 comprises clutch discs 65 splined on to a hub member 66 which in turn is splined on the shaft 28. The clutch also comprises clutch discs 67 interleaved between the discs 65 and splined within a member 68 rotatably disposed on the shaft 28. The part 68 is splined on an enlarged portion 69 of the shaft 27 so as to be driven by this shaft.

The clutch 31 comprises a movable pressure plate 70 splined within the member 68 and adapted to press the friction discs 65 and 67 together in frictional engagement and between it and the enlarged portion 69 which acts as a pressure member on the other side of the discs. An annular piston 71 is provided for actuating the movable pressure plate 70 and is slidably disposed within an annular cavity 72 provided in the part 68. Pressure from the piston 71 is transmitted to the pressure plate 70 through a spring strut 73 which is in the form of a ring and is held in place within the part 68 at its outer edge by means of a retainer 74. The strut 73 at its inner periphery is acted on by the piston 71, so that its inner periphery moves axially with respect to its outer periphery and moves the pressure plate 70 which is acted on by the strut 73 at intermediate points thereof. The ring 73 is in its relaxed condition as it is illustrated in FIG. 1B and is distorted out of shape as just described by the piston 71 on movement thereof, and this distortion is against the spring action of the ring 73. The resilient action of the ring 73 functions to return the piston back into its illustrated position when fluid pressure, applied as will be hereinafter described, is released from the piston.

The clutch 32 is arranged to connect the part 68 and thereby the shaft 27 with the shaft portion 57 and sun gear 56 and comprises clutch discs 75 splined on to the member 68 and clutch discs 76 splined within a member 77 which is fixed to the shaft portion 57. A pressure plate 78 is fixed within the member 77 on one side of the clutch discs, and an annular hydraulic piston 79 is provided on the other side of the discs and within a similarly shaped cavity 80 formed in the part 77 for compressing the discs between it and the pressure plate 78. A coiled return spring 81 is provided for yieldably holding the piston 79 in its illustrated clutch releasing position. The spring 81 is disposed between the piston 79 and a spring retainer collar 82 fixed on the shaft portion 57.

Fluid under pressure is supplied to the piston 71 by a passage 83 which extends through the shaft 28 and associated part 68, through the gear set 35 and through the shaft 26. A sleeve 84 surrounding the shaft 26 seals the passage 83 from various other passages to be described. The passage 83 in the shaft 28 is formed by a tube 85 extending through the shaft 28, as shown. A passage 86 is provided for supplying fluid under pressure to the piston 79, and this passage extends through the shaft 28 and is formed by a tube 87 surrounding the tube 85. The passage 86 extends into the shaft 26 and within the sleeve 84. The tubes 85 and 87 are disposed in a cylindrical cavity 88 in the shaft 28, and the sides of this cavity form, with the tube 87, part of a conduit 89 for lubricating fluid which may pass through various connected passages with various working parts of the transmission, such as with the gear 55.

The brake 33 comprises a brake band 90 adapted to be contracted on a drum portion 91 of the part 77 for thereby braking the sun gear 56. Referring in particular to FIG. 4, it will be observed that one end 92 of the band 90 is fixed with respect to the transmission casing 29, and the other end is adapted to have force applied to it for tightening the band on the drum portion 91 by means of a strut 93 disposed between this end of the band and one end of a lever 94. The l sETAOINSHRDLU disposed at 95 with respect to the transmission casing 29, and the lever is acted on at its opposite end by a rod 96 reciprocably disposed in a casing 97. An adjustable screw is disposed in the last mentioned end of the lever 94, so that the positions of the rod 96 and lever 94 may be adjustable with respect to each other. A piston 98 is slidably disposed in the casing 97 and is fixed with respect to the rod 96 for moving the rod and associated parts. A spring 99 is provided for acting between the piston 98 and the casing portion 97 for yieldably holding the piston 98 in its brake disengaging position in which it is illustrated in FIG. 4. An annular closure member 100 is provided in the end of the casing 97 for sealing the casing. The casing 97 provides a chamber 101 between one end of the casing 97 and the piston 98 into which fluid under pressure may be supplied for augmenting the action of the spring 99, and the end portion 100 provides a fluid chamber 102 between it and the piston 98 into which fluid under pressure may be supplied for moving the piston 98 against the action of the spring 99. The piston 98, casing 97 and closure member 100 together form a servomotor 103 for actuating the brake 33.

The brake 34 comprises a brake band 104 adapted to be contracted on a drum portion 105 of the planetary gear carrier 62. The band 104 at one of its ends 106 is held fixed with respect to the transmission casing 29 by means of a set screw 107 and a strut 108 disposed between the screw 107 and the band end 106 (see FIG. 3). The band 104 at its other end 109 is acted on by a strut 110 which is disposed between this end of the band and a lever 111. The lever 111 is pivotally mounted with respect to the transmission casing by means of a shaft 112, and the lever on its opposite end is acted on by a piston 113 slidably disposed in a casing 114. A spring 115 is disposed in the casing 114 between one end of the casing and the piston 113 for yieldably holding the piston in its brake disengaging position in which it is illustrated in FIG. 3. The casing 114 and piston 113 together form a servomotor 116 for actuating the brake 34.

A parking brake 117 may be provided for use with the transmission. The brake comprises a series of teeth 118 formed on the bell shaped portion 59 of the shaft 26 and a sprag 119 swingably mounted with respect to the transmission casing 29 by means of a shaft 120 (see FIGS. 7, 8, 9, and 10). The sprag has teeth 121 which are adapted to engage with the teeth 118. A spring 122 is disposed about the shaft 120 and acts between the sprag 119 and the transmission casing 29 and tends to hold the sprag 119 out of engagement with the teeth 118. A toggle linkage is provided for actuating the pawl 119 and moving it into engagement with the teeth 118. The toggle linkage comprises a link 123 pivotally connected with the pawl 119 and a link 124. The link 124 is pivotally mounted at one end with respect to the transmission casing 29 by means of a pin 125 and is pivotally connected with the link 123 at its other end by means of a round ended pin 126.

The pin 126 is moved by means of a lever 127 pivotally mounted with respect to the transmission case 29 by means of a shaft 128. The pin 126 is movable in a slot 129 in the end of the lever 127 which is formed by tangs 130 and 131 of unequal length. Another lever 132 is swingably mounted on the pin 128, and the levers 127 and 132 have respective coacting portions 133 and 134. A spring 135 is disposed about the shaft 128 and has ends 136 and 137 respectively in contact with the levers 132 and 127.

The lever 132 is connected to be actuated from the ordinary selector lever 138 of the vehicle located immediately beneath the vehicle steering wheel 139 (see FIG. 11B). The selector lever 138 is connected with a lever 140, so that the levers 138 and 140 rotate together, and the lever 140 is connected with a lever 141 located on the exterior of the transmission by any suitable means such as a link 142. The lever 141 is fixed on a shaft 143 extending through the transmission casing 29, and the shaft 143 has fixed thereto a lever 144 located inside the transmission case. The levers 132 and 144 are connected by means of a link 145.

Detent mechanism of any suitable type may be associated with the lever 144 for yieldably holding the lever and the connected selector lever 138 in a plurality of different positions. The detent mechanism 146 which is illustrated, comprises a ball 147 adapted to fit in any of a plurality of notches 148 provided in the periphery of the lever 144. A spring 149 is provided for yieldably moving the ball 147 into any of the notches 148.

The illustration of the steering wheel 139 in FIG. 11B is a top view, and the wheel is located immediately in front of the seat 150 for the driver of the vehicle, as shown, so that the lever 138 is moved away from the driver into its "P" position, which is indicated, for purposes hereinafter to be described.

In operation, the transmission has a neutral condition and provides low, intermediate and high speed ratios in forward drive and a drive in reverse. As illustrated in FIGS. 1A and 1B, the transmission is in neutral condition in which the clutches 31 and 32 and the brakes 33 and 34 are disengaged. As has been hereinbefore mentioned, the parking brake 117 is shown engaged in FIGS. 7 to 10; however, the transmission may be in its neutral condition either with or without engagement of the brake 117, as will hereinafter appear. For ordinary driving conditions of the vehicle, the transmission is operated in its high range which includes the intermediate and high speed ratios.

The intermediate speed ratio power train is completed by engaging the clutch 31 and the brake 33. The clutch 31 is engaged by applying fluid pressure to the piston 71 through the conduit 83 so that the piston moves the internal periphery of the annular strut 73 axially with respect to the fixed outer periphery of the strut and moves the pressure plate 70 toward the portion 69 of the shaft 27 to press the friction discs 65 and 67 together in frictional contact. Engagement of the brake 33 may be obtained by applying fluid pressure within the pressure chamber 102 of the servomotor 103 so as to move the piston 98 to the right as seen in FIG. 4 and rotate the lever 94 counterclockwise and thereby tighten the band 90 on the drum portion 91. The intermediate speed power train exists from the drive shaft 25 through the torque converter 30 to the intermediate shaft 27 and thence through the clutch 31 and its hub portion 66 to the shaft 28 and through the planetary gear set 35 to the driven shaft 26. The brake 33 is effective to hold the part 77 stationary and to brake the sun gear 56 of the planetary gear set, so that the sun gear 56 constitutes the reaction element of the gear set. The shaft 28 is driven as just described, and the sun gear 55 of the gear set 35 thus constitutes the driving element of the gear set. The drive is transmitted through the planet gears 61 and 60 to the ring gear 58 driving the driven shaft 26. Since there are sets of two planet gears 61 and 60 between the sun gear 55 and the ring gear 58, and the sun gear 56 in mesh with the gears 60 functions as the reaction element of the gear set, the ring gear 58 and thereby the shaft 26 are driven at a reduced speed, intermediate speed ratio, with respect to the shaft 27. At this point it may be noted that the direction of reaction on the sun gear 56 and the brake drum 91 is in the reverse direction as indicated by the arrow A in FIG. 4 and tends to rotate the drum in this direction. This direction is opposite the direction of rotation of the drive shaft 25 indicated by the arrow 51, and the drum 91 in tending to rotate in this direction augments the action of the strut 93 in engaging the band 90 and causes increased band engagement, since the drum tends to carry the end of the band acted on by the strut along with the drum in the same direction in which this end of the band is urged by the strut. It is apparent that the band 90 wraps or is partially self-energizing for this rotative tendency of the drum 91.

When the vehicle is being started in intermediate speed ratio, there is considerable slip between the impeller 36 and rotor 37 of the torque converter 30, and the rotor 37 is driven at increased torque with respect to the impeller 36, so that both the hydraulic torque converter 30 and the planetary gear set 35, which are connected in series or tandem, multiply torque between the drive shaft 25 and the driven shaft 26. Under these conditions, the one-way brake 43 is effective to hold the stator 38 stationary. The hydraulic torque converter provides a desirably gradual start for the vehicle, since it is the characteristic of such a converter to drive its driven element at speeds dependent on the speed of its driving element, as is well known. When the vehicle is underway and the driven element 37 of the converter 30 is rotating at a substantial speed, the one-way brake 43 releases and the stator 38 begins to rotate in the forward direction as indicated by the arrow 51, which is the direction of drive of the drive shaft 25, and the converter 30 now functions as a simple fluid coupling to provide no increase in torque.

The high speed ratio power train through the transmission, which constitutes a substantially direct drive between the shafts 25 and 26, may be obtained by engaging the clutch 32, allowing the clutch 31 to remain engaged. The brake 33 is disengaged at this time. The clutch 32 may be engaged by applying fluid pressure through the passage 86 to the piston 79 so as to move the piston to the left as seen in FIG. 1B to compress the clutch discs 75 and 76 between the piston and the pressure plate 78. In this drive, the shaft 27 is driven through the torque converter 30 from the drive shaft 25 as in intermediate speed drive. The shaft 27 is connected through the clutch 31 to drive the sun gear 55 as was the case in intermediate speed drive. The clutch 32 functions to connect the part 68, which in turn is connected with the shaft 27 through its portion 69, with the part 77 and thereby with the sun gear 56 splined thereto. Thus both the sun gear 55 and also the sun gear 56 are driven by the shaft 27, and as is well known in connection with planetary gear sets, when two elements of the gear set are driven at the same speed, the gear set becomes locked up so that all of its gears and elements rotate as a unit, and there is thus a direct drive between the shaft 27 and the ring gear 58 and driven shaft 26. A substantially direct drive generally exists in this power train between the shafts 25 and 26, since the converter 30 may be expected to function as a simple fluid coupling generally in this drive, with little slip or difference in speed between the impeller 36 and rotor 37. For relatively low vehicle speeds in this drive, the converter 30 may function to convert torque, but for cruising higher speeds of the vehicle, the converter will be in its non-torque converting condition.

The low speed forward drive through the transmission is always available but is intended to be needed only for emergencies in which great torque is required to drive the vehicle, as through sand or snow, or up steep grades, or this drive may also be used for its engine braking effect in descending steep grades. The combination of the torque converter 30 and the two higher speed drives through the gear set 35 provide a sufficient torque range for all ordinary forward driving, and there need be only one change in drive in ordinary driving, namely between intermediate and high speed drives. The low speed forward drive may be obtained by engaging the clutch 31 and the brake 34. The clutch 31 is engaged as has been previously described, and the brake 34 may be engaged by applying fluid pressure on the piston 113 in the servomotor 116 causing a movement of the piston 113 against the action of the spring 115 and a rotation of the lever 111 in the clockwise direction as seen in FIG. 3 so as to pull the band 104 about the drum portion 105. Engagement of the brake 34 causes the planet gear carrier 62 to function as the reaction element of the gear set, and the sun gear 55 is driven from the shafts 25 and 27 substantially as in intermediate speed drive. Since there are sets of the two planet gears 61 and 60 between the sun gear 55 and ring gear 58, the ring gear 58 is driven at a reduced speed drive with respect to the sun gear 55 and shaft 28, and the speed of the ring gear 58 and shaft 26 connected therewith is lower than their speed relative to the shaft 28 for intermediate speed drive. For most vehicle driving conditions, when low speed drive is used, the rotor 37 is driven at increased torque, and the gear set 35 connected in tandem with the converter 30 also increases the torque to provide a relatively great overall torque ratio between the shafts 25 and 26. It may be noted that the reaction on the planet gear carrier 62 and on the drum 105 for low speed forward drive is in the reverse direction indicated by the arrow B in FIG. 3 which is opposite to the direction of rotation of the drive shaft 25, and this reaction or tendency to rotate tends to move the band end 109 in a direction to unwrap and disengage the band from the drum 105. For this direction of reaction, the brake 34 is thus self-deenergizing and provides a less braking effect than for a case in which this reaction did not exist.

Reverse drive may be obtained through the transmission by engaging the brake 34 and engaging the clutch 32. Engagements of the clutch and brake may be made as has been hereinbefore described. For this drive the power train exists from the drive shaft 25 through the torque converter 30 to the intermediate shaft 27 and from thence through the clutch 32 to the sun gear 56 and through the planetary gear set 35 to the driven shaft 26. The brake 34 causes the planet gear carrier to function as the reaction element of the gear set, and since there are only the single planet gears 60 between the sun gear 56 and the ring gear 58, the ring gear 58 will be driven at a reduced speed in the reverse direction with respect to the sun gear 56 and the shaft 27 in accordance with well known principles of operation of planetary gear sets. For this drive, the torque converter 30 generally functions to increase torque, and thus the torque impressed on the driven shaft 26 is the product of the torque increases by the torque converter 30 and the planetary gear set 35, the driven shaft 26 being rotated in the reverse direction, as has just been described. The reaction on the brake drum 105 for reverse drive is in the forward direction as indicated by the arrow C in FIG. 3, that is, in the same direction as the drive shaft 25 rotates. This tendency of the drum 105 to rotate in this direction assists the strut 110 in forcing the band end 109 to move in the direction indicated by the arrow C, and the brake 34 thus wraps or is self-energizing for this direction of reaction so that the braking effect is greater than would be the case if there were no tendency for the drum to rotate. The reaction on the drum 105 is greater for reverse drive than for low forward drive, for the gearing of the particular dimensions shown being approximately three times the torque on the shaft 27 for reverse drive as compared with one and one-half times this torque for low forward drive, and hence the brake 34 has been constructed to wrap for the reaction for reverse drive instead of that for low speed forward drive.

The parking brake 117 is intended to be utilized for braking the driven shaft 26 of the transmission and thereby the vehicle, when the vehicle is stationary, to prevent the vehicle from being pushed or from rolling down an incline, for example. In order to engage the brake 117 which includes the sprag 119 engageable with the teeth 118 fixed on the portion 59 of the shaft 26, the selector lever 138 is moved into its "P" position. The selector lever 138 is located immediately beneath the vehicle steering wheel 139 and is thus readily accessible to the vehicle operator. It also has other positions, as indicated in FIG. 11B, which are "N," "R," "H," and "L" which correspond respectively with "neutral," "reverse," "high range" and "low range" conditions of the transmission and of the hydraulic control system, as will be hereinafter further described in detail. The lever 138 is moved to its "P" position from its "N" position or its "R" position and thus rotates the lever 144 in the clockwise direction as seen in FIG. 8 by means of the link 142 and levers 140 and 141. The lever 144 is connected by means of the link 145 with the lever 132 and thus rotates this lever in the counterclockwise direction as seen in FIG. 8. The spring 135 is effectively between the lever 132 and the lever 127 and causes a similar movement of the lever 127 through the action of the spring. The pin 126 is disposed in the slot 129 in the end of the lever 127 as shown, and this rotation of the lever 127 moves the pin 126 upwardly as seen in FIG. 8, and, through the toggle linkage, including the links 124 and 123, moves the pawl 119 inwardly toward the teeth 118 to engage the teeth 121 with the teeth 118. This movement of the pawl 119 is in a clockwise direction about the pin 120 and is against the action of the spring 122, as will be apparent. The brake 117 is thus engaged and functions to hold the driven shaft 26 of the transmission and thereby the vehicle stationary.

It will be noted that the lever 127 is rotated through the action of the spring 135 from the lever 132, and thus if there should be a butt ending condition of the teeth 121 with respect to the teeth 118, there will not be a complete movement of the lever 127 until the driven shaft 26 is rotated slightly to relieve the butt ended condition. The detent mechanism 146 functions to yieldably hold the selector lever 138 in any of its positions including the "P" position with the ball 147 being held in the corresponding notch 148 in the lever 144 by means of the spring 149, as is apparent. The parking brake 117 may be disengaged by moving the selector lever 138 back out of its "P" position to its "R" or "N" position. The levers 141, 144 and 132 are rotated in the reverse directions, and the surface 134 on the lever 132 will engage the surface 133 on the lever 127 and will positively move the latter lever so as to cause the pin 126 to move downwardly as seen in FIG. 8 and release the toggle linkage between the pin 125 and the pawl 119 and pull the pawl teeth 121 out of meshing engagement witht the teeth 118. This movement of the pawl 119 is with the assistance of the spring 122, as will be understood. The brake 117 is thus disengaged. As will be noted from FIG. 8, the smaller tang 130 permits the lever 127 to separate completely from the pin 126 on clockwise movement of the lever 127 corresponding to movement of the selector lever 138 toward its "N" position.

Referring now to FIGS. 11A to 11D, 12A to 12C, 13A to 13C, 14A to 14C, 15A to 15C, 16A to 16C, 17A to 17C, 18A to 18C, 19A to 19C, 20A to 20C and 21A to 21C, and particularly to FIGS. 11A, 11B, 11C, and 11D, the hydraulic control system for the transmission comprises in general a front pump 160 and a rear pump 161 which, together provide a source of hydraulic pressure; a primary main regulator valve 162 for regulating the fluid pressure from the pumps and applied to the pistons for the various friction brakes and clutches of the transmission; a secondary main regulator valve 163 for regulating the fluid pressure from the pumps applied to the torque converter 30; a manually operated selector valve 164 for conditioning the transmission for operation in different forward speed ratios and in reverse and having an "H" or High Range position, an "L" or Low Range position, an "N" or Neutral posiiton, an "R" or Reverse position, and a "P" or Parking position; a governor valve 165; an automatic 2nd to 3rd ratio shift valve 166 hereinafter designated as a 2-3 valve for changing the drive through the transmission from its second forward speed ratio to its third forward speed ratio; a downshift valve 167 for causing actuation of the 2-3 valve under manual control for changing the drive through the transmission from its third to its second speed ratio when the operator of the vehicle so desires; a throttle valve 168 for providing a throttle pressure that increases with the depression of the vehicle accelerator; a throttle modulator valve 169 hereinafter designated as a TV modulator valve for supplying the throttle pressure from the valve 168 to various lands of a compensator valve 170 for different conditions of operation of the transmission, the compensator valve 170 providing a fluid pressure that varies inversely with the depression of the vehicle accelerator to the regulator valves 162 and 163 so that they regulate correctly; a low regulator valve 171 which functions on a shift of the manual valve 164 from high range to low range position with a closed vehicle engine throttle to regulate the hydraulic pressure to apply the rear brake 34 with less than the pressure that is supplied by the primary main regulator valve 162 for thereby providing a smooth change in speed ratio under these circumstances; a 1st to 2nd ratio shift valve 172 hereinafter designated as a 1-2 valve which functions on a change between ranges to cause simultaneous engaging and disengaging fluid pressure flows to the motors for the front brake 33 and rear brake 34 when the proper pressure valves are reached; a 3rd to 2nd ratio shift control valve 173 hereinafter designated as a 3-2 control valve which functions to provide a restriction in a fluid discharge conduit for the motor for the front brake 33 on a governor controlled change from third speed to second speed ratio; and a low inhibitor valve 174 which functions under the influence of the governor valve 165 above a certain speed of the vehicle to provide a speed ratio change from third speed ratio to second speed ratio rather than to first speed ratio when the manual valve 164 is moved from its high range position to its low range position. These various hydraulic elements and mechanisms, including their construction and operation, will now be described in greater detail.

The pump 160 may be of any suitable construction, and in the illustrated embodiment of the controls comprises an inner gear 175 in mesh with an eccentrically disposed outer gear 176. The inner gear 175 is connected to be driven by the shaft 25 through the impeller casing 40 by means of a sleeve shaft 177 fixed to the impeller casing, and the gear 175 may have a toothed connection 178 with the sleeve 177. The gears 175 and 176 are disposed in a pump casing 179 fixed with respect to the transmission casing 29, and the casing 179 comprises a crescent shaped portion 180 disposed between the gears 175 and 176, as shown. The inner gear 175 is driven from the drive shaft 25 in the direction indicated by the arrow 181, which is in the counterclockwise direction as seen in FIG. 11D, so that the gear 176 rotates in this direction also, and the pump 160 is thus effective to pump from an inlet conduit 182 to a discharge conduit 183. The conduit 182 is arranged to draw fluid out of a transmission sump 184 formed by an oil pan 185 fixed to the bottom of the transmission.

The rear pump 161 is similar in construction to the front pump 160 and comprises an inner gear 186 in mesh with an eccentrically disposed ring gear 187. The gear 186 is fixed on the driven shaft 26 of the transmission by any suitable means, such as a key 188. The gears 186 and 187 are rotatably disposed in a pump casing 189 fixed with respect to the transmission casing 29 and which comprises a crescent shaped portion 190 disposed between the gears, as shown. The gear 186 is driven in a clockwise direction, as indicated by the arrow 191, in FIG. 11D, when the driven shaft 26 rotates in the same direction as the drive shaft 25 for providing a forward drive of the vehicle, and in this case, the pump is adapted to draw fluid through an inlet conduit 192 and discharge it into an outlet conduit 193. The inlet conduit 192, like the conduit 182, is arranged to draw fluid from the transmission sump 184.

The primary main regulator valve 162 comprises a piston 194 slidably disposed in a casing portion 195. The casing portion 195 is formed with cylindrical cavities 196, 197 and 198 of successively increasing diameter, and the piston 194 is slidably disposed within these cavities. The cylindrical cavities have ports 199, 200, 201, 202, 203 and 204 connected therewith, as shown. The piston 194 comprises lands 205, 206, 207, 208 and 209, and grooves 210, 211, 212 and 213 between the lands. The piston 194 is disposed within the casing portion 195 so that its land 205 is in sliding contact with the walls of the cavity 196; its lands 206, 207 and 208 are in sliding contact with the walls of the cavity 197 and the land 209 is in sliding contact with the walls of the cavity 198. A spring 214 is disposed between the land 209 and the adjacent end of the cavity 198, as shown.

The port 199 is connected by means of a small passage 215 with the conduit 193. The port 200 is connected with a conduit 216 that serves as a source of regulated fluid pressure to be applied to the pistons for the brakes and clutches, as will hereinafter be described, and the conduit 193 is connected with the conduit 216 as shown. The port 201 is connected with a conduit 217, and the port 202 is connected with a conduit 218. The port 203 is connected with the conduit 183, and the port 204 is also connected with this latter conduit by means of a conduit 219.

A one-way check valve 220 is disposed in the conduit 193 and in its illustrated form comprises a valve element 221 movably disposed in an enlarged cylindrical cavity 222 and adapted to seat on one end 223 of the cavity for closing the conduit 193. A spring 224 is disposed between the other end of the cavity and the valve element 221 for yieldably holding the valve element against the seat 223 for closing the conduit 193.

A similar one-way check valve 225 is provided in the conduit 219 and comprises a valve element 226 movably disposed in an enlarged cylindrical cavity 227 and adapted to seat on one end 228 of the cavity. A spring 229 is provided for yieldably holding the valve element 226 on the end 228 of the cylindrical cavity 227.

The secondary main regulator valve 163 comprises a piston 230 slidably disposed in a casing portion 231. The casing portion is provided with cylindrical cavities 232 and 233 which are coaxially disposed and in communication with each other, and the piston 230 is slidably disposed in these cavities. The cavity 233 is larger in diameter than the cavity 232, as shown. Th cavities 232 and 233 are provided with ports 234, 235, 236, 237, 238, 239, 240 and 241. The piston 230 is provided with lands 242, 243, 244 and 245 and grooves 246, 247 and 248 between the lands. A spring 249 is provided between the land 245 and the adjacent end of the cavity 233. The lands 242, 243 and 244 are slidably disposed in the cavity 232 and the land 245 is slidably disposed in the cavity 233.

The port 234 is connected with a conduit 250; the port 235 is connected with the conduit 217; the port 236 is connected with the conduit 218; the port 237 is connected with a conduit 251; the port 238 is connected with the conduit 89; the ports 239 and 241 are connected together by means of a conduit 252; and the port 240 is connected to a conduit 253.

The conduits 217 and 250 are both connected with the torque converter 30 as shown. The conduit 217 constitutes a fluid supply for the converter and passes between the sleeves 177 and 42 and through the perforated washer 50 into the converter. The conduit 250 constitutes an exhaust conduit for the converter and passes between the shafts 27 and 42 and through the washer 49 on the left side of the one-way brake 43 (see FIG. 1A). The conduit 251 is connected with the intake conduit 182 for the pump 160, as shown, and constitutes an exhaust conduit for the valve 163. The conduit 89 is a lubrication conduit, as has already been described, and passes through the shaft 28. The conduit 252 connecting the ports 239 and 241 is for the purpose of providing a regulating action for the valve 163 as will be described, and is formed with a constriction 254 for purposes to be described. The conduit 253 is at times connected by means of the valve 163 with the conduit 250 and discharges into the sump 184.

The manual selector valve 164 comprises a piston 255 disposed in a casing portion 256. The casing portion 256 is provided with a cylindrical cavity 257 in which the piston is slidable, and the cavity has a plurality of ports 258, 259, 260, 261, 262 and 263 in communication therewith. The piston 255 has lands 264, 265 and 266 and grooves 267 and 268 separating the lands.

The port 263 is connected with a conduit 269; the port 262 is connected with the conduit 83 which, as has been previously described, is connected to apply fluid pressure to the piston 71 for engaging the front clutch 31; the port 261 is connected withh the fluid supply conduit 216; the port 260 is connected with a conduit 270; the port 259 is connected with a conduit 271; and the port 258 constitutes a bleed port through which fluid may freely discharge into the sump 184. The conduit 83 is provided with a restriction 272 therein for purposes which will be described.

The selector valve piston 255 is connected to be controlled by the selector lever 138 for moving the piston between its various positions. The connection between the selector lever 138 and the valve piston 255 may comprise a lever 273 fixed with respect to the lever 138 and rotatable therewith and connected as by means of a link 274 with the piston 255. As has been described, the lever 138 has the following positions: "P" or parking, "R" or reverse, "N" or neutral, "H" or high range, and "L" or low range; and the selector valve piston 255 has corresponding positions, as indicated.

The governor valve 165 constitutes a hydraulic governor and comprises a piston 275 movably disposed in a casing 276 which is disposed on the driven shaft 26 and is fixed to rotate with the shaft by any suitable means, such as a ball 277 disposed in a splineway formed in the casing 276. The casing 276 is provided with two connected cavities 278 and 279 therein for receiving the piston 275 and the cavities are respectively of smaller and larger diameter. The cavities are provided with ports 280, 281, 282 and 283. The piston 275 is provided with lands 284, 285 and 286, the lands 284 and 285 being slidably disposed in the cavity 278 and the land 286 being slidably disposed in the cavity 279. Grooves 287 and 288 separate the lands as shown. The port 280 is connected with a conduit 289 which in turn is connected with the conduit 83; the ports 281 and 282 are connected with a conduit 290 and the port 283 is connected with a passage 291 through which fluid may freely discharge into the sump 184.

The 2-3 valve 166 comprises pistons 292, 293 and 294 slidably disposed in a casing portion 295. The casing portion 295 has connected cavities 296, 297, 298, 299, 300 and 301 of the relative diameters illustrated for receiving the pistons. The cavities in the casing portion 295 are provided with ports 302, 303, 304, 305, 306, 307, 308, 309, 310, 311 and 312. The piston 292 comprises a land 313 and reduced end portions 314 and 315. The piston 293 comprises lands 316, 317 and 318 and grooves 319 and 320 between the lands and a reduced end portoin 321. The piston 294 comprises lands 322 and 323 and a groove 324 separating the lands. A spring 325 is provided between the land 316 and the opposite end of the cavity 297, and a spring 326 is provided between the land 316 and the land 313 on the piston 292. As shown, the lands 313, 316, 317, 318, 322 and 323 are disposed in the cavities 296, 297, 298, 299, 300 and 301, respectively, and have a sliding fit with the respective cavities.

The port 302 is connected with a conduit 327; the port 303 is connected with the conduit 269 which has a restriction 328 formed therein as shown; the port 304 is connected with the conduit 86; the port 305 is connected with the conduit 271; the port 306 is a bleed port through which fluid may freely discharge into the sump 184; the port 307 is connected with the conduit 290 by means of a branch conduit 329; the port 308 is connected with a conduit 330; the port 309 is connected with the conduit 290 through the branch conduit 329; the port 310 is connected with the conduit 330 through a passage 331; the port 311 is also connected with the conduit 330; and the port 312 is connected with a conduit 332.

The downshift valve 167 comprises a piston 333 disposed in a casing portion 334, and the throttle valve 168 comprises a piston 335 also disposed in the casing portion 334. The casing portion 334 is provided with connected cylindrical cavities 336 and 337 of respectively larger and smaller diameters as shown, and the pistons 333 and 335 are slidably disposed in these cavities as shown. The cavities 336 and 337 are provided with ports 338, 339, 340, 341, 342, 343, 344, and 345. The downshift valve piston 333 is provided with lands 346 and 347 and with a groove 348 separating the lands. The piston 335 is provided with lands 349, 350, 351 and 352 and grooves 353, 354 and 355 separating the lands. The lands 346 and 347 of the piston 333 and the lands 349 and 350 of the piston 335 are slidably disposed in the cavity 336, and the land 351 of the piston 335 is slidably disposed in the smaller sized cavity 337, as shown. A spring 356 is disposed between the piston 333 and 335 and extends into an internal end caivty in the piston 333, as shown.

The port 338 is connected with the conduit 332 for providing a regulated throttle pressure to the conduit 332 as will be hereinafter described; the port 339 is also connected by means of a restriction 357 with the conduit 332; the port 340 is connected with a conduit 358 which in turn is connected with the fluid supply conduit 216; the ports 341 and 342 are fluid bleed ports adapted to freely discharge into the sump 184; the port 343 is also connected by means of a branch conduit 359 with the conduit 358 and through the latter with the fluid supply conduit 216; the port 344 is connected with the conduit 327; and the port 345 is connected with the conduit 270.

The downshift valve piston 333 is connected by any suitable linkage such as the link 360 with the vehicle accelerator 361. The accelerator 361 has an ordinary connection with the carburetor butterfly valve 362 for the internal combustion vehicle driving engine 363 which may include a link 364 connecting the carburetor throttle lever 365 and a lever 366 fixed to move with the accelerator 361.

The TV modulator valve 169 comprises pistons 367 and 368 disposed in a casing portion 369. The casing portion is provided with connected cavities 370 and 371 therein of relatively large and small diameters respectively. The cavities are provided with ports 372, 373, 374, 375, 376, 377, 378 and 379. The piston 368 is provided with lands 380, 381 and 382 and grooves 383 and 384 between the lands. The piston 367 is slidably disposed in the cavity 370, and the piston 368 is slidably disposed in the cavity 371, as shown. A spring 385 is disposed between the right end of the piston 368 and the adjacent end of the cavity 371, as shown.

The port 372 is connected with a conduit 386; the port 373 is a bleed port from which fluid may freely discharge into the sump 184; the port 374 is connected to a conduit 387; the port 375 is connected with the conduit 332; the port 376 is connected with a conduit 388; the port 377 is a bleed port similar to the port 373 through which fluid may freely discharge into the sump 184; the port 378 is connected by a passage 389 having a restriction 390 therein with the conduit 387; and the port 379 is connected with a conduit 391.

The compensator valve 170 comprises pistons 392 and 393 in a casing portion 394. The casing portion 394 has connected cylindrical cavities 395, 396, 397 and 398 therein. These cavities are provided with ports 399, 400, 401, 402, 403, 404, 405 and 406. The piston 392 is provided with lands 407, 408, 409, 410, 411 and grooves 412, 413, 414 and 415 between the lands and a reduced end portion 416. A spring 417 is disposed between the land 411 and the adjacent end of the cavity 397. The lands 409, 410 and 411 are slidably disposed in the cavity 397 and the lands 407 and 408 are slidably disposed in the cavities 395 and 396, respectively. The piston 393 is slidably disposed in the cavity 398.

The port 399 is connected with the conduit 387; the port 400 is connected with the conduit 388; the port 401 is connected with the conduit 290; the port 402 is a bleed port adapted to discharge fluid into the sump 184; the port 403 is connected to the fluid supply conduit 216 by means of a branch conduit 418; the port 404 is connected with a conduit 419 by means of a branch conduit 420, and, as shown, the conduit 419 in turn is connected with the conduit 218; the port 405 is a bleed port for discharging fluid into the sump 184; and the port 406 is also connected with the conduit 419 by means of a branch conduit 421 having a restriction 422 therein.

The low regulator valve 171 comprises pistons 423 and 424 disposed in a casing portion 425. The pistons 423 and 424 are slidably disposed in connected cylindrical cavities 426, 427 and 428 in the casing portion. As shown, the cavity 428 is somewhat smaller than the cavity 426, and the cavity 426 is smaller in diameter than the cavity 427. The cavities have ports 429, 430, 431, 432, 433, 434 and 435. The piston 423 comprises a land 436 and reduced end portions 437 and 438, and the piston 424 comprises lands 439, 440 and 441 and grooves 442 and 443 and a reduced end portion 444. As shown, the land 436 is slidably disposed in the cavity 426; the land 439 is slidably disposed in the cavity 427; and the lands 440 and 441 are slidably disposed in the cavity 428.

The port 429 is connected with a conduit 445 having a restriction 446 therein; the port 430 is connected with the conduit 271 by means of a branch conduit 447; the port 431 is connected with the conduit 447 by means of a branch conduit 448; the port 432 is connected with the conduit 445; the port 433 is connected with a conduit 449; the port 434 is connected with a conduit 450 which in turn is connected to apply fluid pressure to the piston 113 for the brake 34; and the port 435 is connected to the conduit 332 by means of a branch conduit 451.

The 1–2 valve 172 comprises a piston 452 disposed in a casing portion 453. The casing portion has connected cylindrical cavities 454 and 455, which are respectively of relatively small and large diameter, for receiving the piston 452. The cavities have ports 456, 457, 458, 459 and 460. The piston 452 has lands 461, 462 and 463 and grooves 464 and 465 between the lands and a reduced end portion 466. As shown, the lands 461 and 462 fit in the cavity 454, and the land 463 fits in the cavity 455.

The port 456 is connected with a conduit 457 which is arranged to apply fluid pressure to the chamber 102 of the servomotor 103; the ports 457 and 458 are bleed ports adapted to discharge fluid into the sump 184; the port 459 is connected to the conduit 449; and the port 460 is connected to a conduit 468 which in turn is connected with the conduit 83.

The 3–2 control valve 173 comprises a piston 469 disposed in a casing portion 470, and the casing portion is provided with a cylindrical cavity 471 for receiving the piston. The cavity is provided with ports 472, 473, 474 and 475, as shown. The piston 469 is provided with lands 476 and 477 having a sliding fit in the cavity 471 and spaced by a groove 478. A spring 479 is disposed in a cavity 480 formed in the piston 469 and extends between the end of the cavity and the adjacent end of the cavity 471.

The port 472 is a bleed port adapted to discharge fluid freely into the sump 184; the port 473 is connected with a conduit 481 which is connected with the chamber 101 in the servomotor 103 for the brake 33; the port 474 is connected with a conduit 482 which in turn is connected with the conduit 86; and the port 475 is connected with the conduit 332 by means of a branch conduit 483. A restriction 484 is provided in the conduit 482, and a passage 485 of relatively small diameter is provided between the conduits 481 and 482, as shown.

The low inhibitor valve 174 comprises a piston 486 disposed in a casing portion 487. The casing portion 487 has connected cylindrical cavities 488 and 489 of relatively small and large diameters respectively formed therein, and the cavities have ports 490, 491, 492, 493, 494 and 495. The piston 486 is formed with lands 496 and 497 and a groove 498 therebetween and a reduced end portion 499. A spring 500 is disposed between the lands 496 and the adjacent end of the cavity 488, as shown. The land 496 has a sliding fit in the cavity 488 and the land 497 has a sliding fit in the cavity 489.

The port 490 is connected by means of a conduit 501 with the conduit 449 and the conduit 386; the port 491 is connected to the conduit 270 by means of a branch conduit 502; the port 492 is connected by means of a branch conduit 503 with the conduit 290; the port 493 is connected to a conduit 504; the port 494 constitutes a bleed port through which fluid may freely discharge into the sump 184; and the port 495 is also connected to the conduit 504. A restriction 505 is provided in the conduit 501 between its junctions with the conduits 386 and 449, as shown.

In operation, the transmission and its hydraulic control system are under the control of the vehicle operator by means of the accelerator 361 of the vehicle and the manual selector lever 138. The manual selector lever 138, as has been described, has five different positions which are indicated in FIGS. 11B, 12A, 13A, 14A, 15A, 16A, 17A, 18A, 19A, 20A and 21A and are respectively the "P," parking position; the "R," reverse position; the "N," neutral position; the "H," high range position; and the "L," low range position. The selector valve piston 255 is connected with the selector lever 138 by means of the link 274 and lever 273 so that the piston 255 has positions corresponding to those of the selector lever 138, and these positions are also indicated in these figures. The transmission is conditioned for various types of operation by moving the selector lever 138 and the manual selector valve piston 255 connected therewith into the positions corresponding to the type of operation desired.

The transmission is maintained in its neutral condition by having the manual selector lever 138 and the selector valve piston 255 in their neutral positions in which they are shown in FIG. 11B. In this condition of the transmission and its hydraulic controls, the accelerator 361 is assumed to be in its closed throttle position; although movement of the accelerator toward its open throttle position, when the manual selector valve piston 255 is in this position, has no effect on the condition of the transmission to complete a drive through it. This position of the accelerator as well as its medium throttle, open throttle and forced downshift positions, are indicated in FIGS. 11D, 12C, 13C, 14C, 15C, 16C, 17C, 18C, 19C, 20C and 21C. The engine 363 is started with the selector lever 138 and valve 255 in their neutral positions, and prior to such operation of the engine, no fluid pressure exists in the hydraulic system since neither of the pumps 160 or 161 is in operation. The pump 160, it will be recalled, is driven from the transmission drive shaft 25 and thereby from the vehicle engine 363, and the pump 161 is driven by the driven shaft 26 of the transmission and thereby in accordance with the speed of the vehicle.

When the engine 363 begins operating, the pump 160 driven by the engine supplies line pressure to the conduit 183 and connected conduits. This line pressure which is shown in FIGS. 11A to 11D, 12A to 12C, 13A to 13C, 14A to 14C, 15A to 15C, 16A to 16C, 17A to 17C, 18A to 18C, 19A to 19C, 20A to 20C and 21A to 21C, is indicated by the designation illustrated in FIG. 22, and designations for the various other fluid pressures which are obtained at times in the hydraulic system are also shown in FIG. 22. These various designations for the various pressures will be used for the various conditions of operation of the transmission controls illustrated in FIGS. 11A to 11D, 12A to 12C, 13A to 13C, 14A to 14C, 15A to 15C, 16A to 16C, 17A to 17C, 18A to 18C, 19A to 19C, 20A to 20C and 21A to 21C for making the operation clearer.

In the neutral condition of the transmission and hydraulic system as illustrated in FIGS. 11A, 11B, 11C and 11D, the pump 160 draws the transmission oil, which is the operating fluid of the transmission, from the sump 184 through the conduit 182 and discharges it into the conduit 183 as line pressure. The conduit 219 is connected with the conduit 183 and has line pressure therein, and the conduit 216 is connected with the conduit 219 through the check valve 225, the ports 204 and 200, and the groove 211 of the piston 194 for receiving line pressure. The valve element 226 is held off its seat 228 against the action of the spring 229 by the fluid pressure from the pump 160 to establish communication between the conduits 216 and 219, and the check valve 220 is closed with its valve element 221 disposed on the seat 223 by means of the line pressure which is effective on the check valve through the conduit 193 connected with the conduit 216. The check valve 220 prevents any flow of line pressure and any consequent leakage thereof through the conduit 193 and rear pump 161 which is inoperative in this condition of the transmission. The conduits 358, 359 and 418 are connected with the fluid supply conduit 216, and line pressure is also supplied to the latter conduits. The land 265 of the manual valve piston 255 in the neutral position of the piston blocks the port 261 and conduit 216, as shown. The port 340 and conduit 358 are blocked by the land 350 of the throttle valve piston 335, and the port 343 and conduit 359 are blocked by the land 347 of the downshift valve piston 333.

The primary main regulator valve 162 functions for all conditions of the transmission and its hydraulic control system to regulate the line pressure in the conduit 216 and connected conduits to predetermined maximum values. For this purpose the line pressure is supplied through the conduit 193 and through the passage 215 to the faces 205a and 206a of the lands 205 and 206. The face 206a is of greater area than the face 205a, since the land 205 is disposed in the smaller diameter cavity 196 as compared with the cavity 197, and the line pressure applied to these land faces tends to move the primary main regulator valve piston 194 to the right as seen in FIG. 11D against the action of the spring 214. This movement of the valve piston 194 tends to release the line pressure from the conduit 183 between an edge of the port 203 and an end of the land 208 into the groove 212 and into the converter supply conduit 217 through the port 201. The spring 214 is of such strength that the port 203 will not be thus opened by line pressure influence on the valve piston 194 until a certain line pressure is reached. Increased line pressure above this certain pressure tends to move the valve piston 194 farther to the right, as seen in FIG. 11D, so as to increase the opening between the land 208 and one edge of the port 203 and increase the flow from the conduit 183 through the groove 212 and port 201 for decreasing the line pressure in the conduit 183 and connected conduits to the predetermined maximum. The valve piston 194 thus functions to release excessive fluid under pressure discharged by the pump 160 and maintain the pressure in the conduit 183 and connected conduits at this predetermined pressure, assuming that there are no influences on the piston 194 other than the line pressure on the land faces 205a and 206a and the spring 214 tending to move the piston.

For most conditions of operation, however, including the condition illustrated in FIGS. 11A, 11B, 11C and 11D, a third additional variable force is applied to the piston 194 tending to move it, and this third force is due to fluid pressures of different values supplied to the faces 208a and 209a of the lands 208 and 209 of the piston 194 through the port 202 and conduits 218, 419 and 420. For the neutral condition of the transmission with the accelerator 361 released and in its closed throttle position illustrated in FIGS. 11A, 11B, 11C and 11D, full line pressure is applied to the land faces 208a and 209a, and the conduits 218 and 419 are connected by the valve piston 392 of the compensator valve 170 with the conduits 418 and 216 for this purpose. The line pressure in the conduit 418 flows through the port 403, the groove 415 of the piston 392 and the port 404 to the conduits 420, 419 and 218, as shown. This line pressure is applied to a face 407a of the land 407 of the piston 392 through the conduit 421 connected with the conduit 419; however, for this condition of operation as illustrated in FIGS. 11A, 11B, 11C and 11D, the spring 417 acting on the piston 392 is of sufficient strength to hold the piston 392 to the limit of its movement toward the left as seen in FIG. 11C, and the fluid applied to this land face has no effect.

The fluid pressure applied to the faces 208a and 209a of the lands 208 and 209 of the main regulator valve piston 194 provides a force on the piston acting against the spring 214 tending to move the valve piston to the right as seen in FIG. 11D, since the lands 208 and 209 are slidably disposed in the cavities 197 and 198 which are respectively of relatively small and large diameters, and the line pressure in the conduit 183 and connected conduits is drained into the relief conduit 217 through the ports 203 and 201 at smaller line pressures than would otherwise be the case, and the full line pressure applied to the faces 208a and 209a as in this condition of the controls thus maintains the line pressure at a predetermined minimum, which for one certain embodiment of the invention is 75 lbs. per sq. in. The passage 215 is of a small restricted size so as to impede fluid flow therethrough and prevent quick longitudinal movements or vibration of the piston 194 which would cause undesirable noise.

The conduit 217 which, as has been described, functions as a sump or fluid discharge conduit for the primary main regulator valve 162 is connected with the torque converter 30 to supply fluid pressure thereto. The secondary main regulator valve 163 is for the purpose of regulating the fluid pressure within the conduit 217 and thereby within the torque converter 30. The pressure in the conduit 217 is applied to the face 242a of the land 242 on the secondary main regulator valve piston 230 through the port 235, the groove 247, the port 239, the conduit 252 and the port 241, and as the fluid pressure in the conduit 217 and thereby in the converter 30 increases, it tends to move the piston 230 to the right as seen in FIG. 11D against the action of the spring 249 to open up the port 238 and lubrication conduit 89 to the port 235 and conduit 217 and meter fluid between the land 244 and an edge of the port 238 as is indicated by the illustrated position of the piston 230. Thus, as the fluid pressure in the conduit 217 and in the converter 30 tends to increase, the excessive fluid pressure is discharged into the conduit 89, and the pressure in the conduit 217 and converter 30 is kept to a predetermined maximum. The action of the valve piston 230 in regulating the pressure in the conduit 217 is similar to that of the valve piston 194 in regulating the pressure in the conduit 216. The restriction 254 in the conduit 252 is for the purpose of restricting the flow and inhibiting vibration of the valve piston 230 and is similar in its action to the restricted passage 215 for the valve piston 194.

As has been mentioned, the conduit 89 is a lubrication conduit, and referring to FIG. 1B, fluid therein lubricates various contacting mechanical parts of the transmission. The gear set 35 is, for example, lubricated through the passage 89a in the sun gear 55, and the clutch 32 having the dished friction plates 76 has lubricating fluid flowing through it and between its plates by means of the passages 89b, 89c and 89d. The clutch 32 is disengaged for all forward drives except high speed drive as has been described, and power is saved by lubricating the clutch in this manner.

The pressure within the conduits 419 and 218 is also applied to the valve piston 230 for changing the regulated converter pressures in conduit 217 for various conditions of operation of the transmission and controls. The fluid pressure in the conduit 218 is applied to the land faces 244a and 245a of the valve piston 230 through the port 236. The face 245a is of greater area than the face 244a, and this fluid pressure thus tends to move the valve piston 230 to the right against the action of the spring 249 and augment the action of the converter pressure applied to the face 242a of the land 242 to open the lubrication conduit 89 to the conduit 217 by moving the land 244 farther out of blocking position with respect to the port 238 and to thus further relieve the pressure in the conduit 217 and converter 30. The pressure in the conduits 420, 419 and 218 for the condition of operation shown in FIGS. 11A, 11B, 11C and 11D is at a maximum value of full line pressure, and the regulated converter pressure in the conduit 217 is thus at a minimum, which, for one particular embodiment of the invention, is substantially 30 lbs. per sq. in. It is noted that the conduit 250 which is also connected with the torque converter is connected with the cavity 232 of the secondary main regulator valve 163, and under certain conditions, this conduit may be connected with the conduit 253 leading to the sump 184. If the fluid pressure in the conduit 217 and thus in the converter 30 tends to increase to such a high value that the lubrication conduit 89 cannot take the full discharge of the pump 160 (and in addition the discharge from the pump 161 under conditions which will hereinafter be described), as for example, when the oil in the sump 184 is cold, the resultant increased pressure in the conduit 252 applied to the land face 242a will move the valve piston 230 still farther to the right against the action of the spring 249 so as to connect the port 234 with the port 240 through the groove 246 of the piston 230, so that fluid from the converter may discharge into the sump though the conduit 250, the groove 246, and the conduit 253. Under normal conditions of operation in which the oil in the sump 184 is at usual high operating temperatures, this discharge through the conduit 253 is not needed, and the excess oil is completely discharged through the lubrication conduit 89.

As will hereinafter appear, the pistons 98 and 113 for engaging the brakes 33 and 34 and the pistons 71 and 79 for engaging the clutches 31 and 32 are supplied with fluid pressure from the line pressure supply conduit 216 and the manual selector valve 164. The manual selector valve piston 255 in its neutral position as illustrated in FIG. 11B blocks the port 261 for the line pressure supply conduit 216, and thus there is no fluid pressure applied to any of these pistons for engaging any of these friction engaging mechanisms. The transmission is thus in its neutral condition.

For forward driving, the transmission is ordinarily operated in high range in which the intermediate and high speed ratio power trains are alternately effective for driving the driven shaft 26 and thereby the vehicle and in which transitions between these two drives is automatically accomplished by the automatic control system. The transmission and its control system are conditioned for operation in high range by moving the selector lever 138 and thereby the manual selector valve piston 255 into their "H" or high range positions as shown in FIGS. 12A, 12B, and 12C. The change in position of the piston 255, as well as the change in position of other pistons in the system are indicated by arrows on the pistons in FIGS. 12A, 12B and 12C, with the positions of the pistons in FIGS. 12A, 12B and 12C being contrasted with their positions shown in FIGS. 11A, 11B, 11C and 11D. Assuming that the accelerator is allowed to remain in its closed throttle position in which it is illustrated in FIG. 12C, the primary main regulator valve 162 and the secondary main regulator valve 163 function as in the neutral condition of the transmission and controls as illustrated in FIGS. 11A, 11B, 11C and 11D to maintain the line pressure in the conduit 216 and connected conduits at a minimum and to maintain the fluid pressure in the converter 30 also at a minimum. Movement of the manual selector valve piston 255 to its "H" position causes a connection through the groove 267 of the ports 263 and 262 with the fluid pressure supply port 261. Line pressure is supplied through the port 263 to the conduit 269 and the 2–3 valve 166 and particularly to its port 303. This fluid pressure is blocked by the land 317 of the 2–3 valve piston 293, which is shown in its second speed position, and the 2–3 valve does not function to supply fluid pressure to any of the pistons for the clutches or brakes as it does for conditions of the hydraulic controls to be hereinafter described.

Line pressure is supplied through the groove 267 of the manual selector valve piston 255 to the port 262 and thence to the conduit 83 which is connected with the clutch piston 71. Line pressure is thus supplied to the clutch piston 71 and engages the clutch 31 with a minimum engaging pressure corresponding to the minimum line pressure that exists in the illustrated condition of the hydraulic controls with the accelerator 361 released. The restriction 272 in the conduit 83 functions to impede the flow of fluid to the clutch piston 71 and soften engagement of the clutch, although its final engaging pressure will be in accordance with the value of line pressure, as will be understood.

The conduit 289 is connected with the conduit 83, and line pressure is thus supplied to the governor valve 165 and particularly to its port 280. The governor valve 165 is a regulating valve that supplies a fluid pressure to the conduit 290 that increases with the speed of the driven shaft 26 with which the governor valve 165 rotates, and thereby with the speed of the vehicle, and since, in the condition of the hydraulic controls as shown in FIGS. 12A, 12B and 12C, the driven shaft 26 and vehicle are stationary, the governor valve piston 275 and particularly its land 285 blocks the port 280, so that there is substantially no governor pressure in the governor output conduit 290. Although no governor pressure is illustrated in the conduit 290, actually there may be a very small pressure in this conduit, just sufficient to act on the two land faces 285a and 286a to move the valve into its illustrated position blocking the port 280. It will be observed that the governor conduit 290 is connected with the valve piston 275 by means of the port 281 through which fluid within the conduit 290 is applied to the land faces 285a and 286a. Pressure in the conduit 290 tends to move the piston 275 inwardly with respect to the axis of the shaft 26 since the land face 286a is so much larger than the face 285a.

The conduit 468 is connected with the conduit 83 as shown, and line pressure is applied to a land face 461a of the 1–2 valve piston 452 and moves the piston to the limit of its movement to the right in which it is shown in FIG. 12B. The valve piston 452 in this position connects the ports 460 and 456 around the reduced end 466 of the piston and connects the conduit 467 with the conduit 468. The conduit 467 is connected to supply line pressure to the chamber 102 in the brake servomotor. 103, and line pressure in this chamber moves the piston 98 to the right as seen in FIGS. 12A, 12B and 12C against the action the the spring 99 into its brake engaging position in which it is illustrated. The brake 33 is thus engaged with a minimum engaging pressure corresponding to the minimum line pressure existing under the conditions in which the hydraulic controls and transmission are shown in FIGS. 12A, 12B and 12C.

The conduit 391 is connected with conduit 467, as has been described, and the line pressure in conduit 467 is applied through the conduit 391 to the piston 367 of the TV modulator valve 169. The fluid pressure functions to move the piston against the rim 370a forming an end of the cavity 370 and moves the piston 368 along with the piston 367, all against the action of the spring 385. The TV modulator valve is thus put into condition for modulating or limit throttle pressure, as will hereinafter be described.

Thus when the selector lever 138 and the selector valve piston 255 are moved into their "H" or high range positions from their neutral positions, the front clutch 31 and front brake 33 are both engaged, and the intermediate speed power train is completed through the transmission. The accelerator 361 is in its closed throttle position and the engine 363 is rotating at idling speed which may be in the vicinity of 450 revolutions per minute, and actually there is not sufficient power transmitted through the power train and in particular through the hydraulic torque converter 30 for driving the driven shaft 26 and the vehicle; however, the drive may be made effective for driving the vehicle by simply depressing the accelerator to open the throttle valve 362 of the engine 363 and thereby increasing the speed and power output of the engine. Prior to such depression of the accelerator, the torque converter "slips," that is, its impeller 36 rotates without any resultant rotation of the rotor 37. Since the vehicle is started through the torque converter 30, which has a variable "slip" dependent on the torque applied to it and has an infinite number of speed ratios, this start of this vehicle can be made very smooth and shockless.

Throttle opening movement of the accelerator, as has been described, provides the additional power for driving the vehicle in this speed ratio, and this movement of the accelerator also has other effects on the hydraulic control system including an increasing of the line pressure effective on the applying pistons for the front brake 33 and front clutch 31 for increasing the applying pressures in these mechanisms and an increasing of the fluid pressure within the converter 30. These changes in the fluid pressures will be described in connection with FIGS. 13A, 13B and 13C, which show the hydraulic system in high range—second speed driving condition, just prior to a transition into third speed condition at 15 miles per hour vehicle speed, with the accelerator in medium throttle position.

The accelerator 361 acts on the throttle valve 168 through the intermediary of the downshift valve 167 to provide a throttle pressure in conduit 332 which is less than line pressure (as in conduit 216), which throttle pressure increases from zero at closed throttle position of the accelerator to line pressure at open throttle accelerator position. The throttle valve 168, like the valves 162 and 163, is a regulator valve, providing a variable fluid pressure by metering fluid flow between a valve land and a valve port in accordance with variable forces impressed on the valve. The accelerator 361 tends to move the piston 335 of the throttle valve 168 to the right as seen in FIG. 13C upon depression of the accelerator by means of the link 360, the downshift valve piston 333 and the spring 356. The change in position of the pistons 333 and 335, as well as the change in position of other pistons in the system, are indicated by arrows on the pistons in FIGS. 13A, 13B and 13C, with the positions of the pistons in FIGS. 13A, 13B and 13C being contrasted with their positions shown in FIGS. 12A, 12B and 12C. Such movement of the throttle valve piston 335 in FIG. 13C provides a connection between the ports 340 and 338 through the groove 353 of the piston 335 admitting fluid under pressure into the conduit 332 through the port 338. This fluid in the conduit 332 is effective on the faces 350a and 351a of the lands 350 and 351 through the restriction 357 and port 339. Since the land 350 is of larger diameter than the land 351, the fluid pressure on these land surfaces tends to move the valve piston 335 back to the left against the action of the spring 356, so that the land 350 tends to again close the port 340 and block further admittance of fluid pressure to the conduit 332. The greater the depression of the accelerator, the greater will be the force from the spring on the throttle valve piston 335 and the greater must be the pressure in the conduit 332 for closing the port 340 by the land 350, and hence the valve 168 has a regulating action to provide a throttle pressure in the conduit 332 which increases with accelerator depression.

The valve 168 is similarly effective to decrease the throttle pressure in the conduit 332 with a return of the accelerator 361 toward its closed throttle position so that the throttle pressure will have a value corresponding to any particular accelerator depression, by relieving the throttle pressure in the conduit 332 through the port 338, the groove 353 and the bleed port 341 adapted to discharge into the sump 184. If the throttle pressure in the conduit 332 is at a higher value than that which corresponds to the particular accelerator depression existing at the time, as when the accelerator is so released, the throttle pressure acting through the port 339 on the land faces 350a and 351a will move the throttle piston 335 to vent the port 341 with respect to the port 338. There is leakage from the throttle pressure conduit 332 through the various valves connected with it which also acts to reduce the pressure in the conduit 332, so that for any constant accelerator depression, the valve piston 335 is in its position illustrated in FIG. 13C in which it meters fluid flow between its land 350 and an edge of the port 340. The valve 168 and its connections are such that the increase in throttle pressure in the conduit 332 takes place preferably for movements of the accelerator between its closed throttle position and a medium throttle position, and at extremely wide open throttle positions of the accelerator, the downshift valve piston 333 abuts and mechanically moves the throttle valve piston 335 to move the land 350 off the port 340 and thus cause full line pressure to exist in conduit 332. Since the throttle valve 168 is supplied by line pressure in conduit 358, the maximum throttle pressure that can exist at any particular time equals the line pressure at the particular time. The restriction 357 connected with the port 339 is for the purpose of preventing hunting and undue vibration of the valve piston 335 and is similar in this action to the restriction 215 in the primary main regulator valve 162.

For one particular embodiment of the invention, the throttle pressure in conduit 332 is illustrated in FIG. 26 and varies from zero pressure for openings of the throttle between zero and 7% to 75# per sq. in. at approximately 53% throttle opening. As is indicated in FIG. 11D, the valve 362 is normally held at a 3% throttle opening position which supplies sufficient fuel to the vehicle engine 363 so that it runs at an idling speed of 450 revolutions a minute, for example, and an additional opening of the valve 362 between 3% and 7% may occur without actuating the throttle valve piston 168 to provide throttle pressure in the conduit 332. Assuming that the line pressure in conduit 358 is at its minimum value of 75# per sq. in., further throttle openings will not function to increase the throttle pressure in conduit 332 any further; however, if the line pressure in conduit 358 is greater, the throttle pressure will increase on the curve shown in FIG. 26 to the particular value of line pressure existing. At 85% throttle opening, the downshift valve piston 346 contacts the throttle valve piston 335 and completely opens the port 340, and the throttle pressure in the conduit 332 immediately increases to line pressure, assuming that the line pressure is greater than the throttle pressure just before a throttle opening of 85% is reached.

The throttle pressure from the throttle valve 168 is supplied through the conduit 332 to the TV modulator valve 169. The valve 169 functions to provide a limited or so called modulated TV pressure in the conduit 387 when the piston 368 of this valve is in its limiting or modulating position in which it is shown in FIG. 13B, with line pressure acting on piston 367 functioning to hold the piston 368 in this position. This limited pressure in conduit 387 is the same as the throttle pressure in conduit 332 up to a predetermined maximum value and for further increases in throttle pressure corresponding to increased openings of the engine throttle, the modulated TV pressure in conduit 387 remains at this predetermined value. The throttle pressure in conduit 332 flows through the port 375 of the TV modulator valve 169 and through the groove 384 and port 374 to the conduit 387. The pressure in conduit 387 is applied on the face 380a of the land 380 of the TV modulator valve piston 368 through the passage 389, and the effect of this application of pressure on the valve is to tend to move the piston 368 to the right against the action of the spring 385 so as to close the port 375 by means of the land 381. The modulated TV pressure in the conduits 387 and 389 and applied to the land face 380a, however, is not sufficient to move the valve piston 368 in this manner until the modulated TV pressure has reached this predetermined maximum value, after which the valve land 381 meters the flow of fluid through the port 375 and prevents a further increase in modulated TV pressure in conduit 387. The restriction 390 functions similarly to the restriction 215 in preventing undesired vibration of the associated valve piston which in this case is the piston 368. In the particular embodiment of the invention mentioned before, the modulated TV pressure had a maximum of 22 lbs. per sq. in. at about 25% throttle opening, and the modulated TV pressure remained constant for additional movements of the accelerator. FIG. 26 may be referred to for a graphical showing of the variations of modulated TV pressure with accelerator movement for this particular embodiment.

The modulated TV pressure in conduit 387 is applied to the compensator valve 170 for providing a compensator pressure in the conduit 419 that decreases with depression of accelerator pedal for initial throttle opening movements of the accelerator. The compensator pressure in conduit 419 also increases with the speed of the driven shaft 26 and of the vehicle due to action of the governor pressure in conduit 290, that increases with the speed of the shaft 26 and the vehicle, on the compensator valve 170. In this connection, the action of the governor valve 165 in producing such a governor pressure in conduit 290 will now be described.

The governor valve 165 is a regulator valve similar in many respects to the valves 162, 163 and 168 which are also regulator valves. The casing 276 for the governor valve piston 275 rotates with the driven shaft 26 of the transmission since the casing is fixed on the driven shaft, and the piston 275 tends to move outwardly in its cavities 278 and 279 under the influence of centrifugal force. Line pressure is present in conduit 289 and feeds through port 280, the groove 288 of the piston 275, and the port 281 into the conduit 290 to supply pressure to the latter conduit. The pressure in the conduit 290 is applied to the faces 285a and 286a of the lands 285 and 286 and tends to move the piston 275 inwardly of the valve casing 276, since the face 286a is of larger area than the face 285a, so that the land 285 will move over the port 280 and block any further admission of fluid pressure to the conduit 290. A balance is attained between the centrifugal force effective on the valve piston 275 tending to move the piston outwardly of the casing 276, which increases with vehicle speed, and the force derived from the fluid pressure in the conduit 290 effective on the land faces 285a and 286a tending to move the piston 275 inwardly, which increases with the pressure in conduit 290, for every speed of the driven shaft 26 so that the valve piston 275 meters the flow of fluid under pressure to the governor output conduit 290 between the land 285 and an edge of the port 280 and provides a regulated governor pressure in the conduit 290 that increases with the speed of the driven shaft 26 and of the vehicle. The bleed passage 291 is provided for the purpose of relieving fluid pressure in the conduit 290 on a decrease in speed of the driven shaft 26, although the ordinary leakage about the valve piston 275 and other pistons connected with the conduit 290 may be expected to provide for such a decrease in governor pressure without the use of the passage 291 for gradual decreases in vehicle speed. Upon a sudden decrease in vehicle speed, there is a governor pressure in the conduit 290 greatly in excess of that corresponding to the reduced vehicle speed, and this pressure moves the governor piston 275 inwardly to connect the ports 283 and 282 by means of its groove 287 to drain this excessive fluid pressure from the conduit 290 through the passage 291. When the governor pressure in the conduit 290 reaches the decreased value corresponding to the decreased vehicle speed, the pressure in the conduit 290 effective on the land faces 285a and 286a is ineffective to hold the valve piston in its inwardly moved position, and it returns to block the port 282 by its land 285 and meter any additional flow to the conduit 290 between its land 285 and an edge of the port 280 as is shown in FIG. 13A. For the particular embodiment of the invention mentioned above, FIG. 32 may be referred to for a showing of the manner in which the governor pressure in conduit 290 varies with vehicle speed.

The governor pressure in conduit 290 which increases with the speed of the driven shaft 26 and of the vehicle is impressed through the port 401 on the piston 393 of the compensator valve 170 and tends to move the piston 393 and thereby the piston 392 in contact with it to the left, augmenting the action of the spring 417 in moving the piston 392 in this direction. The modulated TV pressure in conduit 387 is supplied through the port 399 of the compensator valve 170 to the land faces 407b and 408a of the piston 392, as shown in FIG. 13B. The land face 408a is of greater area than the face 407a since the land 408 is of larger diameter than the land 407, and the modulated TV pressure which varies with accelerator depression thus provides a force on the piston 392 varying with the degree of accelerator depression tending to move the piston 392 to the right against the action of the spring 417 and the piston 393.

The compensator valve 170 is also a regulator valve, and it functions to provide a regulated compensator pressure in conduits 420 and 419 that decreases with increased throttle openings and increases with increased speed of the shaft 26 and of the vehicle. In its regulating condition in which it is illustrated in FIG. 13B, the valve piston 392 meters line pressure from the conduit 418, the port 403 and the groove 415, between its land 410 and a side of the port 404 into the conduits 420 and 419. Increased governor pressure in the conduit 290 applied to the piston 393 tends to augment the action of the spring 417 in moving the piston 392 to the left to open a greater part of the port 404 by moving the land 410 off the port, so that the fluid flow to the conduit 420 is greater. The modulated TV pressure in conduit 387 which increases with accelerator movement acts on the land faces 407b and 408a tending to move the piston 392 in the opposite direction and increasingly block the port 404 with the land 410. The compensator pressure in conduit 420 is also effective on the land end 407a of the piston 392 through the conduit 421, and this pressure acts in the same manner as the modulated TV pressure in tending to move the piston 392 to the right to further close the port 404. These four forces on the piston 392, namely, those due to the governor pressure in conduit 290, the spring 417, the modulated TV pressure on land faces 408a and 407b and the compensator pressure on land face 407a balance each other so as to produce the compensator pressure in conduit 419 that decreases with increased throttle opening and increases with the speed of the driven shaft 26 and of the vehicle, the fluid in the conduit 420 for the regulating conditions of the piston 392 being metered past the land 410 and a side of the port 404. There is, of course, fluid leakage from the conduit 420 through the various valves connected therewith tending to decrease the pressure in the conduit 420, so that, for constant accelerator positions and vehicle speeds, the valve piston 392 is in its metering position as shown in FIG. 13B; however, for a rapid movement of the accelerator toward its open throttle position, the pressure in the conduit 420, in order to have a sudden decrease corresponding with this changed accelerator position, must be suddenly drained. This release of the pressure in the conduit 420 is obtained through the port 404, the groove 414 in the piston 392 and the bleed port 405, the valve piston 392 having been moved to the right of its position as shown in FIG. 13B so that fluid from the port 404 may meter past the land 410. The restriction 422 in the branch conduit 421 functions similarly to the restriction 215 used in connection wtih the primary main regulator valve 162 in inhibiting vibration of the valve piston 392.

For the particular embodiment of the invention referred to above, FIG. 30 may be referred to for a graphical illustration of the variation in compensator pressure with changes in vehicle speed and throttle opening for high range operation. In the graph in this figure, the compensator pressure is illustrated by the surface bounded by the points 525, 526, 527, 528, 529 and 530, the surface bounded by the points 526, 527 and 531 and the surface bounded by the points 531, 532, 528 and 527. It will be observed from this graph that below approximately 33 m.p.h. the compensator pressure in conduit 420 will decrease along the surface bounded by the points 526, 527 and 531 with a movement of the accelerator in the throttle opening direction, and, with the accelerator in a medium throttle position corresponding to 50% throttle opening, for example, the compensator pressure will increase on the surface bounded by the points 531, 532, 528 and 527 with increases in vehicle speed. Above a vehicle speed of approximately 33 m.p.h., the compensator pressure is at its maximum of 75 lbs. per sq. in regardless of changes in position of the accelerator.

For the conditions indicated in FIGS. 13A, 13B and 13C, namely with the accelerator in a medium throttle position and with the vehicle travelling at a relatively slow speed, the depressed condition of the accelerator is a controlling influence on the compensator pressure in conduit 419 as compared with vehicle speed, and the compensator pressure in this conduit is at a value somewhat less than line pressure, being found on the surface bounded by the points 531, 532, 528 and 527 or on the surface bounded by the points 526, 527 and 531 in the graph of FIG. 30, for example. This reduced compensator pressure in conduit 419 causes a change in the regulating action of the primary main regulator valve 162 for increasing the line pressure in conduit 216 and connected conduits and causes a change in the regulating action of the secondary main regulating valve 163 for increasing the pressure in the conduit 217 and in the converter 30, as will be described. As the vehicle starts, however, the rear pump 161 driven by the driven shaft 26 of the transmission begins operation, and the fluid discharged therefrom, exclusive of the effect of the change in the compensator pressure in conduits 419 and 218, causes a change in the regulating action of the primary main regulator valve 162, and this effect of the rear pump will now be described.

When the vehicle begins to move, after the accelerator 361 has been moved toward its open throttle position to increase the speed and power output of the engine 363, the rear pump 161 begins its pumping action and draws fluid through the conduit 192 from the sump 184 and discharges it into the conduit 193. The check valve 220 remains closed, with its valve element 221 held on the seat 223 by line pressure in conduits 216 and 193 and by the spring 224 as shown in FIG. 12C, until the pressure of the fluid discharged by the rear pump 161 increases to a sufficient value to overcome the forces due to the line pressure and the spring 224, and at this time the check valve 220 opens and the rear pump discharges into the conduit 216. The fluid flow through the conduit 219 then reverses and closes the check valve 225, moving the valve element 226 on to its seat 228. The closing of the check valve 225 blocks discharge by the front pump 160 into the line pressure conduit 216 and its connected conduits, and the rear pump now becomes the sole supply of line pressure for conduit 216 and connected conduits. Since the check valve 225 is closed, the rear pump 161 cannot discharge through the conduits 219 and 183 and the port 203, and the discharge from the rear pump 161 must be taken care of in another way. When the check valve 225 closes, the line pressure in conduit 216 increases slightly and is impressed on the land faces 205a and 206a of unequal area through the passage 215 and moves the valve piston 194 slightly to the right so as to provide an outlet for the excess fluid discharged from the rear pump between an edge of the port 201 and the land 207. The line pressure is now regulated exactly as has been previously described, except that it is slightly higher in value and is metered between the land 207 and an edge of the port 201 instead of between an edge of the port 203 and the land 208. Incidentally, the difference of line pressure in conduit 216 when it is supplied solely by the rear pump 161 instead of the front pump 160 and necessary to move the valve piston from its FIG. 12C position to its FIG. 13C position metering fluid through the port 201 instead of the port 203 is quite small, being only about 4 lbs. per sq. in. in one particular embodiment. As will be noted from FIG. 13C, the port 203 is substantially completely opened by the land 208 in the moved position of the valve piston 194, and the front pump 160 now discharges against only the pressure in the conduit 217 and in the converter 30 which is substantially less than line pressure. The front pump now functions solely to supply fluid under pressure to the converter 30 and for lubrication by means of the conduit 89 through the intermediary of the secondary main regulator valve 163, and the rear pump, as has been described, is the sole supply of line pressure in the conduit 216, while the excess fluid discharged from the rear pump escapes between an edge of the port 201 and land 207 for augmenting the fluid supply for the converter and lubrication.

The compensator pressure in conduit 419, which is less than line pressure for the vehicle speed and accelerator depression of FIGS. 13A, 13B and 13C, causes a change in the line pressure regulating action of the primary main regulator valve 162 as compared with its operation as shown in FIGS. 11A, 11B, 11C and 11D and 12A, 12B and 12C in which the accelerator is in its closed throttle position and the vehicle is stationary. As has been previously explained, the pressure in conduits 419 and 218 tends to move the regulator valve piston 194 to the right against its spring 214, and this tends to more fully open the port 201 to vent the pressure supply line 216 after the check valve 225 has closed, as above described, or more fully open the port 203 to vent the conduit 216 before closure of the check valve 225. When the pressure in conduits 419 and 218 is reduced from full line pressure, as shown in FIGS. 11A, 11B, 11C and 11D and 12A, 12B and 12C, the valve piston 194 tends to move to the left under the influence of its spring 214, since the pressure on the land faces 208a and 209a tending to move the piston 194 to the right is decreased, and the piston 194 will not move to open the supply conduit 216 through the port 201 or 203 until a higher pressure is reached in the conduit 216. The piston 194 thus maintains the line pressure in the conduit 216 at a higher value corresponding to the decreased pressure in conduits 419 and 218. The line pressure, as has been previously explained in connection with FIGS. 12A, 12B and 12C, when the selector lever 138 is moved to its high range position, is supplied to the piston 71 for engaging the front clutch 31 and to the chamber 102 in the servomotor 103 for engaging the front brake 33, and this line pressure is thus increased with accelerator depression to increase the engaging pressures of the front clutch 31 and front brake 33 to take the additional torque from the vehicle engine which results from depression of the accelerator 361. The engaging pressures of the front clutch 31 and front brake 33, being thus increased, no slippage of these two friction engaging mechanisms takes place when the vehicle is started and operated in intermediate speed drive.

For the particular embodiment of the transmission and its controls referred to previously, the graph in FIG. 23 may be referred to for a showing of the manner in which the line pressure in conduit 216 and connected conduits varies with accelerator movement and vehicle speed. The line pressure is shown in this graph by the surface bounded by the points 533, 534, 535, 536, 537 and 538, the surface bounded by the points 539, 535 and 534 and the surface bounded by the points 539, 540, 536 and 535. As is apparent from the graph, line pressure varies inversely as compensator pressure. For all the vehicle speeds above approximately 33 m.p.h., the line pressure is at its minimum value of 75 lbs. per sq. in., being on the surface bounded by the points 533, 534, 535, 536, 537 and 538. Below this vehicle speed, the line pressure will increase with a depression of the accelerator on the surface bounded by the points 534, 535 and 539. After the line pressure has reached its maximum value for any particular speed, the value of line pressure will be found on the surface bounded by the points 539, 540, 536 and 535 and will decrease on this surface, as is apparent, with increases of vehicle speed. For the low vehicle speeds for which FIGS. 13A, 13B and 13C are applicable, the value of line pressure will be found on the surface bounded by the points 534, 535 and 539 or on the surface bounded by the points 539, 540, 536 and 535.

The compensator pressure in conduit 419, indicated in FIGS. 13A, 13B and 13C, which is reduced from line pressure, is effective on the secondary main regulator valve 163 for increasing the pressure in the converter 30; however, the increased discharge from the pumps 160 and 161 in itself has the effect of moving the piston 230 of the regulator valve 163 in the direction indicated in FIG. 13C.

The excess discharge from the rear pump 161 flows between the land 207 of the primary main regulator valve piston 194 and an edge of the port 201 into the conduit 217, and the discharge from the front pump 160 flows through the conduit 183 and the ports 203 and 201 into the conduit 217. This increased discharge has the effect of increasing slightly the pressure in the conduit 217 and in the torque converter 30, so that this pressure impressed on the land face 242a through the conduit 252 functions to move the valve piston 230 of the secondary main regulator valve 163 to the right from its FIG. 12C position to its FIG. 13C position. In the latter position, the land 244 of the valve opens the port 238 to the lubrication conduit 89 practically completely, and the valve meters fluid from the conduit 250 between an edge of the port 234 connected with this conduit and the land 243. The metering action of the land 243 has the effect of maintaining certain pressures in the conduits 217 and 250 and in the torque converter 30. Under these circumstances there is still some fluid flow from the conduit 217 through the ports 235 and 238 and the groove 247 to the lubrication conduit 89; however, most of the discharge from the pumps flows through the conduit 217 through the torque converter 30 and the converter outlet conduit 250, and past an edge of the port 234 and land 243 where it is metered and thence through the groove 246, port 240 and conduit 253 to the sump 184. Under unusual conditions, the valve piston 230 will also move still farther to the right against the action of the spring 249 due to the excess discharge from the pumps 160 and 161, as when the oil in the transmission is quite cold and viscous. Under these circumstances the valve piston 230 moves to at least partially uncover the port 237 by means of the land 244 so as to drain fluid from the conduit 217 through the port 235, the groove 247, the port 237 and the conduit 251 back to the inlet conduit 182 for the front pump 160. In this case, the metering action is by the land 244 coacting with the port 237. Generally the metering action by the valve piston 230 is by the land 243 coacting with the port 234, and, in this case, it is apparent that there is a continuous fluid flow from the conduit 217 through the torque converter 30 and thence through the converter outlet conduit 250, and this continuous fluid flow has the effect of cooling the converter and maintaining the oil within the transmission at safe operating temperatures.

Although, due to this movement of the valve piston 230, the converter pressure varies slightly with changes in output of the pumps 160 and 161, the sizable variations of converter pressure are with changes in vehicle speed and accelerator movement due to variation of the compensator pressure in conduit 419. The conduits 419 and 218 are in communication with the land faces 244a and 245a through the port 236 as has been previously described, and pressure on these faces tends to move the piston 230 of the valve 163 to the right against the action of the spring 249. When the pressure in the conduits 218 and 419 is regulated by means of the compensator valve 170 to less than line pressure, this action on the land faces 244a and 245a decreases, so that the spring 249 is increasingly effective to block the relief port 234 or the relief ports 238 or 237, as the case may be, so as to increase the pressure in the conduit 217 and thereby in the converter 30 connected therewith. The valve 163 regulates as before, since converter pressure is applied on the land face 242a of the piston 230 through the conduit 252, but the regulated pressure in the converter is at a predetermined higher value corresponding to the compensator pressure in the conduits 419 and 218 which is less than line pressure. The higher fluid pressure necessary for increased torque transmittal through the torque converter 30 is thus supplied to the torque converter with a depression of the accelerator 361.

The variations of converter pressure with changes in vehicle speed and accelerator movement are shown in FIG. 27, for the particular embodiment of the invention above referred to. The converter pressure is shown on the surface bounded by the points 541, 542, 543, 544, 545 and 546, the surface bounded by the points 542, 543 and 547 and the surface bounded by the points 543, 547, 548 and 544. The converter pressure varies quite substantially with changes in the viscosity and temperature of the oil used in the transmission, and hence the values shown in this graph are very approximate and may be considered average values. As is apparent from the graph, above approximately 33 m.p.h. of the vehicle, the converter pressure is at a minimum, being on the plane bounded by the points 541, 542, 543, 544, 545 and 546. Below this vehicle speed, the converter pressure will rise with a depression of the accelerator, the rise being on the surface bounded by the points 542, 543 and 547. Above approximately 25% throttle opening and below 33 m.p.h., the converter pressure will be indicated by a point on the surface bounded by the points 547, 543, 544 and 548. As is apparent, as the vehicle speed increases, with the pressure being indicated by this latter surface, the pressure will decrease toward its minimum value indicated by the surface bounded by the points 541, 542, 543, 544, 545 and 546. Comparing FIGS. 23 and 27, it will be observed that the converter pressure varies in substantially the same way as line pressure with variations in accelerator position and vehicle speed, as the two graphs look much the same, but the converter pressures are much less than line pressures for the same accelerator position and vehicle speed.

The throttle pressure in conduit 332 which increases with the depression of the accelerator 361 and opening of the engine throttle valve 362 is also effective on the 3–2 control valve 173, the low regulator valve 171 and the 2–3 valve 166, in addition to the compensator valve 170. The throttle pressure is effective through conduit 483 and port 475 on the land end 476a of the valve piston 469 of the 3–2 control valve 173 and moves the piston 469 against the action of the spring 479 to the limit of its movement to the right as seen in FIG. 13A; however, this valve in the condition of the hydraulic control system shown in this figure has no particular function. Throttle pressure is also applied on the land faces 439a and 440a of the valve piston 424 of the low regulator valve 171 through the conduit 451 and port 435. Since the land face 439a is considerably larger than the land face 440a, the piston 424 and thereby the piston 423 are held in their illustrated positions at the limit of their movements to the left as seen in the figure; however, this valve in this condition of the hydraulic control system has no particular function.

The throttle pressure in conduit 332 which increases with accelerator depression is applied also to the 2–3 valve 166 and tends to hold the piston 293 of the valve, which is the actual speed changing portion of the valve, in its intermediate speed position in which it is illustrated in FIG. 13A. The throttle pressure is applied to the land face 313a and the reduced end portion 314 of the piston 292 of the 2–3 valve 166 and moves the piston 292 to the right as seen in FIG. 13A, against the action of the spring 326 disposed between the piston 292 and the land 316 of the piston 293. Such movement of the piston 292 causes its land 313 to uncover the port 311 and admit fluid pressure from the conduit 332, through the port 312, the cavity 296, the port 311, the passage 331 and the port 310 to the cavity 297 and the fluid pressure in the cavity 297 is applied to both the face 316a of the land 316 formed on the piston 293 and also on the reduced end portion 315 and on the face 313b of the land 313 on the piston 292. This fluid pressure within the cavity 297, as it increases, tends to move the piston 292 back with the assistance of the spring 326, so that the land 313 again covers the port 311. An increase in throttle pressure in conduit 332 tends to move the valve piston 292 to the right to again uncover the port 311 and admit additional fluid under pressure within the cavity 297. This movement of the piston 292 is against both the force due to the spring 226 and is also against the force due to the regulated throttle pressure which has built up in the cavity 297 and is effective on the reduced end 315 and land face 313b of the piston 292. Both of the latter forces are effective to tend to move the valve piston 292 in the opposite direction to close the port 311 by the land 313. The valve piston 292 thus meters fluid flow from the conduit 332 between an edge of the port 311 and the land 313 to provide the regulated throttle pressure in the conduit 331 and cavity 297, and since both regulated throttle pressure and also the spring 326 are effective on piston 292, the regulated throttle pressure is at a predetermined less value than the throttle pressure.

In order for the regulated throttle pressure within the cavity 297 to decrease with a corresponding decrease in throttle pressure in conduit 332, as when the accelerator is suddenly moved toward its closed throttle position, the cavity 297 is drained through the port 302, the conduit 327, the port 344 in the valve 167, the groove 348, the port 345, the conduit 270, the port 260 of the manual selector valve 164, the groove 268 and the port 258. In this case the metering action is between the land 313 and the edge of the port 302. As will be further illustrated, the throttle pressure and regulated throttle pressure reach maximum values at a partially open throttle position of the accelerator, and hence the port 345 is open to the groove 348, rather than being closed by the land 346 of the downshift valve piston 167, when a release of the regulated throttle pressure in cavity 297 is necessary for maintaining it coordinated with the throttle pressure in conduit 332 which has similarly decreased. The net effect of the piston 292 is thus to regulate in a manner similar to the action of the other regulating valves to provide the regulated throttle pressure in conduit 331 and cavity 297 which is always less by a predetermined amount than the throttle pressure in conduit 332.

FIG. 26 may be referred to for a graphical showing of the variation of regulated throttle pressure in conduit 331 with accelerator movement for the particular embodiment of the invention above mentioned. It will be observed that the regulated throttle pressure varies in the same manner as throttle pressure and has values always a predetermined amount less than the throttle pressure. In the particular instance illustrated, the regulated throttle pressure in conduit 331 is always 16 lbs. per sq. in. less than the throttle pressure.

The regulated throttle pressure is also applied to the faces 322a and 323a of the lands 322 and 323 of the piston 294 through the conduit 330. Since the face 322a is considerably smaller in area than the face 323a, the effect of the regulated throttle pressure in the conduit 329 is to provide a force on the piston 294 tending to hold the piston against movement to the left as seen in FIG. 13A. This force acts in unison with that due to the regulated throttle pressure on the land face 316a in tending to hold the two pistons 293 and 294 from moving as a unit to the left, as is apparent.

The governor pressure in conduit 290 is applied through the conduit 329 and port 307 to the right end of the piston 294 in the 2–3 valve 166 including the land face 323b, and this pressure tends to move the piston 294 and thereby the piston 293 in contact with it to the left as seen in FIG. 13A. The governor pressure is also applied to the faces 316b and 317a of the lands 316 and 317 respectively through the conduit 329, and since the face 316b is considerably larger than the face 317a in area, the net effect of the governor pressure applied to these faces is to tend to assist the force just described, in connection with the piston 294, in moving the piston 293 to the left against the action of the springs 325 and 326.

The valve piston 293 is the actual portion of the 2–3 valve 166 causing a change between the intermediate and high speed drives as will hereafter appear. The governor pressure impressed on the land 323 and on the lands 316 and 317 tends to move the pistons 293 and 294 to the left to move the piston 293 into a high speed drive position, and this effect of the governor pressure is opposed by the regulated throttle pressure acting on the land 316 and on the lands 322 and 323, the spring 325 acting on the piston 293, and the throttle pressure acting through the piston 292 and the spring 326 on the piston 293 all of which tends to hold the pistons 293 and 294 from movement to the left. In the condition of the control system shown in FIGS. 13A, 13B and 13C, the shift forces due to the governor pressure at the low vehicle speed existing are not high enough relative to the sum of these opposing forces to actually move the pistons 293 and 294, so that these pistons remain in their intermediate or second speed positions in which they are illustrated in FIG. 13A.

The low inhibitor valve piston 486 has governor pressure impressed on it through the conduits 290 and 503, the ports 492 and 493, the conduit 504 and the port 495. The governor pressure is effective on the right end of the piston 486 including the land end 497a and is effective through the conduit 504 on the left end of the piston 486 including the face 496a and the reduced end portion 499. Since the right end of the piston 486 has a larger area than its left end, the effect of the governor pressure on the piston 486 is to tend to move it to the left as seen in FIG. 13B, against the action of the spring 500, but this movement of the piston 486 does not occur until a higher speed of the vehicle is reached than that for which the hydraulic controls are illustrated in FIGS. 13A, 13B and 13C. The low inhibitor valve thus has no function in the condition of the hydraulic controls in which they are illustrated in FIGS. 13A, 13B and 13C.

As the speed of the vehicle increases in second speed ratio, the governor pressure in conduit 290 increases, and this is impressed on the compensator valve 170 tending to move its piston 392 toward the left as seen in FIG. 13B to more fully open the port 404 and provide an increased compensator pressure in conduits 419 and 420. For the particular embodiment referred to above, the values of compensator pressure are found on the surface bonded by the points 531, 532, 528 and 527 in the graph of FIG. 30, and, as is apparent, the compensator pressure increases in vehicle speed.

The increased compensator pressure in conduits 420, 419 and 218 acts on the primary main regulator valve 162 and tends to move its piston 194 farther to the right, so as to increase the opening between the land 207 and the edge of the port 201 for further relieving the line pressure in the conduit 216 and decreasing the line pressure. For the particular embodiment of the invention above referred to, FIG. 23 may be referred to for a showing of line pressure, and under these conditions, the line pressure will be found on the surface bounded by the points 539, 540, 536 and 535, and the line pressure decreases on this surface with increases in vehicle speed, as is apparent.

As has been previously explained, the torque conversion in the hydraulic torque converter 30 generally decreases with increases in vehicle speed, and the torque transmitted through the transmission decreases similarly, so that the holding power of the various friction engaging mechanisms completing the drive, such as the front clutch 31 and front brake 33, may be decreased without slippage, and hence the line pressure applied to engage the friction engaging mechanisms is decreased. The rear pump 161 is the sole supply of line pressure after the vehicle has started moving, and this pump thus pumps against a reduced line pressure and requires less power for driving the pump.

The increased compensator pressure in conduits 419 and 218 is applied to the secondary main regulator valve 163 and tends to move its valve piston 230 farther to the right to further open the port 234 to decrease the converter pressure is conduits 250 and 217. For the particular embodiment of the invention above referred to, FIG. 27 may be referred to for a graph showing the variations in converter pressure, and, under these conditions, the converter pressure is found on the surface bounded by the points 547, 548, 544 and 543, and this converter pressure decreases on this surface with increases in vehicle speed, as is apparent from the graph.

As has been explained, the torque conversion in the torque converter decreases generally with increases in vehicle speed, and the one-way brake 43 releases and the stator 38 begins to rotate when a one to one speed ratio through the converter 30 is approached with increases in vehicle speed and I have found that the fluid pressure required for the drive through the torque converter decreases with such decreases in torque conversion. The system thus has been designed to decrease the converter pressure with increases in vehicle speed. After the rear pump 161 has become the sole supply of line pressure, the front pump 160 is the sole supply of converter pressure, and the front pump 160 pumps against a reduced converter pressure with increased vehicle speed resulting in a decreased power requirement for driving the front pump.

When the speed of the vehicle increases to a predetermined value with the accelerator assumed to remain in its same medium throttle position in which it is shown in FIG. 13C, the governor pressure in conduit 290 applied to various lands in the 2–3 valve 166 increases sufficiently to overcome the effect of the throttle pressure in conduit 332 and regulated throttle pressure in conduits 330 and 331, so as to move the valve piston 293 to the left into its third speed position in which it is illustrated in FIG. 14A. The change in position of the piston 293, as well as the change in position of other pistons in the system, are indicated by arrows on the pistons in FIGS. 14A, 14B and 14C, with positions of the pistons in FIGS. 14A, 14B and 14C being contrasted with their positions shown in FIGS. 13A, 13B and 13C. As has been explained in connection with FIGS. 13A, 13B and 13C, the governor pressure in conduit 290 is effective on the land faces 323b, 316b and 317a and thereby tends to move the valve piston 293 to the left against the actions of the spring 325, the throttle pressure effective on the left end of the valve piston 292 and the regulated throttle pressure effective on the land faces 316a, 322a and 323a. The piston 294 moves along with the piston 293, and during its movement the piston 293 contacts the piston 292 and moves this also.

As has been previously explained, the throttle pressure in conduit 332 and therefore the regulated throttle pressure in conduit 331 and connected cavities increase in accordance with throttle opening and depression of the accelerator 361. Therefore, the governor pressure must be at higher values, the greater the accelerator depression and the greater the throttle pressure and regulated throttle pressure, in order to overcome the effect of the throttle pressure and regulated throttle pressure and shift the valve pistons 292, 293 and 294 to the left into their third speed or direct drive positions in which they are illustrated in FIG. 14A. Thus, the vehicle speed at which an upshift occurs corresponding to this movement of these pistons is higher the greater the depression of the accelerator; so that the increased torque resulting from the drive in the intermediate speed power train is available for driving the vehicle for a longer period during an acceleration of the vehicle, the greater the torque demand by the vehicle operator as is evidenced by accelerator depression. For the medium throttle position of the accelerator illustrated in FIG. 14C, the upshifting movement of the pistons 292, 293 and 294 occurs at approximately 15 m.p.h. vehicle speed for a certain embodiment of the invention.

In the third speed position of the 2–3 valve piston 293, the groove 320 of the piston connects the ports 303 and 304 and thereby the conduits 269 and 86. Line pressure is thus supplied from the conduit 269, through the port 303, the groove 320, the port 304, and the conduit 86, to the piston 79 for the rear clutch 32, and the piston is moved to engage the rear clutch. Movement of the piston 293 has no effect on the front clutch, since the front clutch piston 71 remains supplied with line pressure through the conduit 83, as shown. Engagement of the rear clutch due to application of fluid pressure to its piston 79 completes the direct drive power train through the transmisison.

Simultaneously with the application of fluid pressure to the rear clutch piston 79, line pressure is also supplied to the chamber 101 in the front brake servomotor 103, so as to disengage the front brake 33 and break the intermediate speed power train through the transmission. Line pressure is supplied to the chamber 101 through the conduit 482, the port 474, the groove 478 of the 3–2 control valve piston 469, the portion 473 and the conduit 481. With the application of line pressure to the right side of the brake piston 98, the same line pressure exists on both sides of the piston 98. The area of the right side 98a of the piston 98 to which line pressure is thus applied may be seen to be greater than the area of the other side 98b of the piston, so that the same fluid pressure on both sides of the piston 98 causes movement of the piston 98 to the left, and the brake 33 is disengaged. This disengaging movement of the piston 98 is also caused by the spring 99 which acts to move the piston in this direction.

The restriction 328 in the conduit 269 is for the purpose of causing the application of pressure on the clutch piston 79 and on the surface 98a of the front brake servomotor 103 to occur substantially at the same time. Referring to FIG. 1B, it will be observed that the conduit 86 to the clutch piston 79 is quite tortuous and it impedes the flow of fluid therethrough to a greater extent than the conduits 481 and 482 to the servomotor 103. The restriction 328 retards the fluid flow through the conduits to the servomotor 103 and piston 79 and assures that the pressure build up in these two motors will be substantially the same. This restriction also functions to prevent an unduly abrupt drop in the line pressure in the conduits 269 and 216 when the piston 79 and servomotor 103 are connected with these conduits by movement of the piston 293 into its FIG. 14A position. The restriction 484 in the conduit 482 is relatively quite large with respect to the restriction 328, and it has substantially no effect on this build up of pressure on the piston 79 and in the servomotor 103. As will hereinafter appear, the restriction 484 functions primarily for a change in speed ratio from third speed to second speed. It will be observed that the conduits 482 and 481 are also connected through the restricted passage 485; however, this has substantially no effect on the change of speed ratio from second speed to third speed just described, due to the fact that the fluid may flow from the conduit 482 freely thorugh the groove 478 of the 3–2 control valve piston 469 into the conduit 481 in the illustrated position of the piston 469.

The groove 320 in the 2–3 valve piston 293 is formed by the face 317b of the land 317 and the face 318a of the land 318. The land 317 is slidably disposed in the cavity 298 which is substantially larger in diameter than the cavity 299 in which the land 318 is disposed, and the area of face 317b is larger than the area of face 318a. Hence the line pressure within the groove 320 when the valve piston 293 is in its FIG. 14A position exerts a force on the piston 293 tending to hold it from movement to the right as seen in the figure, back into its second speed position. This arrangement of the different size lands 317 and 318 thus constitutes a fluid latch yieldably holding the piston 293 in its third speed position, so that, assuming other forces tending to move the piston 293 to the right remain the same, a lower governor pressure in conduit 290 and applied to the lands 316 and 323 is required for causing a downshifting movement of the piston 293 than that at which an upshifting movement of the piston 293 takes place. This fluid latch prevents hunting of the valve piston 293 between its second speed and third speed positions. As an additional means for assuring that no hunting of this piston 293 takes place, it will be observed that the piston 292, which is moved back to the limit of its movement to the left with movement of the piston 293 into its third speed position, closes the port 311 of the 2–3 valve 166 with its land 313. The regulated throttle pressure applied to the land faces 313b, 316a, 322a and 323a, tending to force the pistons 293 and 294 to the right thus ceases to exist, being drained through the port 302, conduit 327, port 344, groove 348, port 345, conduit 270, port 260, groove 268, and port 258, as is indicated by the arrows in these parts in FIGS. 14A, 14B and 14C. The throttle pressure in the conduit 332 is thus effective exclusive of the regulated throttle pressure tending to move the pistons 292, 293 and 294 to the right.

The 3–2 control valve 173 at times closes the port 473, so that fluid flowing in the conduits 482 and 481 and applied to the right face 98a of the brake piston 98 must pass through the additional restrictive passage 485; however, whenever there is any substantial throttle pressure present in the conduit 332 corresponding with any substantial depression of the accelerator 361 from its closed throttle position, the 3–2 control valve piston 469 is in its FIG. 14B position and bypasses the restrictive passage 485 by means of its groove 478. An increase in vehicle speed causing a change in speed ratio from second speed to third speed generally only occurs with the accelerator in some depressed position, and the 3–2 control valve piston 469 is thus generally always in its position in which it is illustrated in FIG. 14B when this change in speed ratio takes place.

The line pressure in conduit 216 utilized for engaging the clutch 32 for completing the drive in third speed ratio varies, as has been described, in accordance with the depression of the vehicle accelerator and in accordance with the speed of the vehicle, and the converter pressure also varies in this manner. Comparing the conditions of the hydraulic control system shown in FIGS. 13A, 13B and 13C with those of the system shown in FIGS. 14A, 14B and 14C, in which the accelerator is in the same medium throttle position, the speed of the vehicle is greater for the conditions of the system shown in FIGS. 14A, 14B and 14C as compared with those for FIGS. 13A, 13B and 13C, and accordingly the governor pressure in conduit 290 is greater, the compensator pressure in conduit 419 is greater, the line pressure in conduit 216 is less and the converter pressure in conduit 217 is less for the FIGS. 14A, 14B and 14C conditions of the system as compared with the FIGS. 13A, 13B and 13C conditions. The line and converter pressures which decrease with vehicle speed reduce the pumping losses. Due to the fact that the hydraulic converter 30 is in general converting torque only at the lower vehicle speeds, the increased holding pressures for the friction engaging mechanisms of the transmission by line pressure are in general necessary for only low vehicle speeds and the line pressure has, therefore, been decreased for higher vehicle speeds. The torque converter 30 furthermore does not require such high converter pressures when it functions as a fluid coupling at higher vehicle speeds, and the converter pressure has been reduced accordingly.

In the change from high range second speed ratio to high range third speed ratio illustrated in FIGS. 14A, 14B and 14C, the servomotor 103 for the front brake 33 has an accumulator effect and cushions engagement of the rear clutch 32. This accumulator effect would be modified and changed with variations in line pressure, and the variable accumulator effect would be over and above the effect due to changes in line pressure directly effective on the clutch piston 79 and producing the ultimate variable engaging pressure; however, it is contemplated that changes to third speed ratio can preferably only take place when the line pressure is at its minimum value, and hence the accumulator effect of the brake motor 103 will not be variable. A depression of the accelerator 361 will, of course, cause an increase in line pressure and also in throttle pressure; however, such increased throttle pressure is effective through its conduit 332 on the left end of the 2–3 valve 166 and is effective to hold the 2–3 valve in its second speed condition, so that a change to third speed drive is not made when an increased line pressure exists. As has been explained, when the 2–3 valve piston 293 moves to the left into its FIG. 14A direct drive position, fluid pressure flows through the conduits 86, 482 and 481 to simultaneously disengage the front brake 33 and engage the rear clutch 32, and these conduits are interconnected. By virtue of the orifice 328, pressure applied to the face 98a of the front brake piston 98 and pressure on the clutch piston 79 build up simultaneously. The manner in which these pressures build up is controlled by the force on the piston 98 tending to hold it in its brake engaged position which force is the difference between the force due to line pressure applied to the face 98b of the piston 98 and the force due to the spring 99. As is illustrated with reference to FIG. 33 which applies in particular to the specific embodiment of the invention mentioned above, pressure on the piston face 98a and clutch piston 79 increases rapidly at first, for approximately a half second, with "0" time denoting the particular instant the 2–3 valve piston has moved into its FIG. 14A direct drive position. At this time, the pressure overcomes the force holding the brake piston 98 to the limit of its movement to the right, and the piston 98 starts to move. During movement of the piston 98, between about ½ and 2 seconds as seen on the graph, the pressure applied to the piston 79 and piston face 98a increases quite gradually as seen in FIG. 33, due to the increasing fluid storage space in chamber 101 in the brake servomotor 103, and the actual transition between second and third speed drives takes place at this time during this gradual pressure increase. Since the pressure increases quite gradually at this time, the speed transition is correspondingly smooth and gradual. When the piston 98 has completed its brake disengaging movement and the speed transition has been completed, the pressure applied to the clutch piston 79 and piston face 98a increases to the full value of line pressure at the same rate as in the first ½ second. If the line pressure were higher, the actual pressures at which the piston 98 moved and at which the actual speed change occurred would be higher; however, as has been stated, in the preferred embodiment of the invention, the line pressure is at its minimum before the 2–3 valve shifts to third speed position, and the pressure on the piston face 98a and on the piston 79 at which the actual transition in drive occurs remains the same.

The transmission may be forced down in speed ratio from third speed drive to intermediate speed drive, while the transmission is driving in its high speed ratio, by moving the accelerator 361 to its forced downshift position as is illustrated in FIGS. 15A, 15B and 15C. The accelerator is moved through its open throttle position, in which the engine throttle valve 362 is in a substantially open position and is at a slight angle to the vertical axis of the carburetor passage 362a in which the valve 362 is disposed, to the forced downshift position of the accelerator, in which the throttle valve is at substantially the same slight angle to this vertical axis but is tilted in the opposite direction (see FIG. 11D for illustrations of these positions of the valve 362). Movement of the accelerator 361 from its open throttle position to its forced downshift position moves the land 347 of the downshift valve piston 333 off the port 343 to open the conduit 359, which is supplied with line pressure from the conduit 216, to the conduit 327 through the groove 348 and port 344. The changed position of the piston 333, as well as other pistons in the system in FIGS. 15A, 15B and 15C, are indicated by arrows on the pistons with the positions of the pistons being contrasted with their positions in FIGS. 14A, 14B and 14C. Line pressure is thus supplied to the port 302 in the 2–3 valve 166, and fluid under this pressure enters the cavity 297 and acts on the face 316a of the land 316 to augment the action of the springs 325 and 326. The cavity 297 is connected by means of the passage 331 and conduit 330 with the cavity 301 through the port 308, and line pressure is thus also applied to the faces 322a and 323a of the lands 322 and 323 of the piston 294. The line pressure acting on the faces 316a, 322a and 323a tends to move the pistons 293 and 294 to the right against the action of the governor pressure applied to the land faces 316b, 317a and 323b of the lands 316, 317 and 323, respectively, and the fluid latch including the land faces 318a and 317b having line pressure thereon, and the line pressure on the faces 316a, 322a and 323a overcomes the effects of the fluid latch and the governor pressure at the vehicle speed for which FIGS. 15A, 15B and 15C are applicable and moves the pistons 293 and 294 to the right into their intermediate speed positions, shown in FIG. 15A.

The piston 293 in its intermediate speed position in which it is illustrated in FIG. 15A, functions to drain the conduit 86 and connected pistons and conduits through its groove 320. The conduit 86 is connected with the piston 79 of the rear clutch 32, and the fluid applied to the piston 79 drains through the conduit 86, the port 304, the groove 320, the port 305, the conduit 271, the port 259, the groove 268 of the selector valve piston 255 and the bleed port 258 to the sump 184, as is indicated by arrows in FIG. 15A. The clutch 32 is thus disengaged.

The front brake 33 is applied simultaneously with the disengagement of the rear clutch 32 by releasing the fluid pressure on the face 98a of the piston 98 for the brake, the fluid applied to the piston face 98a draining through the conduit 481, the port 473 of the 3–2 control valve 173, the groove 478 of the valve piston 469, the port 474, and the conduit 482 to the conduit 86 and the port 304, as is indicated by arrows in FIGS. 15A and 15B, so that the fluid in the conduit 482 drains to the sump along with the fluid from the clutch piston 79. The release of fluid pressure on the piston face 98a of the piston 98 causes the piston 98 to move rearwardly against the action of the spring 99 due to the action of the line pressure remaining applied on the face 98b of the piston 98 from the conduit 467 and the 1–2 valve 172, and the piston 98 acts through the lever 94 to engage the brake 33. The transmission is then again in intermediate speed drive, with the brake 33 engaged and the clutch 32 disengaged.

The restriction 484 in the conduit 482 functions in this forced down transition by means of the accelerator illustrated in FIGS. 15A, 15B and 15C to delay the application of the front brake 33 with respect to the disengagement of the rear clutch 32. The restriction 484 impedes the flow of fluid through the conduits 481 and 482 from the brake servomotor 103, while no corresponding impediment is in the conduit 86 from the rear clutch piston 79. It will be noted, furthermore, in the intermediate speed position of the piston 293 that the restriction 328 is not effective, since the conduits 482 and 86 discharge exclusive of the conduit 269 in which the restriction 328 is located. This delayed application of the front brake with respect to disengagement of the rear clutch 32 allows the speed of the engine 363 to rise momentarily without substantial loading from the driven shaft 26. As is apparent, when the driven shaft 26 is driven from the engine 363 in intermediate drive, the speed of the drive shaft 25 and of the engine is substantially higher than for direct or third speed drive. This momentary increase in engine speed on this forced down transition by accelerator control allows the engine to obtain approximately the speed at which it will operate to drive the driven shaft 26 in intermediate speed drive a moment later when engagement of the front brake 33 and disengagement of the rear clutch 32 are both completed. The transition from third speed ratio to second speed ratio is thus smoother and more shockless than would be the case if simultaneous disengagement of the rear clutch 32 and engagement of the front brake 33 occurred.

As has been previously described, the throttle pressure in conduit 332 is regulated by the throttle valve piston 335 to increase with the depression of the accelerator 361, and in the forced downshift position of the accelerator, the piston 335 is in contact with and is acted on directly by the downshift valve piston 333 and increases the pressure in the conduit 332 to the maximum which is line pressure. The conduits 483 and 451 are connected with the conduit 332, as has been described, and line pressure is thus applied to the land face 439a of the piston 424 of the low regulator valve 171 holding the piston in the same position in which it is illustrated in FIG. 14B, and line pressure is applied to the face 476a of the piston 469 of the 3–2 control valve 173 for holding the latter piston in the same position in which it is illustrated in FIG. 14B against the action of the spring 479. Since the piston 469 does not move at this time, the conduit 481 drains through the groove 478 of the piston instead of solely through the restricted passage 485 connecting the conduits 481 and 482. The line pressure in conduit 332 is also applied to the TV modulator valve 169 and this valve provides the modulated TV pressure in the conduit 387 which remains at a predetermined limited value.

At the speed of the vehicle in which the control system is in its condition as illustrated in FIGS. 15A, 15B and 15C, the governor pressure in conduit 290 acting on the compensator valve 170 is sufficiently great so that the output pressure of the compensator valve in conduit 420 is equal to line pressure, the compensator valve piston 392 being moved to the limit of its movement to the left as seen in FIG. 15B to admit line pressure from the conduit 418 through the port 403, groove 415 and port 404 to the conduit 420. The pressure applied to the land faces 209a and 208a of the primary main regulator valve piston 194 is thus line pressure, application being made through the conduits 419 and 218, so that the piston 194 tends to move to the right as seen in FIG. 15C to connect the ports 200 and 201 to a greater extent thereby regulating the line pressure in conduit 216 and connected conduits to a minimum. This line pressure from conduit 419 is also applied through conduit 218 to the land faces 244a and 245a of the secondary main regulator valve piston 230 tending to move this valve piston farther to the right against the action of its spring 249 so as to tend to drain fluid from the conduits 250 and 217 to the discharge conduits 251 and 253, respectively, thereby decreasing the pressure in the converter 30 to a minimum. The discharge of the pumps 160 and 161 is sufficiently great so that the secondary main regulator valve piston 230 is moved to the right of its FIG. 14C position to connect the conduits 217 and 251, metering the fluid between the land 244 and an edge of the port 237.

Referring to FIG. 26, it will be observed that the throttle pressure in conduit 332 is line pressure at 100% accelerator movement which is illustrated in FIG. 15C, and the modulated throttle pressure in conduit 387 is at its maximum at 20 lbs. per sq. in. for the particular embodiment of the invention above referred to. Referring to FIG. 30, it will be observed that the compensator pressure in conduit 420 is at a maximum of 75 lbs. per sq. in., which is line pressure for 100% accelerator movement and high vehicle speeds, and referring to FIG. 23, it will be observed that the line pressure in conduit 216 is at its minimum of 75 lbs. per sq. in. for the same conditions. Converter pressure is at its minimum of 32 lbs. per sq. in. for these conditions, as shown in FIG. 27.

The low inhibitor valve 174 is solely governor conscious and has its piston 486 moved to the limit of its movement to the left against the action of the spring 500 in the condition of the hydraulic control mechanism illustrated in FIGS. 15A, 15B and 15C. The low inhibitor valve piston is moved to this limit of its movement in one embodiment of the controls at a vehicle speed of 40 m.p.h. The low inhibitor valve under the conditions illustrated by FIGS. 15A, 15B and 15C, however, has no particular function.

As has just been described, the downshift valve 167 operated by the accelerator 361 is operative to admit line pressure to the land faces 316a and 323a to move the piston 293 of the 2–3 valve 166 to the right into its intermediate speed position against the action of the governor pressure on the land faces 323b and 316b and the fluid latch formed by line pressure effective on the land faces 318a and 317b. When the governor pressure in the conduit 290 and in the connected conduits increases above a certain value, corresponding to some higher speed of the vehicle than that for which the controls are shown in FIGS. 15A, 15B, and 15C, the line pressure on the land faces 316a and 323a applied thereto by the downshift valve 167 is insufficient to move the piston 293 of the 2–3 valve 166 back from its third speed position to its second speed position. Such a critical vehicle speed may be 60 m.p.h. for example, and is a speed of the vehicle beyond which the lower speed ratio is of no substantial effect in providing greater acceleration of the vehicle. Above this critical speed of the vehicle, a movement of the accelerator 361 to its forced downshift position is of no effect in changing the speed ratio of the vehicle from third to second, and the transmission remains in its high speed ratio. Incidentally if the vehicle is accelerated in second speed ratio after a forced down transition from third speed ratio to second speed ratio with the accelerator 361 remaining in its FIG. 15C position, the governor pressure at some higher vehicle speed will increase sufficiently to move the 2–3 valve pistons 293 and 294 to the left against the line pressure on the faces 316a and 323a and automatically change the drive to third speed ratio. In the particular embodiment of the invention mentioned, this occurs at approximately 65 m.p.h.

The transmission is also downshifted from third speed ratio to second speed ratio when the vehicle decreases below a predetermined speed, with the accelerator being in its closed throttle position, and this condition of the hydraulic controls is shown in FIGS. 16A, 16B and 16C. With the accelerator being in its closed throttle position, there is subtsatially no throttle pressure in the conduit 332, and the land 350 of the throttle valve piston 335 substantially blocks the port 340 supplied with line pressure. Since no throttle pressure is supplied through the conduit 332 to the TV modulator valve 169, there is accordingly no modulated TV pressure in conduit 337, and only the governor pressure in conduit 290, which is quite low under the conditions shown in FIGS. 16A, 16B and 16C, is effective on the compensator valve 170. The spring 417 of this valve is effective to hold the piston 392 to the limit of its movement to the left as seen in FIG. 16B, so as to connect the ports 403 and 404 through the groove 415 for supplying line pressure from the conduits 216 and 418 to the output conduit 420 for the compensator valve 170. Line pressure in the conduit 218 connected with the conduit 420 is thus effective on the primary main regulator valve 162 for maintaining the line pressure at a minimum, and the line pressure in conduit 218 is also effective on the secondary main regulator valve 163 for maintaining the converter pressure at a minimum, similarly as in the neutral condition of the transmission and its controls as shown in FIGS. 11A, 11B, 11C and 11D, for example.

The condition of the transmission controls shown in FIGS. 16A, 16B and 16C assumes that the vehicle is gradually decreasing in speed as when it is approaching a stop, for example, and the governor pressure in the conduit 290 and connected conduits is thus steadily decreasing. The transmission is assumed to be preliminarily in its third speed driving condition, as shown in FIGS. 14A, 14B and 14C, with the two clutches 31 and 32 engaged, and when a predetermined decreased vehicle speed is reached, the valve piston 293 of the 2–3 valve 166 moves to the right from its FIG. 14A third speed position to its FIG. 16A second speed position, as indicated by the arrow on this valve piston in FIG. 16A, and any other changes in position of the other pistons in FIGS. 16A, 16B and 16C are indicated in the same manner with respect to their positions shown in FIGS. 14A, 14B and 14C. Before this movement of the shift valve piston 293, the governor pressure in the conduit 290 and applied to the land faces 316b and 323b has been effective to hold the piston 293 in its third speed position; however, upon a decrease in vehicle speed to this predetermined speed, the governor pressure in the conduit 290 has decreased to such an extent that it is no longer sufficient acting on these land faces to hold the piston 293 in its third speed position, and the springs 325 and 326 are then effective to move the piston into its second speed position. The groove 320 in the piston 293 is then effective to drain the conduit 86 and conduit 482 for disengaging the rear clutch 32 and engaging the front brake 33 for breaking the third speed power train and completing the second speed power train, similarly as for a downshift by moving the accelerator to its forced downshift position, as illustrated in FIGS. 15A, 15B and 15C.

Although the front brake 33 is applied with an ultimate pressure (line pressure) that varies in accordance with accelerator depression and which is at a minimum corresponding to the closed throttle position of the accelerator as shown in FIG. 16A, I have found that in order for a smooth change in drive to be made under the conditions of the vehicle as illustrated in FIGS. 16A, 16B and 16C, it is desirable to add an additional restriction to the flow of fluid from the chamber 101 in the front brake servomotor 103 for causing the brake to have a delayed application. The rear clutch 32 is driving in direct drive, with the accelerator released, and is not transmitting much torque, and a complete disengagement of the clutch 32 does not take place until some time later as compared with the condition in which a third speed to second speed change takes place with the engine driving, and for this reason it is desirable to apply the brake 33 at a somewhat later time under the conditions of the vehicle shown in FIGS. 16A, 16B and 16C, for causing a smooth completion of the second speed drive through the transmission. The conduit 86 to the rear clutch piston furthermore is quite tortuous, as may be seen from FIG. 1B, in comparison to the actual conduits 482 and 481 which tends to retard clutch disengaging fluid flow through the conduit 86 as compared to the brake engaging fluid flows through the conduits 482 and 481, and hence the additional restriction 485 has been added for this reason also between the conduits 481 and 482 for released accelerator conditions for similarly retarding flow through these latter conduits so that the brake 33 does not engage too soon with respect to engagement of the clutch 32. In this connection I have provided the 3–2 control valve 173 which controls flow through the restricted passage 485 and adds an extra impedance to the flow of fluid through the conduits 481 and 482 when the accelerator is in its closed throttle position.

As has been previously explained, when the accelerator is in a closed throttle position, there is substantially no throttle pressure present in conduit 332. There thus is no throttle pressure effective on the land face 476a of the 3–2 control valve piston 469, and the spring 479 holds the valve piston at the limit of its movement to the left as seen in FIG. 16B. The valve piston 469, incidentally, is moved against its spring 479 when the accelerator is given any appreciable throttle opening movement. The land 477 in this position of the valve piston blocks the port 473, and thus any fluid from the chamber 101 passing through the conduit 481 may only escape through the restricted passage 485 into the conduit 482. Thus, under the conditions of the vehicle which I illustrated in FIGS. 16A, 16B and 16C, the pressure on the face 98a of the brake piston 98 and which holds the brake 33 disengaged drains away slower than would otherwise be the case and causes a delayed application of the front brake for a smooth completion of the second speed power train through the transmission.

The vehicle may also be operated and started in low range, and the hydraulic control system is shown in this condition in FIGS. 17A, 17B and 17C. Line pressure in this case is provided solely by the front pump 160, the same as for neutral condition of the control system as shown in FIGS. 11A, 11B, 11C and 11D, it being assumed that the vehicle is just starting and is operating at too low a speed for the output pressure of the rear pump 161 to open the check valve 220 so that the rear pump 161 will discharge into the conduit 216.

The manual selector lever 138 is moved by the vehicle operator into its "L" or low range position to condition the transmission and controls for low range operation, and the manual selector valve piston 255 is also thereby moved to its "L" position. The change in position of the piston 255 as well as the change in position of other pistons in the system are indicated by arrows on the pistons in FIGS. 17A, 17B and 17C, with the positions of the pistons in FIGS. 17A, 17B and 17C being contrasted with their positions shown in FIGS. 11A, 11B, 11C and 11D which shows the hydraulic control system in neutral condition. The selector valve piston 255 in its "L" position connects the ports 260, 261 and 262 by means of its groove 267, as shown. The conduit 216 connected with the port 261 thus supplies pressure to the conduit 83 connected with the port 262 and also with the conduit 270 connected with the port 260. The conduit 83, similar to its function in the high range condition of the hydraulic control system, supplies fluid under pressure to the piston 71 for engaging the front clutch 31 and also supplies fluid pressure through the conduit 289 to the governor valve 165. The conduit 468 connected with the conduit 83 supplies line pressure, as in high range operation, to the 1–2 valve 172; however, in low range operation, the 1–2 valve blocks the conduit 468 and its port 460 by its land 461.

The conduit 270 connected with the port 260 is also supplied with line pressure, as has been mentioned, and this conduit is connected with the piston 113 for the rear brake 34 for applying this brake, the connection being through the conduit 502, the port 491, the groove 498 of the low inhibitor valve piston 486, the port 490, the conduit 501, the conduit 449, the port 433, the cavity 428 of the low regulator valve 171, the port 434, and the conduit 450 to the brake piston 113. Both the front clutch 31 and the rear brake 33 are thus applied, and the low speed power train through the transmission is completed. The restriction 505 functions in this case to prevent an unduly rapid drop in line pressure in conduits 501, 502 and 270 when the servomotor 116 is filled with fluid for engaging the brake 34. With the accelerator 361 in its closed throttle position, there is not sufficient power delivered by the engine 363 to actually drive the vehicle even though the low speed power train is completed, and the vehicle may be actually driven in this drive by depressing the accelerator to a medium throttle position for example, in which it is illustrated in FIG. 17C, to increase the speed and power output of the engine 363.

It will be observed that the line pressure applied to the brake piston 113 is applied also to the face 496b of the land 496 and the face 497b of the land 497 of the low inhibitor valve piston 486. Since the land face 497b is greater in area than the land face 496b, the resultant effect of the line pressure in the groove 498 of the low inhibitor valve piston 486 is to provide a force assisting the spring 500 tending to hold the valve piston 486 in its illustrated position at the limit of its movement to the right as seen in FIG. 17B. Governor pressure in the conduits 290 and 503, which increases with vehicle speed is applied to the land faces 497a and 496a, providing a resultant force increasing with vehicle speed tending to shift the valve piston 486 to the left against the action of the spring 500; however, when the vehicle is started in low range, the governor pressure in the conduits 290 and 503 never becomes sufficient to overcome the action of the spring 501 and the action of the line pressure on the land faces 496b and 497b to shift the piston 486 from its illustrated position.

Line pressure is applied to the face 463a of the land 463 of the 1–2 valve piston 452 through the conduit 449. Line pressure is also applied to the land face 461a on the opposite end of the piston 452 through the conduit 468, as has been described. Since the face 463a is larger in diameter than the face 461a, the net effect of the line pressure on the two ends of the piston 452 is to hold the piston in its illustrated position to the limit of its movement to the left as seen in FIG. 17B.

In the condition of the hydraulic transmission controls illustrated in FIGS. 17A, 17B and 17C, the accelerator 361 is in its medium throttle position, and there thus exists in the conduit 332 a throttle pressure which is regulated by the throttle valve 168, the throttle pressure in this conduit being at some intermediate value between zero and line pressure. This throttle pressure is impressed on the face 439a of the land 439 on the low regulator valve piston 424 and holds the pistons 423 and 424 to the limits of their movement to the left as seen in FIG. 17B, and the valve 171 thus allows line pressure to freely flow from the conduit 449 to the conduit 450 for engaging the rear brake 34. This line pressure is applied to the face 441a of the piston 424 and through the conduit 445 is also applied to the land face 436a of the piston 423, as shown. When the pistons 423 and 424 are at the extreme limits of their movement to the left as they are illustrated in FIG. 17B, the low regulator valve 171 has no particular function.

The throttle pressure in conduit 332 is impressed through the conduit 483 on the 3–2 control valve piston 469, so that this valve piston moves to the right to the limit of its movement against the action of the spring 479; however, in the condition of the hydraulic controls illustrated in FIGS. 17A, 17B and 17C, the 3–2 control valve 173 has no particular function.

Line pressure is applied to the face 316a of the land 316 on the 2–3 valve piston 293 and to the land 323a on the 2–3 valve piston 294, and such application of line pressure is from the conduit 270 through the port 345, the groove 348 of the downshift valve piston 333, the port 344, the conduit 327 and the port 302 to the cavity 297 of the 2–3 valve 166. Line pressure is applied to the land face 323a from the cavity 297 through the passage 331 and conduit 330. This application of line pressure to these land faces assures that the valve pistons 293 and 294 of the 2–3 valve 166 will remain in their second speed positions in which they are shown.

Line pressure is applied to the right end of the piston 368 of the TV modulator valve 169 from the conduit 501 and through the conduit 386 and port 372, assisting the spring 385 in holding the piston to the limit of its movement to the left as seen in FIG. 17B. In this position of the piston 368, its groove 384 connects the ports 376, 375 and 374 so that throttle pressure in the conduit 332 connected with the port 375 is supplied also to the conduits 387 and 388 connected respectively with the ports 374 and 376. Throttle pressure is applied also to the face 380a of the land 380 on the TV modulator valve piston 368 through the branch conduit 389 tending to move the piston 368 to the right; however, it is not sufficient to overcome the effect of line pressure applied through the conduit 386 on the right end of the piston 368.

The throttle pressure in conduits 387 and 388 is applied to the faces 407b, 408a, 408b and 409a on the lands 407, 408 and 409 of the compensator valve piston 392, and since the land 408 is larger than the land 407 and the land 409 is larger than the land 408, the net effect of the throttle pressure on the piston 392 is to force it to the right against the action of the spring 417 to the limit of its movement in this direction. The governor pressure in conduit 290 is effective on the piston 393 tending to move it and the piston 392 to the left; however, it is not sufficient to overcome the action of the throttle pressure.

The compensator valve piston 392 in its illustrated position blocks line pressure from the conduit 418 and its port 403 to the port 404 and the connected compensator pressure conduit 420, and there is thus no pressure within the latter conduit. Since there is no pressure in the conduit 420 and connected conduits 419 and 218 applied to the primary main regulator valve 162, there is no counteracting action on the spring 214 of this valve from this source, and the primary main regulator valve functions to provide an increased line pressure, for example, 175 lbs. per sq. in., in the conduit 216. The secondary main regulator valve 163 functions similarly with no fluid pressure in the conduit 218 impressed on it to provide an increased fluid pressure in the converter 30, higher than any provided in high range operation of the transmission. The line pressure in conduit 216 is applied to both the piston 113 for the rear brake 34 and also to the front clutch piston 71, as is shown, and hence increased engaging pressures are provided on both of these friction engaging mechanisms which is sufficient to take the increased torque and reaction for driving through the transmission in low speed ratio. As has been previously explained, for the direction of reaction on the rear brake 34 for the low speed forward drive, the brake band 104 for this brake tends to unwrap, and the torque that must be taken by the band 104 for the low speed ratio is about one and one-half times the torque impressed on the shaft 27. Due to these two facts, the relatively great engaging force on the band 104 due to the increased line pressure in conduit 216, is required for completing the low speed ratio forward drive.

For the particular embodiment of the invention above referred to, the throttle pressure in conduit 332 is shown in FIG. 26, and this remains the same for low range operation as for high range operation, except that its maximum, which is line pressure, is greater. Since line pressure is supplied to the right end of the TV modulator valve, there is no modulated TV pressure for this range. The compensator pressure in low range in conduit 419 is shown in FIG. 31 and may be found on the surface bounded by the points 549, 550, 551 and 552 and on the surface bounded by the points 550, 551, 553 and 554. For an initial portion of the accelerator movement, it will be observed that the compensator pressure remains at a maximum value of 75 lbs. per sq. in. being found on the surface bounded by the points 549, 550, 551 and 552. The greater the speed of the vehicle, the greater the accelerator depression may be with the compensator pressure remaining at this maximum value on this surface, as is apparent from an inspection of this figure. When the accelerator is given an additional small movement, as to provide between 8% and 20% throttle opening at zero vehicle speed, the compensator pressure decreases quickly, being found on the surface bounded by the points 550, 551, 553 and 554. For additional throttle openings beyond 20% at zero speed, for example, and approximately 30% at 50 m.p.h. vehicle speed, the compensator pressure is zero.

For this particular embodiment of the invention, the line pressure in conduit 216 is shown in FIG. 24. The line pressure may be found on the surface bounded by the points 555, 556, 557 and 558, the surface bounded by the points 556, 559, 560 and 557 and the surface bounded by the points 559, 561, 562 and 560. The line pressure, as in other cases, varies inversely as the compensator pressure. For the first portion of the accelerator movement, as to provide throttle openings between 0% and 8% at zero vehicle speed, the line pressure will remain in its minimum value of 75 lbs. per sq. in. on the surface bounded by the points 555, 556, 557 and 558. For additional throttle openings, as between 8% and 15% at zero vehicle speed, the line pressure is found on the surface bounded by the points 556, 559, 560 and 557 and the line pressure increases quickly on this surface from the minimum value of 75 lbs. per sq. in. to the maximum value of 175 lbs. per sq. in. For additional throttle openings, as from 20% to 100% at zero vehicle speed, the line pressure in low range will be found on the surface bounded by the points 559, 561, 562 and 560 and is at its maximum value of 175 lbs. per sq. in. The graph in FIG. 28 showing the variations of converter pressure in low range is quite similar to that showing line pressure. The values shown are only approximate for reasons previously mentioned. For initial throttle openings, the converter pressure is found on the surface bounded by the points 563, 564, 565 and 566 and is at a minimum value of 32 lbs. per sq. in. For additional throttle openings, the converter pressure rises quickly and is found on the surface bounded by the points 564, 567, 568 and 565. For still additional throttle openings, the converter pressure is at its maximum of 56 lbs. per sq. in. and is found on the surface bounded by the points 567, 569, 570 and 568.

The transmission may be changed under manual control while the vehicle is in motion, from high range third speed ratio illustrated in FIGS. 14A, 14B and 14C to low range first speed ratio, below the critical speed of the low inhibitor valve 174, for thereby providing greater engine braking effect on the vehicle. The hydraulic control system in its changed condition corresponding to low range first speed ratio is shown in FIGS. 18A, 18B and 18C and the arrows on various of the pistons in FIGS. 18A, 18B and 18C indicate the changed positions of the pistons with respect to their positions shown in FIGS. 14A, 14B and 14C illustrating the hydraulic control system in its high range third speed condition. For providing this change, the manual control lever 138 is moved from its high range position to its low range position, causing a corresponding movement of the manual selector valve piston 255. When this change is made, the accelerator 361 is assumed to have been previously returned to its closed throttle position, and there is accordingly substantially no throttle pressure in the conduit 332. The line and converter pressures in conduits 215 and 217 are supplied respectively by the front pump 160 and by the rear pump 161, the same as for third speed drive in high range as shown in FIGS. 14A, 14B and 14C.

The movement of the selector valve piston 255 from its "H" position shown in FIG. 14A to its "L" position shown in FIG. 18A, has the effect of blocking the port 263 in the manual selector valve 164 from line pressure in conduit 216 and connecting the port 261 for the conduit 216 with the port 260 and the connected conduit 270. Line pressure in conduit 270 is supplied to the faces 316a and 323a of the 2–3 valve pistons 293 and 294 through the ports 345 and 344 of the downshift valve 167 and the groove 348 of the downshift valve piston 333, the conduit 327, the port 302, the cavity 297, the port 310, the passage 331, the conduit 330 and port 308. The function of the line pressure on the land faces 316a and 323a is to move the 2–3 valve pistons 293 and 294 to the limit of their movement to the right, regardless of the value of the governor pressure acting on these pistons tending to move them in the opposite direction, and any fluid pressure in the conduit 86 may drain to the sump through the ports 304 and 305 of the 2–3 valve 166, the groove 320 of the 2–3 valve piston 293, the conduit 271, the port 259 of the manual valve 164, the groove 268 of the manual valve piston 255 and the bleed port 258 of the manual valve 164. The conduit 86 is connected with the piston 79 for the rear clutch 32, and this clutch is thereby disengaged.

The conduit 482 is connected with the conduit 86, and fluid applied to the brake disapplying face 98a for the front brake 33 is drained through this conduit, the connection being through the conduit 481, the restricted passage 485 to the conduit 482. The manual shift from high range third speed drive to low range first speed drive is assumed to be made with the accelerator 361 in its closed throttle position, so that there is substantially no throttle pressure in the conduit 332, and hence none is applied to the 3–2 control valve piston 469 so that the valve piston 469 is at the limit of its movement to the left, due to the action of its spring 479, whereby the land 477 of the valve piston 469 blocks the port 473. Fluid from the conduit 481 therefore cannot flow through the groove 478 of the valve piston 469; however, for this particular change in drive, the restricted flow through the passage 485 has no particular effect, inasmuch as the front brake 33 is not engaged at any time for making the change in speed ratio.

The line pressure in conduit 270 is also applied to the right end of the TV modulator valve piston 368 augmenting the action of the spring 385 and holding the TV modulator valve piston to the limit of its movement to the left in its non-regulating position. Line pressure from the conduit 270 is supplied to the TV modulator valve through the conduit 502, port 491 of the low inhibitor valve 174, groove 498 of the low inhibitor valve piston 486, port 490, conduit 501, conduit 386 and port 372.

The line pressure in conduit 83 is continued to be supplied to the piston 71 for the front clutch 31 for maintaining the clutch engaged, and the line pressure from conduit 83 is supplied through the conduit 289 to the governor valve 165. The conduit 468 carries line pressure from the conduit 83 to the 1–2 valve 172; however, the conduit 467 connected with the brake applying side 98b of the piston 98 in the servomotor 103 for the front brake 33 is blocked with respect to the conduit 468 carrying line pressure, and the conduit 467 is drained by the 1–2 valve 172, as will now be described.

Line pressure is supplied to the conduit 501 as has been described, and this pressure is applied through the conduit 449 and port 459 of the 1–2 valve 172 to the land face 463a of the 1–2 valve piston 452. The line pressure from the conduit 468 is applied through the port 460 to the opposite land face 461a; however, since the land 463 is larger in diameter than the land 461, the 1–2 valve piston 452 is moved to the left into its position in which it is illustrated in FIG. 18B. In this position, the 1–2 valve piston 452 blocks the port 460 with respect to the port 456, so that the line pressure in conduit 468 is blocked from the conduit 467, and fluid is drained from conduit 467 through the port 456 of the 1–2 valve 172, the groove 464 of the 1–2 valve piston 452, and the bleed port 457. Thus fluid pressure is drained from both sides of the brake piston 98, and this brake remains disengaged due to the action of the spring 99 in making the manually controlled change from high range direct to low range first speed drive.

The line pressure supplied to conduits 501 and 449 through the low inhibitor valve 174 from the conduit 270 is also supplied to the servomotor 116 for the rear friction brake 34 after being regulated to a lower value by the low regulator valve 171 when the hydraulic controls are in their FIGS. 18A, 18B and 18C condition with the accelerator 361 released. As has been explained, there is no throttle pressure in the conduit 332 with the accelerator 361 in its closed throttle position, and there is thus no fluid pressure applied to the land face 439a of the low regulator valve piston 424 tending to hold the piston 424 to the limit of its movement to the left, as is illustrated in FIG. 17B, for example. The line pressure in conduit 449 is supplied through the port 433 to the right end of the low regulator valve 171, and the fluid flows around the reduced end portion 444 of the valve piston 424 and through the port 434 and conduit 450 to the brake piston 113 in the servomotor 116 and acts to move the piston in a brake engaging direction against the action of the spring 115. The same pressure in the conduit 450 which is applied to the brake piston is also supplied through the port 432, the conduit 445 and the port 429 to the land face 436a on the low regulator valve piston 423 and tends to move the piston 423 and thereby the piston 424 to the right to move the land 441 to block the port 434. The valve piston 424 thus has a regulating action, similar to the regulating action of the other regulator valves including the primary main regulator valve 162, providing regulated rear servo brake pressure in the conduit 450 which is at some predetermined lower value than the line pressure in conduits 501 and 449 and which varies along with the line pressure. This reduced fluid pressure on the piston 113 for the rear brake 34 provided under these circumstances assures that the rear brake 34 will be applied with an engaging pressure which is reduced with respect to the pressure used on the brake 34 when the accelerator is in some open throttle position, as for example, under the conditions in which the hydraulic control system is shown in FIGS. 17A, 17B and 17C.

As has been previously explained, the rear brake 34 wraps or is self-energizing for the direction of reaction on it for providing the reverse drive through the transmission from the drive shaft 25 to the driven shaft 26, and the brake is unwrapping or self-deenergizing for the direction of reaction on it for the low speed forward drive from the drive shft 25 to the driven shaft 26. With the accelerator 361 released and a change being made from third speed ratio to first speed ratio, the vehicle tends to drive the engine 363 through the transmission from the driven shaft 26, and when the brake 34 is engaged to complete the low speed forward drive, the direction of reaction on the brake is the same as for reverse drive, and the brake 34 wraps and would engage too abruptly if line pressure were applied to the brake under these conditions. The pressure applied to the brake 34 has thus been regulated by the low regulator valve 171 for reducing the applying pressure of the brake under these circumstances for providing a smooth, gradual completion of the low speed power train.

The restriction 505 in the conduit 501 restricts the flow of line pressure through the conduits 501 and 449 and reduces the initial rate of increase of fluid pressure in the latter conduit, and it thereby reduces the initial rate of increase of regulated rear servo brake pressure in conduit 450 which is regulated by the low regulator valve 171. The restriction 505 thus acts in conjunction with the low regulator valve in providing a gradual engagement of the brake 34 and consequent gradual completion of the low speed forward drive power train. The restriction 446 functions similarly to the restricted passage 215 used in connection with the primary main regulator valve 162 for preventing undesired vibration of the low regulator valve pistons 423 and 424.

As the accelerator is moved toward open throttle position after the movement of the selector lever 138 and the change in speed ratio have been completed to drive the vehicle in first speed, the resulting throttle pressure in conduit 332 acting on the land face 439a of the low regulator valve piston 424 will cause the piston to move to the limit of its movement to the left as seen in the figures out of its pressure regulating position, and the pressure on the piston 113 for the rear brake will be increased to line pressure, substantially as is shown in FIGS. 17A, 17B and 17C. Furthermore, as is shown in these figures the throttle pressure will be applied to the compensator valve 170 through the conduits 387 and 388, moving the compensator valve to a non-regulating position and blocking compensator pressure to conduits 420 and 218, whereby both the fluid pressure in the converter 30 and also the line pressure in conduit 216 and connected conduits and applied to the rear brake piston 113 and front clutch piston 71 will be increased.

For the particular embodiment of the invention above referred to, FIG. 24 may be referred to for an illustration of the manner in which the regulated rear servo brake pressure in conduit 450 varies with vehicle speed and accelerator movement. The regulated rear servo brake pressure may be found on the surface bounded by the points 571, 572, 573 and 574, the surface bounded by the points 572, 575, 576 and 573, and on the surface bounded by the points 575, 561, 562 and 576. At zero vehicle speed, for example, it will be observed that between 0% and approximately 8% throttle opening, the regulated rear servo brake pressure is constant at a minimum value of about 24 lbs. per sq. in. and is found on the surface bounded by the points 571, 572, 573 and 574. For a throttle opening between 8% and about 30%, this pressure is found on the surface bounded by the points 572, 575, 576 and 573 and increases from about 24 lbs. per sq. in. to 175 lbs. per sq. in. For greater throttle openings, the pressure in conduit 450 is the same as line pressure, being at a maximum of 175 lbs. per sq. in., and during this range of throttle openings, the low regulator valve 171 ceases to regulate, and line pressure flows from the conduit 449 freely to the conduit 450, as shown in FIGS. 17A, 17B and 17C, for example. As is illustrated in FIG. 24, the greater the vehicle speed, the greater must be the throttle opening for the regulated rear servo brake pressure to reach its maximum value of line pressure.

The transmission may be changed from high range to low range by means of the manual selector 138 above the critical vehicle speed of the low inhibitor valve 174 which may be, for example, 40 m.p.h., and this valve functions to cause a change in speed ratio from third speed to second speed instead of first speed, so that the braking effect by the engine is not too severe in suddenly reducing the vehicle speed. The condition of the hydraulic control system on this change in condition of the transmission is shown in FIGS. 19A, 19B and 19C, and the changed positions of the various pistons as indicated by the arrows on the pistons are taken with reference to the condition of the control system for third speed high range operation as it is shown in FIGS. 14A, 14B and 14C.

The low inhibitor valve piston 486 is responsive to the governor pressure in conduits 290 and 503 and shifts from its position at the limit of its movement to the right in which it is shown in FIGS. 18B and 14B to the limit of its movement to the left against the action of its spring 500 at the critical vehicle speed. The governor pressure in conduits 290 and 503 is impressed through the port 492, port 493, conduit 504 and port 495 on the right and left ends of the piston 486 of the valve and since the right end is considerably larger in area than the other end, the governor pressure exerts a force on the valve piston tending to move it to the left against the action of its spring 500.

When the manual selector lever 138 is moved from its "H" position to its "L" position, causing corresponding movement of the manual selector valve piston 255, the piston 255 connects the line pressure supply port 261 with the adjacent ports 260 and 262, the same as is shown in FIGS. 18A, 18B and 18C, which illustrate a change from high range to low range below the critical vehicle speed for the low inhibitor valve 174. The port 262 connected with the conduit 83 supplies pressure in the same manner to the front clutch 31 for engaging this clutch, to the governor valve 165 and to the 1-2 valve 172. The conduit 270 connects with the port 261 supplies line pressure as for the FIGS. 18A, 18B and 18C conditions to the low inhibitor valve 174 and the downshift valve 167 and through the latter valve to the 2-3 valve 166. The 2-3 valve pistons 293 and 294 are moved into their second speed positions in the same manner by line pressure as is illustrated in FIGS. 18A, 18B and 18C. The piston 293 of the 2-3 valve functions the same as in FIGS. 18A, 18B and 18C to drain the conduits 86 and 482 to the sump 184 for disengaging the rear clutch 32 and for draining the fluid pressure applied to the disengaging side 98a of the brake piston 98 through the groove 320 of the valve piston 293.

With the vehicle speed being above the critical vehicle speed for the low inhibitor valve 174, the inhibitor valve piston 486 is in its changed position as shown in FIG. 19B and its land 497 blocks the port 491 for the conduit 502. The low inhibitor valve thus does not function to supply fluid pressure through the conduits 501 and 449 to the 1-2 valve 172 or to the low regulator valve 171 as it did in its FIG. 18B position. Since the low inhibitor valve does not supply fluid pressure to the land face 463a of the 1-2 valve piston 452, the pressure in the conduit 468 which is supplied through the port 460 to the face 461a of the 1-2 valve piston 452 holds the 1-2 valve piston 452 to the limit of its movement to the right so that the ports 460 and 456 are connected around the reduced end portion 466 of the 1-2 valve piston. The line pressure in the conduit 468 thus is supplied through the 1-2 valve 172 and through the conduit 467 connected therewith to the brake engaging face 98b of the brake piston 98, moving the piston 98 to the right against the action of its spring 99 so as to engage the front brake 33. Since the front clutch 31 and the front brake 33 are now engaged, the transmission is driving in second speed drive.

In the condition of the transmission and its controls shown in FIGS. 19A, 19B and 19C, the accelerator 361 is depressed to a medium throttle position, and in this position there is a throttle pressure in the conduit 332 and applied to the 2-3 valve 166, the low regulator valve 171, the 3-2 control valve 173, the TV modulator valve 169 and the compensator valve 170, as shown. The compensator valve 170 functions to provide the same line pressure in conduit 216 and connected conduits as is provided for other high range conditions for the same accelerator positions and vehicle speeds. It will be noted in connection with the 3-2 control valve 173 that the throttle pressure in conduit 332 causes the 3-2 control valve piston 469 to be held against the action of its spring 479 at the limit of its movement to the right at seen in the figures, so that the conduits 481 and 482 are connected through the groove 478 of the valve piston, and the fluid pressure on the disapply side 98a of the brake piston 98 is not restricted in its flow by the restricted passage 485.

In the event the speed of the vehicle decreases, while travelling in low range second speed illustrated in FIGS. 19A, 19B and 19C, so as to reduce the governor pressure in conduit 290 sufficiently, the low inhibitor valve piston 486 will shift to its FIG. 18B position due to the action of the spring 500, and the system will then go into its FIG. 18A, 18B and 18C condition with the drive being in low speed. An automatic change from second speed drive to first speed drive will be made when the low inhibitor valve moves in this manner.

The transmission may be changed from high range second speed ratio to low range first speed ratio by moving the selector 138 from its "H" position to its "L" position, assuming that when the vehicle is traveling in the high range, the vehicle speed is not sufficient to cause an upshift from second speed ratio to third speed ratio. The condition of the hydraulic control system, when in its first speed ratio condition after this change, is shown in FIGS. 20A, 20B and 20C, and the changed positions of the various pistons, with reference to their positions in the second speed condition of the hydraulic control system shown in FIGS. 13A, 13B and 13C are indicated by arrows on the pistons in FIGS. 20A, 20B and 20C. It has been assumed that the change in drive is made after the accelerator 361 has been released to its closed throttle position.

Movement of the manual selector lever 138 from its "H" position to its "L" position causes corresponding movement of the manual selector valve piston 255 so as to connect the ports 262, 261 and 260 by means of the groove 267 and supply line pressure to the conduit 83 connected with the port 262 and the conduit 270 connected with the port 260. Line pressure in the conduit 83 is supplied, as in the condition of FIGS. 18A, 18B and 18C, to the front clutch 31 to keep it engaged, to the governor valve 165 and to the 1–2 valve 172, and the line pressure in the conduit 270 is supplied as in the condition of FIGS. 18A, 18B and 18C to the low inhibitor valve 174, the TV modulator valve 169 and the 1–2 valve 172 through the low inhibitor valve, the downshift valve 167 and through the latter valve to the 2–3 valve 166. The accelerator 361 is released to its closed throttle position prior to movement of the manual lever 138, and the ultimate positions of the pistons and the values of the various pressures are the same after low speed ratio has finally been established as in the FIGS. 18A, 18B and 18C condition of the controls.

When the manual selector lever 138 is moved from its "H" to its "L" position, after the accelerator 361 has previously been released and the vehicle is traveling at a relatively low speed in second speed ratio, the line pressure admitted to conduit 270 from the manual selector valve 164 flows, as when a similar change is made from third speed to first speed, as illustrated in FIGS. 18A, 18B and 18C, through the conduit 502, the low inhibitor valve 174, the conduit 501 having the restriction 505 therein, the conduit 449 to the right end of the 1–2 valve 172 and through the low regulator valve 171 and the conduit 450 to the servomotor 116 for the rear brake 34. The pressure in conduit 450 is regulated as in FIGS. 18A, 18B and 18C by the low regulator valve 171. Since the transmission has previously been in second speed ratio as illustrated in FIGS. 13A, 13B and 13C, there has been no pressure on the disapply side 98a of the piston 98 in the servomotor 103 for the front brake 33, as there is for high speed drive through the transmission (see FIGS. 14A, 14B and 14C), and a disengagement of the front brake 33 for breaking the second speed power train is obtained by draining the cavity 102 in the servomotor 103 for the change from high range second speed ratio to low range first speed ratio.

The 1–2 valve 172 functions to cause a certain variable overlap between the engagement of the front brake 33 completing the second speed drive and the rear brake 34 completing the low speed drive and acts as means in addition to the low regulator valve 171 and the restriction 505 for obtaining a smooth and gradual change from second speed ratio to first speed ratio. As has been previously explained, the restriction 505 in the conduit 501 restricts the flow of line pressure through the conduits 501 and 449 and controls the initial rise of regulated rear servo brake pressure in the conduit 450 which is decreased from line pressure by the low regulator valve 171.

The pressure in conduit 449, which, on the movement of the selector 138, increases from zero to full line pressure gradually due to the restriction 505, is applied through the port 459 on the right end of the piston 452, and line pressure without this variation continues to be applied through the conduit 468 to the left end of the 1–2 valve piston 452 in the same manner as in the second speed condition of the controls as shown in FIGS. 13A, 13B and 13C, and until the 1–2 valve piston 452 shifts to the limit of its movement to the left, as will be described, the ports 456 and 460 supply the line pressure from the conduit 468 to the conduit 467 and the brake apply side 98b of the brake piston 98 for maintaining the second speed brake 33 engaged. When the pressure in the conduits 501 and 449 which is applied to the right end of the 1–2 valve piston 452 through the port 459 increases under the control of the restriction 505 to a predetermined value corresponding to a predetermined increase in regulated rear servo brake pressure in the conduit 450 and a predetermined partial engagement of the rear brake 34, the force due to the pressure on the right end of the piston 452 tending to move the piston 452 to the left becomes greater than the force due to the line pressure impressed on the left end of the piston tending to hold the piston 452 to the limit of its movement to the right, and the 1–2 valve piston 452 shifts to the left to the limit of its movement and blocks the port 456 with respect to the line pressure supply port 460. Upon this shift of the 1–2 valve piston 452, the conduit 467 connected to the apply side 98b of the brake piston 98 is connected to drain through the groove 464 of the 1–2 valve piston 452 and through the port 457 of the 1–2 valve, and disengagement of the brake 33 is initiated. Thus, it will be apparent that the 1–2 valve 172 functions to start disengagement of the front brake 33 by draining the conduit 467 to the sump 184 at a time when the rear brake 34 has reached a predetermined engagement. Disengagement of the second speed brake continues until complete, and engagement of the low speed brake 34 continues from the partial engagement at which disengagement of the brake 33 is begun until engagement of the brake 34 is complete, and the brakes 33 and 34 thus overlap in engagement.

The 1–2 valve piston 452 shifts from its FIG. 13B second speed position to its FIG. 20B first speed position to initiate disengagement of the front brake 33 at different fluid pressures on its right end corresponding to different regulated rear servo brake pressures and different engagements of the brake 34, depending on variations in line pressure impressed on its left end. As has been hereinbefore explained, the line pressure varies both with the vehicle speed and with the position of the accelerator 361. The line pressure increases with accelerator depression and decreases with increases in vehicle speed. The pressure on the right end of the 1–2 valve piston 452 before it shifts to the left must increase to a greater value corresponding to a greater regulated rear servo brake pressure and a greater engagement of the brake 34, the higher the line pressure is that is impressed on the left end of the piston 452. Thus, the greater the depression of the accelerator 361 is with a resultant higher line pressure, the greater must be the engagement of the rear brake 34 before initiation of disengagement of the front brake 33 occurs with a shift of the 1–2 valve piston 452. The greater the vehicle speed of the vehicle is, the less must be the pressure on the right end of the piston 452 and consequently the less the engagement of the rear brake 34 must be before the 1–2 valve piston 452 shifts to initiate disengagement of the front brake 33. Thus, the overlap of engagement of the brakes 33 and 34 is increased with accelerator depression and is decreased with increases in vehicle speed. The 1–2 valve 172 is constructed to operate in this fashion, since, the greater the depression of the accelerator is, the greater in general is the torque transmitted through the transmission, and the greater will be the tendency for the engine 363 to operate without restraint and hence the overlap between the brakes 33 and 34 is increased, while the arrangement still provides a smooth change in drive from the second speed ratio to the first speed ratio. The greater the vehicle speed is, the less in general will be the torque conversion in the hydraulic torque converter 30 and the less will be the torque transmitted through the transmission. Hence the overlap of engagement between the brakes 34 and 33 is decreased with increases in vehicle speed by the 1–2 valve 172 while still providing the desirable smooth change in drive from second speed ratio to first speed ratio. The 1–2 valve 452 thus provides an overlap between the engagements of the brakes 33 and 34 that varies with accelerator depression and vehicle speed, providing a smooth change from second speed drive to first speed drive under all conditions.

Although a change from low range first speed to high range second speed by a movement by the manual selector lever 138 from its "L" to its "H" positions below a predetermined vehicle speed, for example, 15 m.p.h., is not illustrated specifically, it will be apparent, particularly with reference to FIGS. 20A, 20B and 20C that, when the conduits 449, 501, 502 and 270 are drained to the sump through the port 260, the groove 268 and the port 258 of the manual selector valve 164 on this movement of the latter valve, the 1–2 valve piston 452 will not shift to the right to commence engagement of the second speed brake 33 until the pressure applied to the right end of the 1–2 valve piston 452 and the corresponding regulated rear servo brake pressure in conduit 450 and the pressure of engagement of the first speed brake 34 decrease to predetermined values. On such a decrease in fluid pressure applied to the right end of the 1–2 valve piston 452, the line pressure applied to the left end of the 1–2 valve piston 452 overcomes the force due to the declining pressure on the right end of the piston 452 and the 1–2 valve piston 452 moves to the right to the limit of its movement and connects the line pressure in the conduit 468 with the conduit 467 connected with the apply side 98b of the brake piston 98 to commence application of the brake 33. The line pressure varies, as has been mentioned above, and the values of the declining pressure on the right end of the 1–2 valve piston 452 and the resultant engagement of the low speed brake 34 vary also before a shift from the FIG. 20B low speed position to the FIG. 13B second speed position of the piston 452 occurs. The line pressure increases with accelerator depression and decreases with increases in vehicle speed, and accordingly the fluid pressure on the right end of the 1–2 valve piston 452 is at a higher value with a resultant higher engaging pressure of the brake 34 with a depressed accelerator position and is at a comparatively lower value with a corresponding lower engaging pressure of the brake 34 with higher vehicle speeds before the 1–2 valve piston moves from its FIG. 20B first speed position to its FIG. 13B second speed position to initiate engagement of the second speed brake 33. The 1–2 valve in this case thus also provides an overlap of engagement between the brakes 33 and 34 which varies with line pressure and with accelerator depression and vehicle speed and works for a desirably smooth gradual change from the low speed drive to the second speed drive under all conditions.

Reverse drive through the transmission is obtained by moving the selector lever 138 into its "R" position causing the manual selector valve piston 255 to move into its corresponding "R" position. The condition of the hydraulic control system in reverse drive with the accelerator in a medium throttle position and with the vehicle in motion at a speed of 15 m.p.h., for example, is shown in FIGS. 21A, 21B and 21C. The changed position of the piston 255, as well as the changed positions of other pistons in the system, are indicated by arrows on the pistons in FIGS. 21A, 21B and 21C, with the pistons being assumed to have original positions in which they are shown in FIGS. 11A, 11B, 11C and 11D for the neutral condition of the system.

The selector valve piston 255 in its "R" position as shown in FIG. 21A, connects the ports 259, 260 and 261 by means of its groove 268. Line pressure exists in the conduit 216 connected with the port 261 and is supplied through the ports 260 and 259 to the conduits 270 and 271 respectively. The line pressure in conduit 216 is provided solely by the front pump 160, since in reverse drive the gears 186 and 187 of the rear pump 161 rotate in the reverse direction tending to pump any fluid in the conduit 193 back into the sump 184 through the conduit 192. The check valve 220 in the conduit 193 is closed and prevents any such pumping by the pump 161. The front pump 160 acts in substantially the same manner in the reverse condition of the hydraulic control system as in the neutral condition of the system which is illustrated in FIGS. 11A, 11B, 11C and 11D in constituting the sole supply of line pressure for the conduit 216 and connected conduits. The primary main regulator valve 162 functions as in the neutral condition of the transmission for regulating the line pressure in conduit 216, and the secondary main regulartor valve 163 functions as in the neutral condition of the transmission to regulate the fluid pressure in the hydraulic converter 30. There is substantially no fluid under pressure in the compensator conduits 420, 419 and 218, as will be described, and the regulator valves 162 and 163 function as has been described in connection with FIGS. 17A, 17B and 17C to provide maximum line pressure and a maximum pressure in the converter.

Line pressure in the conduit 270 is supplied to the low inhibitor valve 174 and the downshift valve 167 and to the TV modulator valve 169, the 1–2 valve 172 and the low regulator valve 171 through the conduit 502, the low inhibitor valve 174 and conduits 501, 449 and 386, as has been described in connection with the low range conditions of the hydraulic control system as illustrated in FIGS. 18A, 18B, 18C and 20A, 20B and 20C. The application of line pressure to the right end of the TV modulator valve piston 368 augments the action of the spring 385 in holding the valve piston to the limit of its movement to the left, so that its groove 384 connects the ports 374, 375 and 376. The throttle valve 168 functions as before, when the accelerator 361 is depressed, to provide a throttle pressure in conduit 332, and this throttle pressure is supplied to the land faces 409a and 403a of the compensator valve piston 392 through the ports 374, 375 and 376 and the conduits 387 and 388 to hold the compensator valve piston 392 to the limit of its movement to the right as seen in the figures against the action of its spring 417. The lands 410 and 411 of the piston 392 block the line pressure port 403 of the compensator valve 170 from the port 404 of the valve connected with the compensator conduit 420, and there thus exists no compensator pressure in this conduit, so that the line pressure in conduit 216 is regulated by the primary main regulator valve 162 to a maximum value, and the pressure in the converter 30 is regulated by the secondary main regulator valve 163 to a maximum. The action of the compensator valve 170 in providing no compensator pressure in the conduit 420 is similar to its action in low range condition of the vehicle as illustrated in FIGS. 17A, 17B and 17C; however, unlike the condition of the hydraulic system in FIGS. 17A, 17B and 17C, there is no governor pressure present in the conduit 290 tending to cause the compensator valve 170 to regulate at higher vehicle speeds. This is due to the fact that in the reverse position of the selector valve piston 255, the conduits 83 and 289 for feeding line pressure to the governor 165 are not connected with the conduit 216 constituting the source of line pressure. There thus is no pressure in the compensator conduit 420 regardless of the speed which the vehicle reaches in reverse drive, and the line pressure and converter pressure remain at their maximum values regardless of vehicle speed.

The line pressure in conduit 270, and applied to the downshift valve 167 flows through the port 344, groove 348 of the valve piston 333, port 345, conduit 327 and port 302 to be applied to the face 316a of the 2–3 valve piston 293 to assist the spring 325 in holding the valve piston 293 to the limit of its movement to the right in which it is illustrated. This action is the same as for low range operation as illustrated in FIGS. 18A to 18C 19A to 19C, and 20A to 20C, although for reverse drive, no governor pressure in conduit 290 exists, as has been described, tending to move the pistons 292, 293 and 294 to the left. The line pressure applied to the right ends of the 1–2 valve 172 and the low regulator valve 171 moves the 1–2 valve piston 452 to the limit of its movement to the left as seen in the figures and tends to move the piston 424 of the low regulator valve 171 in this direction also. As will be hereinafter described, line pressure is also applied to the face 439b of the piston 424, so that this movement of the piston 424 actually does not take place.

Line pressure from the selector valve 164 in the conduit 271 flows through the port 305 for the 2–3 valve 166, the groove 320, the port 304 and the conduit 86 to the piston 79 for the rear clutch 32 for applying this clutch. Line pressure in conduit 86 also, incidentally, flows through the conduit 482, the port 474, the groove 478 of the 3–2 control valve piston 469, the port 473 and the conduit 481 to the disapply side 98a of the brake piston 98; however, since there is no pressure on the opposite, apply side 98b of the piston 98, this pressure has no particular function inasmuch as the spring 99 also is effective for maintaining the front brake 33 disengaged.

The conduit 447 is connected with the conduit 271, and line pressure is applied through the conduit 447 to the face 439b of the land 439 of the low regulator valve 171. Throttle pressure is present in the conduits 332 and 451, and throttle pressure is thus applied through the port 435 on the face 439a of the land 439 and on the face 440a of the land 440 of the low regulator valve 171. Line pressure is applied through the conduit 448 on the land faces 440b and 441a, and, as has been previously described, line pressure is applied through the conduit 449 on the right end of the low regulator valve piston 424. Since the line pressure is greater than throttle pressure, the valve piston 424 is held to the limit of its movement to the right as seen in FIG. 21B, and, in this position of the piston 424, line pressure flows from the conduit 448 through the port 431, the groove 443 and the port 434 to the conduit 450 and the piston 113 for applying the rear brake 34 by line pressure. Since the rear clutch 32 and the rear brake 34 are both engaged by line pressure which is, incidentally, at its maximum value, the reverse drive power train through the transmission is completed.

Since line pressure is applied to the face 439b on the land 439 of the low regulator valve 171, the low regulator valve never functions to provide regulated rear servo brake pressure in the conduit 450 for reverse drive, regardless of the position of the accelerator 361 and the value of the throttle pressure in conduits 332 and 451 applied to the land face 439a of the low regulator valve.

The compensator pressure for reverse drive for the particular embodiment of the invention previously mentioned is shown in FIG. 26 and, as seen from this figure, it remains at its maximum value of 75 lbs. per sq. in. for throttle openings between 0% and 8%; it decreases from its maximum value of 75 lbs. per sq. in. to zero pressure for throttle openings between 8% and 15%; and for additional throttle openings the compensator pressure is zero. As has been explained, there is no governor pressure for reverse drive and hence the compensator pressure does not vary with vehicle speed.

The line pressure in reverse drive, as for the other drives, varies inversely with compensator pressure and is shown in FIG. 25. From this figure, it may be seen that the line pressure remains at its minimum of 75 lbs. per sq. in. for throttle openings between 0% and 8% and increases from its minimum value of 75 lbs. per sq. in. to its maximum value of 175 lbs. per sq. in. for throttle openings between 8% and 15%, and it remains constant at its maximum value of 175 lbs. per sq. in. for additional throttle openings. The converter pressure also varies inversely as the compensator pressure and its variations are shown in FIG. 29. For throttle openings between 0% and 8% the converter pressure remains at its minimum value of 32 lbs. per sq. in.; for throttle openings between 8% and 15%, the converter pressure increases from its minimum value of 32 lbs. per sq. in. to its maximum value of 56 lbs. per sq. in.; and for additional throttle openings, the converter pressure remains at its maximum value of 56 lbs. per sq. in.

My improved transmission controls advantageously provide low, intermediate and high speed forward drives and a reverse drive each completed by a friction engaging mechanism, as contrasted with a positive brake or a positive clutch, so that each of these drives can be gradually and smoothly completed. The system includes also mechanism for automatically changing between the intermediate and high speed drives in response to changes in torque delivered by the vehicle engine as indicated by the depression of the vehicle accelerator and changes in vehicle speed. My transmission control system also advantageously includes means for increasing the pressure of engagement of these friction engaging mechanisms with depression of the vehicle accelerator, so that these engaging mechanisms may have the requisite high capacity necessary for the increased torque delivered by the vehicle engine with increased accelerator depression and also provide a gradual completion of the respective power trains with relaxed accelerator positions. The transmission in its preferred form includes a hydraulic torque converter connected in series with gearing controlled by the friction engaging mechanisms, and this increase of engaging pressure is particularly necessary with this arrangement due to the torque conversion by the hydraulic torque converter with increased accelerator depression.

The transmission also includes means for reducing the engaging pressures of these friction mechanisms with increases in vehicle speed for reducing the output pressures of the pumps in the system and the power required for driving these pumps. The high engaging pressures are not required in general for the higher speeds of the vehicle since for these higher speeds the hydraulic torque converter is no longer converting torque and is acting as a simple fluid coupling.

My improved transmission control mechanism also includes means for varying the fluid pressure in the hydraulic torque converter with the vehicle speed and with the depression of the vehicle accelerator. In general, the converter will convert torque at lower vehicle speeds and with increased accelerator depressions, and my control mechanism accordingly increases the fluid pressure in the converter either with increased accelerator depression or with decreases in vehicle speed. I have found that lower charging pressures of the hydraulic torque converter may be used when the torque converter is acting as a fluid coupling instead of converting torque.

The transmission control mechanism includes a simple system for varying the engaging pressure for the friction engaging mechanisms and for varying the fluid pressure in the torque converter in the manner just mentioned which includes a regulating relief valve for each of these pressures, a compensator valve providing a compensating pressure acting on both of these relief valves, a governor valve providing a governor pressure that increases with the vehicle speed and is applied to the compensator valve and a throttle valve that provides a throttle pressure that increases with accelerator depression and is applied to the compensator valve. The compensator pressure will thus change inversely as the converter pressure and as the pressure for engaging the friction engaging mechanisms, namely, the compensator pressure will decrease with accelerator depression and will increase with vehicle speed.

The hydraulic control system also includes the TV modulator valve which is active in high range for restricting the throttle pressure applied to the compensator valve to a predetermined maximum and which allows full throttle pressure application to the compensator valve in low range or first speed drive for thereby providing higher pressures for engaging the friction engaging mechanisms for low range.

The transmission preferably includes a friction brake for completing both the low speed forward and reverse drives, the reaction on which, for reverse drive, is about twice that on it for the low speed forward drive. The brake has thus been constructed so as to wrap or self-energize for the direction of reaction for reverse drive, and the TV modulator valve has been so arranged as to provide the high fluid pressure effective on the brake, so that the brake has the capacity for completing both the low forward and reverse drives.

The transmission controls advantageously also include the low regulator valve which reduces the pressure on the forward and reverse brake when this brake is engaged for completing the low speed forward drive with the vehicle accelerator being in a closed throttle position whereby a smooth change in drive may be made from a higher forward speed ratio to the low speed forward ratio with the accelerator released. Such a smooth change in drive would not ordinarily otherwise be obtained, since under these circumstances the direction of reaction on the forward and reverse brake will be in the wrapping or self-energizing direction when the brake is engaged.

The 3–2 control valve advantageously renders effective the restricted passage 485 for delaying the engagement of the front brake 33 when a change in drive is made from the high speed forward drive to the intermediate speed drive, when the accelerator is in a closed throttle position, for rendering this change in drive quite smooth and shockless.

The 1–2 valve 172 advantageously provides a certain overlap between the engagement of the two brakes 33 and 34 when a change in drive is made between the low and intermediate speed ratios. The valve functions under a pressure on its right end that varies in accordance with the pressure applied to the low brake servomotor 116, so that engagement or disengagement of the front brake 33 is not initiated until a predetermined increase or decrease of pressure in the rear brake servomotor 116 is attained. Since line pressure that varies both with accelerator depression and vehicle speed is impressed on the left end of the 1–2 valve 172, the pressure in the rear brake servomotor 116, at which this initiation of engagement or disengagement of the front brake 33 occurs, varies both with accelerator depression and vehicle speeds.

The selector lever 138 and valve 164 are advantageously arranged so that the lever is pulled toward the driver of the vehicle from its neutral position for all forward speed driving and is pushed away from the driver out of its neutral position for driving in reverse. The parking position of the lever 138 is advantageously located at the end of movement of the lever 138 away from the driver, so that it does not obstruct a person's movement into and out of the vehicle between the steering wheel 139 and seat 150.

I wish it to be understood that my invention is not to be limited to the specific constructions and arrangements shown and described except only insofar as the appended claims may be so limited, as it will be apparent to those skilled in the art that changes may be made without departing from the principles of the invention. In particular, I wish it to be understood that the invention is not at all limited to the specific values of the various pressures shown in FIGS. 23 to 33, inasmuch as these particular pressure values were only intended to be illustrative with respect to a certain embodiment of the invention, and the graphs in these figures show a preferred manner in which the various pressures vary with respect to each other and with respect to throttle opening and vehicle speed.

I claim:

1. In transmission mechanism for an automotive vehicle, the combination of a drive shaft, a driven shaft, means for providing a drive between said shafts and including a friction engaging mechanism for completing the drive when engaged, a fluid pressure actuable motor for engaging said friction engaging mechanism, means responsive to the speed of one of said shafts, a source of fluid pressure, and means for operatively connecting said fluid pressure source with said motor to engage said friction mechanism and under the control of said speed responsive means for coordinately decreasing the fluid pressure applied to said motor and thereby the engaging pressure of said friction mechanism with corresponding increases in speed of said last-named shaft and including regulating valve means having a force impressed thereon varying with the speed of said last-named shaft.

2. In transmission mechanism for an automotive vehicle having a driving engine, the combination of a drive shaft adapted to be driven by the engine, a driven shaft adapted to drive the vehicle, means for providing a drive between said shafts and including a friction engaging mechanism for completing the drive when engaged, means variable with engine torque demand, means responsive to changes in speed of one of said shafts, and means controlled by said two last-mentioned means for applying an engaging force to said friction engaging mechanism that varies coordinately with corresponding changes in the torque demand of the engine and with the speed of said last-named shaft.

3. In transmission mechanism for an automotive vehicle having a driving engine, with a throttle control, the combination of a drive shaft adapted to be driven by the engine, a driven shaft adapted to drive the vehicle, means for providing a drive between said shafts and including a friction engaging mechanism for completing the drive when engaged, means variable with the position of said throttle control, means responsive to changes in speed of one of said shafts, and means controlled by said two last-mentioned means for applying an engaging force to said friction engaging mechanism that increases coordinately with movement of said throttle control in a throttle opening direction and decreases with the speed of said last-named shaft.

4. In transmission mechanism for an automotive vehicle having a driving engine with a throttle control, the combination of a drive shaft adapted to be driven by said engine, a driven shaft adapted to drive the vehicle, means for providing a drive between said shafts and including a friction engaging mechanism for completing the drive when engaged, means variable with movement of said throttle control and providing a force variable with throttle control position, means responsive to changes in speed of one of said shafts and providing a force variable with such speed changes, a fluid pressure actuated motor for engaging said friction engaging means, a source of fluid pressure, and means under the combined control of said throttle control variable and speed responsive means for applying a fluid pressure from said source to said motor that increases coordinately with corresponding movement of said throttle control in a throttle opening direction and decreases coordinately with corresponding changes in speed of said last-named shaft and including a regulating valve for the fluid pressure from said source moved in one direction by said throttle control variable force and moved in the opposite direction by said speed variable force.

5. In transmission mechanism, the combination of a drive shaft, a driven shaft, means for providing a drive between said drive shaft and said driven shaft and including a friction engaging mechanism for completing the drive when engaged, a fluid pressure actuable motor for engaging said friction engaging mechanism, a source of fluid pressure including a pump and adapted to be connected with said motor for supplying fluid pressure thereto, and means responsive to the speed of rotation of one of said elements and including a regulator valve for providing a regulated fluid pressure to said motor from said source which coordinately decreases with corresponding increases in speed of said last-named element whereby said pump pumps against a lower pressure for increased speeds of said last-named element.

6. In transmission mechanism, the combination of a drive shaft, a driven shaft, means for providing a drive from said drive shaft to said driven shaft and including a friction engaging mechanism for completing the drive when engaged, fluid pressure actuable motor for engaging said friction engaging mechanism, a source of fluid pressure adapted to be connected to said motor for engaging said friction mechanism, a governor driven in unison with said driven shaft and connected with said pressure source and supplying a fluid pressure which increases with driven shaft speed, and a regulator valve acted on by the speed variable fluid pressure output from said governor and effective to regulate the fluid pressure applied to said motor to coordinately decrease this fluid pressure with corresponding increases in speed of said driven shaft.

7. In transmission mechanism for an automotive vehicle having a driving engine with a throttle control the combination of a drive shaft adapted to be driven by the engine, a driven shaft adapted to drive the vehicle, means for providing a drive between said drive shaft and said driven shaft and including a friction engaging mechanism for completing the drive when engaged, means responsive to the speed of one of said shafts, means variable with changes in throttle control position, and means under the combined control of said speed responsive means and said throttle control variable means and effective on said friction engaging mechanism for coordinately increasing the pressure of engagement of the mechanism with corresponding movement of said throttle control in a throttle opening direction and for coordinately decreasing the pressure of engagement of said friction mechanism with corresponding increases in speed of said one shaft.

8. In transmission mechanism for an automotive vehicle having a driving engine with a throttle, the combination of an accelerator for controlling the throttle, a drive shaft adapted to be driven by the engine, a driven shaft adapted to drive the vehicle, means for providing a drive between said drive shaft and said driven shaft and including a friction engaging mechanism for completing the drive when engaged, a source of fluid pressure, a hydraulic governor driven by said driven shaft and connected with said pressure source for providing a governor pressure that varies with the speed of the driven shaft, valve means connected with said pressure source and with said accelerator for providing a throttle pressure that varies in accordance with the opening of the engine throttle by the accelerator, a fluid pressure actuated motor for engaging said friction engaging means, and means controlled by said accelerator and by said governor for applying a fluid pressure to said motor that coordinately increases with corresponding opening of the engine throttle and coordinately decreases with corresponding increases in the speed of rotation of said driven shaft and including valve means for connecting said fluid pressure source and said motor and subject to said governor pressure tending to move the valve means in one direction and subject to said throttle pressure tending to move the valve means in the opposite direction.

9. In transmission mechanism for an automotive vehicle having a driving engine with a throttle, the combination of a control for the engine throttle, a drive shaft adapted to be driven by the engine, a driven shaft adapted to drive the vehicle, means for providing a drive between said shafts, fluid pressure operated means for completing said drive, a source of fluid pressure adapted to be connected with said fluid pressure operated means, regulating valve means for regulating the pressure from said source applied to said fluid pressure responsive means, regulating valve means under the control of said throttle control and connected with said pressure source for providing a throttle pressure that varies with changes in position of the throttle control, a governor driven in timed relationship with said driven shaft and including regulator valve means for providing a governor pressure that varies with changes in speed of said driven shaft, and means hydraulically connecting said throttle regulating and governor regulating valve means with said first-named regulating valve means so that the pressure applied to said fluid pressure operated means varies coordinately with corresponding changes in driven shaft speed and changes in throttle opening.

10. In transmission mechanism for an automotive vehicle having a driving engine with a throttle, the combination of a control for the engine throttle, a drive shaft, a driven shaft, a fluid pressure operated mechanism for providing a drive between said shafts, a source of fluid pressure, a plurality of regulator valves each providing an output pressure that varies coordinately with changes in force on the valve, a first one of said regulator valves being connected with said pressure source and with said throttle control for providing a first regulated pressure which increases with opening of the throttle, a second one of said regulator valves having said first regulated pressure impressed thereon so as to provide a second regulated pressure that decreases with an increase in said first regulated pressure, a third one of said regulator valves having said second regulated pressure impressed thereon for providing a third regulated pressure that increases with decreases in said second regulated pressure whereby said third regulated pressure increases with throttle opening, and means for applying said third regulated pressure to said fluid pressure operated mechanism.

11. In transmission mechanism, the combination of a drive shaft, driven shaft, a fluid pressure operated mechanism for providing a drive between said shafts, a source of fluid pressure, a plurality of regulator valves each providing an output fluid pressure that varies coordinately with changes in force on the valve, a governor driven by said driven shaft and comprising a centrifugally operated one of said regulator valves connected with said pressure source and providing a governor pressure that increases with driven shaft speed, a second one of said regulator valves having said governor pressure impressed thereon to provide a second regulated pressure that increases with governor pressure, and a third one of said regulator valves having said second regulated pressure impressed thereon for providing a third regulated pressure which decreases with increases in said second pressure, and means for applying said third regulated pressure to said fluid pressure operated mechanism.

12. In transmission mechanism for an automotive vehicle having a driving engine with a throttle, the combination of a control for the engine throttle, a drive shaft adapted to be driven by the vehicle engine, a driven shaft adapted to drive the vehicle, a fluid pressure operated friction engaging mechanism for providing a drive between said shafts, a source of fluid pressure, and a plurality of regulator valves each providing an output pressure that varies coordinately with changes in force on the valve, one of said regulator valves being connected with said pressure source and actuated by said throttle control for providing a throttle pressure that increases with opening of the engine throttle, a second one of said regulator valves being connected with said pressure source and driven by one of said shafts so as to be centrifugally operated for providing a governor pressure that increases with shaft speed, a third one of said regulator valves being connected with said pressure source and actuated by both said throttle pressure and said governor pressure to provide a third regulated pressure that increases with increases in governor pressure and decreases with increases in throttle pressure, and a fourth one of said regulator valves being connected with said pressure source and providing a fourth regulated pressure that is connected with said fluid pressure operated mechanism and controlled by said third regulated pressure so as to provide a fourth regulated pressure that increases with decreases in the third regulated pressure.

13. In transmission mechanism for an automotive vehicle having a driving engine with a throttle, the combination of a control for the engine throttle, a drive shaft, a driven shaft, a fluid pressure operated mechanism for providing a drive between said shafts, a source of fluid pressure, a plurality of regulator valves each providing an output fluid pressure that varies coordinately with changes in force on the valve, a first one of said regulator valves being connected with said pressure source and with said throttle control for providing a first regulated pressure that increases with opening of the engine throttle, a second one of said regulator valves being for providing a second regulated pressure, means hydraulically connecting said first and second regulator valves so that the second regulated pressure increases with increases with said first regulated pressure, and means for hydraulically connecting said second regulated pressure with said fluid pressure operated mechanism.

14. In transmission mechanism, the combination of a drive shaft, a driven shaft, a fluid pressure operated mechanism for providing a drive between said shafts, a source of fluid pressure, a plurality of regulator valves each providing an output fluid pressure that varies coordinately with changes in force on the valve, a governor driven by one of said shafts and comprising a centrifugally operated one of said regulator valves connected with said pressure source and providing a governor pressure that increases with shaft speed, a second one of said regulator valves supplying a second regulated pressure, means hydraulically connecting said regulator valves so that said second regulated pressure decreases with increases in said first regulated pressure, and means for hydraulically connecting said second regulator pressure with said fluid pressure operated mechanism.

15. In transmission mechanism for an automotive vehicle having a driving engine with a throttle the combination of a control for the engine throttle, a drive shaft, a driven shaft, a fluid pressure operated mechanism for providing a drive between said shafts, a source of fluid pressure, a plurality of regulator valve means each providing an output fluid pressure that varies coordinately with changes in force on the valve means, one of said regulator valve means being connected with said pressure source and with said throttle control for providing a first regulated pressure that increases with opening of the throttle, a governor driven by said driven shaft and comprising a centrifugally operated one of said regulator valve means connected with said pressure source and providing a governor pressure that increases with shaft speed, another of said regulator valve means being actuated both by said throttle pressure and said governor pressure for providing a third regulated pressure that decreases with increases in driven shaft speed and increases with increased throttle opening, and means for applying said third regulated pressure to said fluid pressure operated mechanism.

16. In transmission mechanism for an automotive vehicle having a driving engine with a throttle, the combination of a control for the engine throttle, a drive shaft adapted to be driven by the vehicle engine, a driven shaft adapted to drive the vehicle, means for providing a power train between said shafts and including first and second friction engaging mechanisms for rendering the power train effective when both are engaged, means under the control of said throttle control for applying an engaging force to said first friction engaging mechanism that increases with opening of the engine throttle, and means under the control of said throttle control for applying an engaging force to said second friction engaging mechanism that increases with opening of the engine throttle at a different rate than the force on said first engaging mechanism.

17. In transmission mechanism for an automotive vehicle having a driving engine with a throttle, the combination of a control for the engine throttle, a drive shaft adapted to be driven by the driving engine, a driven shaft adapted to drive the vehicle, means for providing a power train between said shafts and including first and second friction engaging mechanisms for rendering the power train effective when both are engaged and so arranged that the engaging pressures for said first friction engaging mechanism may vary less than the engaging pressures for said second engaging mechanism to transmit drives of variable torque from said drive shaft to said driven shaft, means under the control of said throttle control for applying an engaging force to said first one of said friction engaging mechanisms that increases with opening of the engine throttle within certain force limits, and means under the control of said throttle control for applying an engaging force to said second one of said friction engaging mechanisms that increases with opening of the engine throttle between wider limits of engaging forces than the forces applied on said first engaging mechanism.

18. In transmission mechanism for an automotive vehicle having a driving engine with a throttle, the combination of a control for the engine throttle, a drive shaft adapted to be driven by the vehicle engine, a driven shaft adapted to drive the vehicle, means for providing a power train between said shafts and including first and second friction engaging mechanisms for rendering the power train effective when both are engaged and arranged so that the engaging force for said first friction engaging mechanism may vary less than the engaging force for said second friction engaging mechanism with variable torque transmitted from said drive shaft to said driven shaft, means under the control of said throttle control for applying an engaging pressure to the first one of said friction engaging mechanisms that increases with opening of the engine throttle from a certain minimum pressure to a certain maximum pressure, and means under the control of said throttle control for applying an engaging pressure to said second one of said friction engaging mechanisms that increases with opening of the engine throttle from a lower minimum pressure to the same maximum pressure.

19. In transmission mechanism for an automotive vehicle having a driving engine, the combination of a drive shaft adapted to be driven by the vehicle engine, a driven shaft adapted to drive the vehicle, means for providing a power train between said shafts and including first and second friction engaging mechanisms for rendering the power train effective when both are engaged, and means responsive to variations in a driving condition of the vehicle for simultaneously applying engaging forces to said friction engaging mechanisms that vary with the variations in said driving condition with one of the forces varying within wider limits than the other.

20. In transmission mechanism for an automotive vehicle having a driving engine with an accelerator, the combination of a drive shaft adapted to be driven by the vehicle engine, a driven shaft adapted to drive the vehicle, a planetary gear set having a reaction element and two drive transmitting elements one of which is connected to one of said shafts, a friction clutch for connecting the other of said drive transmitting elements with the other of said shafts and a friction brake for said reaction element for rendering a drive effective between said shafts when both said clutch and brake are engaged, means variable with the position of said accelerator, means under the control of said accelerator variable means for applying an engaging force to said friction clutch that increases within certain limits with movement of said accelerator in a throttle opening direction, and means under the control of said accelerator variable means for applying an engaging force to said brake that increases with accelerator movement within wider limits than the force applied to said clutch.

21. In transmission mechanism for an automotive vehicle having a driving engine with a throttle, the combination of a control for the engine throttle, a drive shaft adapted to be driven by the vehicle engine, a driven shaft adapted to drive the vehicle, two planetary gear sets having power transmitting elements and a reaction element, one of said power transmitting elements being connected to one of said shafts, a friction clutch for connecting the other of said power transmitting elements with the other of said shafts and a friction brake for said reaction element which when both are engaged render a power train between said shafts effective, means under the control of said throttle control for applying an engaging force to said friction clutch which increases with throttle opening within predetermined force values, and means under the control of said throttle control for applying an engaging force to said brake that increases with throttle opening and varies within wider limits than the force applied to said friction clutch.

22. In transmission mechanism for an automotive vehicle having an engine with a throttle, the combination of a control for the engine throttle, a drive shaft adapted to be driven by the engine, a driven shaft adapted to drive the vehicle, means providing a power train between said shafts and including a planetary gear set having a power transmitting element and a reaction element, a friction clutch for connecting said power transmitting element with one of said shafts and a friction brake for said reaction element which when both are engaged complete the power train, a fluid pressure actuable piston for engaging said clutch, a fluid pressure actuable piston for engaging said brake, a source of fluid pressure, means including a regulator valve under the control of said throttle control for supplying a fluid pressure from said source to said clutch and brake pistons that increases with opening of the engine throttle the pressure varying within predetermined limits, and means including a second regulator valve also under the control of said throttle control for further reducing the pressure controlled by said first regulator valve and applied to said brake piston so that the pressure applied to the brake piston is initially less than the pressure applied to said clutch piston when the throttle control is in the first part of its movement from a closed throttle position toward an open throttle position.

23. In transmission mechanism for an automotive vehicle having an engine with a throttle, the combination of a control for the engine throttle, a drive shaft adapted to be driven by the vehicle engine, a driven shaft adapted to drive the vehicle, a planetary gear set having two power transmitting elements one of which is connected to said driven shaft and a reaction element, a friction clutch for connecting the other of said power transmitting elements to be driven by said drive shaft, a friction brake for said reaction element, said clutch and brake when both are engaged rendering a power train effective between said drive shaft and said driven shaft through said planetary gear set means under the control of said throttle control for applying an engaging force to said friction clutch that increases between predetermined values with opening of the engine throttle, and means under the control of said throttle control for applying an engaging force to said friction brake that increases with opening of the engine throttle and varies between wider values of engaging force than the force applied to said friction clutch.

24. In transmission mechanism for an automotive vehicle having a driving engine with a throttle, the combination of a drive shaft adapted to be driven by the engine, a driven shaft adapted to drive the vehicle, a planetary gear set having two power transmitting elements one of which is connected with said driven shaft and a reaction element, a friction clutch for connecting the other of said power transmitting elements to be driven by said drive shaft and a friction brake for said reaction element which when both the brake and clutch are engaged render a power train effective between said shafts, a fluid pressure actuable motor including a piston for engaging said clutch, a fluid pressure actuable motor including a piston for engaging said brake, a source of fluid pressure for supplying fluid pressure to said pistons, means under the control of said throttle control for regulating the fluid pressure from said pressure source to said clutch piston so as to increase the pressure applied to the piston to increase with throttle opening and vary between a predetermined minimum value and a predetermined maximum value, and fluid pressure regulating means under the control of said throttle control for regulating the fluid pressure from said source applied to said brake piston to increase with throttle opening and vary from a lower minimum value to the same predetermined maximum value applied to said clutch piston.

25. In transmission mechanism for an automotive vehicle having a driving engine with a throttle control, the combination of a drive shaft adapted to be driven by the engine, a driven shaft adapted to drive the vehicle, a planetary gear set having two power transmitting elements one of which is connected with one of said shafts and a reaction element, a friction clutch for connecting the other of said power transmitting elements with the other of said shafts and a friction brake for said reaction element which when both are engaged render a power train effective between said shafts, means variable with the throttle adjusting movement of said throttle control, said brake having an unwrapping action for the reaction thereon for a drive through the power train from said drive shaft to said driven shaft and having a wrapping action so that it may take a greater reaction for a drive in the opposite direction, means under the control of said throttle control for applying an engaging force to said clutch that increases with the throttle opening movement of said throttle control and varies between predetermined minimum and maximum values, and means under the control of said throttle control for applying an engaging force to said brake that increases with the throttle opening movement of said throttle control and has a greater proportional variation than the force applied to said clutch.

26. In transmission mechanism for an automotive vehicle having a driving engine with a throttle, the combination of a control for the engine throttle, a drive shaft adapted to be driven by the engine, a driven shaft adapted to drive the vehicle, a planetary gear set having two power transmitting elements one of which is connected with said driven shaft and a reaction element, a friction clutch for connecting said drive shaft with the other of said elements and a friction brake for said reaction element which when both are engaged render a power train effective between said shafts, a fluid pressure actuable motor for engaging said clutch, a fluid pressure actuable motor for engaging said brake, said brake being arranged to have an unwrapping action for the direction of reaction on said reaction element for a drive from said drive shaft to said driven shaft through said power train and having a wrapping action so as to be able to take a greater reaction force on said reaction element for a drive in the opposite direction, means under the control of said throttle control for applying an engaging fluid pressure to said clutch motor that increases with opening of the engine throttle and varies between predetermined minimum and maximum values, and means under the control of said throttle control for applying an engaging fluid pressure to said brake motor that increases with opening of the engine throttle and varies between wider minimum and maximum pressures than the limits of pressure impressed on said clutch motor.

27. In transmission mechanism for an automotive vehicle having an engine with a throttle and a control therefor, the combination of a control for the engine throttle, a drive shaft driven by said engine, a driven shaft adapted to drive the vehicle, a planetary gear set having two power transmitting elements one of which is connected to said driven shaft and a reaction element, a friction clutch for connecting said drive shaft and said other power transmitting element for a drive from the former to the latter and a friction brake for said reaction element for rendering a power train effective when both clutch and brake are engaged, said brake being arranged so as to have an unwrapping action for the reaction on said reaction element for a drive from said drive shaft to said driven shaft through said power train and to have a wrapping action so as to be capable of taking a greater reaction force on said reaction element for a drive in the opposite direction, means including a fluid pressure actuable piston for applying said clutch, means including a fluid pressure actuable piston for applying said brake, a source of fluid pressure adapted to be connected to said pistons, and pressure regulating means under control of said throttle control and effective for regulating the pressure from said source applied on said clutch piston so that the pressure increases with opening of the engine throttle and varies from a certain minimum value to a certain maximum value, and additional pressure regulating means under the control of the throttle control for regulating the pressure from said source applied to said brake piston so that the pressure increases with opening of the engine throttle and varies from a lower predetermined minimum value to the same predetermined maximum value as the pressure impressed on said clutch piston.

28. In transmission mechanism for an automotive vehicle having a driving engine with an accelerator, the combination of a drive shaft adapted to be driven by the vehicle engine, a driven shaft adapted to drive the vehicle, means for providing a high speed ratio power train between said shafts, means for providing a low speed ratio power train between said shafts, said last-named means including a friction engaging mechanism for completing the low speed power train when engaged and which is self-energizing for a drive from said driven shaft to said drive shaft and is self-deenergizing for a drive in the opposite direction, means variable with movement of said accelerator in a throttle opening direction, and means under the control of said accelerator variable means for applying an engaging force to said friction engaging mechanism that increases with the movement of said accelerator in a throttle opening direction, whereby, when a change in drive is made from said high speed ratio power train to said low speed ratio power train with the accelerator being in a retracted position, the completion of the low speed drive is relatively gradual and the low speed ratio power train may be effective for a subsequent movement of said accelerator in a throttle opening direction for driving the vehicle without slippage of said friction engaging mechanism.

29. In transmission mechanism for an automotive vehicle having a driving engine with a throttle, the combination of a control for the engine throttle, a drive shaft adapted to be driven by the vehicle engine, a driven shaft adapted to drive the vehicle, means for providing a high speed ratio forward drive power train between said shafts, means for providing a low speed ratio forward drive power train and a reverse drive power train between said shafts and including a planetary gear set having a reaction element and a friction brake for the reaction element for completing the power trains when engaged, said friction brake being self-energizing for the direction of reaction on the reaction element for said reverse drive and being self-deenergizing for the direction of reaction on the reaction element for said low speed forward drive power train, means for selectively changing the drive from said high speed ratio drive to said low speed ratio drive, and means under the control of said throttle control for applying an engaging force to said friction brake for completing said low speed ratio forward drive that increases with the opening of the engine throttle whereby a smooth and gradual change in drive may be made from said high speed ratio power train to said low speed ratio power train and the low speed ratio power train may be subsequently effective for driving the vehicle without slippage of said brake when the throttle control is moved toward an open throttle position.

30. In transmission mechanism for an automotive vehicle having a driving engine with an accelerator, the combination of a drive shaft adapted to be driven by the vehicle engine, a driven shaft adapted to drive the vehicle, means for providing a high speed ratio power train between said shafts, means for providing a low speed ratio power train between said shafts, said last-named means including first and second friction engaging mechanisms for rendering the low speed power train effective when engaged, said second friction engaging mechanism being self-energizing for a drive from said driven shaft to said drive shaft and being self-deenergizing for a drive in the opposite direction, means variable with the movement of said accelerator in a throttle opening direction, means under the control of said accelerator variable means for applying an engaging force to said first one of said friction engaging mechanisms that increases with the movement of the accelerator in a throttle opening direction, means for changing the drive from said high speed ratio drive to said low speed ratio drive, and means under the control of said accelerator variable means for applying an engaging force to said second one of said friction engaging mechanisms that increases with the movement of said accelerator in a throttle opening direction but is variable within a proportionally wider range of force values than the forces impressed on said first friction engaging mechanism whereby a smooth completion of said low speed power train may be made on a change in drive from said high speed ratio power train to said low speed ratio power train.

31. In transmission mechanism for an automotive vehicle having an engine with a throttle, the combination of a control for the engine throttle, a drive shaft adapted to be driven by the vehicle engine, a driven shaft adapted to drive the vehicle, means providing a high speed ratio power train between said shafts, means providing a low speed ratio power train between said shafts, said last-named means including first and second friction engaging mechanism for completing the low speed ratio power train when engaged, said second friction engaging mechanism being self-energizing when the drive is from said driven shaft to said drive shaft and being self-deenergizing when the drive is in the opposite direction, means under the control of said throttle control for applying an engaging force to said first friction engaging mechanism that increases with opening of the engine throttle and varies within predetermined maximum and minimum values, means for changing the drive of the transmission mechanism from said high speed ratio power train to said low speed ratio power train, and means under the control of said throttle control for applying an engaging force to said second of said friction engaging mechanisms that increases with opening of the engine throttle and varies between a wider range of maximum and minimum values than the force applied to said first friction engaging mechanism whereby a smooth completion of said low speed power train may be made when the transmission mechanism is changed in drive from said high speed power train to said low speed power train.

32. In transmission mechanism for an automotive vehicle having a driving engine with a throttle, the combination of a control for the engine throttle, a drive shaft adapted to be driven by the vehicle engine, a driven shaft adapted to drive the vehicle, means for providing a high speed ratio power train between said shafts, means for providing a low speed ratio power train between said shafts and including a planetary gear set having a power transmitting element and a reaction element, a friction clutch for connecting said power transmitting element with said drive shaft and a friction brake for said reaction element which clutch and brake when both are engaged complete the low speed ratio power train, means for changing the drive of the transmission mechanism from said high speed ratio power train to said low speed ratio power train, said brake being arranged to wrap and self-energize when the drive is from said driven shaft to said drive shaft and unwrap to self-deenergize so as to be effective to hold the reaction element with less force when the drive is in the opposite direction, means under the control of said throttle control for applying an engaging force to said friction clutch that increases with opening of the engine throttle and varies between predetermined maximum and minium values, and means under the control of said throttle control for applying an engaging force to said friction brake that increases with opening of the engine throttle and varies between wider maximum and minimum values as compared with the forces impressed on said friction clutch whereby a smooth completion of said low speed power train may be made when the transmission mechanism is changed in drive from said high speed power train to said low speed power train.

33. In transmission mechanism for an automotive vehicle having a driving engine with a throttle, the combination of a control for the engine throttle, a drive shaft adapted to be driven by the vehicle engine, a driven shaft adapted to drive the vehicle, means for providing a high speed ratio power train between said shafts, means for providing a low speed ratio power train between said shafts and including a planetary gear set having a power transmitting element and a reaction element, a friction clutch for connecting said power transmitting element and said drive shaft and a friction brake for said reaction element which when both said brake and clutch are engaged complete the low speed ratio power train, said brake being wrapping to take an increased reaction force on said reaction element when the drive is in said low speed ratio power train from said driven shaft to said drive shaft and being unwrapping and being thus capable of taking a less reaction force when the drive is in this speed ratio power train from said drive shaft to said driven shaft, means for changing the drive of the transmission mechanism from said high speed ratio power train to said low speed ratio power train, a fluid pressure actuated piston for engaging said clutch, a fluid pressure actuated piston for engaging said brake, means under the control of said throttle control for applying an engaging pressure to said clutch piston that increases with opening of the engine throttle and varies between predetermined maximum and minimum values, and means under the control of said throttle control for applying an engaging pressure to said brake piston that increases with opening of the engine throttle and varies from the same predetermined maximum pressure applied to said clutch piston to a lower predetermined minimum pressure than that applied to said clutch piston whereby a smooth completion of said low speed ratio power train may be made by engaging said friction brake when the drive is changed in the transmission mechanism from said high speed ratio power train to said low speed ratio power train.

34. In transmission mechanism, the combination of a drive shaft, a driven shaft, means for providing a forward drive and a reverse drive between said shafts and including a planetary gear set having a reaction element which when held stationary renders both of the power trains effective, the reaction on said reaction element being greater for completing the reverse drive power train than for the forward drive power train for the same torque applied to said drive shaft, and a brake for said reaction element which wraps for the direction of reaction on said reaction element for providing a relatively large braking effect for the reverse drive power train and which unwraps for the direction of reaction on the reaction element in the opposite direction and provides a relatively small braking effect for the forward drive.

35. In transmission mechanism, the combination of a drive shaft, a driven shaft, a planetary gear set having a reaction element and three power transmitting elements one of which is connected to said driven shaft, a pair of clutches for connecting said other two power transmitting elements respectively with said drive shaft so that said reaction element may be held stationary to render both a forward drive power train and a reverse drive power train effective depending on which of said clutches is engaged, a friction brake for said reaction element which is wrapping or self-energizing for the direction of reaction on the reaction element for completing the reverse drive power train and which is unwrapping or self-deenergizing for the direction of reaction in the opposite direction for completing the forward drive power train, means for conditioning the transmission mechanism for a drive either through said forward drive power train or through said reverse drive power train by engaging one or the other of said clutches, and means under the control of said conditioning means for automatically applying engaging forces on said brake to complete said power trains with the engaging force when the transmission mechanism is conditioned for the forward drive power train being smaller as compared with the force on the brake for the reverse drive power train, whereby a gradual and smooth completion of said forward drive power train may be obtained by an engagement of said brake.

36. In transmission mechanism for an automotive vehicle having a driving engine, the combination of a drive shaft, a driven shaft, a planetary gear set connectible between said shafts and having three power transmitting elements one of which is connected to said driven shaft and a reaction element which may be held stationary to complete either a forward drive power train or a reverse drive power train depending on which of said other two power transmitting elements are connected to said drive shaft, a clutch for connecting each of said two last named power transmitting elements to said drive shaft, a brake for said reaction element which wraps or is self-energizing to provide a greater braking action for the direction of reaction on the reaction element to complete the reverse drive power train and which is unwrapping or self-deenergizing for providing a smaller braking force for the direction of reaction on the reaction element for the forward drive power train, means variable with the torque demand of said engine, means for conditioning the transmission mechanism for a drive through either said forward drive power train or said reverse drive power train by engagement of one or the other of said clutches, and means under the control of said torque demand variable means and said conditioning means for applying an engaging force to said friction brake that increases with the torque demand of said engine for both of said drives and increases in this manner for said forward drive power train from a lower minimum engaging force than for said reverse drive power train.

37. In transmission mechanism for an automotive vehicle having a driving engine with a throttle, the combination of a drive shaft adapted to be driven by the engine, a driven shaft adapted to drive the vehicle, a control for the engine throttle, means for providing a forward drive power train and a reverse drive power train between said shafts and including a planetary gear set connectible between said shafts and having a reaction element which may be braked to complete either of said power trains, a friction brake for said reaction element which is wrapping or energizing to provide a relatively great braking effect for the direction of reaction on the reaction element for said reverse drive and which is unwrapping or self-deenergizing to provide a relatively smaller braking effect for the direction of reaction for said forward drive power train, means for conditioning the transmission mechanism either for said reverse drive power train or said forward drive power train, a fluid pressure actuable piston for engaging said friction brake, a source of fluid pressure, and valve means under the control of said conditioning means and said throttle control for providing a brake engaging fluid pressure to said brake piston that increases with opening of the engine throttle with the minimum predetermined fluid pressure for the forward drive power train being less than the minimum predetermined fluid pressure applied to said brake piston for said reverse drive and with the maximum brake engaging fluid pressures applied to said piston being the same for both the forward and reverse drive power trains.

38. In transmission mechanism, the combination of a drive shaft, a driven shaft, a planetary gear set connectible between said shafts and having three power transmitting elements one of which is connected to said driven shaft and the other two of which may be driven and a reaction element which may be braked to complete either a forward drive power train or a reverse drive power train depending on which of said two last named power transmitting elements are driven, a clutch for connecting each of said two last named power transmitting elements with said drive shaft, means for conditioning the transmission mechanism for a drive either through said forward drive power train or through said reverse drive power train by engaging one or the other of the clutches, and means under the control of said conditioning means for applying a greater brake engaging force to said brake for said reverse drive power train than for said forward drive power train whereby a smooth engagement of the forward drive power train may be obtained by engagement of said brake.

39. In transmission mechanism for an automotive vehicle having a driving engine with a throttle, the combination of a drive shaft adapted to be driven by the vehicle engine, a driven shaft adapted to drive the vehicle, a control for the engine throttle, a planetary gear set having three power transmitting elements one of which is connected to said driven shaft and having a reaction element, a clutch for connecting each of said other two power transmitting elements with said drive shaft to be driven thereby, said reaction element when braked rendering a forward drive power train or a reverse drive power train effective between said shafts depending on which of said clutches is engaged, means for conditioning the transmission mechanism for a drive either in said forward drive power train or in said reverse drive power train by engaging one or the other of said clutches, and means under the control of said throttle control for applying an engaging force to said friction brake that increases with throttle opening and with the force applied to said brake for said forward drive power train increasing from a lower predetermined value than for said reverse drive power train whereby a gradual completion of the forward drive power train may be obtained.

40. In transmission mechanism for an automotive vehicle having a driving engine with a throttle, the combination of a drive shaft adapted to be driven by the engine, a driven shaft adapted to drive the vehicle, a control for the engine throttle, means for providing a forward drive power train between said shafts and a reverse drive power train between said shafts and including a friction engaging mechanism for rendering both of said power trains effective when engaged and which carries more torque for said reverse power train than for said forward power train for the same torque applied to said drive shaft, means for conditioning the transmission mechanism for a drive either through said forward drive power train or said reverse drive power train, and means under the control of said throttle control and said conditioning means for applying an engaging force to said friction engaging mechanism that increases with opening of the engine throttle with the applying force increasing from a lower predetermined value for said forward drive power train than for said reverse drive power train.

41. In transmission mechanism for an automotive vehicle having an engine with a throttle, the combination of a drive shaft adapted to be driven by the engine, a driven shaft adapted to drive the vehicle, a control for the engine throttle, means providing a forward drive power train and a reverse drive power train between said shafts and including a friction engaging mechanism for rendering both of the power trains effective when engaged, said friction engaging mechanism carrying a greater torque for said reverse drive power train than for said forward drive power train for the same torque applied to said drive shaft and being of a type to be self-energizing for increasing its force of application for the reverse drive power train and being self-denergizing to reduce its pressure of application for a transmission of torque therethrough in the opposite direction for said forward drive power train, means for conditioning the transmission mechanism for a drive either through said forward drive power train or said reverse drive power train, and means under the control of said conditioning means and said throttle control for applying a force to said friction engaging mechanism for engaging the mechanism that increases with throttle opening for each of said drives with the force increasing from a lower predetermined value for said forward drive power train than for said reverse drive power train.

42. In transmission mechanism for an automotive vehicle having a driving engine with a throttle, the combination of a control for the engine throttle, a drive shaft adapted to be driven by the vehicle engine, a driven shaft adapted to drive the vehicle, means for providing a forward drive power train and a reverse drive power train between said shafts and including a planetary gear set having two power transmitting elements and a reaction element, a friction clutch for connecting one of said power transmitting elements with said drive shaft for conditioning the forward drive power train for operation and a friction clutch for connecting the other power transmitting element with said drive shaft for conditioning the reverse drive power train for operation, a friction brake for said reaction element for completing either of said power trains when the brake is engaged, a selector for conditioning the transmission mechanism for drive either in said forward drive power train or in said reverse drive power train and causing engagement of the respective clutch, and means under the control of said selector and said throttle control for applying an engaging force to said brake that increases with opening of the engine throttle for both of said drives with the engaging force for the brake at closed throttle positions of the throttle control being less for said forward drive power train than for said reverse drive power train.

43. In transmission mechanism, the combination of a drive shaft, a driven shaft, means for providing a forward drive power train and a reverse drive power train between said shafts and including a planetary gear set having two power transmitting elements and a reaction element, a friction clutch for connecting one of said power transmitting elements with said drive shaft for conditioning the forward drive power train for operation and a friction clutch for connecting the other power transmitting element with said drive shaft for conditioning the reverse drive power train for operation, a friction brake for said reaction element for completing either of said power trains when the brake is engaged, means including a fluid pressure actuable piston for each of said clutches and said brake for engaging the clutches and brake, a source of fluid pressure, selector valve means for connecting said source of fluid pressure with the respective clutch and brake pistons for causing a completion of either said forward or said reverse power train, and valve means for reducing the fluid pressure applied to said brake piston for completing the forward drive power train so that a gradual and smooth completion of the latter power train may be made by an engagement of said brake.

44. In transmission mechanism, the combination of a drive shaft, a driven shaft, means for providing a forward drive power train and a reverse drive power train between said shafts and including a planetary gear set having two power transmitting elements and a reaction element, a friction brake for said reaction element, a friction clutch for connecting one of said power transmitting elements with said drive shaft for completing said forward drive power train when it and said brake are engaged, a friction clutch for connecting said other power transmitting element with said drive shaft for completing said reverse drive power train when it and said brake are engaged, a fluid pressure actuable piston for engaging each of said clutches and said brake, a source of fluid pressure, said brake being arranged to wrap or be self-energizing for the reaction on said reaction element for said reverse drive power train and being unwrapping or self-deenergizing to provide a less braking effect than for reverse drive for the direction of reaction on the reaction element for said forward drive power train, a source of fluid pressure, selector valve means for connecting said pressure source and the respective pistons for completing either said forward drive power train or said reverse drive power train, and a pressure reducing valve hydraulically connected with said selector valve means for reducing the fluid pressure applied to said brake piston for said forward drive power train and maintaining the pressure on the brake piston the same as on the respective clutch piston for the reverse drive power train.

45. In transmission mechanism, the combination of a drive shaft, a driven shaft, means for providing a forward low speed ratio drive, a forward high speed ratio drive and a reverse drive between said shafts and including a planetary gear set having two power transmitting elements and a reaction element, a friction brake for said reaction element, a friction clutch for connecting one of said power transmitting elements with said drive shaft and completing the reverse drive power train when it and said brake are engaged, and a friction clutch for connecting the other power transmitting element with said drive shaft and completing said low speed forward drive power train when it and said brake are engaged, said clutches when both are engaged completing said high speed forward drive power train, a fluid pressure actuable piston for engaging each of said brakes and clutches, a source of fluid pressure, selector valve means for connecting the respective pistons with said source of fluid pressure for completing the respective power trains between the shafts, and a regulator valve connected with said source of fluid pressure and with said selector valve means for reducing the fluid pressure impressed on said brake piston for said forward low speed ratio drive with respect to that impressed on said clutches and on said brake piston for said reverse drive and forward high speed ratio drive so that said low speed forward drive may be gradually and smoothy completed by engagement of said friction brake when said selector valve means is utilized for changing the drive from said high speed ratio drive to said low speed ratio drive.

46. In transmission mechanism for an automotive vehicle having a driving engine with a throttle, the combination of a drive shaft adapted to be driven by the engine, a driven shaft adapted to drive the vehicle, a control for the engine throttle, means for providing a high speed forward drive, a low speed forward drive and a reverse drive between said shafts and including a planetary gear set having two power transmitting elements and a reaction element, a friction brake for said reaction element, a friction clutch for connecting one of said power transmitting elements with said drive shaft for completing said reverse drive when it and said brake are engaged, a friction clutch for connecting said other power transmitting element with said drive shaft for completing said low speed forward drive when it and said brake are engaged, said clutches when both are engaged completing said high speed drive, a fluid pressure actuable piston for each of said clutches and brake, a source of fluid pressure, regulating valve means under the control of said throttle control for providing, a line pressure that increases with engine throttle opening, selector valve means for connecting the respective pistons with said regulated line pressure for completing the three power trains for different positions of the selector valve means, controlling the fluid pressure effective on said brake piston so as to reduce the pressure on said brake piston below said line pressure for engagement of said brake at small throttle openings for said low speed forward drive but not for said reverse drive power train for providing a gradual completion of the low speed forward drive when a change in speed ratio is made by means of said selector valve means to change from said high speed forward drive to said low speed forward drive.

47. In transmission mechanism for an automotive vehicle having a driving engine, with an accelerator, the combination of a drive shaft adapted to be driven by the vehicle engine, a driven shaft, means for providing a relatively high speed ratio power train between said shafts, means for providing a relatively low speed ratio power train between said shafts, means for changing the drive between said shafts from one of said power trains to the other, and means variable with the throttle opening movement given said accelerator and effective for varying the rate at which the change is made from the drive through one speed ratio power train to the other.

48. In transmission mechanism for an automotive vehicle having a driving engine with a throttle, the combination of a drive shaft adapted to be driven by the vehicle engine, a driven shaft, a control for the engine throttle, means for providing a low speed ratio power train between said shafts, means for providing a high speed ratio power train between said shafts, one of said means including a friction engaging mechanism which is engaged to complete the respective power train, and means under the control of said throttle control for varying the rate of engagement and disengagement of said friction engaging mechanism in accordance with changes in position of the throttle control.

49. In transmission mechanism for an automotive vehicle having a driving engine with an accelerator, the combination of a drive shaft adapted to be driven by the vehicle engine, a driven shaft, means for providing a high speed ratio power train between said shafts, means for providing a low speed ratio power train between said shafts, one of said means including a friction engaging mechanism for completing the respective power train, means including a fluid pressure actuable piston for engaging said friction engaging mechanism, a source of fluid pressure, means including a conduit for connecting said fluid pressure source and said piston, and means variable with the positioning of said accelerator for variably restricting the fluid flow in said conduit for altering the rate of engagement of said friction engaging means in accordance with changes in accelerator position.

50. In transmission mechanism for an automotive vehicle having a driving engine with a throttle, the combination of a drive shaft adapted to be driven by the vehicle engine, a driven shaft adapted to drive the vehicle, a control for the engine throttle, means for providing a relatively high speed ratio power train between said shafts and including a friction engaging mechanism for completing the power train when engaged, means for providing a relatively low speed ratio power train between said shafts and including a friction engaging mechanism for completing the power train when engaged, control means for causing simultaneous disengagement of one of said friction engaging mechanisms and engagement of the other friction engaging mechanism for causing a change in the drive from one of said power trains to the other power train, and means under the control of said throttle control for reducing the rate of engagement of one of said friction engaging mechanisms while the other is being disengaged for a relatively closed condition of the engine throttle as compared with the rate of engagement with a more nearly open engine throttle.

51. In transmission mechanism for an automotive vehicle having a driving engine with a throttle, the combination of a drive shaft adapted to be driven by the engine, a driven shaft adapted to drive the vehicle, means for providing a relatively high speed power train between said shafts and including a friction engaging mechanism for completing the power train when engaged, means for providing a relatively low speed power train between said shafts and including a friction engaging mechanism for completing the power train when engaged, control means for causing a simultaneous disengagement of said friction mechanism for said high speed power train and an engagement of said friction mechanism for said low speed power train for breaking the high speed power train and completing the low speed power train, and means under the control of said throttle control for causing such an engagement of said low speed ratio friction mechanism at a reduced rate when the throttle control is in a first part of its movement from a closed throttle position toward an open throttle position as compared to the engagement of this friction mechanism when the throttle control is moved farther toward its open throttle position.

52. In transmission mechanism for an automotive vehicle having a driving engine with a throttle, the combination of a drive shaft adapted to be driven by the vehicle engine, a driven shaft adapted to drive the vehicle, an engine throttle control, means for providing a relatively high speed power train between said shafts and including a friction engaging mechanism for completing the power train when engaged, means for providing a relatively low speed power train between said shafts and including a friction engaging mechanism for completing the power train when engaged, means including a fluid pressure operated piston for engaging each of said friction engaging mechanisms, a source of fluid pressure for providing pressure to said pistons, means including valve means connected with said pressure source and a conduit leading to said low speed piston for causing a change in the fluid pressure applied to said pistons for disengaging said high speed friction mechanism and simultaneously engaging said low speed friction mechanism for causing a change in the drive from said high speed power train to said low speed power train, and valve means under the control of said throttle control for providing a restriction in said conduit to said low speed piston when the throttle control is in the first part of its movement from a closed throttle position toward an open throttle position for reducing the rate of engagement of said low speed friction engaging mechanism when the throttle is in this position as compared with a relatively fast rate of engagement of the latter friction engaging mechanism when the throttle control is moved closer to an open throttle position.

53. In transmission mechanism for an automotive vehicle having a driving engine with a throttle, the combination of a drive shaft adapted to be driven by the engine, a driven shaft adapted to drive the vehicle, means for providing relatively low and high speed power trains between said shafts and including a planetary gear set having a reaction element and a power transmitting element, a friction brake for said reaction element for completing the low speed power train between said shafts, and a friction clutch for connecting said power transmitting element with said drive shaft for completing the high speed power train between said shafts, a source of fluid pressure, means including a piston for engaging said clutch when fluid pressure is applied to the piston from said source, means including a fluid pressure operated piston for disengaging said brake when fluid pressure is applied to the piston, said last-named piston having connection with said source of fluid by a conduit, control valve means for simultaneously draining both of said pistons for disengaging said clutch and causing application of said brake for changing the drive through the transmission mechanism from said high speed power train to said low speed power train, means forming a restriction in said conduit connected to said brake piston, a control valve having two positions in one of which it provides a parallel passage around said restriction for passage of fluid through the conduit and in the other of which it blocks the parallel passage so that the restriction in the conduit is effective, a regulator valve connected with said throttle control and hydraulically with said source of fluid pressure for providing a throttle pressure that increases with opening of the engine throttle, and hydraulic means connecting said regulating valve and said control valve whereby, when the throttle control is in an open throttle position providing a substantial throttle pressure, the throttle pressure is effective to move the control valve to its position providing a parallel passage around said restriction for providing a relatively quick application of said brake and whereby the reduced throttle pressure on a movement of the throttle control to a closed throttle position causes said control valve to move into its other position blocking said parallel passage for thereby decreasing the rate of engagement of said friction brake.

54. In transmission mechanism, the combination of a drive shaft, a driven shaft, means providing a drive between said shafts including a first friction engaging mechanism for completing the drive, means providing another drive between said shafts and including a second friction engaging mechanism for completing the latter drive, means for initiating disengagement of said first friction mechanism when predetermined engaging pressures are applied to said second friction mechanism for changing the drive between said shafts and providing an overlap of engagement between said friction mechanisms in such a drive change, and means variable with the speed of a part of the transmission mechanism for varying said predetermined engaging pressures on said second friction engaging mechanism at which initiation of disengagement of said first friction mechanism occurs.

55. In transmission mechanism, the combination of a drive shaft, a driven shaft, means for providing a relatively low speed power train between said shafts and including a friction engaging mechanism for completing the power train when engaged, means for providing a relatively high speed power train between said shafts and including a friction engaging mechanism for completing the power train when engaged, means for initiating disengagement of one of said friction mechanisms when predetermined engaging pressures on the other friction engaging mechanism are reached for changing the drive between said shafts and providing an overlap in engagement between said friction engaging mechanisms, and means variable with the speed of said driven shaft for changing said predetermined engaging pressures on said other friction engaging mechanism at which initiation of engagement on said one friction mechanism is begun in accordance with changes in speed of said driven shaft.

56. In transmission mechanism for an automotive vehicle having a driving engine having an accelerator, the combination of a drive shaft adapted to be driven by the engine, a driven shaft adapted to drive the vehicle, means providing a drive between said shafts including a friction engaging mechanism for completing the drive when engaged, means providing another drive between said shafts including a second friction engaging mechanism for completing the drive when engaged, means variable with the movement of said accelerator in a throttle opening direction, means variable with variations in speed of an element of the transmission mechanism, means for disengaging one of said friction mechanisms when predetermined engaging pressures on the other are reached for changing the drive between said shafts, and means responsive to said accelerator variable means and to said speed variable means for changing said predetermined engaging pressures at which said one friction mechanism is disengaged in accordance with both variations in engine torque and speed of said element of said transmission mechanism.

57. In transmission mechanism for an automotive vehicle having a driving engine with a throttle, the combination of a drive shaft adapted to be driven by the vehicle engine, a driven shaft adapted to drive the vehicle, means providing a drive between said shafts and including a friction engaging mechanism for completing the drive when engaged, means providing another drive between said shafts and including a friction engaging mechanism for completing the drive when engaged, a control for the engine throttle, means for disengaging one of said friction mechanisms when predetermined engaging pressures on the other friction mechanism are attained for changing the drive between said shafts and providing an overlap in engagement between said friction engaging mechanisms, means variable with the speed of one of said shafts, and means under the control of said throttle control and said speed variable means for changing said predetermined engaging pressures on said other friction engaging mechanism at which disengagement of said one friction mechanism takes place to vary with changes in throttle control position and the speed of said one shaft.

58. In transmission mechanism, the combination of a drive shaft, a driven shaft, means for providing a low speed power train between said drive shaft and said driven shaft and including a friction engaging mechanism for completing the power train when engaged, means for providing a high speed power train between said torque converter and said driven shaft and including a friction engaging mechanism for completing the power train when engaged, means for disengaging one of said friction mechanisms when predetermined engaging pressures on the other friction engaging mechanism are reached for changing the drive between said torque converter and said driven shaft and providing an overlap in engagement between said friction engaging mechanisms, and speed variable means for changing said predetermined engaging pressures of said other friction engaging mechanism in accordance with speed changes.

59. In transmission mechanism for an automotive vehicle having a driving engine with an accelerator, the combination of a drive shaft adapted to be driven by the vehicle engine, a driven shaft adapted to drive the vehicle, means providing a low speed power train between said drive shaft and said driven shaft and including a friction engaging mechanism for completing the power train when engaged, means for providing a high speed power train between said drive shaft and said driven shaft and including a friction engaging mechanism for completing the power train when engaged, means variable with the movement of said accelerator in a throttle opening direction, means responsive to variations in the speed of said driven shaft, means for disengaging one of said mechanisms when predetermined engaging pressures of the other friction mechanism are reached for changing the drive from said drive shaft to said driven shaft from one of said power trains to the other and for providing an overlap in the engagements of said friction engaging mechanisms, and means under the control of said speed variable means and said accelerator variable means for changing said predetermined engaging pressures of said other friction mechanism in accordance with changes in speed of said driven shaft and the positioning of said accelerator.

60. In transmission mechanism for an automotive vehicle having a driving engine with a throttle, the combination of a drive shaft adapted to be driven by the vehicle engine, a driven shaft adapted to drive the vehicle, a control for the engine throttle, means for providing a low speed power train between said drive shaft and said driven shaft and including a friction engaging mechanism for completing the power train when engaged, means providing a high speed power train between said drive shaft and said driven shaft and including a friction engaging mechanism for completing the power train when engaged, means responsive to changes in speed of said driven shaft, means for disengaging one of said friction mechanisms when predetermined engaging pressures on the other friction engaging mechanisms are reached for changing the drive between said drive shaft and said driven shaft and providing an overlap between the engagements of said friction mechanisms, and means under the control of said throttle control and said speed responsive means for changing said predetermined engaging pressures at which said one friction mechanism is disengaged to increase said predetermined friction engaging pressures with engine throttle opening and to decrease said predetermined pressures with driven shaft speed.

61. In transmission mechanism, the combination of a drive shaft, a driven shaft, means providing a drive between said shafts and including a first friction engaging mechanism for completing the drive when engaged, means providing another drive between said shafts and including a second friction engaging mechanism for completing the drive when engaged, a fluid pressure actuable piston for engaging each of said friction mechanisms, a source of fluid pressure connectible to said pistons for completing the respective power trains, means for causing disengagement of said first friction engaging mechanism when said second friction engaging mechanism is being engaged and including a shift valve having a first position connecting said pressure source and the piston for said first friction mechanism and a second position disconnecting said source and said last-named piston and draining the fluid pressure therefrom, hydraulic means for applying a fluid pressure to said shift valve which varies with the fluid pressure applied to the piston for said second friction mechanism and tending to move the shift valve into its said second position disconnecting the piston for said first friction mechanism with respect to said fluid pressure source, and means for applying an opposing fluid pressure on said shift valve tending to hold it in its said first position connecting said pressure source and said first piston which fluid pressure decreases with increases in speed of an element of the transmission mechanism for varying the overlap of engagement between said friction engaging mechanisms in accordance with the speed of said last-named element.

62. In transmission mechanism for an automotive vehicle having a driving engine with a throttle, the combination of a drive shaft adapted to be driven by the engine, a driven shaft adapted to drive the vehicle, a control for the engine throttle, means providing a low speed power train between said shafts and including a first friction engaging mechanism for completing the power train when engaged, means for providing a high speed power train between said shafts and including a second friction engaging mechanism for completing the power train when engaged, a fluid pressure actuable piston for engaging each of said friction engaging mechanisms, a source of fluid pressure, means for selectively applying fluid pressure to said pistons for engaging one or the other of said friction engaging mechanisms for completing the respective power trains, said last-named means including a shift valve having a first position in which it connects said source of fluid pressure and the piston for said second-named friction engaging mechanism and having a second position in which it disconnects said pressure source and said last-named piston and drains the piston of fluid pressure, hydraulic means for applying to said valve a fluid pressure that varies with the pressure on said piston for said first friction engaging mechanism tending to shift the shift valve into its said second position for disconnecting the source of fluid pressure and the other piston, means responsive to the speed of said driven shaft, and valve means connected with said pressure source and under the control of said throttle control and said speed responsive means for applying a variable fluid pressure to said shift valve tending to shift the valve from its said second position to its said first position and varying both with the position of said throttle control and with the speed of said driven shaft.

63. In transmission mechanism for an automotive vehicle having a driving engine with a throttle, the combination of a control for the engine throttle, a drive shaft adapted to be driven by the vehicle engine, a driven shaft adapted to drive the vehicle, a control for the engine throttle, means providing a relatively low speed power train between said drive shaft and said driven shaft and including a first friction engaging mechanism for completing the power train when engaged, means for providing a relatively high speed power train between said drive shaft and said driven shaft and including a second friction engaging mechanism for completing the power train when engaged, a fluid pressure actuable piston for engaging each of said friction engaging mechanisms, a source of fluid pressure, means for selectively applying fluid pressure to said pistons for engaging one or the other of said friction engaging mechanisms for completing the respective power trains, said last-named means including a shift valve having a first position in which it connects said source of fluid pressure and the piston for said second-named friction engaging mechanism and having a second position in which it disconnects said pressure source and said last-named piston and drains the piston of fluid pressure, hydraulic means for applying to said shift valve a fluid pressure that varies with the pressure on said piston for said first friction engaging mechanism tending to shift the valve into its said second position for disconnecting the source of fluid pressure and the other piston, means responsive to the speed of said driven shaft, and valve means connected with said pressure source and under the control of said throttle control and said speed responsive means for applying a variable fluid pressure to said shift valve tending to shift the valve from its said second position to its said first position, the variable fluid pressure on the shift valve increasing with opening of the engine throttle and decreasing with increases in speed of said driven shaft whereby to increase the overlap between the friction engaging mechanisms with opening of the engine throttle and to decrease the overlap between the friction engaging mechanisms with increases in speed of the driven shaft.

64. In transmission mechanism for an automotive vehicle having a driving engine with a throttle, the combination of a drive shaft adapted to be driven by the vehicle engine, a driven shaft adapted to drive the vehicle, a control for the engine throttle, a planetary gear set having two power transmitting elements and two reaction elements, one of said power transmitting elements being connected to said driven shaft and the other being connectible to be driven by said drive shaft, a first friction brake for one of said reaction elements for completing the low speed power train when engaged, and a second friction brake for the other reaction element for completing the high speed power train when engaged, a fluid pressure actuable piston for engaging each of said brakes, a source of fluid pressure, selector valve means for connecting said source of fluid pressure with one of said pistons or with the other whereby for completing either said low speed power train or said high speed power train, said valve means including a shift valve having a first position for connecting said source of fluid pressure and said brake piston for said second friction brake and having a second position for disconnecting said pressure source and said last-named piston and draining the piston of fluid pressure, hydraulic means for applying to said shift valve a fluid pressure that tends to shift the valve from its said first position to its said second position with a fluid pressure that increases with the fluid pressure applied to said piston for said low speed power train, means for restricting the flow of the latter fluid pressure to said shift valve for providing a gradual increase in this pressure on the valve and in the pressure applied to said low speed piston, valve means connected with said pressure source and responsive to changes in speed of said driven shaft and providing a governor pressure varying with driven shaft speed, valve means connected with said pressure source and controlled by said throttle control for providing a throttle pressure varying with the opening of the engine throttle, valve means under the control of said governor pressure and said throttle pressure for providing a pressure exerted on said shift valve tending to shift the shift valve from its said second position to its said first position with the pressure increasing with movement of the throttle control toward its open throttle position and decreasing with an increase in speed of said driven shaft whereby the first-named fluid pressure impressed on said shift valve must increase to a greater extent for an opening of said throttle control and must increase to a less extent with an increased speed of the driven shaft in order for the shift valve to move to its said second position and initiate a disengagement of said high speed brake, and a regulator valve under the control of said throttle pressure and hydraulically connected with said shift valve and with said low speed ratio brake piston for decreasing the fluid pressure applied to said low speed piston to a greater extent as compared with the first-named fluid pressure impressed on said shift valve the closer the throttle control is to its closed throttle position.

65. In transmission mechanism, the combination of a drive shaft, a driven shaft, means for completing a power train between said shafts and including a hydrodynamic coupling device and a fluid pressure actuated engaging mechanism both operative to complete the train, means providing fluid pressure for both said hydrodynamic device and said engaging mechanism and including a pump driven by said drive shaft, a pump driven by said driven shaft, and valve means for regulating the fluid pressure supplied to said hydrodynamic device at a lower pressure than that supplied to said engaging mechanism and operative to connect the drive shaft pump to both said mechanism and to said hydrodynamic device when the driven shaft is not rotating and operative to connect the driven shaft pump with said engaging mechanism and to connect said drive shaft pump with said hydrodynamic device to pump at the lower pressure of the hydrodynamic device when the driven shaft rotates.

66. In transmission mechanism, the combination of a drive shaft, a driven shaft, means providing a power train between said shafts and including a hydrodynamic device and a fluid pressure operated friction engaging mechanism both operative to complete the power train, means providing a fluid pressure for operating said hydrodynamic device and said friction mechanism and including a pump driven by said drive shaft, a pump driven by said driven shaft, and regulator valve means under the control of the fluid pressure discharged by said driven shaft pump for at first maintaining the fluid discharged by said drive shaft pump at a predetermined high value which is supplied to said engaging mechanism and supplying excess fluid from said drive shaft pump to said hydrodynamic device when there is substantially no rotation of said driven shaft and thereafter connecting said drive shaft pump with said hydrodynamic device exclusive of said friction engaging mechanism with said driven shaft pump providing fluid under pressure to said mechanism and the excess thereof being supplied to said hydrodynamic device.

67. In transmission mechanism, the combination of a drive shaft, a driven shaft, drive completing means effective between said shafts and including a fluid pressure operated engaging mechanism and a hydrodynamic coupling device, means for supplying fluid under pressure to said engaging mechanism and said coupling device and including a pump driven by said drive shaft and a pump driven by said driven shaft and a relief valve, said relief valve being subject to the fluid under pressure for said engaging mechanism which tends to shift the valve and including yielding means acting against said fluid pressure and tending to return the valve, said valve in a first part of its movement under the fluid for said engaging mechanism regulating the pressure from said drive shaft pump and available for said engaging mechanism to a predetermined value and supplying the excess fluid discharged by said drive shaft pump to said hydrodynamic device and in a subsequent movement under a slightly increased fluid pressure available for said engaging mechanism and when said driven shaft pump is in operation regulating the fluid pressure from the driven shaft pump to a slightly higher predetermined value and opening said drive shaft pump to said hydrodynamic device, and a check valve for preventing fluid from said driven shaft pump flowing to said drive shaft pump and to said hydrodynamic device.

68. In transmission mechanism, the combination of a drive shaft, a driven shaft, drive completing means effective between said shafts and including a fluid pressure operated engaging mechanism and a hydrodynamic coupling device, means for supplying fluid under pressure to said engaging mechanism and to said coupling device and including a pump driven by said drive shaft and a pump driven by said driven shaft and a relief valve, both of said pumps being connected to supply fluid to said engaging mechanism, and a check valve for preventing the flow of fluid discharged by said driven shaft pump to said drive shaft pump and to said hydrodynamic device, said relief valve comprising a port and a land opening the port on a small movement of the valve for regulating the pressure supplied to said friction engaging mechanism from said drive shaft pump to a predetermined value and for supplying excess fluid to said hydrodynamic device when said driven shaft is stationary and a second land and port opening on a further movement of said valve for regulating the fluid pressure applied to said friction engaging mechanism from said driven shaft pump after closure of said check valve, said further movement of said valve opening said first land and port for providing a substantially unrestricted supply of fluid pressure from said drive shaft pump to said hydrodynamic device.

69. In transmission mechanism, the combination of a drive shaft, a driven shaft, drive completing means effective between said shafts and including a fluid pressure operated engaging mechanism and a hydrodynamic coupling device, means for supplying fluid under pressure to said engaging mechanism and said coupling device and including a pump driven by said drive shaft, a pump driven by said driven shaft and a relief valve, means providing a first fluid supply conduit connectible with said engaging means, means providing a second conduit from said drive shaft pump connected with said first conduit to provide fluid from the pump to the latter conduit, means defining a third conduit connected with said first supply conduit and with said driven shaft pump for supplying the discharge from the driven shaft pump to said first conduit, means defining a fourth conduit connecting said drive shaft pump and said hydrodynamic coupling device for supplying fluid from the pump to the latter, said valve comprising a land in communication with said first conduit tending to move the valve under the influence of fluid pressure in said first conduit and comprising yieldable means for restraining such movement, said relief valve comprising a land and a port opening with such movement of the valve to restrict the fluid flow from said second conduit to said fourth conduit and said hydrodynamic device and to maintain the fluid in said first conduit at a predetermined pressure when said drive shaft pump exclusive of the other pump is operative, and a check valve in said second conduit for preventing the flow of fluid from said driven shaft pump to said drive shaft pump, said valve also comprising another land and port which open on further movement of the valve to relieve the fluid under pressure in said first conduit and maintain it at a predetermined value and supply the excess from said first conduit to said fourth conduit when said driven shaft pump is in operation, said first land and port opening on such further movement of the valve to supply fluid from said drive shaft pump and said second conduit substantially without restriction to said hydrodynamic device through said fourth conduit.

70. In transmission mechanism, the combination of a drive shaft, a driven shaft, drive completing means effective between said shafts and including a fluid pressure operated engaging mechanism and a hydrodynamic coupling device, means for supplying fluid under pressure to said engaging mechanism and said coupling device and including a pump driven by said drive shaft, a pump driven by said driven shaft and a relief valve, means providing a first fluid conduit for supplying fluid to said engaging means, means providing a second conduit from said drive shaft pump connected with said first-named conduit, means defining a third conduit connected for receiving discharge from said driven shaft pump and connected with said first conduit, means defining a fourth conduit connected with said hydrodynamic device, said relief valve comprising a surface connected with said first conduit so that fluid pressure therein tends to move the valve and spring means tending to hold the valve against such movement, said relief valve comprising a land and port opening upon movement of said relief valve under the influence of fluid pressure in said first conduit for regulating the pressure in said first conduit and relieving fluid discharged from said drive shaft pump when it exclusive of the other pump is in operation to said fourth conduit, a check valve in said second conduit for preventing the flow of fluid from said driven shaft pump to said drive shaft pump and to said hydrodynamic device, said valve comprising another land and port which open on further movement of the valve to relieve to said fourth conduit the fluid under pressure in said first conduit supplied by said driven shaft pump and this movement further opening the first-named land and port so as to discontinue any restriction between said second and fourth conduits, and a check valve in said third conduit for preventing the flow of fluid from said drive shaft pump in said first conduit to said driven shaft pump when the latter is not in operation.

71. In transmission mechanism, the combination of a drive shaft, a driven shaft, drive completing means effective between said shafts and including a hydrodynamic coupling device and gearing requiring lubrication, means defining a conduit for providing lubricating fluid to said gearing, said hydrodynamic coupling device having a fluid inlet and a fluid outlet, means for providing fluid under pressure to said inlet of said hydrodynamic device, and a regulator valve for regulating the fluid pressure in said hydrodynamic device and having a surface subject to this pressure so that the pressure tends to move the valve and yielding means tending to restrain the valve from such movement, said hydrodynamic coupling inlet being connected to said relief valve so that on a first part of the movement of the valve under the effect of the fluid pressure in the hydrodynamic device, the valve moves to open the lubrication conduit to said hydrodynamic coupling inlet and on a further movement opens to restrict the flow from the hydrodynamic coupling outlet in accordance with changes in pressure in the hydrodynamic coupling device and for providing a flow through the coupling device.

72. In transmission mechanism, the combination of a drive shaft, a driven shaft, means for providing a power train between said shafts and including a hydrodynamic coupling device having a fluid inlet conduit and a fluid outlet conduit, means for providing fluid under pressure to said inlet conduit, and a regulator valve for regulating the fluid pressure in the coupling device, said valve having a face subject to the fluid pressure in said inlet conduit and tending to move the valve so as to open up the outlet conduit with an opening increasing with the fluid pressure in the inlet conduit, and a spring for yieldably restraining the valve from such movement.

73. In transmission mechanism, the combination of a drive shaft, a driven shaft, drive completing means effective between said shafts and including a fluid pressure operated engaging mechanism, a hydrodynamic coupling device and gearing requiring lubrication, means for supplying fluid under pressure to said drive completing means and including a pump driven by said drive shaft and a pump driven by said driven shaft, means defining a fluid pressure supply conduit for said engaging mechanism, means for hydraulically connecting said pumps to supply fluid under pressure to said supply conduit, a relief valve having a surface subject to the fluid under pressure in said supply conduit and tending to move the valve and having a spring yieldably opposing such movement, said hydrodynamic coupling device having a fluid inlet and a fluid outlet, said valve having a land and port which are opened to restrict the fluid flow therethrough for regulating the pressure of the fluid discharged by said drive shaft pump and supplied to said supply conduit and for providing the excess of fluid from said drive shaft pump to said hydrodynamic device inlet on a first part of its movement due to fluid pressure in said supply conduit when said driven shaft pump is inoperative, said regulator valve including a second port and land which are opened on a further movement of the valve under increased pressure in said supply conduit when said driven shaft pump is operative to restrictedly connect said driven shaft pump and said hydrodynamic coupling inlet for regulating the fluid pressure in said supply conduit, said valve on such further movement opening said first-named port and land to unrestrictedly connect said drive shaft pump and hydrodynamic device fluid inlet, a check valve for preventing the flow of fluid from said driven shaft pump to said drive shaft pump, and a second relief valve having a surface subject to the pressure of the fluid in said inlet conduit tending to move the valve and having a spring yieldably restricting such movement, means defining a lubrication conduit for said gearing, said second relief valve including a land and port for restrictedly connecting said inlet conduit and said lubrication conduit on a first part of the movement of said valve under the influence of the fluid pressure in said hydrodynamic device inlet and said second regulator valve including a second port and land for restrictedly relieving the pressure in said outlet conduit on a second part of the movement of the latter valve for regulating the fluid pressure in said hydrodynamic coupling device and for establishing a flow from said inlet through said hydrodynamic device and through said outlet.

74. In transmission mechanism, the combination of a drive shaft, a driven shaft, means providing low, intermediate and high speed drives between said shafts, a selector movable from a high range to a low range position, hydraulic connecting means effectively between said selector and said first-named means for causing a change from said high speed drive to either of said two other drives when the selector is moved from its high range to its low range position and including a selector valve connected with a source of fluid under pressure and connecting said pressure source with an outlet conduit for the selector valve in its low range position, a shift valve having a low speed position and an intermediate speed position and connected with said outlet conduit so that fluid from outlet conduit is supplied to low speed drive completing means when the shift valve is in its low speed position and disconnecting said conduit from said low speed drive completing means in the intermediate speed position of the shift valve, means for automatically completing said intermediate speed drive when the shift valve is in its position blocking said outlet conduit, hydraulic governor means driven by said driven shaft and connected with said source of fluid pressure for providing a governor pressure which increases with driven shaft speed applied to said shift valve for shifting the valve from its low speed position to its intermediate position above a predetermined speed of the driven shaft, and lands of unequal area on said shift valve subject to the fluid pressure from said outlet conduit in the low speed position of the shift valve for holding the shift valve in its low speed position after fluid pressure has once flowed through the valve to said low speed drive completing means.

75. In transmission mechanism, the combination of a drive shaft, a driven shaft, means for providing a plurality of different drives between said shafts, fluid pressure operated means for completing said drives, a source of fluid pressure adapted to be connected with said fluid pressure operated means, means including a regulator valve effective for providing a regulated pressure from said source applied to said fluid pressure operated means and the valve having two lands, means for supplying fluid pressure to one or both of said lands and including a second valve having two positions in one of which it supplies fluid pressure to one of said lands and in the other of which it supplies fluid pressure to both of said lands, and selecting means for conditioning the transmission mechanism for said different drives and effective for putting said second valve in one of its poistions for one drive so that said regulator valve is effective to provide a certain pressure to said fluid pressure operated means for this drive and the selecting means is effective to move said second valve to its other position for the other drive so that the regulator valve is effective to provide a different pressure to said fluid pressure operated means for the latter drive.

76. In transmission mechanism, the combination of a drive shaft, a driven shaft, means for providing a plurality of different drives between said shafts, fluid pressure operated means for completing said drives, a source of fluid pressure adapted to be connected with said fluid pressure operated means, means including a regulator valve effective for providing a regulated pressure from said source and applied to said fluid pressure operated means and the valve having two lands, means for supplying fluid pressure to one or both of said lands and including a second valve having two positions in a first one of which it supplies fluid pressure to one of said lands and in the second of which it supplies fluid pressure to both of said lands, selecting means for conditioning the transmission mechanism for said different drives and effective for putting said second valve in one of its positions for one drive so that said regulator valve is effective to provide a certain pressure to said fluid pressure operated means for this drive and the selecting means is effective to move said second valve to its other position for the other drive so that the regulator valve is effective to provide a different pressure to said fluid pressure operated means for the latter drive, and means in connection with said second valve for rendering the valve a limiter valve to supply said regulator valve only a certain maximum pressure in said first position of said second valve.

77. In transmission mechanism for an automotive vehicle having a driving engine, the combination of a control for the engine throttle, a drive shaft, a driven shaft, a fluid pressure operated mechanism for providing a drive between said shafts, a source of fluid pressure adapted to supply fluid pressure to said fluid pressure operated mechanism, means for varying the pressure from said source applied to said fluid pressure operated mechanism and including a first regulator valve connected with said pressure source and providing a regulated pressure, means for providing a throttle pressure that increases with throttle opening and comprising a second regulator valve connected with said pressure source and with said throttle control, means connecting said throttle pressure and said first regulator valve for actuating the valve and causing it to vary its output pressure according to the position of the throttle, and valve means for limiting the throttle pressure to a predetermined maximum that may be effective on said first regulator valve.

78. In transmission mechanism for an automotive vehicle having a driving engine with a throttle, the combination of a control for the engine throttle, a drive shaft adapted to be driven by the vehicle engine, a driven shaft adapted to drive the vehicle, a fluid pressure operated device for providing a drive between said shafts, a source of fluid pressure for supplying fluid pressure to said device, pressure regulating mechanism for regulating the pressure supplied from said source to said device and including a regulator valve, governor means driven by said driven shaft and including a valve connected with said pressure source and supplying a governor pressure that increases with shaft speed which is applied to said regulator valve tending to change the output regulated pressure of the regulator valve in one direction with increase of governor pressure, a throttle valve connected with said throttle control and with said pressure source for supplying a throttle pressure which increases with throttle opening to said regulator valve for causing a change in the opposite direction of the regulated pressure output of the regulator valve with increase in throttle pressure, and means for limiting the throttle pressure effective on said regulator valve to a predetermined value so that the effect of the governor pressure at the higher vehicle speeds overcomes the effect of the throttle pressure in regulating the fluid pressure to said device.

79. In transmission mechanism for an automotive vehicle having a driving engine with a throttle, the combination of a control for the engine throttle, a drive shaft, a driven shaft, pressure responsive means for providing a plurality of different drives between said shafts, a source of fluid pressure adapted to be connected with said pressure responsive means, means actuated by said throttle control for varying the pressure supplied to said pressure responsive means in accordance with changes in position of said throttle control, and means for changing the action of said throttle control for different ones of said drives through the transmission mechanism whereby to provide a greater pressure on said drive providing means for one of said drives as compared with another.

80. In transmission mechanism for an automotive vehicle having a driving engine with a throttle, the combination of a control for the engine throttle, a drive shaft, a driven shaft, means for providing a plurality of different drives between said shafts, fluid pressure operated means for completing said drives, a source of fluid pressure adapted to be connected with said fluid pressure operated means, means for varying the pressure supplied to said fluid pressure operated means in accordance with changes in position of said throttle control and including a regulator valve and means connecting the throttle control and the regulator valve, and means for varying the connection between said throttle control and said regulator valve for different drives through the transmission mechanism whereby to provide a greater pressure on said fluid pressure operated means for one of said drives as compared with another.

81. In transmission mechanism for an automotive vehicle having an engine with a throttle, the combination of a control for the engine throttle, a drive shaft adapted to be driven by the engine, a driven shaft adapted to drive the vehicle, means for providing a plurality of different drives between said shafts, fluid pressure operated means for completing said drives, a source of fluid pressure, valve means for supplying a fluid pressure to said fluid pressure operated means variable with throttle opening and the speed of one of said shafts and including a throttle regulator valve connected with said pressure source and with said throttle control for providing a throttle pressure that varies with throttle position, governor means including a second regulator valve connected with said pressure source and influenced by rotation of said one shaft and providing a governor pressure that varies with the speed of said one shaft, and a third regulator valve connected with said pressure source and having said throttle pressure and said governor pressure applied thereto for providing an output regulated pressure that varies in accordance with both the position of said throttle control and the speed of said one shaft, a selector and a selector valve controlled by the selector for conditioning the transmission mechanism for the different drives therethrough, and a throttle pressure limiter valve hydraulically connected with said selector valve and having one position corresponding to a position of said selector valve and a certain drive through the transmission mechanism in which the throttle pressure supplied to said third regulator valve is limited to a predetermined maximum to cause the pressure applied to said fluid pressure operated means to increase with throttle opening to a predetermined maximum and decrease with vehicle speed and the limiter valve having a second position corresponding to another position of said selector valve and another drive through the transmission mechanism in which the throttle pressure applied to the third regulator valve is not so limited to cause the pressure applied to said fluid pressure operated means to rise to a higher maximum value along with opening of said throttle.

82. In transmission mechanism for an automotive vehicle having a driving engine with an accelerator, the combination of means variable with the positioning of said accelerator and constituting a control means, a drive shaft adapted to be driven by the engine, a driven shaft adapted to drive the vehicle, means for providing a plurality of drives between said shafts, fluid pressure operated means for completing said drives, governor means variable with the speed of one of said shafts and constituting a control means, means under the control of said accelerator variable means and said governor means for applying a pressure to said pressure operated drive completing means that varies coordinately with corresponding changes both with the movement of said accelerator in a throttle opening direction and the speed of said one shaft, and means under the control of said first-named means for changing the action of one of said control means on said pressure applying means with various drives through the transmission mechanism for thereby changing the variation of pressure on said fluid pressure operated means for the various drives.

83. In transmission mechanism for an automotive vehicle having a driving engine with a throttle, the combination of a control for the engine throttle, a drive shaft adapted to be driven by the vehicle engine, a driven shaft adapted to drive the vehicle, means for providing a plurality of drives of different speed ratio between said shafts, fluid pressure operated means for completing said drives, a source of fluid pressure adapted to be connected with said fluid pressure operated means, pressure regulating mechanism for regulating the pressure supplied from said source to said fluid pressure operated means and including a regulator valve, governor means driven in timed relationship with said driven shaft and including a valve connected with said pressure source and supplying a governor pressure that increases with shaft speed which is applied to said regulator valve tending to change the output regulated pressure of the regulator valve in one direction with increase in governor pressure, a throttle valve connected with said throttle control and with said pressure source for supplying a throttle pressure which increases with throttle opening and is applied to said regulator valve for causing a change in the opposite direction of the regulated pressure output of the regulator valve with increase in the throttle pressure, and means under the control of said first-named means for limiting the throttle pressure effective on said regulator valve to a predetermined value for one of the drives through the transmission mechanism and not so limiting the throttle pressure for another of the drives through the transmission mechanism whereby to change the variation of the fluid pressure on said fluid pressure operating means with changes in position of the throttle control for one of the two drives as compared with the other drive.

84. In transmission mechanism, the combination of a drive shaft, a driven shaft, means for providing first and second drives between said shafts and including a planetary gear set having two power transmitting elements and first and second clutches for connecting said power transmitting elements respectively with said drive shaft, said second friction clutch exclusive of said first friction clutch completing said first drive whereby this clutch takes the full drive shaft torque, and both of said clutches being engaged for said second drive whereby the drive shaft torque is divided through the clutches, and means for providing a greater engaging force for said second friction clutch for said first drive than for said second drive corresponding to the high and low values of torque transmitted through this clutch for the respective drives.

85. In transmission mechanism for an automotive vehicle, the combination of a drive shaft, a driven shaft, a vehicle engine having a throttle control for driving said drive shaft, means for providing first and second drives between said shafts and including a friction engaging means which carries more torque for said first drive than for said second drive for the same torque impressed on said drive shaft, means for providing an engaging force for said engaging means for said second drive that increases with the opening of said throttle control, and means for providing a greater engaging force for said engaging means that increases with opening of said throttle control for said first drive.

86. In transmission mechanism for an automotive vehicle having a driving engine with a throttle, the combination of a drive shaft, a driven shaft, a control for the engine throttle, means for providing two different drives between said shaft and including a planetary gear set arranged to drive said driven shaft and having two power transmitting elements, a first friction clutch for connecting one of said elements to be driven by said drive shaft and a second friction clutch for connecting another of said elements to be driven by said drive shaft, said first friction clutch being engaged exclusively of said second friction clutch for a first one of said drives and taking the full torque transmitted from said drive shaft and said first and second clutches both being engaged for the second drive for dividing the torque transmitted from said drive shaft, means responsive to changes in speed of said driven shaft, means under the control of said speed responsive means and said throttle control for providing an engaging force to said first friction clutch that increases with engine throttle opening and decreases with driven shaft speed when said first clutch is effective exclusive of said second clutch to complete said first drive, and means under the control of said throttle control and said speed responsive means for providing an engaging force on said first clutch that increases with throttle opening and decreases with vehicle speed when said clutches are both effective to provide said second drive and which is less for corresponding throttle openings and speeds of said driven shaft than the engaging force on the said first friction clutch for said first drive.

87. In transmission mechanism, the combination of a drive shaft, a driven shaft, a planetary gear set connected in driving relation with one of said shafts and having two power transmitting elements, a first friction clutch for connecting one of said elements with the second one of said shafts and a second friction clutch for connecting the other power transmitting element with said second shaft, means for providing a low speed and an intermediate speed drive through said planetary gear set and including said first clutch which is engaged exclusive of said second clutch for completing the two drives, both of said clutches when they are engaged completing a direct drive between said shafts and the clutches functioning in parallel, means for automatically breaking said intermediate drive and completing said direct drive which includes engaging said second clutch for completing the latter drive, and means for automatically providing a greater engaging pressure for said first clutch for said first drive as compared with the engaging force on this clutch provided for said direct drive.

88. In transmission mechanism, the combination of a drive shaft, a driven shaft, a planetary gear set connected to drive said driven shaft and having first and second power input elements and first and second reaction elements, means for providing a low speed forward drive power train between said shafts and through said gear set and including a first clutch for connecting said first input element with said drive shaft and a brake for said first reaction element, means for providing an intermediate speed forward drive power train between said shafts and including said first clutch and a brake for said second reaction element which are engaged to complete the power train, said two clutches when both are engaged completing a direct drive power train between said shafts, means for providing a reverse drive power train between the shafts and including said brake for said first reaction element and said second clutch for completing the train when engaged, a fluid pressure operated piston for said second clutch for engaging the clutch, a source of fluid pressure adapted to be connected with said piston, and valve means for automatically increasing the pressure from said fluid source applied to said clutch piston for said reverse drive as compared with the pressure for said direct drive which is applied to said clutch piston whereby said second clutch engages gradually for a gradual completion of the direct drive power train and whereby the said second clutch has sufficient torque capacity for completing said reverse drive.

89. In transmission mechanism for an automotive vehicle, the combination of a drive shaft, a driven shaft, a vehicle engine having a throttle control for driving said drive shaft, a planetary gear set connected to drive said driven shaft and having first and second power input elements and a reaction element, means for completing a reverse drive power train between said shafts and including a first clutch for connecting the first one of said input elements with said drive shaft and a brake for said reaction element, means for completing a low speed forward drive power train between said shafts and including a second clutch for connecting said second input element with said drive shaft and a brake for said first input element, said clutches when both are engaged completing a direct drive power train between said shafts, a piston for actuating each of said clutches and brakes, a source of fluid pressure, selector valve means for connecting said source of fluid pressure and the respective clutch and brake pistons for completing the respective power trains, and regulator valve means under the control of said throttle control and hydraulically connected with said pressure source for applying a fluid pressure to said piston for said first clutch that increases with throttle opening for said reverse drive and for applying a fluid pressure to said piston for completing the direct drive that increases with throttle opening but is less than the fluid pressure applied to the piston for said reverse drive.

90. In transmission mechanism, the combination of a drive shaft adapted to be driven by an engine, a driven shaft, means for providing a relatively high speed power train between said shafts and including a friction engaging mechanism for completing the power train, means for providing a relatively low speed power train between said shafts which when effective causes said drive shaft to rotate faster than when said high speed power train is effective and including a second friction engaging mechanism for completing the low speed power train, means for disengaging said first named friction engaging mechanism and for engaging said second friction mechanism for changing the drive from said high speed power train to said low speed power train, and means for delaying the application of said second friction mechanism momentarily on this change in drive until a time subsequent to disengagement of said first friction engaging mechanism for thereby momentarily disconnecting said drive shaft with respect to said driven shaft to allow it to run freely thereof so as to allow the engine to gain in speed to approximately its speed when it drives through said low speed power train.

91. In transmission mechanism, the combination of a drive shaft adapted to be driven by an engine, a driven shaft, means for providing a relatively high speed power train between said shafts and including a friction engaging mechanism for completing the power train, means for providing a relatively low speed power train between said shafts which when effective causes said drive shaft to rotate faster than when said high speed power train is effective and including a friction engaging mechanism for completing the low speed power train, a fluid pressure actuated motor for engaging each of said friction engaging mechanisms, means for simultaneously rendering one of said motors effective and the other ineffective for thereby disengaging said first named friction mechanism and engaging said second friction mechanism to change from the high speed power train to the low speed power train, and means for retarding the fluid flow in connection with said motor for said second friction mechanism as compared with the fluid flow in connection with said other motor on this change in drive to retard engagement of said second friction mechanism and momentarily disconnect said drive shaft with respect to said driven shaft to allow it to run freely thereof for allowing the engine to gain in speed to approximately its speed when said low speed power train is completed.

92. In transmission mechanism, the combination of a drive shaft adapted to be driven by an engine, a driven shaft, an accelerator for the engine, means for providing a relatively high speed power train between said shafts and including a friction clutch for completing the power train, means for providing a relatively low speed power train between said shafts which when effective causes said drive shaft to rotate faster than when said high speed power train is effective and including a friction brake for completing the low speed power train, a fluid pressure actuated motor for engaging said clutch when fluid pressure is applied thereto, a fluid pressure actuated motor for disengaging said brake when fluid pressure is applied thereto, means under the control of said accelerator for simultaneously draining fluid from both of said motors when the accelerator is moved to an open throttle kickdown position for disengaging said clutch and engaging said brake and changing the drive from said high speed power train to said low speed power train, and means providing a restricted passage for retarding the fluid flow from the motor for said friction brake and retarding application of the brake on such a change in drive and momentarily disconnecting said drive shaft with respect to said driven shaft to allow it to run free thereof so as to allow the engine to gain in speed to approximately its speed which obtains when said low speed power train is completed.

93. In transmission mechanism for an automotive vehicle having a driving engine with a throttle, the combination of a throttle control for the engine, a drive shaft adapted to be driven by the engine, a driven shaft adapted to drive the vehicle, a hydraulic torque converter driven by said drive shaft, means providing a plurality of drives of different speed ratios between said torque converter and said driven shaft and including a plurality of friction engaging mechanisms for completing the respective drives when various of the mechanisms are engaged, a fluid pressure actuated motor including a piston for engaging each of said friction mechanisms, a source of fluid pressure, valve means controlled by said throttle control and modifying a connection of the pressure source with said pistons for applying fluid pressures to said pistons that increase with opening of said throttle for increasing the pressure of engagement of the respective friction engaging mechanisms, and means under the control of said throttle control for increasing the pressure of the fluid in said hydraulic torque converter with increased opening of the throttle whereby the torque converter has the capacity to transmit the increased torque attendant with increased throttle opening.

94. In transmission mechanism for an automotive vehicle having a driving engine with a throttle, the combination of a control for the engine throttle, a drive shaft adapted to be driven by the engine, a driven shaft adapted to drive the vehicle, a hydraulic torque converter driven by said drive shaft, a planetary set having three power transmitting elements and two reaction elements, one of said power transmitting elements being connected to said driven shaft, a pair of friction clutches for selectively connecting the other of said power transmitting elements to be driven from said torque converter, a friction brake for each of said reaction elements, a plurality of drives of different speed ratios between said torque converter and said driven shaft being rendered effective when different pairs of said brakes and clutches are engaged, means including a fluid pressure actuable piston for engaging each of said clutches and brakes when pressure is applied to the piston, a source of fluid under pressure, means responsive to changes in speed of said driven shaft, valve means under the combined control of said throttle control and said speed responsive means for regulating the fluid pressure from said source to said pistons for supplying a fluid pressure to the pistons that increases with the opening of said throttle and decreases with increases in the speed of said driven shaft for varying the clutch and brake applying pressures accordingly, and means under the combined control of said speed responsive means and said throttle control for varying the pressure of fluid in said torque converter to increase the pressure in the torque converter with an opening of said throttle and for decreasing the pressure of fluid in said torque converter with an increase in speed of said driven shaft.

95. In a vehicle transmission, in combination, an input shaft, an output shaft, a fluid pressure operated friction control device coupled between said shafts and effective on an increase in the pressure of the fluid in an operating chamber to establish driving connection between said shafts, a supply passage, means for supplying fluid under pressure to said supply passage, valve means for at times connecting said operating chamber to said supply passage and for at other times connecting said operating chamber to exhaust, and a regulating valve for controlling the pressure of the fluid in said supply passage, said regulating valve comprising a valve element urged to the closed position by biasing means and movable therefrom to release fluid from said supply passage on an increase in the pressure of the fluid in said supply passage, and means for exerting a force which opposes said biasing means and which increases in magnitude in accordance with the speed of one of said shafts.

96. In a vehicle transmission, in combination, an input shaft, an output shaft, a fluid pressure operated friction control device coupled between said shafts and effective on an increase in the pressure of the fluid in an operating chamber to establish driving connection between said shafts, a supply passage, means for supplying fluid under pressure to said supply passage, valve means for at times connecting said operating chamber to said supply passage and for at other times connecting said operating chamber to exhaust, and a regulating valve for controlling the pressure of the fluid in said supply passage, said regulating valve comprising a valve element having a closed position and movable therefrom to release fluid from said supply passage on an increase in the pressure of the fluid in said supply passage, biasing means yieldingly urging said valve element to its closed position, and means for reducing the effective magnitude of the force exerted on said valve element by said biasing means, said last named means increasing in magnitude in accordance with the speed of one of said shafts.

97. In a vehicle transmission, in combination, an input shaft, an output shaft, a fluid pressure operated friction control device coupled between said shafts and effective on an increase in the pressure of the fluid in an operating chamber to establish driving connection between said shafts, a supply passage, means for supplying fluid under pressure to said supply passage, valve means for at times connecting said operating chamber to said supply passage and for at other times connecting said operating chamber to exhaust, means for supplying a control fluid at a pressure which varies in accordance with the speed of one of said shafts, a relief valve comprising a valve element movable between a closed and an open position, biasing means yieldingly urging said valve element to the closed position, means responsive to the pressure of the fluid in said supply passage for moving said valve element against said biasing means from the closed position towards the open position, and means responsive to said control fluid for reducing the effective force exerted by said biasing means.

98. In transmission mechanism for an automotive vehicle having a driving engine with a throttle, the combination of a drive shaft adapted to be driven by the engine, a driven shaft adapted to drive the vehicle, means for providing a drive between said shafts and including a hydraulically operated device completing the drive when hydraulic pressure is applied to the device, means variable with changes in engine throttle opening, means responsive to changes in speed of one of said shafts, and means controlled by said two last-mentioned means for supplying hydraulic pressure to said hydraulically operated device that varies coordinately with corresponding changes in engine throttle opening and speed of said last-named shaft.

99. In transmission mechanism for an automotive vehicle having a driving engine with a throttle, the combination of a drive shaft adapted to be driven by the engine, a driven shaft adapted to drive the vehicle, means for providing a drive between said shafts and including a hydraulically operated device completing the drive when hydraulic pressure is applied to the device, means variable with changes in engine throttle opening, means responsive to changes in speed of one of said shafts, and means controlled by said two last-mentioned means for supplying a hydraulic pressure to said hydraulically operated device that increases coordinately with corresponding increases in engine throttle opening and decreases coordinately with corresponding increases in the speed of said last-named shaft.

100. In transmission mechanism for an automotive vehicle having a driving engine with a throttle, the combination of a drive shaft adapted to be driven by the vehicle engine, a driven shaft, means for providing a power train between said shafts and including a fluid pressure operated friction engaging mechanism for completing the power train, a source of fluid pressure, means including a conduit for connecting said fluid pressure source and said piston, valve means in said conduit in one position providing a restriction in the conduit and in another position providing a relatively wide opening in the conduit in place of said restriction, and means effectively connecting said throttle and said last-named valve means for causing said valve means to be in its restricting position when the throttle is in a relatively closed throttle position and for causing said last-named valve means to be in its relatively wide open position when said throttle is in a relatively open throttle position.

101. In transmission mechanism for an automotive vehicle having a driving engine with a throttle, the combination of a drive shaft adapted to be driven by the vehicle engine, a driven shaft, means for providing a low speed ratio power train between said shafts and including a first friction engaging device with a first actuating piston therefor for completing the train, means for providing a high speed ratio power train between said shafts and including a second friction engaging device with a second actuating piston therefor for completing this power train, a source of fluid pressure, a first conduit means for connecting a friction device engaging surface of said first piston with said pressure source, second conduit means for connecting with said pressure source both a friction device disengaging surface of said first piston and said second piston for engaging said second friction device, a valve in one of said conduit means connected with one of said surfaces on said first piston to provide a restriction in a first position of the valve and to provide a relatively wide open connection in a second position, and means effectively connecting said throttle and said valve for causing the valve to be in its restricted opening position when the throttle is in a relatively closed throttle position for slowing the rate of engagement of said first engaging device when fluid pressure is relieved from said second conduit means for causing disengagement of said second friction device.

102. In transmission mechanism for an automotive vehicle, the combination of a drive shaft, a driven shaft, means for providing a drive between said shafts and including a fluid pressure engaged friction engaging mechanism for completing the drive when engaged, means responsive to the speed of one of said shafts, a source of fluid pressure and means for operatively connecting said fluid pressure source with said friction mechanism to engage said friction mechanism, and a regulating valve metering the fluid flow to said friction engaging mechanism and subject to the fluid pressure applied to said friction mechanism tending to close the regulating valve, said valve also being subject to said speed responsive means so that the fluid pressure applied to said friction mechanism during the course of engagement is at progressively decreased values with increased speeds of said last-named shaft.

103. In transmission mechanism for an automotive vehicle having an engine with a throttle, the combination of a drive shaft, a driven shaft, means for providing a drive between said shafts and including a fluid pressure engaged friction engaging mechanism for completing the drive when engaged, means responsive to the speed of said driven shaft, a source of fluid pressure, means for operatively connecting said fluid pressure source with said friction mechanism to engage the friction mechanism and including a fluid pressure regulator valve subject to the pressure applied to said friction mechanism and metering fluid to the friction mechanism to a decreasing extent with increases in fluid pressure applied to the friction mechanism, and means for effectively connecting said speed responsive means and said throttle with said regulator valve so that fluid pressure applied to said friction mechanism during the course of engagement is at decreased values with increases in speed of said driven shaft and is at increased values with greater openings of said engine throttle.

104. In a vehicle transmission, in combination, an input shaft, an output shaft, power transmitting means between said shafts including fluid pressure operated friction control means effective on an increase in the pressure of the fluid in operating chamber means to establish driving connection between said shafts, a supply passage, means for supplying fluid under pressure to said supply passage, valve means for at times connecting said operating chamber means to said supply passage and for at other times connecting said operating chamber means to exhaust, and a regulating valve for controlling the pressure of the fluid in said supply passage, said regulating valve comprising a valve element urged to the closed position by biasing means and movable therefrom to release fluid from said supply passage on an increase in the pressure of the fluid in said supply passage, and further means for exerting a force which opposes said biasing means and which increases in magnitude in accordance with the speed of one of said shafts.

105. In a vehicle transmission, in combination, an input shaft, an output shaft, power transmitting means between said shafts including fluid pressure operated friction control means effective on an increase in the pressure of the fluid in operating chamber means to establish driving connection between said shafts, a supply passage, means for supplying fluid under pressure to said supply passage, valve means for at times connecting said operating chamber means to said supply passage and for at other times connecting said operating chamber means to exhaust, and a regulating valve for controlling the pressure of the fluid in said supply passage, said regulating valve comprising a valve element having a closed position and movable therefrom to release fluid from said supply passage on an increase in the pressure of the fluid in said supply passage, biasing means yieldingly urging said valve element to its closed position, and further means for reducing the effective magnitude of the force exerted on said valve element by said biasing means, said last-named means increasing in magnitude in accordance with the speed of one of said shafts.

106. In a vehicle transmission, in combination, an input shaft, an output shaft, power transmitting means between said shafts including fluid pressure operated friction control means effective on an increase in the pressure of the fluid in operating chamber means to establish driving connection between said shafts, a supply passage, means for supplying fluid under pressure to said supply passage, valve means for at times connecting said operating chamber means to said supply passage and for at other times connecting said operating chamber means to exhaust, means for supplying a control fluid at a pressure which varies in accordance with the speed of one of said shafts, a relief valve comprising a valve element movable from a closed to an open position on an increase in the pressure of the fluid in said supply passage, biasing means yieldingly urging said valve element to the closed position, and further means responsive to said control fluid for reducing the effective force exerted by said biasing means.

References Cited in the file of this patent

UNITED STATES PATENTS

| Number | Name | Date |
|---|---|---|
| Re. 13,348 | Sauer | Jan. 2, 1912 |
| 456,392 | Ballard | July 21, 1891 |
| 1,137,944 | Allen | May 5, 1915 |
| 1,619,701 | Chorlton | Mar. 1, 1927 |
| 1,706,738 | Moran | Mar. 26, 1929 |
| 2,014,944 | Martyrer et al. | Sept. 17, 1935 |
| 2,024,842 | Bauer et al. | Dec. 17, 1935 |
| 2,033,835 | Lansing | Mar. 10, 1936 |
| 2,051,553 | Fleischel | Aug. 18, 1936 |
| 2,067,793 | Seibold | Jan. 12, 1937 |
| 2,132,728 | Ford | Oct. 11, 1938 |
| 2,193,305 | Thompson | Mar. 12, 1940 |
| 2,204,872 | Thompson | June 18, 1940 |
| 2,205,470 | Dunn et al. | June 25, 1940 |
| 2,221,393 | Carnegie | Nov. 12, 1940 |
| 2,226,014 | Patterson | Dec. 24, 1940 |
| 2,229,345 | Schotz | Jan. 21, 1941 |
| 2,282,949 | Dolza | May 12, 1942 |
| 2,310,518 | Dolza | Feb. 9, 1943 |
| 2,316,390 | Biermann | Apr. 13, 1943 |
| 2,324,713 | McFarland | July 20, 1943 |
| 2,329,724 | Maurer | Sept. 21, 1943 |
| 2,332,593 | Nutt et al. | Oct. 26, 1943 |
| 2,343,955 | Cotterman | Mar. 11, 1944 |
| 2,514,963 | McRae | July 11, 1950 |
| 2,516,203 | Greenlee | July 25, 1950 |
| 2,516,208 | Hasbany | July 25, 1950 |
| 2,528,584 | Farkas | Nov. 7, 1950 |
| 2,528,585 | Farkas | Nov. 7, 1950 |
| 2,536,861 | Weeks et al. | Jan. 2, 1951 |
| 2,548,207 | Dunn | Apr. 10, 1951 |
| 2,576,336 | Farkas | Nov. 27, 1951 |
| 2,590,280 | Swift | Mar. 25, 1952 |
| 2,604,197 | Livermore | July 22, 1952 |
| 2,604,963 | Randol | July 29, 1952 |
| 2,629,265 | Dodge | Feb. 24, 1953 |
| 2,633,760 | Kelley | Apr. 7, 1953 |
| 2,640,373 | Jandasek | June 2, 1953 |
| 2,644,559 | Randol | July 7, 1953 |
| 2,645,137 | Roche | July 14, 1953 |
| 2,737,824 | Livermore | Mar. 13, 1956 |

FOREIGN PATENTS

| Number | Country | Date |
|---|---|---|
| 809,102 | France | Feb. 24, 1937 |
| 48,019 | France | Oct. 16, 1937 |
| | (Addition to No. 809,102) | |

OTHER REFERENCES

Publication: Packard Serviceman's Training Book, Packard Motor Car Co., Detroit, Mich. (June 27, 1949).